(12) United States Patent
Middleton et al.

(10) Patent No.: US 8,613,612 B2
(45) Date of Patent: *Dec. 24, 2013

(54) CONTAINER HAVING A RIM OR OTHER FEATURE ENCAPSULATED BY OR FORMED FROM INJECTION-MOLDED MATERIAL

(75) Inventors: Scott William Middleton, Oshkosh, WI (US); Mark Richard Sinclair, Arvada, CO (US); Brian Robert O'Hagan, Appleton, WI (US); Patrick Henry Wnek, Sherwood, WI (US); Terrence Philip Lafferty, Winnecome, WI (US); Peter Walrave Blaas, Marion, WI (US); Kevin James Hjort, Clintonville, WI (US); Patrick James Smith, Iola, WI (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,976

(22) Filed: Jul. 27, 2011

(65) Prior Publication Data

US 2011/0278762 A1    Nov. 17, 2011

Related U.S. Application Data

(60) Division of application No. 12/950,215, filed on Nov. 19, 2010, which is a continuation of application No. 11/578,357, filed as application No. PCT/US03/32164 on Oct. 8, 2003, now Pat. No. 7,862,318, which is a continuation of application No. PCT/US03/08491, filed on Mar. 17, 2003.

(60) Provisional application No. 60/417,192, filed on Oct. 8, 2002, provisional application No. 60/488,209, filed on Jul. 15, 2003, provisional application No. 60/500,519, filed on Sep. 4, 2003, provisional application No. 60/364,560, filed on Mar. 15, 2002.

(51) Int. Cl.
*B29C 45/14* (2006.01)

(52) U.S. Cl.
USPC .................. 425/112; 425/129.1; 425/394

(58) Field of Classification Search
USPC ....................... 425/112, 129.1, 394
See application file for complete search history.

(56) References Cited

U.S. PATENT DOCUMENTS 2,522,397 A    9/1950  Palmer
2,634,880 A    4/1953  Gravatt
(Continued)

FOREIGN PATENT DOCUMENTS

DE            295 837 C     11/1914
DE         24 22 080 A1    11/1975
(Continued)

OTHER PUBLICATIONS

Rosato, Dominick V. et al.; (2000); Injection Molding Handbook (3$^{rd}$ Edition), Kluwer Academic Publishers. Online version available at: http://www.knovel.com/web/portal/browse/display?_EXT_KNOVEL_DISPLAY_bookid=1009&VerticalID=0.

(Continued)

*Primary Examiner* — James Sanders
(74) *Attorney, Agent, or Firm* — Womble Carlyle Sandridge & Rice, LLP

(57) ABSTRACT

A tool and method for forming a container from a construct. The tool comprising a cavity for receiving a construct, a core operatively associated with the cavity and being operable to move into the cavity, an injection cavity for receiving injection-molding material and directing injection-molding material around at least a portion of the perimeter of the construct, and a clamping feature. The clamping feature is operatively connected to at least one of the cavity and the core and is for clamping a peripheral portion of the construct as the core moves into the cavity to form the construct into the container.

15 Claims, 120 Drawing Sheets

(56) References Cited

U.S. PATENT DOCUMENTS

| | | |
|---|---|---|
| 3,099,377 A | 7/1963 | Metzler et al. |
| 3,135,455 A | 6/1964 | Santagelo |
| 3,144,167 A | 8/1964 | Schultz |
| 3,190,530 A | 6/1965 | Edwards |
| 3,286,876 A | 11/1966 | Ring |
| 3,337,664 A * | 8/1967 | Lyon .................. 264/547 |
| 3,511,902 A * | 5/1970 | Santangelo ............. 264/163 |
| 3,680,733 A | 8/1972 | Winslow |
| 3,684,633 A | 8/1972 | Haase |
| 3,765,976 A | 10/1973 | Nasica |
| 3,973,689 A | 8/1976 | Sutch |
| 4,079,851 A | 3/1978 | Valyi |
| 4,123,214 A | 10/1978 | Sutch |
| 4,139,115 A | 2/1979 | Robinson |
| 4,183,435 A | 1/1980 | Thompson et al. |
| 4,228,121 A * | 10/1980 | Meadors ................. 264/291 |
| 4,404,162 A | 9/1983 | Miki et al. |
| 4,533,065 A | 8/1985 | Chazal et al. |
| 4,533,312 A | 8/1985 | Von Holdt |
| 4,579,745 A | 4/1986 | Mei Sue |
| 4,609,140 A | 9/1986 | Van Handel et al. |
| 4,704,510 A | 11/1987 | Matsui |
| 4,725,219 A | 2/1988 | Jakobsen et al. |
| 4,751,035 A | 6/1988 | McHenry et al. |
| 4,778,439 A | 10/1988 | Alexander |
| 4,935,089 A | 6/1990 | Schirmer |
| 5,061,415 A | 10/1991 | Depcik |
| 5,190,209 A | 3/1993 | Gordon et al. |
| 5,219,461 A | 6/1993 | Hyll et al. |
| 5,246,721 A | 9/1993 | Kerkonian |
| 5,269,717 A | 12/1993 | Tardif |
| 5,758,773 A | 6/1998 | Clements |
| 5,934,472 A | 8/1999 | Ramirez et al. |
| 6,001,457 A | 12/1999 | Ito et al. |
| 6,682,675 B1 | 1/2004 | Vandangeot et al. |
| 6,682,676 B1 | 1/2004 | Renault et al. |
| 6,717,121 B2 | 4/2004 | Zeng et al. |
| 6,790,026 B2 | 9/2004 | Vandangeot et al. |
| 6,981,863 B2 | 1/2006 | Renault et al. |
| 6,988,654 B2 | 1/2006 | Wnek |
| 7,862,318 B2 | 1/2011 | Middleton et al. |
| 2001/0004003 A1 | 6/2001 | Watanabe et al. |
| 2002/0185779 A1 * | 12/2002 | Renault et al. ............. 264/259 |
| 2003/0014912 A1 | 1/2003 | Prosperio |
| 2011/0065556 A1 | 3/2011 | Middleton et al. |

FOREIGN PATENT DOCUMENTS

| | | |
|---|---|---|
| FR | 1 574 908 A | 7/1969 |
| FR | 2 733 715 | 11/1996 |
| FR | 2806346 | 9/2001 |
| FR | 2806347 | 9/2001 |
| GB | 1 348 370 | 3/1974 |
| GB | 1 502 266 | 3/1978 |
| GB | 2 171 048 A | 8/1986 |
| JP | 47-23456 | 10/1972 |
| JP | 54-116059 | 9/1979 |
| JP | 54-126887 | 10/1979 |
| JP | 56065866 U | 6/1981 |
| JP | 59-75004 | 4/1984 |
| JP | 03-004582 | 1/1991 |
| JP | 3057020 U | 5/1991 |
| JP | 6000843 | 1/1994 |
| JP | 60-96234 | 4/1994 |
| JP | 07-28833 | 5/1995 |
| JP | 08-156944 | 6/1996 |
| JP | 08-337235 | 12/1996 |
| JP | 09-254948 | 9/1997 |
| JP | 2000-043840 | 2/2000 |
| JP | 2000-142825 | 5/2000 |
| JP | 2000-238760 | 9/2000 |
| JP | 2000-335550 | 12/2000 |
| JP | 2001-213420 | 8/2001 |
| JP | 2001-328617 | 11/2001 |
| WO | WO 9408777 | 4/1994 |

OTHER PUBLICATIONS

Office Action for Canadian Application No. 2,682,809, dated Oct. 3, 2011.

* cited by examiner

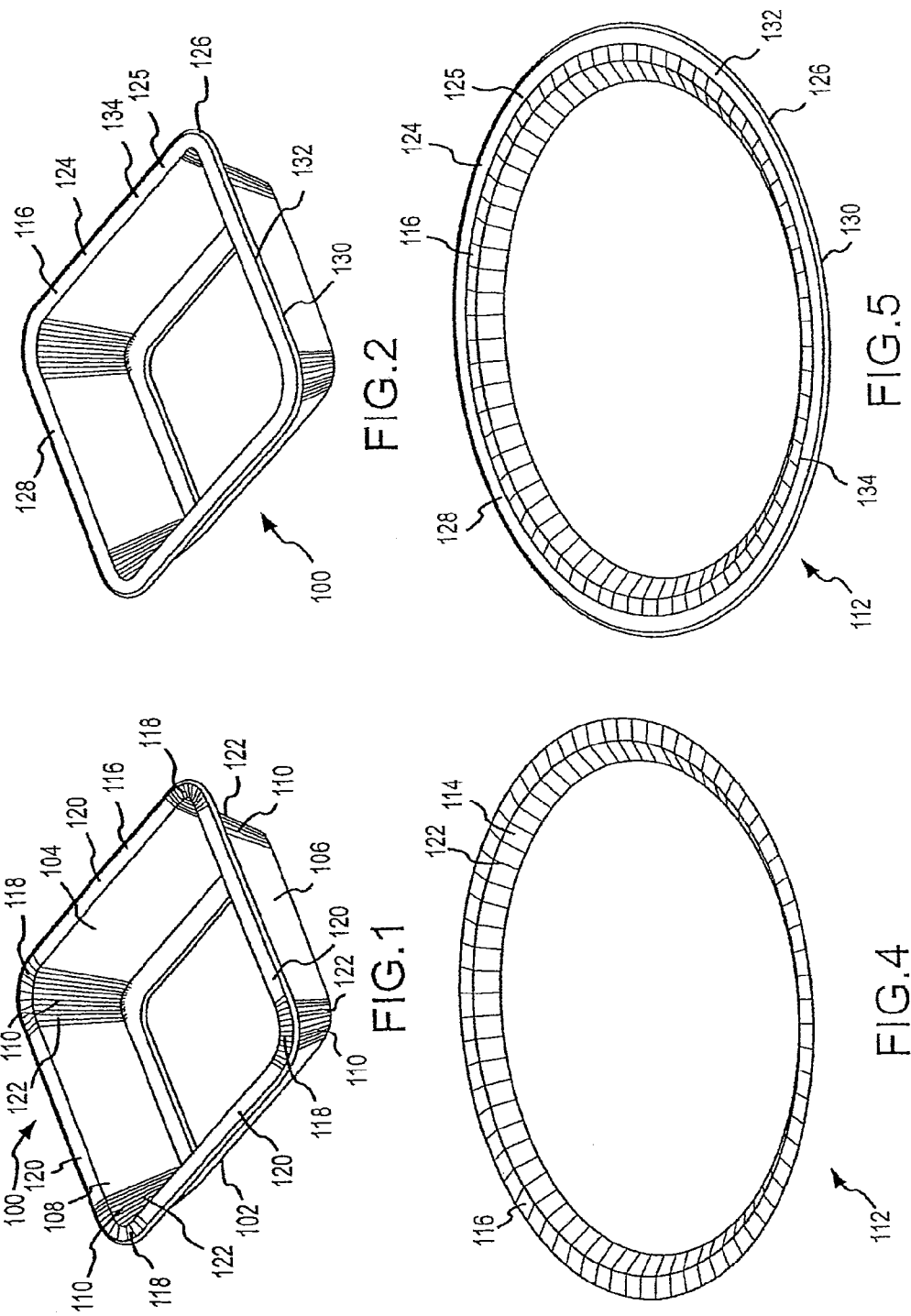

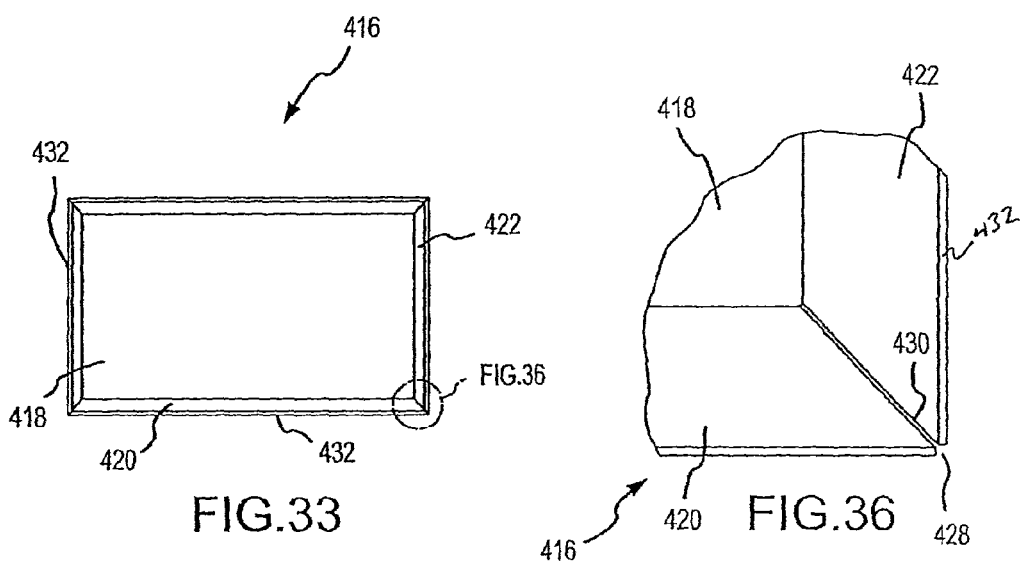
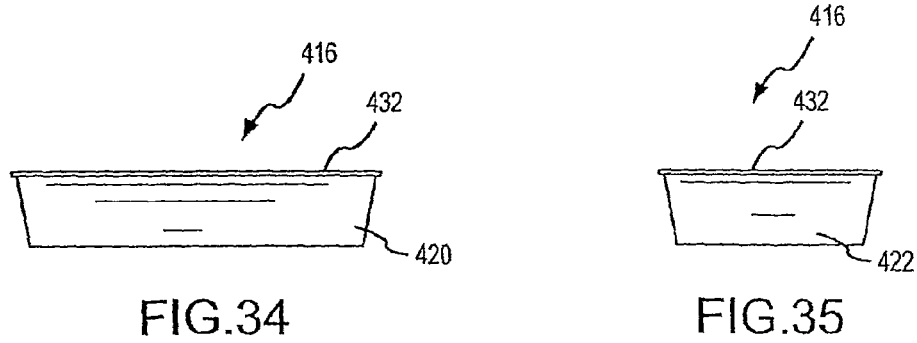

424

426

476

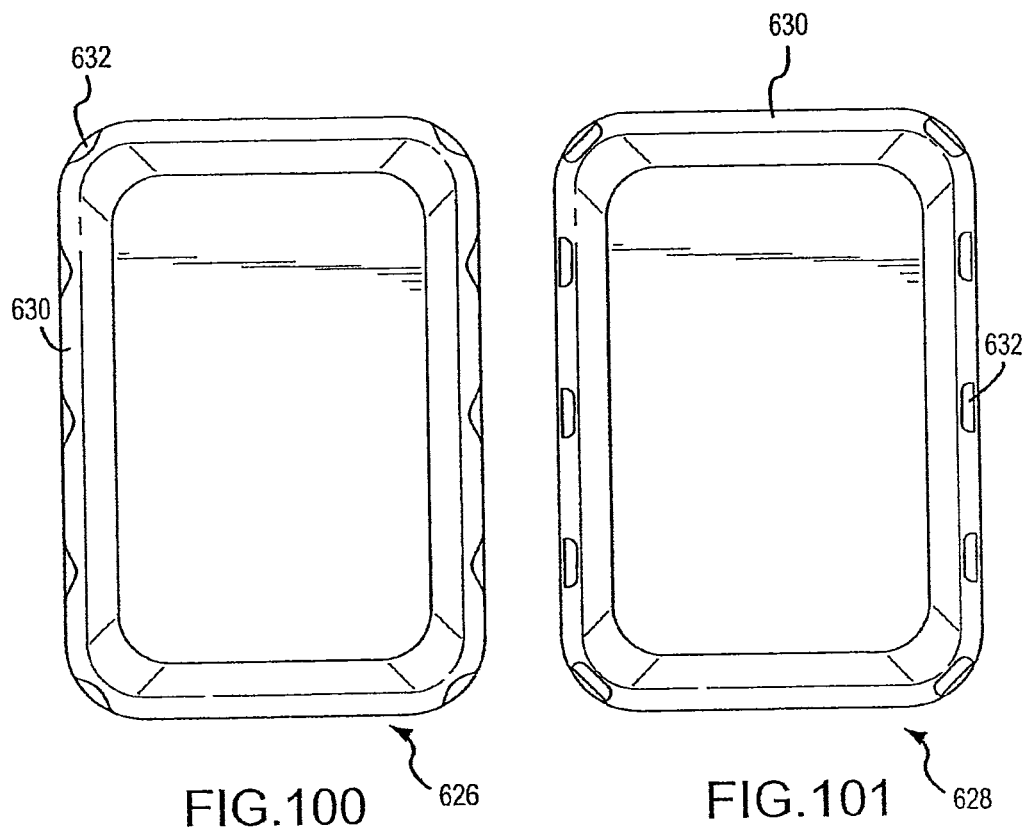

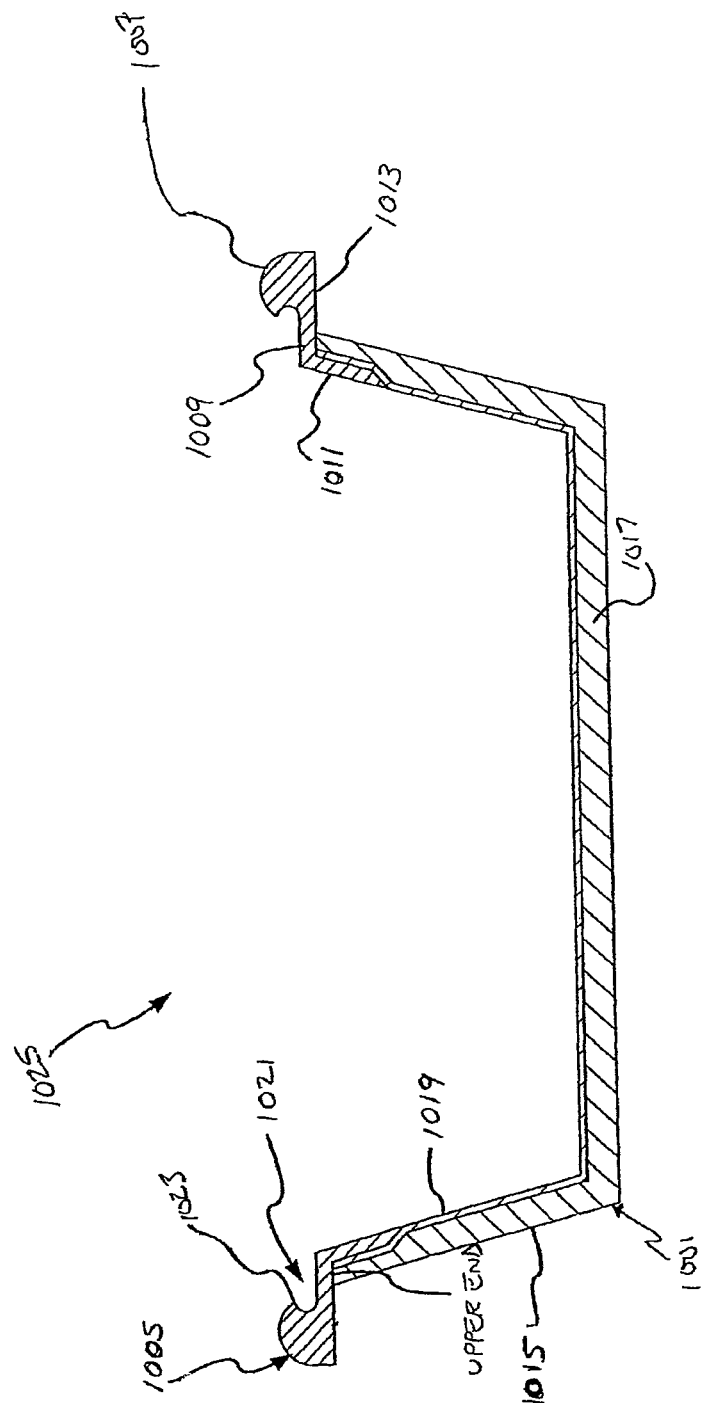

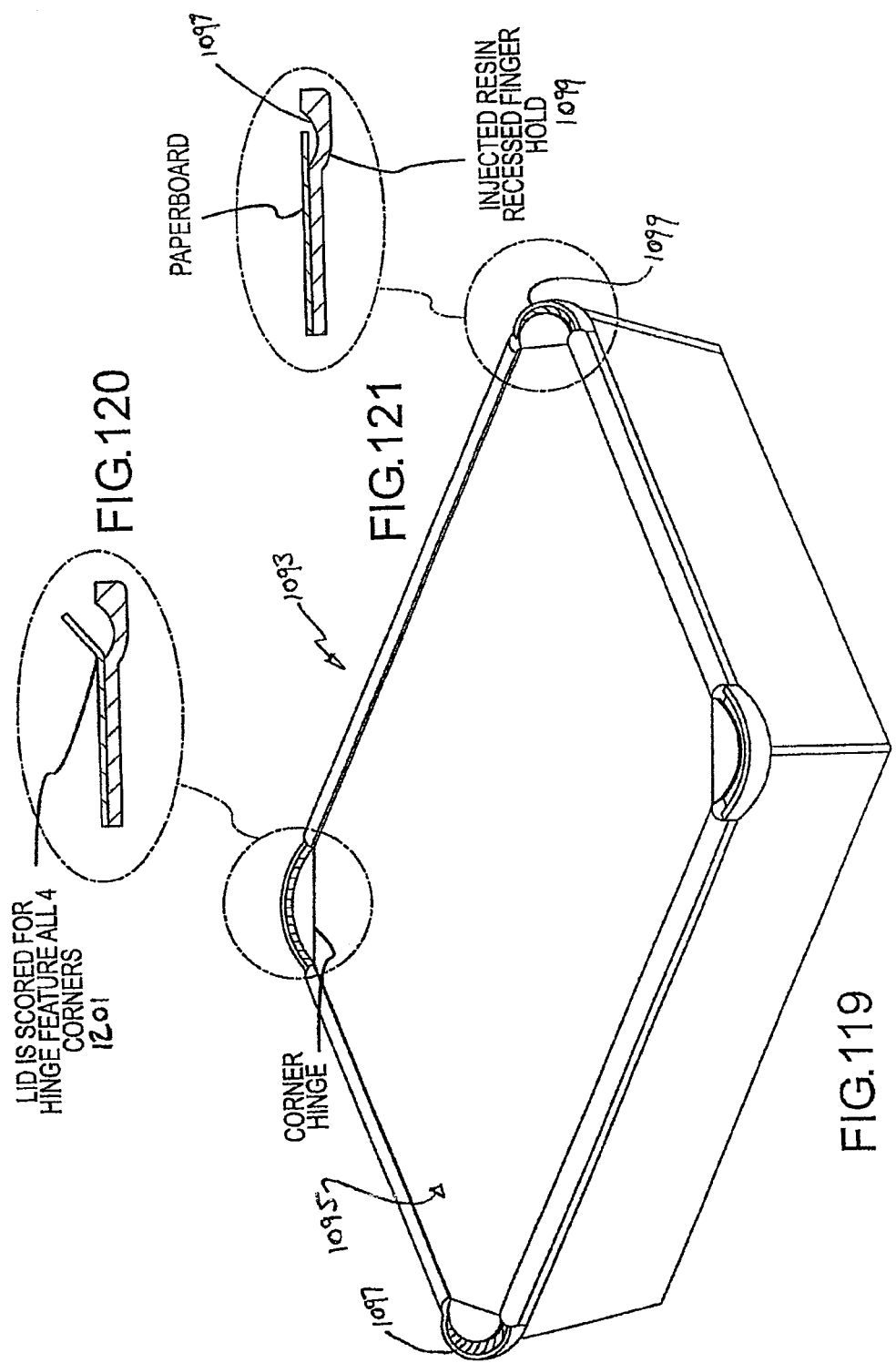

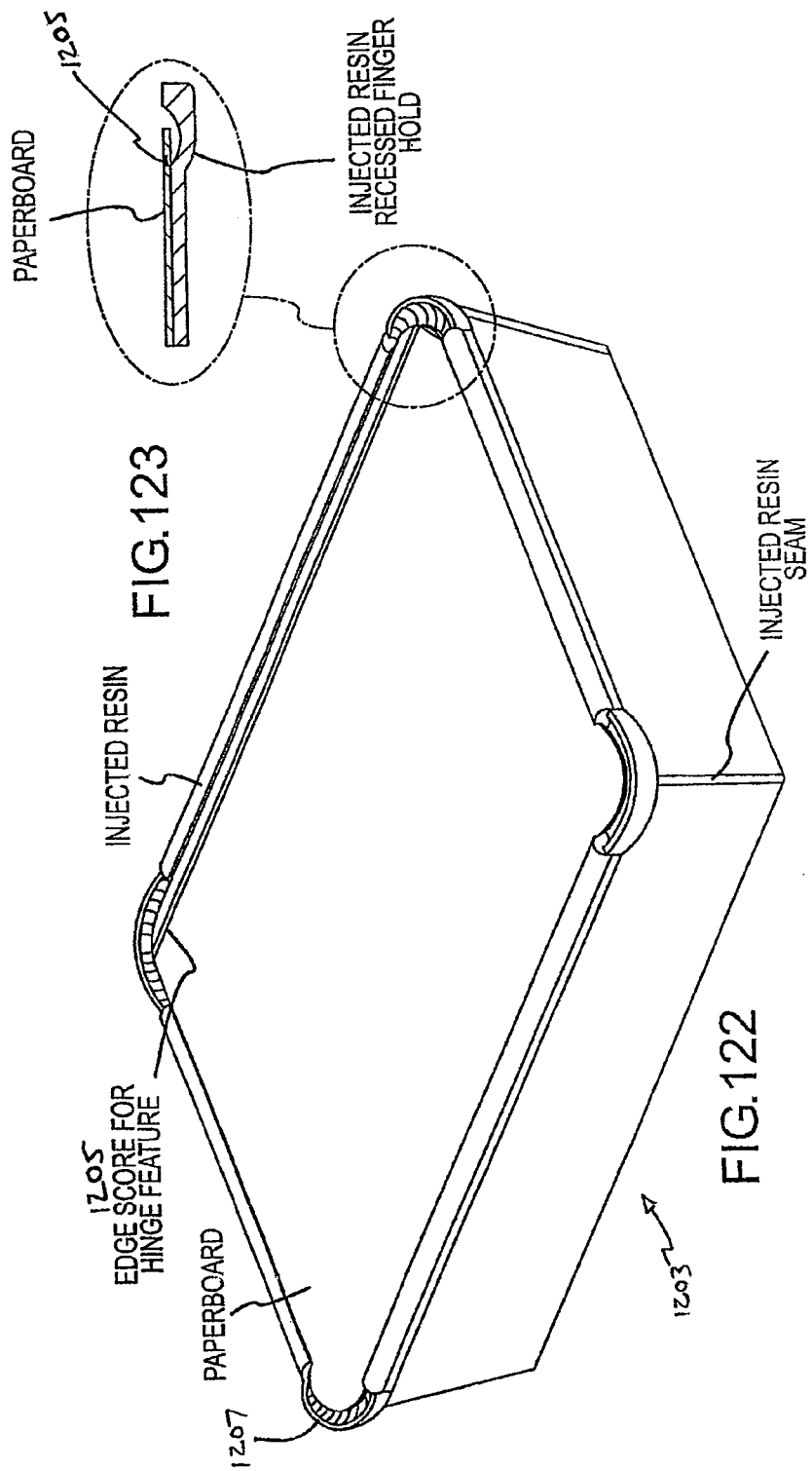

FIG.165       FIG.166
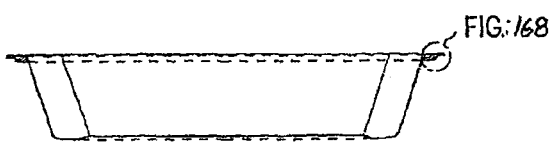
FIG.167
FIG.168
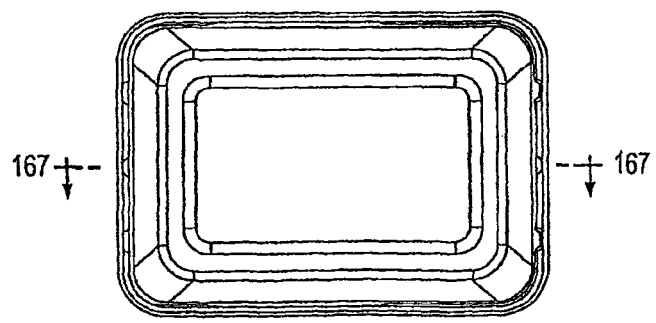
FIG.164

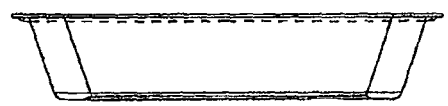
FIG.170  FIG.171
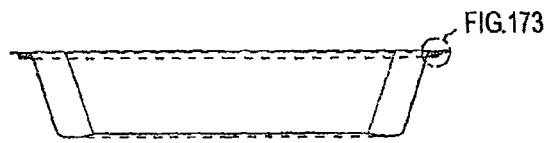
FIG.172
FIG.173
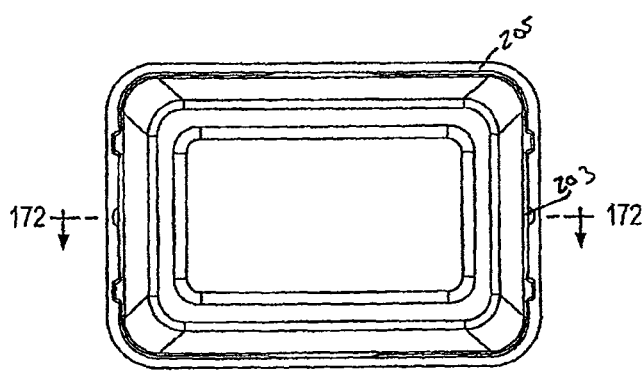
FIG.169

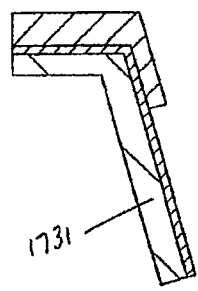
FIG.198
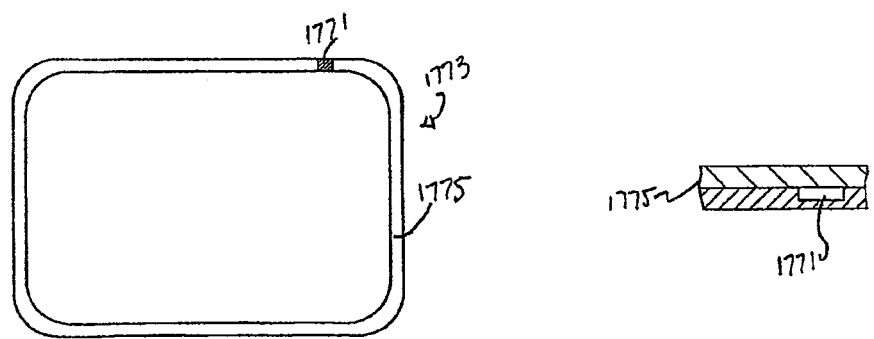
FIG.199
FIG.200

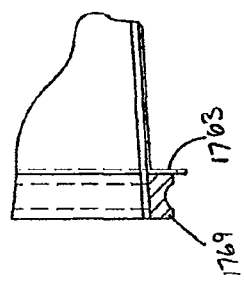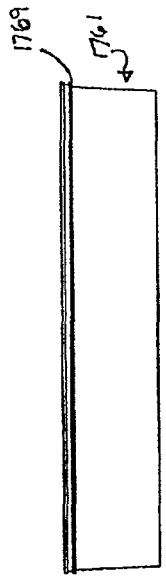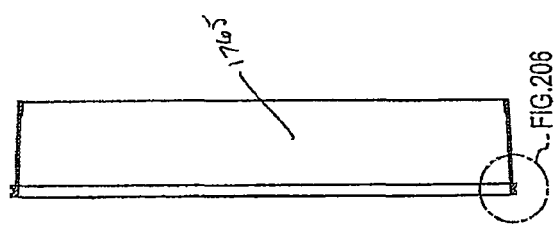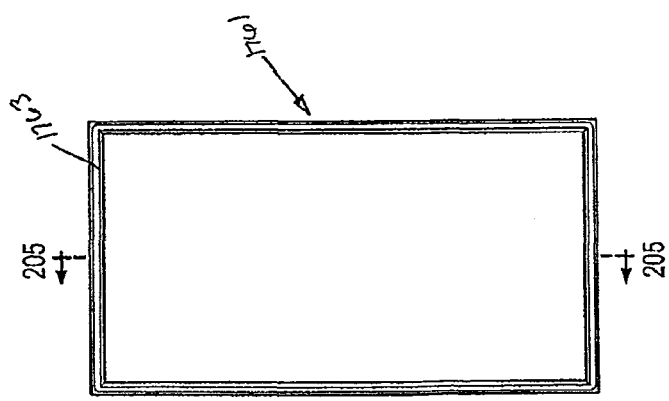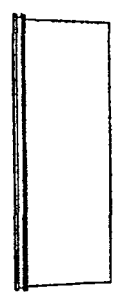

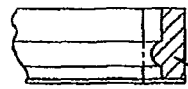
FIG.219
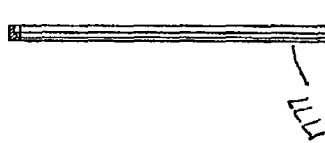
FIG.218
FIG.221
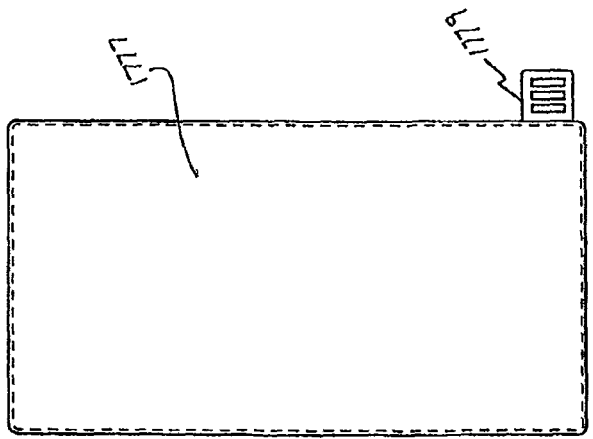
FIG.217
FIG.220

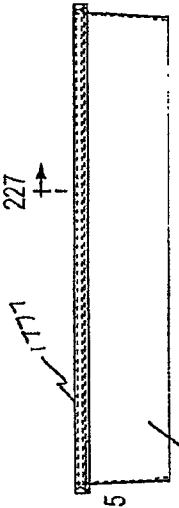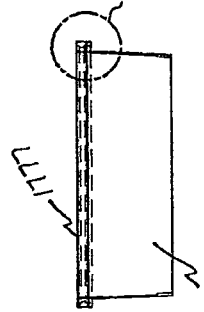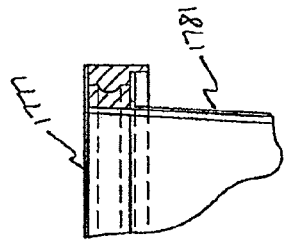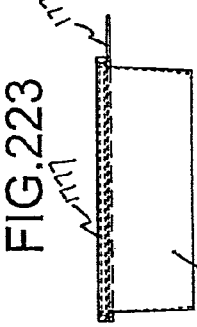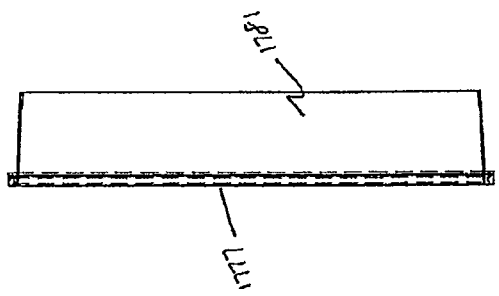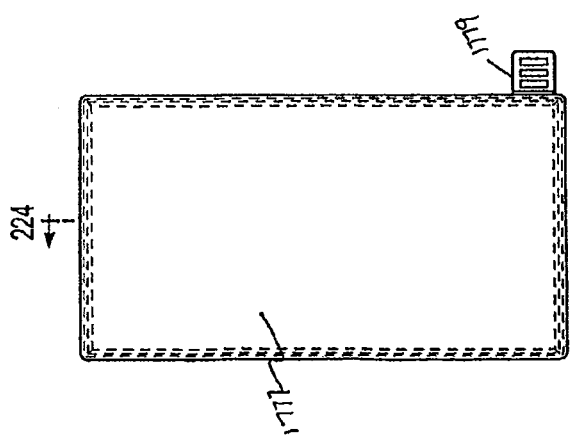

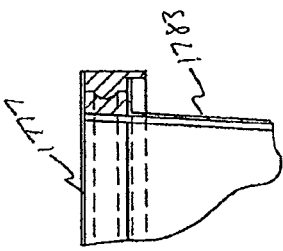
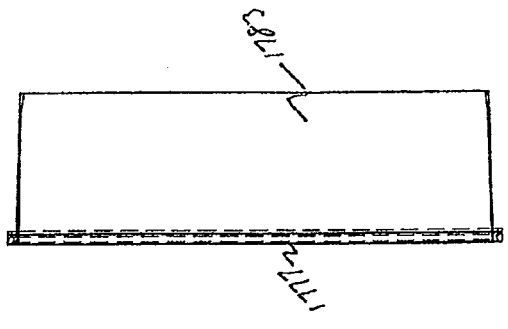
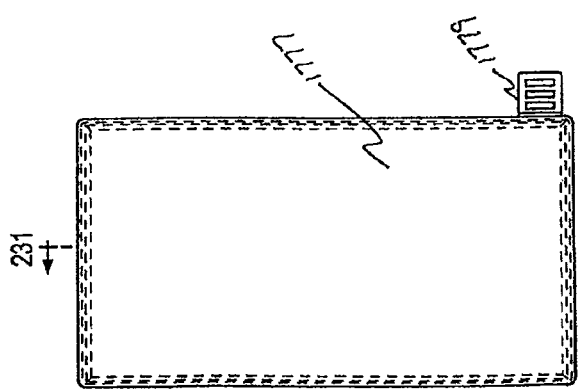
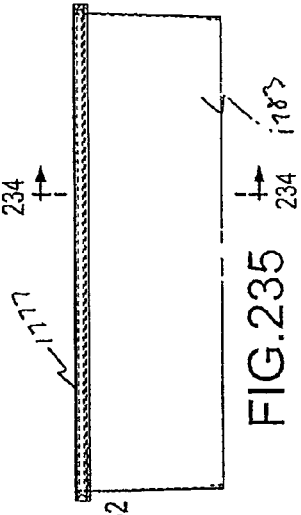
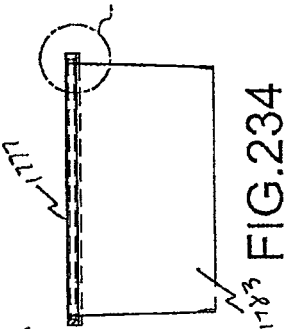
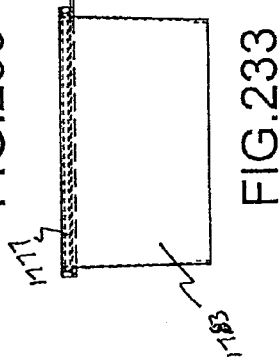

CONTAINER HAVING A RIM OR OTHER FEATURE ENCAPSULATED BY OR FORMED FROM INJECTION-MOLDED MATERIAL

CROSS-REFERENCE TO RELATED APPLICATIONS

This application is a divisional of U.S. patent application Ser. No. 12/950,215, filed Nov. 19, 2010, which application is a continuation of U.S. patent application Ser. No. 11/578,357, filed Apr. 17, 2007 (now U.S. Pat. No. 7,862,318), which application is the national stage of International Application No. PCT/US2003/32164, filed Oct. 8, 2003, which claims the benefit of U.S. Provisional Application No. 60/500,519, filed Sep. 4, 2003 (the '519 application), U.S. Provisional Application No. 60/488,209, filed Jul. 15, 2003 (the '209 application), U.S. Provisional Application No. 60/417,192, filed Oct. 8, 2002 (the '192 application), and International Application No. PCT/US2003/08491, filed Mar. 17, 2003 (the '491 application), which claims the benefit of U.S. Provisional Application No. 60/417,192, filed Oct. 8, 2002 (the '192 application) and U.S. Provisional Application No. 60/364,560, filed Mar. 15, 2002 (the '560 application)

INCORPORATION BY REFERENCE

U.S. patent application Ser. No. 12/950,215, filed Nov. 19, 2010, U.S. Pat. No. 7,862,318, filed Apr. 17, 2007, International Application No. PCT/US2003/32164, filed Oct. 8, 2003, U.S. Provisional Application No. 60/500,519, filed Sep. 4, 2003, U.S. Provisional Application No. 60/488,209, filed Jul. 15, 2003, International Application No. PCT/US2003/08491, filed Mar. 17, 2003, U.S. Provisional Application No. 60/417,192, filed Oct. 8, 2002, and U.S. Provisional Application No. 60/364,560, filed Mar. 15, 2002, are hereby incorporated by reference for all purposes as if presented herein in their entirety.

FIELD OF THE INVENTION

This invention relates generally to a container, and more specifically to a container having a flange, rim, handle, rib, bottom surface, sidewall, or other feature that is encapsulated by or formed from injection-molded material.

BACKGROUND OF THE INVENTION

For many years, perishable goods such as foodstuffs have been stored in sealed trays or containers. Press-formed paperboard trays are typically formed by pressure forming a single sheet or blank of material, which may comprise multiple layers that have been laminated together, into a predetermined shape, or by folding and adhering the sheet or blank into the desired tray shape. Once assembled, the tray may be filled and closed.

Typically, gaps in the tray surface created during the pressure forming or folding of the tray present avenues for gas and moisture to enter the tray that has been sealed by known means (for example, a lid film). For example, many modern trays are pressure formed in a mold that creates pleated or crimped corners, walls, rims, or flange areas as a byproduct of forcing the tray into a desired shape. As a further example, trays formed by folding a blank generally have overlapping partial walls that are imperfectly adhered to one another, leaving irregularities between the walls where no adhesive is present.

Many times, trays are sealed with a separate lid, plastic film, or other top designed to minimize airflow or vapor flow into the tray interior. Few such barriers, however, form a perfectly hermetic seal. The aforementioned gaps and irregularities prevent the tray and top from uniformly mating, because the top is insufficiently flexible to fill in such minute spaces in the rim or flange areas of the tray. Thus, even though a partially effective seal may be created, the tray contents are nonetheless exposed to some amount of external air and moisture seeping through these gaps. This in turn accelerates the spoiling of the tray's contents.

Further, many trays or containers are relatively flimsy. Oftentimes a tray may buckle under a comparatively light weight due to inherent weaknesses in the paperboard material and processes used to form the tray. That is, the tray sidewalls do not provide sufficient support to prevent the tray from bending, folding, or torquing when a load is placed on the tray. Such trays may also become substantially weaker if they are exposed to high moisture environments, such as those present in a refrigerator, microwave over, or freezer.

A tray may also be difficult to carry, due to its size and awkwardness. Especially large trays, whether circular or rectangular, easily shift masses placed thereon when the tray is carried from beneath. This in turn changes the balance of the tray and may cause the tray to be dropped. Similarly, many large trays are too flimsy to be carried by the edges, or lack a good gripping area along the edges.

Many cooking trays may be loaded with different types of food and heated in an oven, microwave, or other suitable appliance. As these foods heat, they may run together, creating an unappetizing appearance and taste. Further, a cooking tray may unevenly distribute heat across its interior surface, causing food in different portions of the tray to heat unevenly. Finally, many cooking trays are not reusable or washable, because the tray material cannot withstand immersion in water or detergent.

Accordingly, there is a need in the art for an improved tray.

BRIEF SUMMARY OF THE INVENTION

In one form, the invention is generally a container having a rim feature, such as an encapsulated portion of the tray body, formed from injection-molded material. The container may be hermetically salable. Typically, the injection-molded material is some form of plastic, although other materials such as rubber may be used. Different embodiments may have different injection-molded features, such as an encapsulated rim, handle, tray interior, sidewall, divider, and so forth. Further, depending on the nature of the rim feature and intended tray use, the injection-molded material may vary.

In one form, the invention generally comprises a tray having a fully- or partially-encapsulated rim. It should be understood throughout this document that a reference to an "encapsulated rim" embraces both fully- and partially-encapsulated rims, unless specifically stated otherwise. Further, the terms "encapsulated rim" and "encapsulated flange" may be used interchangeably. The tray may be of varying shapes and sizes, but typically has at least one sidewall with a top edge and a bottom surface adjacent or connected to the sidewall. The sidewall may be circular or several sidewalls may exist. For example, a rectangular tray would have four sidewalls.

The tray may have a flange extending outwardly from the sidewall or sidewalls. The flange generally extends parallel to the bottom surface of the tray, but may instead extend at other angles. Typically, the flange and sidewall contain irregularities created during creation of the tray. For example, the flange and sidewall might be pleated or crimped as a result of press-forming the tray.

Generally, the encapsulated rim is made of the flange and an encapsulating material. The encapsulating material supports, and at least partially surrounds, the flange and may be substantially uniformly thick. The encapsulating material is generally made of a plastic such as polyolefin, nylon, polyethylene terepthalate, polycarbonate, or other engineering thermoplastic resins, but may also be made from other materials. This encapsulating material covers a portion of the flange and may extend a distance from the flange's outer edge. The exterior of the encapsulating material is substantially smooth, even those portions filling or overlying irregularities in the flange. Further, the encapsulated rim presents a hermetic barrier to gases and moisture, and may be sealed with a film or other material to completely insulate the tray interior. In one form, the tray does not include a paperboard flange. Rather, the encapsulating material encapsulates the upper edge of the sidewall or sidewalls, forming a flange in the process.

Depending on the type of tray, the encapsulated rim may also provide structural support. By controlling the geometry of the encapsulated rim, it is possible to strengthen and stabilize the tray even if the injection-molded material comprising the encapsulating rim has a lower modulus than the paperboard itself. This provides a benefit to any and all trays not requiring a hermetic seal, such as common paper plates or pressed trays.

Further, the injection-molded or encapsulated features may include handles to simplify carrying the tray, interior ribs or dividers to keep foodstuffs separate during cooking, or even a complete internal and external coating of the tray in order to permit washing, drying, and reuse of the tray. In addition, an embodiment may have a hinged handle made of injection-molded material capable of folding inwardly for microwave cooking and outwardly for carrying.

An injection-molding tool or apparatus may injection-mold resin onto a tray to form the encapsulated rim or other encapsulated feature. The tool may be capable of both press-forming the tray from a tray blank and injection-molding resin onto the tray in a single operation, without requiring the adjustment, repositioning of, or moving of the tray between press-forming and injection-molding.

That the present invention fulfills the above-described needs and presents additional advantages will be apparent to one of ordinary skill in the art upon reading the description and claims set forth below.

BRIEF DESCRIPTION OF THE DRAWINGS

FIG. 1 is an isometric view of a rectangular tray having crimped or folded corners and an outwardly extending flange.

FIG. 2 is an isometric view of the rectangular tray of FIG. 1, but having an encapsulated rim in accordance with an embodiment of the present invention.

FIG. 4 is an isometric view of a circular tray having a crimped or folded side wall and an outwardly extending flange.

FIG. 5 is an isometric view of the circular tray of FIG. 4, but having an encapsulated rim in accordance with an embodiment of the present invention.

FIG. 33 is a top view of a five-panel blank folded into a tray shape prior to injection of material.

FIG. 34 is a side view of the folded five-panel blank of FIG. 33.

FIG. 35 is a front view of the folded five-panel blank of FIGS. 33 and 34.

FIG. 36 is an enlarged, fragmentary view of a corner of the five-panel blank of FIGS. 33-35 folded into a tray shape and showing a gap between adjacent walls of the tray.

FIG. 100 is a bottom-up view of a first embodiment of a tray having a cored encapsulated rim.

FIG. 101 is a bottom-up view of a second embodiment of a tray having a cored encapsulated rim.

FIG. 102 is a cross-sectional view of a tray having an encapsulated rim comprising an arcuate head portion, a flange portion, and an anchor portion.

FIG. 119 depicts a package wherein a lid having rounded corners is affixed to the tray of FIG. 118.

FIG. 120 is an enlarged, cross-sectional view through a first corner of the package depicted in FIG. 119, showing a corner hinge feature.

FIG. 121 is an enlarged, cross-sectional view through a second corner of the package depicted in FIG. 119, showing the opening feature recess.

FIG. 122 depicts a package similar to that depicted in FIG. 119, but having an edge score permitting the lid to hinge adjacent to one of its longer edges.

FIG. 123 is an enlarged, fragmentary, cross-sectional view through a corner of the package depicted in FIG. 122 and showing the opening feature recess.

FIG. 127 is similar to FIG. 125, but depicts a package wherein the encapsulated rim extends around the entire perimeter of the lid.

FIG. 128 is an enlarged, fragmentary, cross-sectional view through a portion of the encapsulated rim in an upper end of the tray sidewall.

FIGS. 129-131 are top down views depicting, in general, flow front progression during a center-point, resin-injection process.

FIGS. 132-139 are similar to FIGS. 129-131, but depict in greater detail resin flow front progression during center-point, resin injection designed to minimize flashing while encapsulating portions of a lidded tray.

FIG. 140 is an isometric view of a lidded tray having encapsulated portions formed from a center-point, resin-injection process.

FIGS. 141-146 are enlarged, fragmentary views showing corner flow details of the flow stages also depicted in FIGS. 134-136.

FIG. 147 is a plan view of a blank for a press-formed tray.

FIG. 148 is a press-formed tray having an encapsulated, injected-resin rim and formed from the blank depicted in FIG. 147.

FIG. 149 is a five-panel, folded formed blank that may be used to form a tray.

FIG. 150 is a tray having features formed from injected resin using a center-point, resin-injection process similar to the process previously described in connection with FIGS. 129-146.

FIG. 151 is a press-formed, folded blank that may be used to make a tray according to the present invention.

FIG. 152 is an isometric view of a tray having injected-resin features and formed from the blank depicted in FIG. 151 using the center-point, resin-injection process previously described in connection with FIG. 150.

Figure 153:
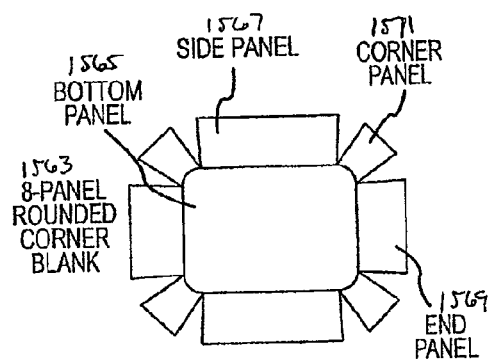

FIG. 153 is an eight-panel, rounded-corner blank.

Figure 154:
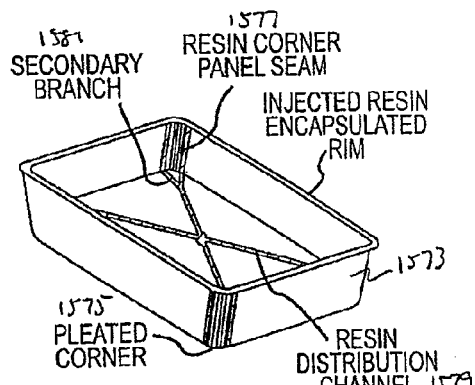

FIG. 154 is a tray formed from the blank of FIG. 153 using a center-point, resin-injection process.

Figure 155:
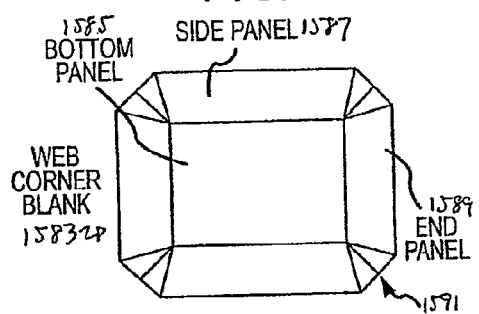

FIG. 155 is a web-corner blank.

Figure 156:
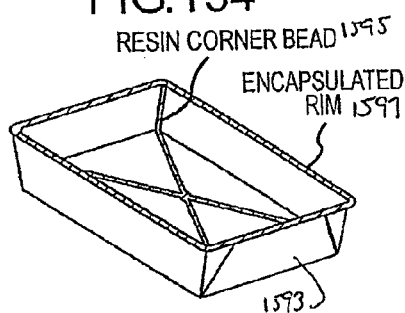

FIG. 156 is a tray formed from the web-corner blank of FIG. 155 using a center-point, resin-injection process.

Figure 157:
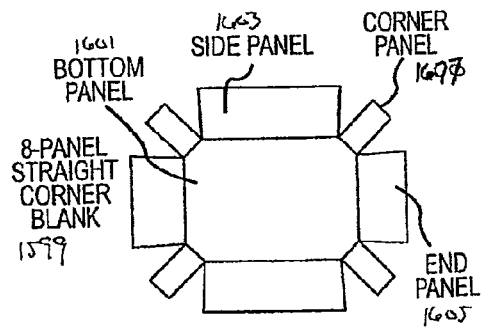

FIG. 157 is an eight-panel, straight-corner blank.

Figure 158:
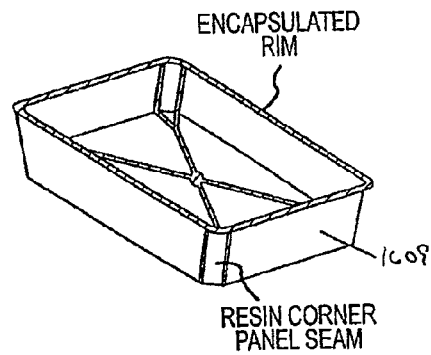

FIG. 158 is a tray formed from the blank depicted in FIG. 157 using a center-point, resin-injection process.

Figure 159:
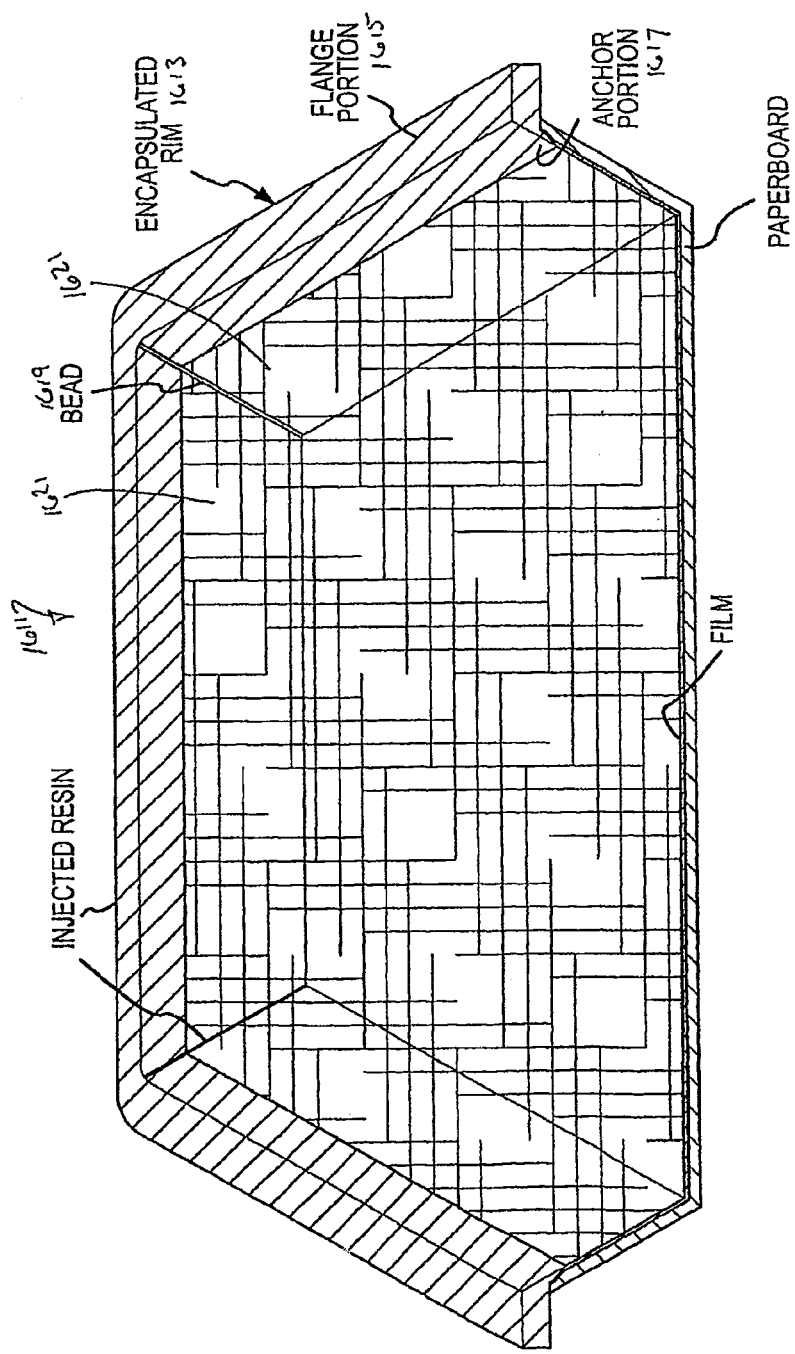

FIG. 159 is a cross-sectional view of a tray according to another embodiment of the present invention and having an encapsulated rim with a flange portion and an anchor portion.

Figure 160:
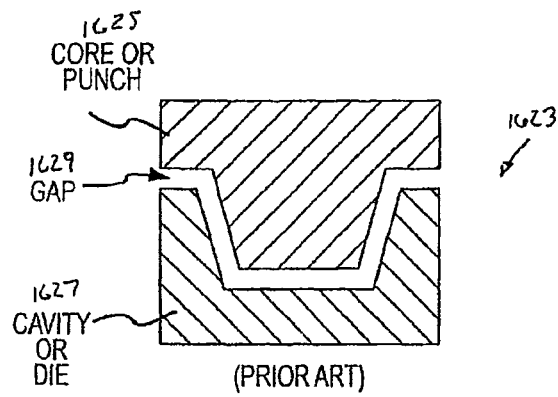

FIG. 160 is a schematic, cross-sectional view of a typical prior art forming tool with a core and a cavity.

Figure 161:
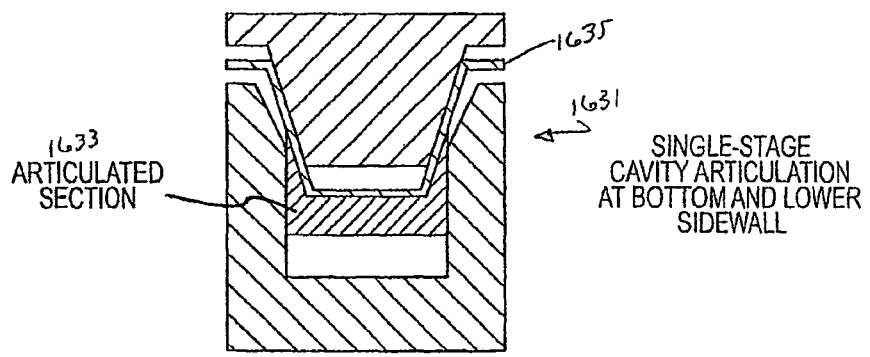

FIG. 161 is a schematic, cross-sectional view of a forming tool incorporating single-stage cavity articulation at the tray bottom and lower sidewall.

Figure 162:
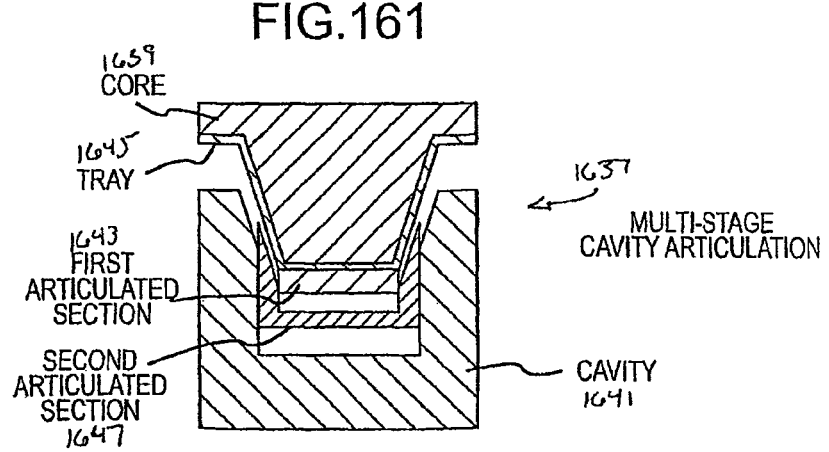

FIG. 162 is a schematic, cross-sectional view of a forming tool incorporating multi-stage cavity articulation.

Figure 163:
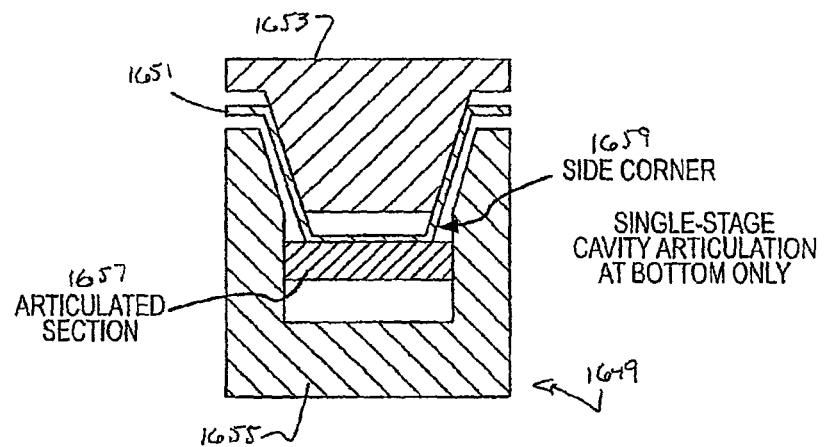

FIG. 163 is a schematic, cross-sectional view of a forming tool incorporating single-stage cavity articulation at the bottom of the tray only.

FIG. 164 is a view looking directly at the bottom of a press-formed tray with a partially-encapsulated rim according to one embodiment of the present invention.

FIG. 165 is a side view of the tray depicted in FIG. 164.

FIG. 166 is an end view of the tray depicted in FIGS. 164 and 165.

FIG. 167 is a cross-sectional view taken along line 167-167 of FIG. 164.

FIG. 168 is an enlarged, fragmentary, cross-sectional view of portion 168 in FIG. 167.

FIG. 169 is a view looking directly at the bottom of a press-formed tray with a partially-encapsulated rim according to another embodiment of the present invention.

FIG. 170 is a side view of the tray depicted in FIG. 169.

FIG. 171 is an end view of the tray depicted in FIGS. 169 and 170.

FIG. 172 is a cross-sectional view taken along line 172-172 of FIG. 169.

FIG. 173 is an enlarged, fragmentary, cross-sectional view of portion 173 in FIG. 172.

Figure 174:
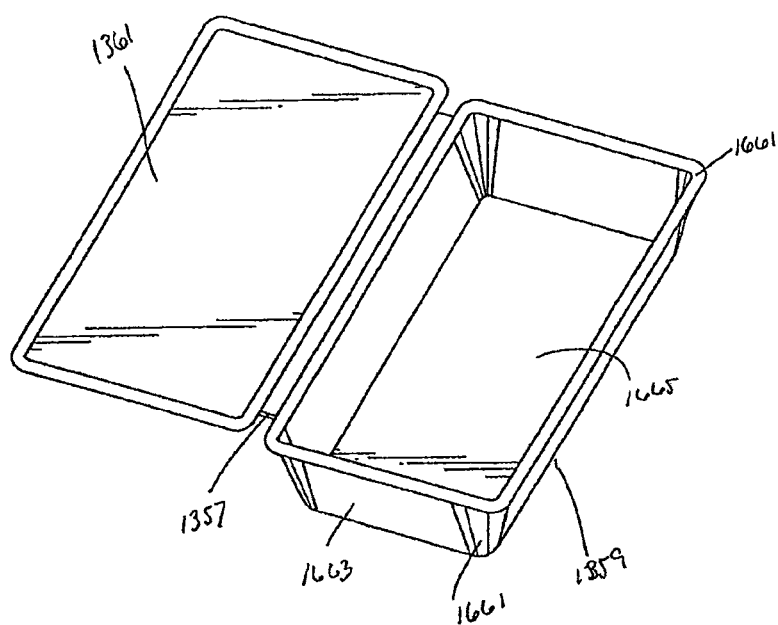

FIG. 174 is an isometric view of a folded-style, injection-molded polymer paperboard composite package manufactured using a co-extrusion injection-molded process for improved gas barrier properties.

Figure 175:
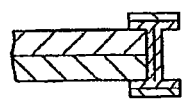

FIG. 175 is an enlarged, fragmentary cross-sectional view of a portion of FIG. 174.

Figure 176:
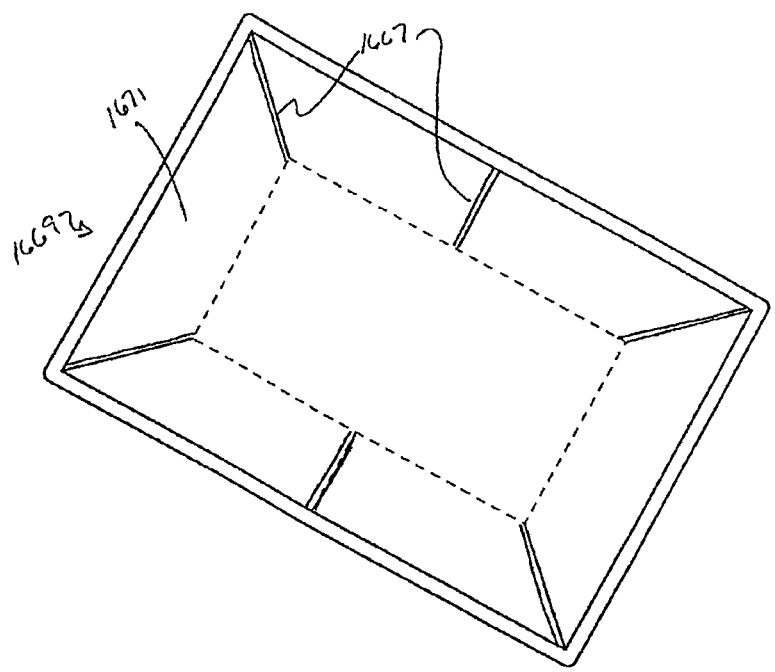

FIG. 176 is a top plan view of a package like that shown in FIG. 174, but also including supporting ribs on the inside of the package as an injection-molded stiffening feature.

Figure 177:
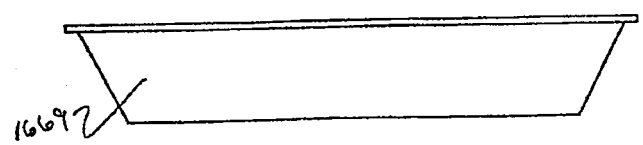

FIG. 177 is a side view of the package depicted in FIG. 176, demonstrating that the supporting ribs shown in FIG. 176 are not visible from outside the package.

FIGS. 178-182 depict examples of cylindrical containers that can be made with the same technology used to make the packages depicted in FIGS. 174-177.

Figure 183:
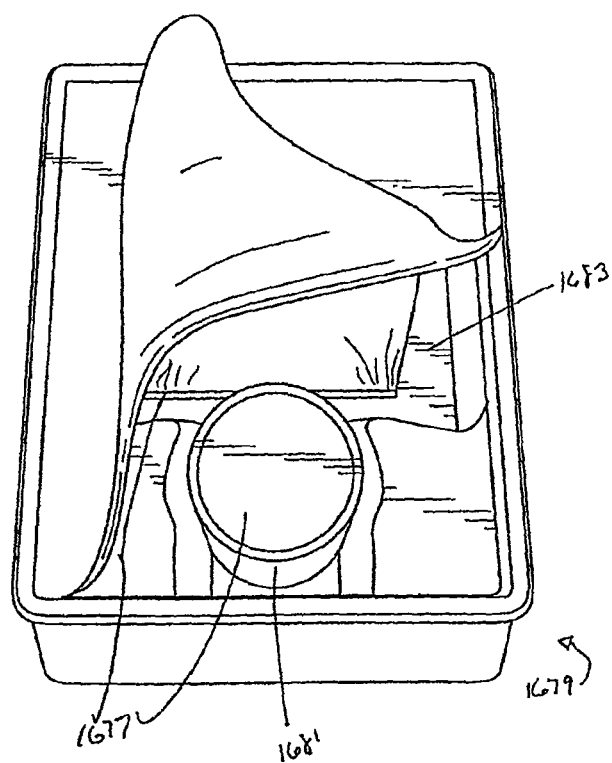

FIG. 183 is an open, prior art compartmented tray, having first and second secondary packages in first and second compartments, respectively.

Figure 184:
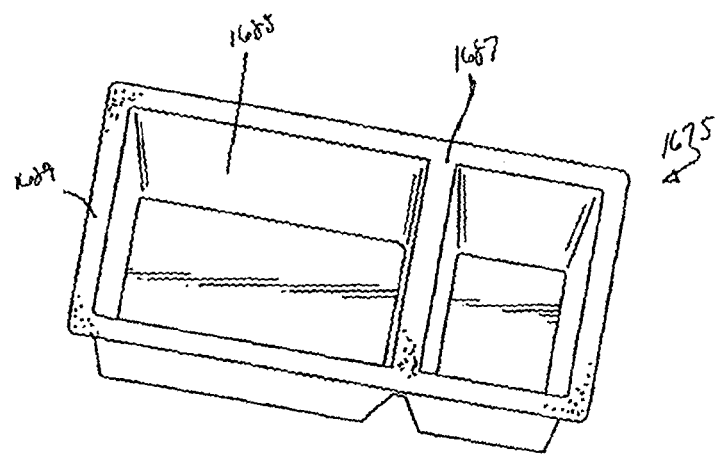
Figure 185:
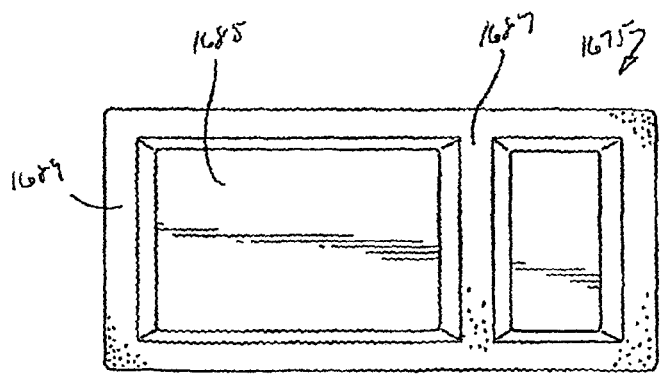

FIGS. 184 and 185 depict an example of a compartmented tray according to the present invention, wherein different compartments of the same tray have different characteristics.

Figure 186:
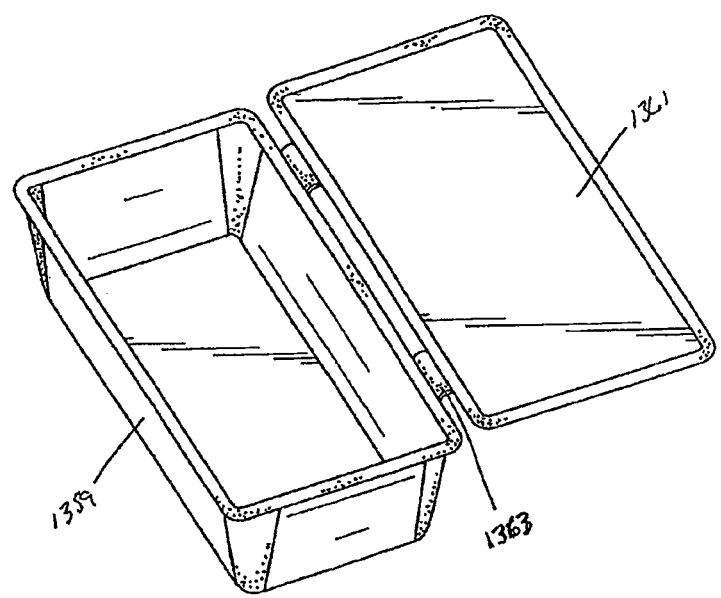

FIG. 186 depicts an example of a one-piece package made in accordance with an embodiment of the present invention, wherein a lid is connected to a tray by a pair of short living hinges.

Figure 187:
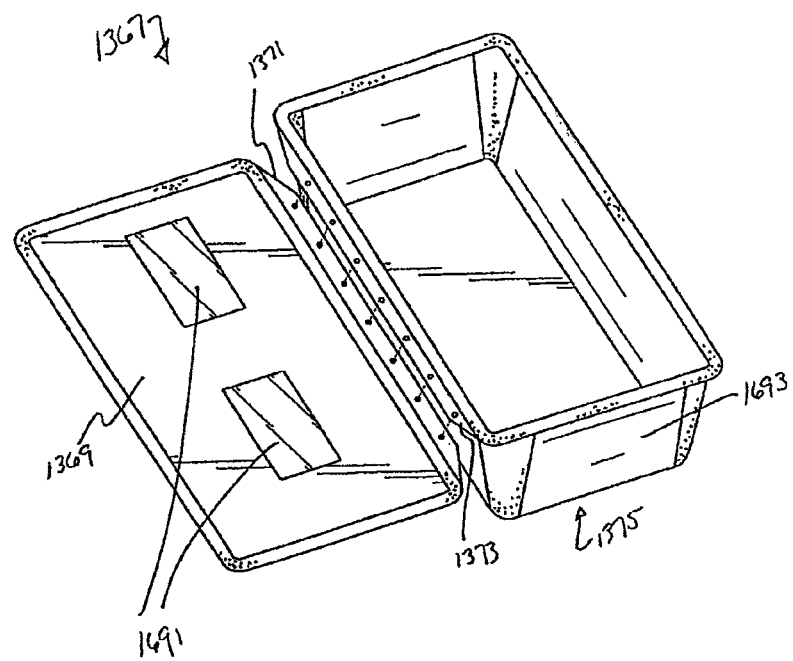

FIG. 187 depicts an example of a two-piece package made in accordance with an embodiment of the present invention, wherein a lid having a pair of windows and a living hinge is about to be mechanically adhered to a mounting surface comprising part of a formed tray.

Figure 188:
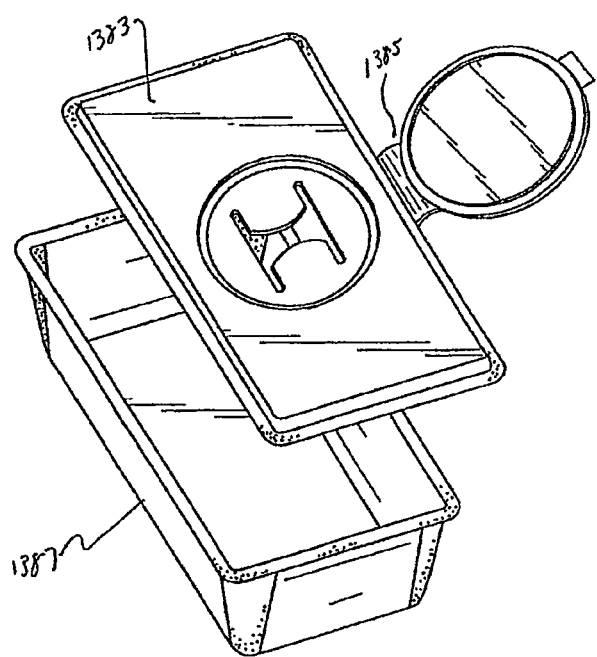

FIG. 188 depicts an example of a two-piece package made in accordance with an embodiment of the present invention, wherein a snap-fit lid with a living hinge dispensing feature is about to be snapped to a formed tray.

Figure 189:
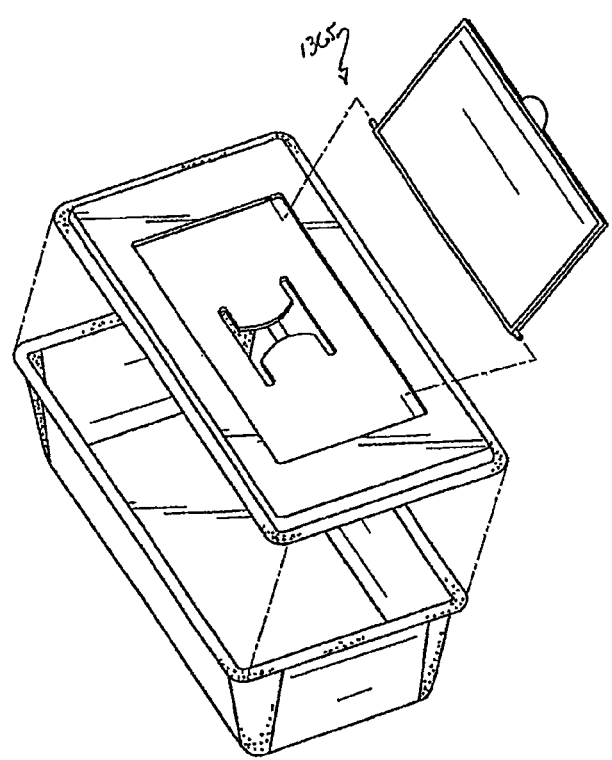

FIG. 189 depicts an example of a two-piece package made in accordance with an embodiment of the present invention, wherein a snap-fit lid with a mechanically-hinge dispensing feature is about to be snapped to a formed tray.

Figure 190:
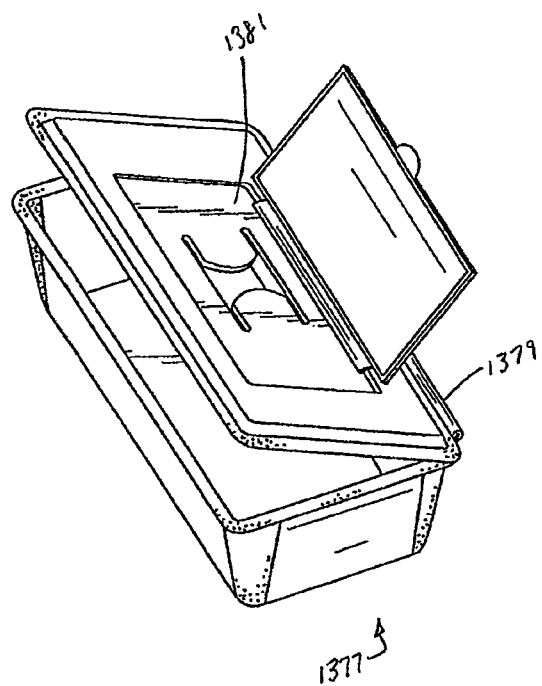

FIG. 190 depicts an example of a one-piece package made in accordance with an embodiment of the present invention, wherein a lid is connected to a tray by a living hinge, and where a dispensing feature lid is connected to the tray by a second living hinge.

Figure 191:
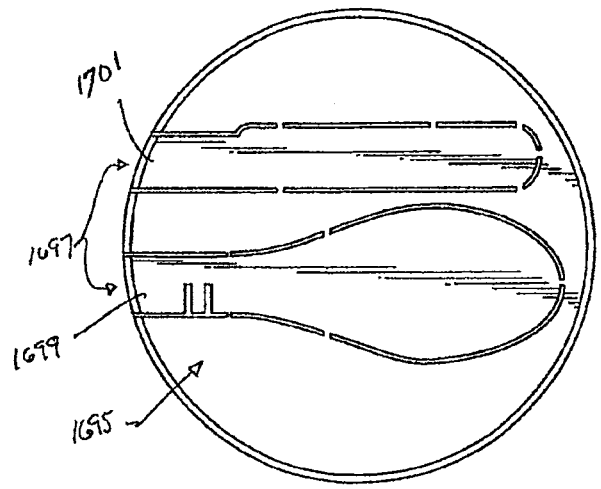

FIG. 191 is a plan view looking at the inside surface of a lid that incorporates a two-piece, break-out serving utensil.

Figure 192:
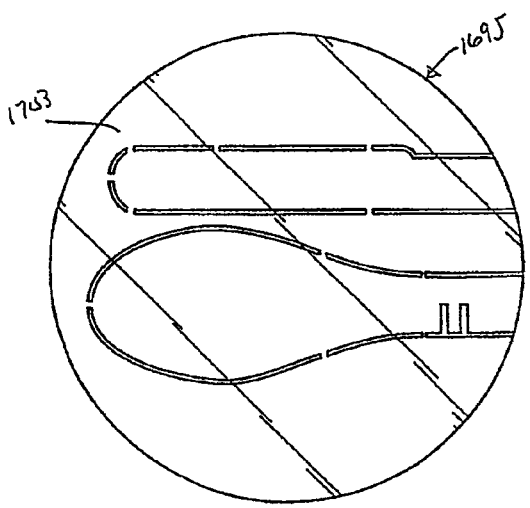

FIG. 192 is a plan view of the outer surface of the lid depicted in FIG. 191, depicting a sealing film fixed over the break-out serving utensil.

Figure 193:
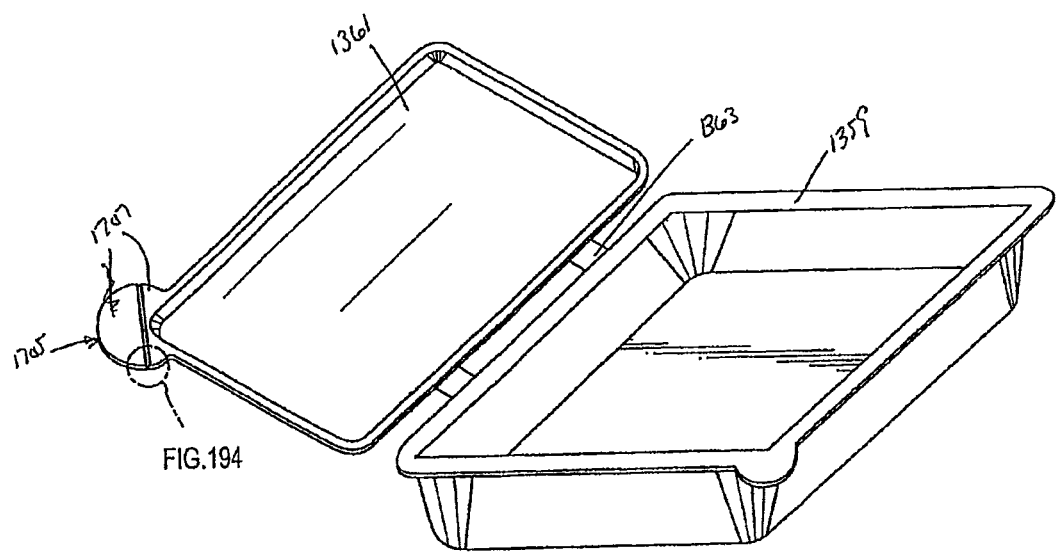

FIG. 193 depicts a tray and lid combination according to the present invention, incorporating an easy-opening feature comprising an extended tab on both the lid and tray.

Figure 194:
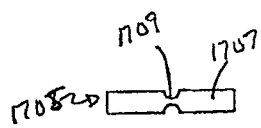

FIG. 194 depicts an enlarged view of circled region 194 of FIG. 193.

Figure 195:
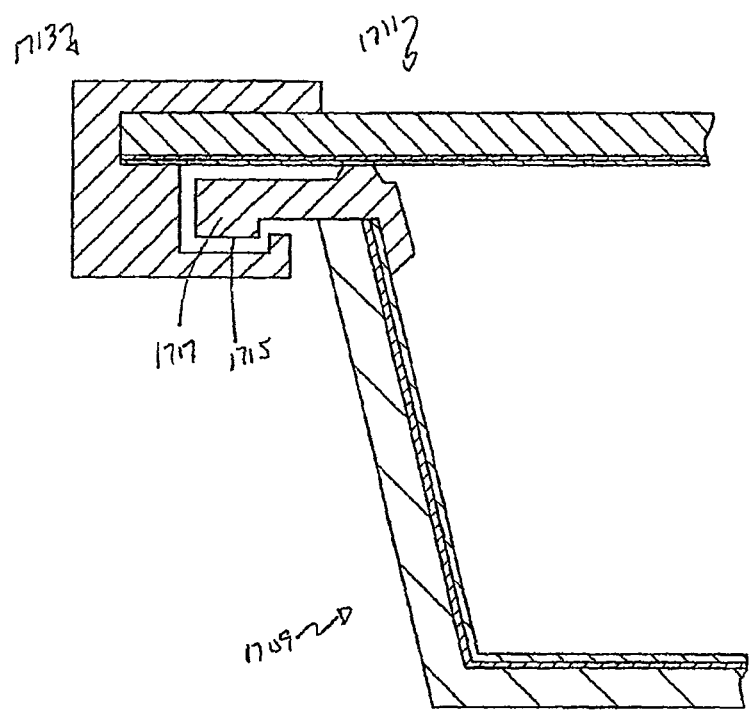

FIG. 195 depicts a tray and lid sealing and locking mechanism, including an easy-open, raised sealing ridge on the tray flange, wherein the paperboard has been encapsulated.

Figure 196:
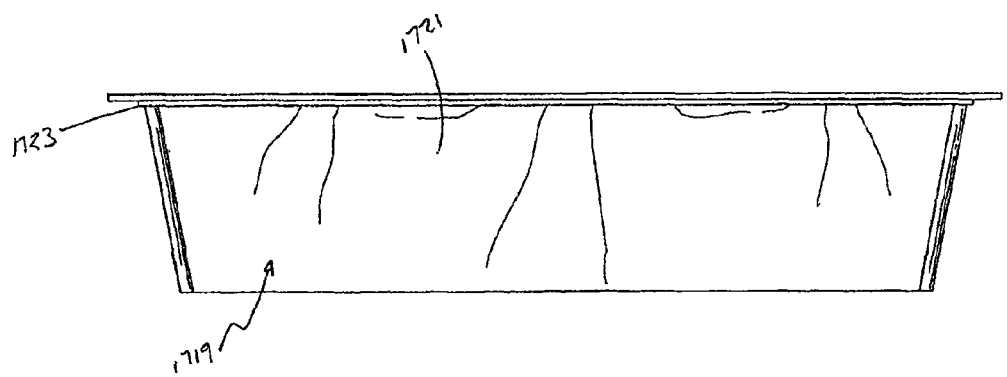

FIG. 196 depicts an injection-molded/paperboard composite tray having warped or wavy sidewalls.

Figure 86:
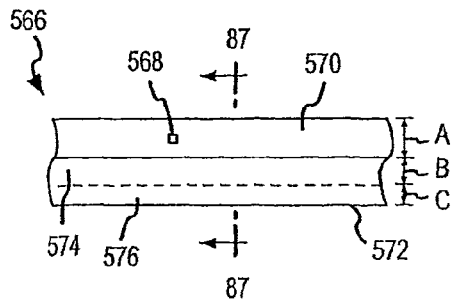
FIG. 86 is a view of a first embodiment of an injection cavity, looking towards a cavity half of an injection-molded tool.
Figure 97:
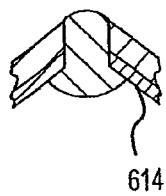
FIG. 97 depicts an embodiment wherein the paperboard is extrusion laminated, or polymer coated, and wherein the injection-molded resin forming the corner bead is directed to the laminated or coated paperboard.
Figure 197:
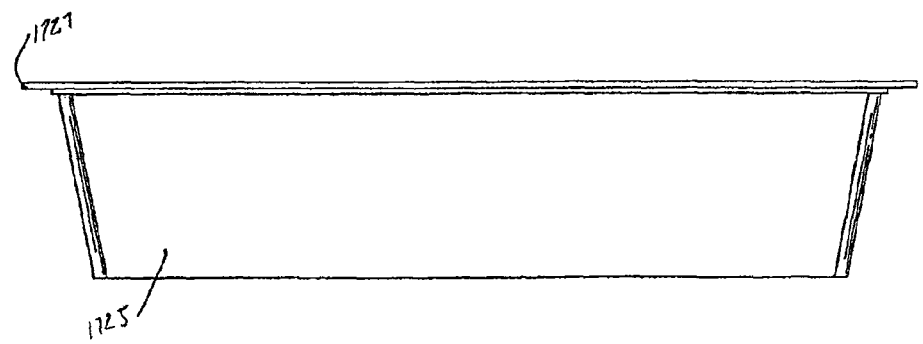

FIG. 197 depicts an injection-molded/paperboard composite tray constructed from the material depicted in FIGS. 97 and 86.

FIG. 198 depicts a fragmentary, cross-sectional view of an embodiment wherein the paperboard is extrusion laminated, or polymer coated, and wherein the injection-molded resin forming the flange is directed to the laminated or coated paperboard.

FIG. 199 is a plan view looking downwardly on a tray that incorporates a venting feature into the flange.

FIG. 200 is a fragmentary, cross-sectional view of the portion of the flange that incorporates the venting feature depicted in FIG. 199.

Figure 201:
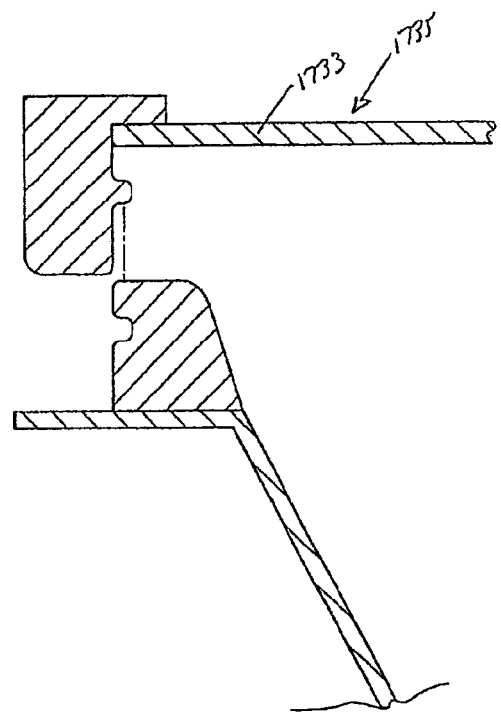

FIG. 201 depicts an embodiment of an injection-molded sealing and locking mechanism, wherein the edge of the paperboard comprising the lid has been encapsulated.

Figure 202:
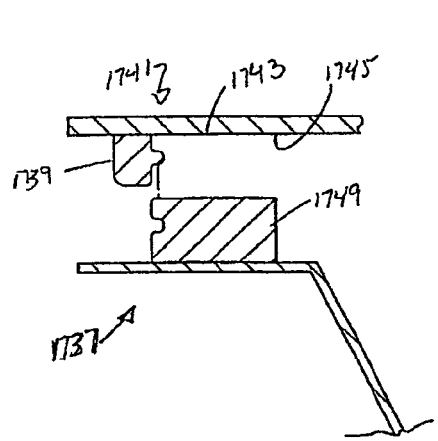

FIG. 202 depicts an embodiment of an injection-molded sealing and locking mechanism, wherein the edge of the paperboard comprising the lid and the edge of the paperboard comprising the tray have not been encapsulated.

Figure 203:
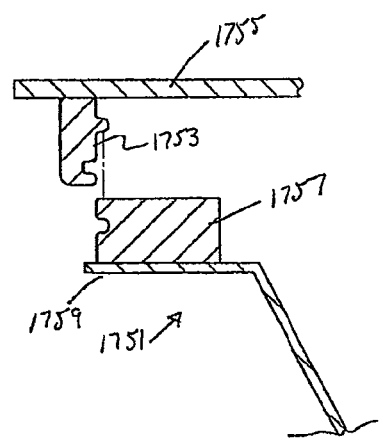
Figure 211:
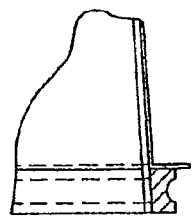
Figure 210:
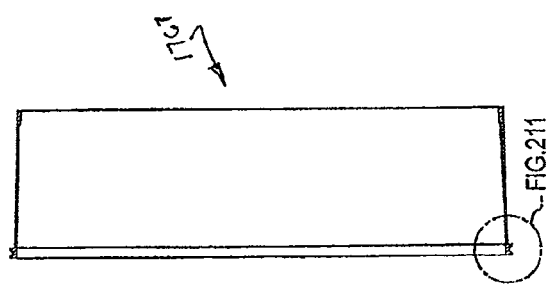
Figure 213:
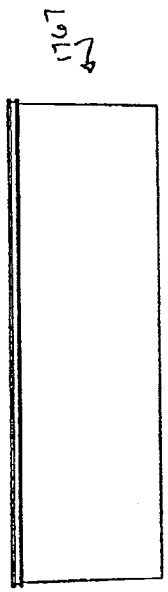
Figure 209:
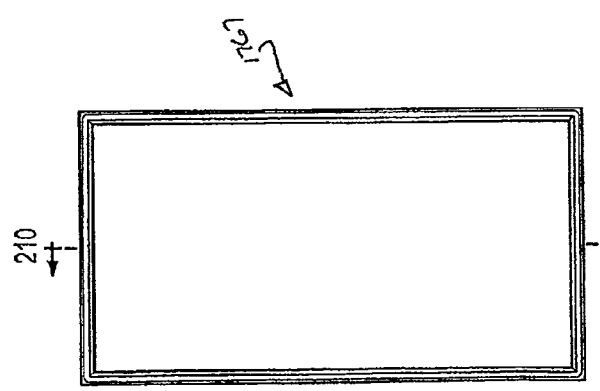
Figure 212:
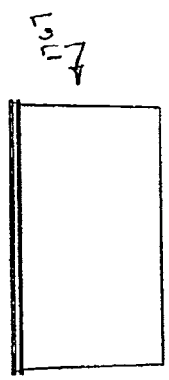

FIG. 203 depicts an alternative embodiment of the injection-molded sealing and locking mechanism depicted in FIG. 202.

FIGS. 204-208 depict different views of a twelve count, folded paperboard tray that has a flange extending outwardly from each sidewall and a first portion of a sealing-and-locking mechanism, similar to the one depicted in the lower portion of FIG. 202, molded on the upper surface of the flange around the perimeter of the tray.

FIGS. 209-213 depict different views of a twenty-four count, folded paperboard tray that has a flange extending outwardly from each sidewall and a first portion of a sealing-and-locking mechanism, similar to the one depicted in the lower portion of FIG. 202, molded on the upper surface of the flange around the perimeter of the tray.

Figure 216:
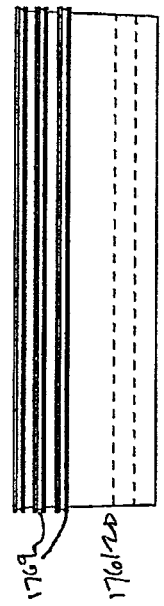
Figure 214:
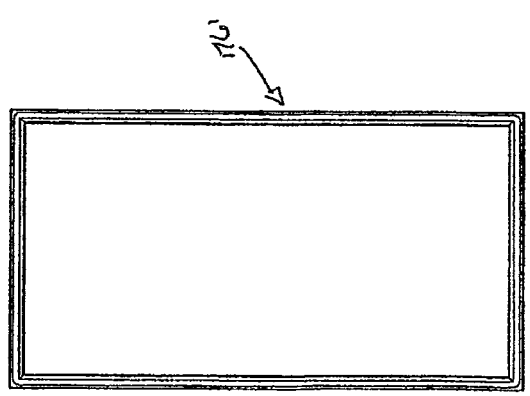
Figure 215:
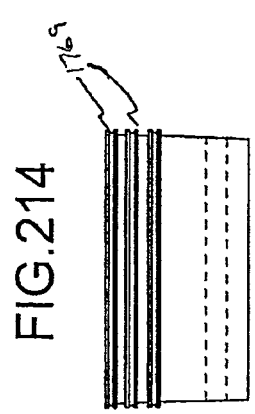

FIGS. 214-216 depict a top view, an end view, and a side view, respectively, of three twenty-four count trays, similar to those depicted in FIGS. 209-213, stacked together.

FIGS. 217-221 depict several views of a lid for use on trays like those depicted in FIGS. 204-216, and these five figures show a second portion of a sealing-and-locking mechanism, similar to the one depicted in the upper portion of FIG. 202, molded on the lower surface of the lid around the perimeter of the lid, and these five figures also show a pull tab feature.

FIGS. 222-228 depict several views of the lid depicted in FIGS. 217-221 attached to the twelve count, folded paperboard tray of FIGS. 204-208, wherein the first portion and the second portion of the sealing-and-locking mechanism are engaged.

FIGS. 229-235 depict several views of the lid depicted in FIGS. 217-221 attached to the twenty-four count, folded paperboard tray of FIGS. 209-216, wherein the first portion and the second portion of the sealing-and-locking mechanism are engaged.

DETAILED DESCRIPTION OF THE INVENTION

Overview

Injection-molded resin can have higher flexural and tensile moduli than paperboard and is resistant to moisture. Capitalizing on these properties, the present invention may comprise paperboard press-formed or folded-style trays or plates, and other paperboard containers, including cylindrical containers or cups, that are enhanced by having high-modulus plastic polymer added (e.g., by injection molding) in one or more selected areas (e.g., around the rim to create a "rim feature") to provide a number of advantages, including the following, among others:

i) increased stiffness and rigidity (for example, high-strength paper plates, serving trays, and other containers that resist collapsing under loads may be created by molding a plastic rim onto an existing flange or onto the unflanged upper perimeter of the tray. This plastic rim helps prevent a tray containing a large food load from flexing upwardly when the tray is lifted);

ii) the ability to obtain a hermetic-quality heat seal of lid film/stock onto the plastic rim or bead for good shelf-life during the distribution cycle;

iii) the ability to incorporate a rim feature that will accept a snap-fit plastic lid; and iv) the ability to incorporate other useful features like fixed and foldable handles, internal ribs, and lids.

The trays of the present invention may be used, among other purposes, for conventional or microwave preparation or storage of food. They may also be washed and reused.

Press-Formed Tray with Formed Rim

In General

One embodiment of the present invention comprises a press-formed, paperboard tray or other container having at least one sidewall; a bottom wall; and a flange, lip, or rim extending from the sidewall. Alternate embodiments may use different methods to manufacture the basic tray, some of which may be suitable only for certain tray materials. Injection-molded resin can have a higher modulus than the paperboard used in the press-formed tray. Thus, combining such resins with paperboard can dramatically increase the stiffness and rigidity of the resulting paperboard tray. For example, molding a plastic rim onto the existing flange increases tray stiffness and rigidity.

In the embodiment shown in FIG. 1, the tray 100 is rectangular in shape, having a first and second major sidewall 102,104 and a first and second minor sidewall 106,108. In this embodiment, each sidewall is joined to another by a corner 110 that is generally crimped, pleated, or folded as shown in FIG. 1. Alternate embodiments of the tray 112 may be circular, as shown in FIG. 4, or may have a different number of sidewalls 114, such as a pentagonal tray.

The tray 100 may be made from paperboard or a paperboard substitute, such as a bleached, unbleached, or recycled cellulose pulp molded fiber matrix. Alternate embodiments may include additional or different materials to form the tray 100, such as metal, foil, plastic, and so forth. The tray body and flange are formed from a single piece of material. Within the context of this document, the phrase a "single piece of material" includes a single piece of material that comprises a single layer or multiple layers of the same material or multiple layers of different materials. These multi-layered materials could include, for example, layers of two or more paper and/or paperboard substrates completely bonded together and/or partially bonded together, such as a corrugated board material, with or without any other layer or layers of any other materials such as metal, foil, plastic, and so forth. Thus, laminates formed from two or more differing types of material are nonetheless encompassed by the phrase a "single piece of material."

As mentioned, the tray 100 has a flange 116 protruding outwardly from the sidewalls 114 to mate with a lid or sealing film. Generally, when the material is formed into the flange, no portion of the flange extends into the interior of the tray. Rather, the flange 116 protrudes outwardly from the tray sidewalls as shown in, for example, FIGS. 1 and 4. Alternate embodiments may have the flange extending at a different angle from the sidewalls, such as at a forty-five degree angle to or flush with the sidewalls.

In the rectangular tray 100 depicted in FIG. 1, the flange comprises "corner flanges" 118 and "sidewall flanges" 120. The term "corner flange" 118 refers to those portions of the flange that extend radially outwardly from each corner 110 of the tray 100, while the term "sidewall flange" 120 refers to the portions of the flange 116 extending outwardly from each tray sidewall 102,104, 106,108. It should be understood that these terms merely refer to different portions of what is generally a unitary flange. It should be further understood that the press-formed flange 116 and tray 100 are typically formed from a continuous piece of material, although alternate embodiments may shape the flange 116 and tray 100 from different pieces of material, which are in turn joined together.

Figure 6:
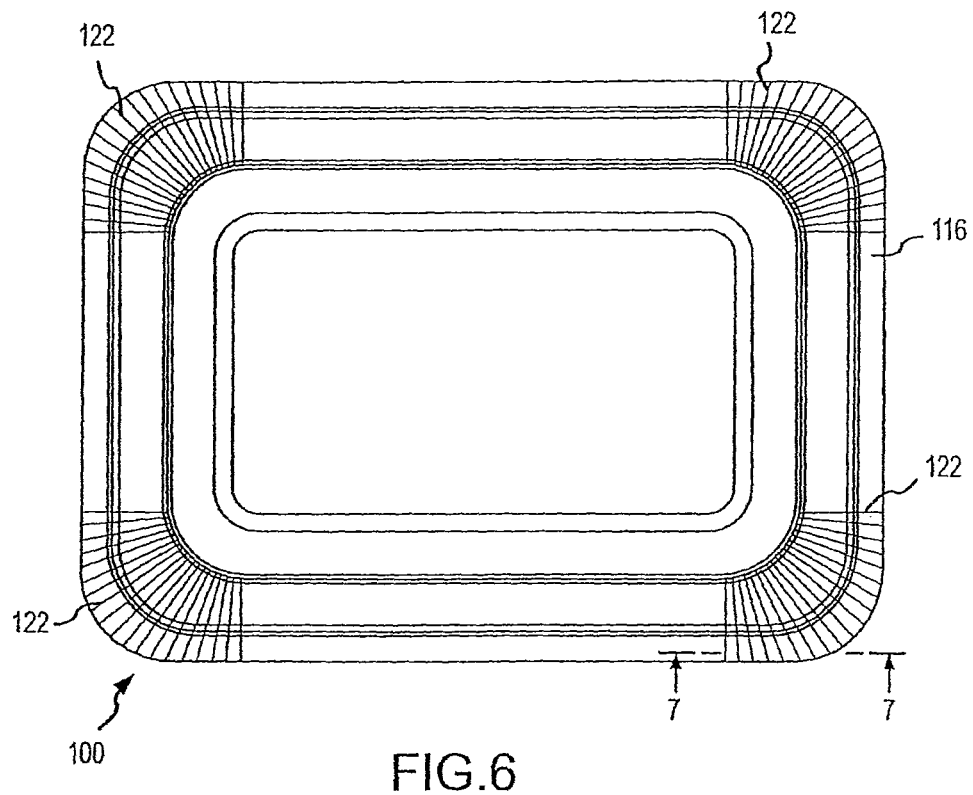
FIG. 6 is a top-down view of the rectangular tray of FIG. 1.
Figure 7:
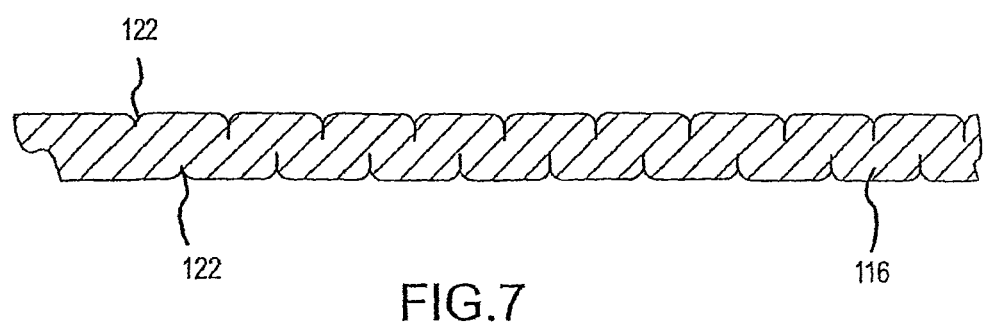
FIG. 7 is an enlarged, fragmentary cross-sectional view along line 7-7 of FIG. 6.

FIGS. 1,4, 6, and 7 show folds, pleats, and creases 122 inherent in a press-formed tray that make it difficult to achieve a hermetic seal around, for example, the flange 116. Layers of material often overlap at each corner, resulting in the corners 110 having a greater cross-sectional thickness than the sidewalls 102,104, 106,108. The same is true for the corner flanges 118 when compared to the sidewall flanges 120 the corners 110 of the tray, 100 and thus the corner flanges 118, are crimped or pleated as a byproduct of being press-formed, whereas the sidewalls 102,104, 106,108, and sidewall flanges 120 are smooth. The crimping or folding of material to form a corner flange typically results in irregular or nonplanar upper and lower flange surfaces in each corner. FIG. 6 is a top-down view of the rectangular tray 100 initially depicted in FIG. 1. FIG. 7 is an enlarged, fragmentary cross-sectional view of the pleated flange 116, taken along line 6-6 of FIG. 6. The irregularities or pleats created within the pleated flange 116 are easily seen. Although FIG. 7 depicts the tray pleats 122 as roughly equally wide, in reality the pleats 122 may be of varying widths, depths, and so forth. Each tray is unique in its irregularities.

When a lid is placed atop the tray 100, or a film is sealed thereto, the film or lid lies smoothly across the top of the pleated corner flanges 118. Ordinarily, the overlapping material, irregularities, and discontinuous surface present a path for airborne contaminants, moisture, vapor, odors, and so forth to enter the interior of the tray (e.g., beneath the film or lid, and through the corner pleats) and affect any contents stored therein. Because the irregularities 122 are relatively small with respect to the overall surface area of the flange corners 118 or sidewalls 120, films or covers mated directly to the flange 116 typically do not completely seal the irregularities. Accordingly, tray flanges lacking an encapsulated rim often present partial gas or vapor paths even when bonded to an overlying film. To eliminate these problems, the flange may be fully or partially encapsulated with plastic.

The embodiment 100 may have only an encapsulated rim, or may have additional injection-molded features such as handles, hinges, coatings, ribs, and so forth. Encapsulated rims are further described next, and the additional features are described in more detail below.

The terms "plastic rim" and "encapsulated rim" are used interchangeably and may in fact refer to encapsulated rims made of a material other than plastic. Any injection-molded material capable of forming a rim encapsulating all or a portion of the tray flange 116 and providing a hermetic barrier is usable with the present invention. For example, an alternate embodiment of the invention may form a hermetic seal from rubbers, such as neoprene or butyl, rather than plastic.

Fully-Encapsulated Rim

Figure 3:
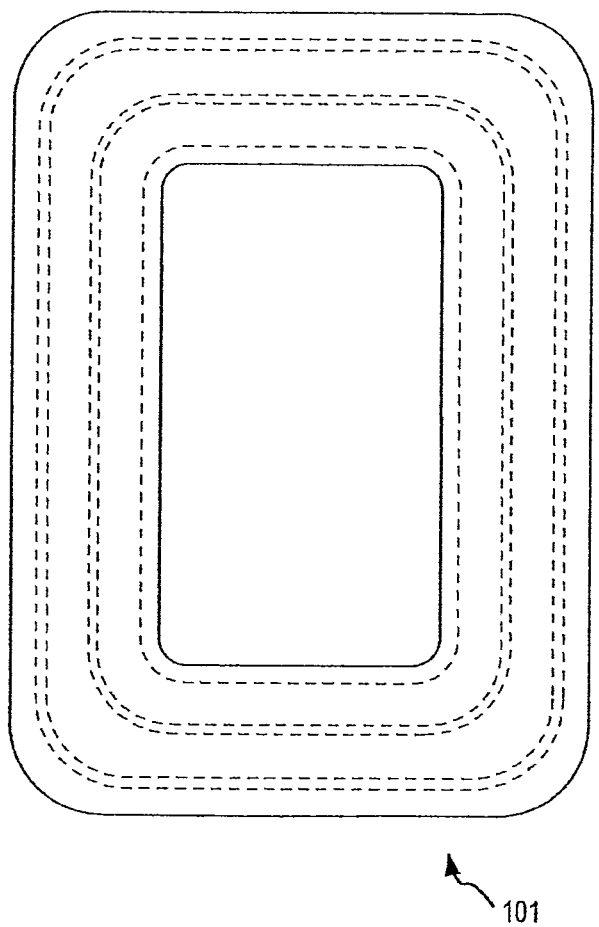
FIG. 3 is a top-down view of a tray blank that, when assembled, forms the tray of FIG. 1.

In one embodiment, as shown in FIGS. 2 and 5, the flange 116 is fully encapsulated to a substantially uniform thickness and width, to form an "encapsulated flange" 124 with the possible exception of the outer tip 126 of the encapsulated flange. The plastic overlays the top and bottom 130 of the flange 124, and extends outwardly slightly past the flange's outer edge 132. The plastic used to form this encapsulated flange 124 is typically vapor-, gas-, and moisture-proof in order to provide a hermetic seal between the tray and the encapsulated rim 124 or flange 116 itself. This encapsulated rim 124 may maintain a substantially uniform thickness from the root 134 to the tip 136 of the flange 116 despite any step changes or discontinuities in the thickness of the flange 116 itself, such as those produced at the corner flanges 118. Alternate embodiments may vary the width or thickness of the encapsulated rim 124, as necessary, and may employ an encapsulated rim of non-uniform thickness or width. FIG. 3 is a top-down view of a tray blank 101 that, when assembled, forms the tray of FIG. 1.

The encapsulated rim 124 generally bonds well with a thin film, paper, fiberboard, or a composite material overlaying the tray. Such overlays will be collectively referred to as a "film." The encapsulated rim 124 and the film overlay also create a hermetically-sealable tray, thus preventing gas or vapor from entering or escaping the tray until the film is removed. An alternate embodiment may use a reclosable lid in place of the film overlay. Such lids are discussed further below. The reclosable lid provides a moisture-proof seal when fitted atop the encapsulated rim and may be made from a variety of suitable materials such as rubber, plastic, or fiberboard.

FIG. 2 is an isometric view of a rectangular tray 100 having a fully-encapsulated flange 124 as a "rim feature." Generally, the term "rim feature" as used herein refers to any feature formed on or adjacent to the rim of a container or tray by either fully- or partially-encapsulating a portion of the tray with injection-molded material. For example, the fully-encapsulated flange 124 just described is a "rim feature" as that term is used herein. The aforementioned pleated corner flanges 118, along with the rest of the flange, is encapsulated in plastic, resin, or other material substantially impermeable to air and moisture. The plastic rim 124, also referred to as an encapsulated rim 124, completely encloses the top, bottom, and outside edge of the flange 116 (see, e.g., FIG. 79). The plastic rim 124 also provides a smooth surface of uniform thickness to maximize contact, and thus sealing, between the aforementioned lid or film and the rim.

A typical fully-encapsulated rim 124 in the present embodiment is approximately one-eighth of an inch thick and extends approximately three-eighths of an inch beyond the outer edge 132 of the flange 116. This thickness adequately coats the flange 116 on both its top 128 and bottom 130, thus creating the potential for the aforementioned hermetic seal, and the rim's width ensures a stable surface with sufficient area to which a covering film may be bonded to effect the hermetic seal. The dimension of a fully-encapsulated rim may vary in alternative embodiments.

Many different tray shapes may accept an encapsulated rim. For example, FIG. 4 displays a shallow circular tray 112, such as a pizza baking tray. Unlike the rectangular tray 100 displayed in FIG. 1, the entire single sidewall 114 and flange 116 of the circular tray 112 are pleated. Even in such instances, an encapsulated rim evenly surrounding the entirety of the pleated flange may be provided. A sample circular tray 112 with a fully-encapsulated rim 124 is shown in FIG. 5.

The encapsulated rim 124 may additionally serve to strengthen the tray. The injection-molded material used to encapsulate the tray rim may be molded into geometries capable of stabilizing and stiffening the paperboard tray, regardless of the stiffness modulus of the injection-molded material itself. Accordingly, the ring of injection-molded material minimizes the tray's ability to flex, twist, or compress. The strength and rigidity of a tray having an encapsulated rim prevents flexing not only in a rotational direction, but also upwardly or outwardly when a tray bearing a significant food load is lifted. Accordingly, the encapsulated rim also minimizes the chances of food slipping off a tray.

The encapsulated rim 124 pictured in FIG. 5 not only provides a hermetic barrier when mated with a covering, but also reinforces the circular tray 112 itself. Trays constructed from paperboard and many other materials bend easily, especially when the surface area of the tray is large with respect to the sidewall depth. In such cases, a tray may bend or fold under a comparatively light load. By adding an encapsulated rim of substantially rigid plastic, the tray's tendency to buckle, twist, or torque is reduced. A substantially rigid encapsulated rim is especially useful where a tray's diameter is eight to ten inches or greater, insofar as trays of such size bend or fold very easily.

Partially-Encapsulated Rim and Stiffening Feature

The polymer for the encapsulation is expensive and the amount used increases the cycle time required to form useful trays 100. Thus, reducing the amount of polymer by encapsulating only a portion of the flange 116 reduces the manufacturing costs and time. The stiffness and rigidity of paperboard trays can be dramatically increased in a cost-effective manner by encapsulating only a portion of the flange.

Figure 8:
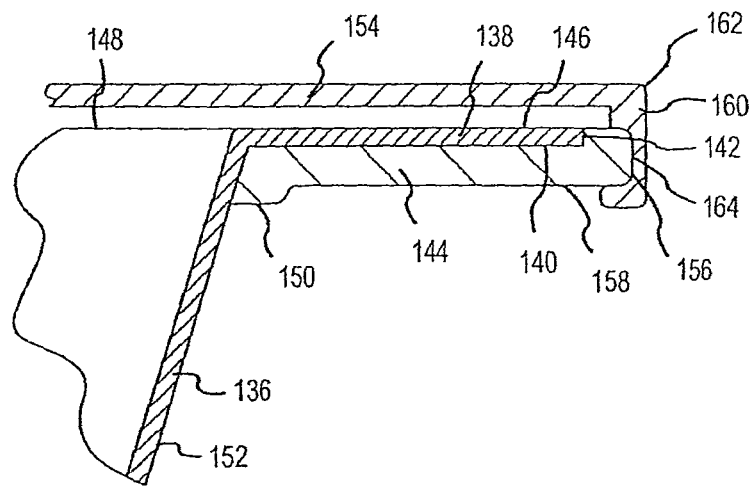
FIG. 8 is a fragmentary, cross-sectional view of a partially encapsulated tray flange, wherein the outward edge of the flange is encapsulated and the injection-molded material is flush with the upper surface of the flange, including a first embodiment of a sealing lid.
Figure 9:
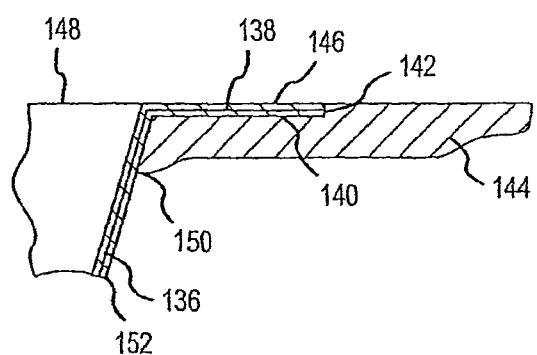
FIG. 9 is a fragmentary, cross-sectional view of another embodiment of a partially encapsulated tray flange, but wherein the injection-molded material extends further past the outer edge of the paperboard flange than it does in FIG. 8.

FIGS. 8, 9, 10, and 11 are cross-sectional views of tray sidewalls 137 having a horizontal flange with an encapsulated bottom. In the embodiments of FIGS. 8 and 9, the outward edge 142 of the flange 138 is also encapsulated and the injected material 144 is flush with the upper surface 146 of the flange 138. In FIG. 9, the injection-molded material 144 extends further past the outer edge of the paperboard flange 138 than it does in FIG. 8.

The entire upper surface of the flange 138 is unencapsulated and can bond directly with the lidding material. The intermolecular mixing between the lidding material and the material on the upper exterior surface 146 of the flange 138 contributes to achieving a hermetic seal. For example, the inner surface of the tray 100 and the outer surface of the flange may be made from a SARAN-coated polyester. SARAN is one example of a polyvinyl dichloride. By using a lidding material that is also a SARAN-coated polyester, a good hermetic seal is possible through the intermolecular mixing of the lining material and the lidding material.

Alternatively, if the lidding material and the material on the upper exterior surface 146 of the flange 138 are not matched to provide intermolecular mixing, by projecting the injection-molded material 144 a small distance beyond the outer edge 142 of the tray flange 138 but flush with the tray top 148 (as shown in FIGS. 8 and 9), a surface capable of providing a hermetic seal with a lid is provided outwardly of the upper exterior surface 146 of the flange 138.

Figure 10:
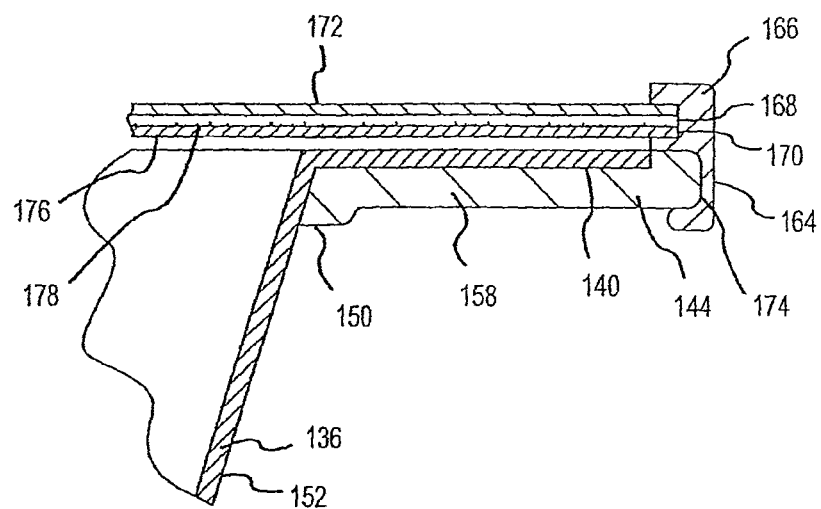
FIG. 10 is a fragmentary, cross-sectional view of the partially encapsulated tray flange of FIG. 8, including a lid sealing ring.

Also, as previously mentioned and as shown in FIGS. 8,9, and 10, additional material may be injected at the intersection of the bottom surface 140 of the flange 138 with the outer wall 152 of the tray to create a bump or stair step 150 that enhances de-nesting operations by providing a space between flanges 138 of multiple stacked or nested trays, thus simplifying de-nesting of trays. Typically, a de-nester includes a screw that shuffles and separates. The bump 150 is also advantageous with pick-and-place operations, and may impart additional stiffness and/or strength to the sidewalls 137. The depth that this additional material or bump 150 extends along the sidewall may vary.

The geometry of the injection-molded material covering the bottom 140 of the tray flange provides enhanced strength and rigidity for the tray 100. The injection-molded material 144 may extend at least partially down the tray's outer sidewall 152, stiffening the sidewalls 137 and body of the tray. Examples of such extension are shown in FIGS. 8,9, and 10. This ring or layer of injection-molded material 144 reduces outward bowing of the sidewalls 136 when a tray containing a heavy food load is lifted and additionally may prevent inward compression when the tray is subjected to crushing or deforming forces.

Currently, press-formed trays have flange surfaces that are rough and will not form a hermetic seal with conventional lidding films. When forming the embodiments of FIGS. 8,9, 10, and 6, however, such pleats (not shown) practically disappear from the pressure and heat generated within an injection mold tool used to manufacture an injection-molded feature. Hot resin 144 comes into the mold under high pressure. By injecting resin only on the bottom 140 or backside of the rim during the injection-molding process, exposed paperboard pleats on the upper surface 146 of the flange are pressed upwardly against a surface of the metal mold by the hot, high-pressure resin injectant, which compresses or "irons" the pleats on the upper surface of the flange. This creates an improved seal surface that helps ensure a hermetic seal is obtained across the now-flattened pleats.

During the injection-molding process, the paperboard forming the tray is plasticized to the point that it flows and closes up any surface gaps, thereby reducing the severity of irregularities on the upper flange surface. This is one example of mechanical crosslinking, described later.

Figure 11:
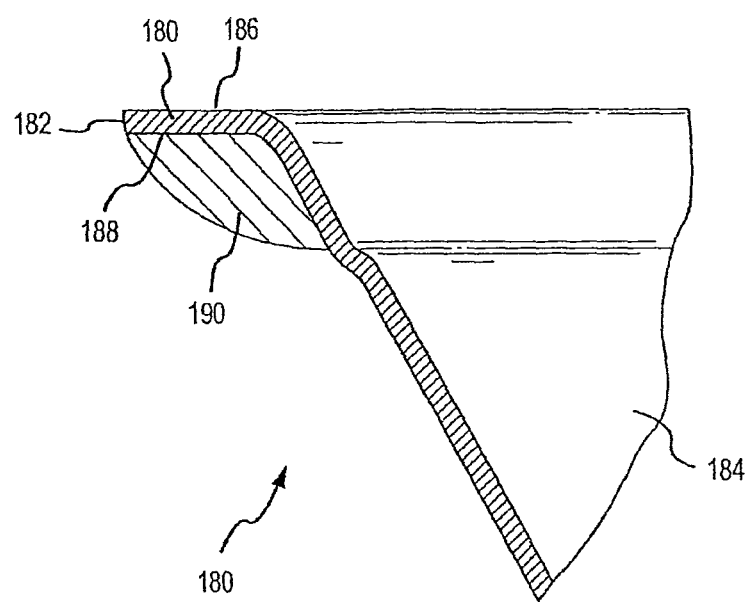
FIG. 11 is a fragmentary, cross-sectional view of a tray sidewall and a horizontal flange, wherein the flange and tray sidewall are partially-encapsulated, and the injection-molded resin does not extend beyond the outer edge or onto the upper surface of the flange.

In addition to creating an encapsulated rim 158 having good sealing properties, as shown in FIGS. 9 and 11, an embodiment may be provided with a lid 154 capable of snapping onto or otherwise fitting onto or around an encapsulated rim, as shown in cross-section in FIG. 8. Here, the lid may include a cavity or recess 156 running along a downturn or lip 160 extending downwardly from the lid edge 162 sized to accept the outer edge 164 of the encapsulated rim 158. The lid 154 may be pressed down onto the tray until the encapsulated rim 158 seats in the cavity.

In yet another embodiment, the lip 160 may be omitted from the lid 154. Instead, a sealing ring 166 may be provided as a separate element, as shown in FIG. 10. Here, the sealing ring 166 includes two cavities running along its interior sidewall-one cavity 168 sized to accept the outer edge 170 of the lid 172, and one cavity 174 sized to accept the outer edge 164 of the encapsulated rim 158. The sealing ring 166 may be placed around either the tray rim 158 or lid 172 initially. The other element (seal or lid) may then be mated to the sealing ring 166 by pressing the element until it seats within the ring, or pressing down on the ring 166 until the element seats in the proper cavity.

The embodiment shown in FIG. 10 includes a film layer 176 bonded to the lower surface 178 of the lid 172. Alternate embodiments may include a Rim layer bonded to the upper surface of the tray 100. Generally, all trays, lids, blanks, and other such items discussed herein may include a film layer bonded thereto. Films are generally discussed later in this document.

FIG. 11 is a cross-sectional view of an alternate embodiment of a partially-encapsulated, injection-molded flange 180. In this embodiment, the edge 182 of the tray 184 extends outwardly from the plane containing the top surface 186 of the tray. By encapsulating only the underside 188 of the flange 180 as shown in FIG. 11, stability and rigidity are added to the tray. The shape of the injection-molded material 190 conforms generally to the shape of the underside 188 of the flange 180. This embodiment is well suited for trays or other devices that do not require a hermetic seal, such as pizza trays, serving plates, and so forth.

Figure 12:
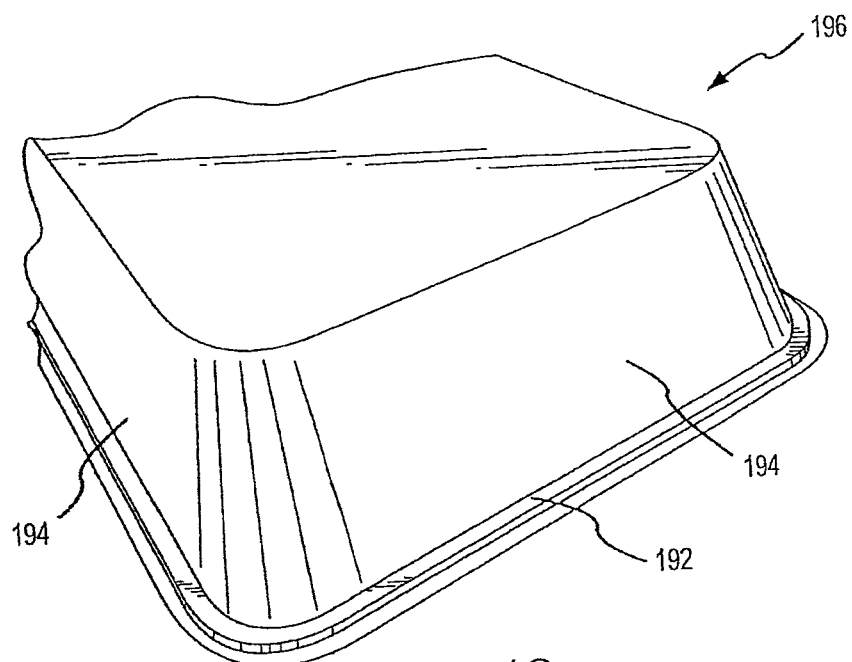
FIG. 12 is a perspective view of the bottom of a tray having an encapsulated rim, showing the injection-molded resin extending a first distance along the tray sidewalls.
Figure 13:
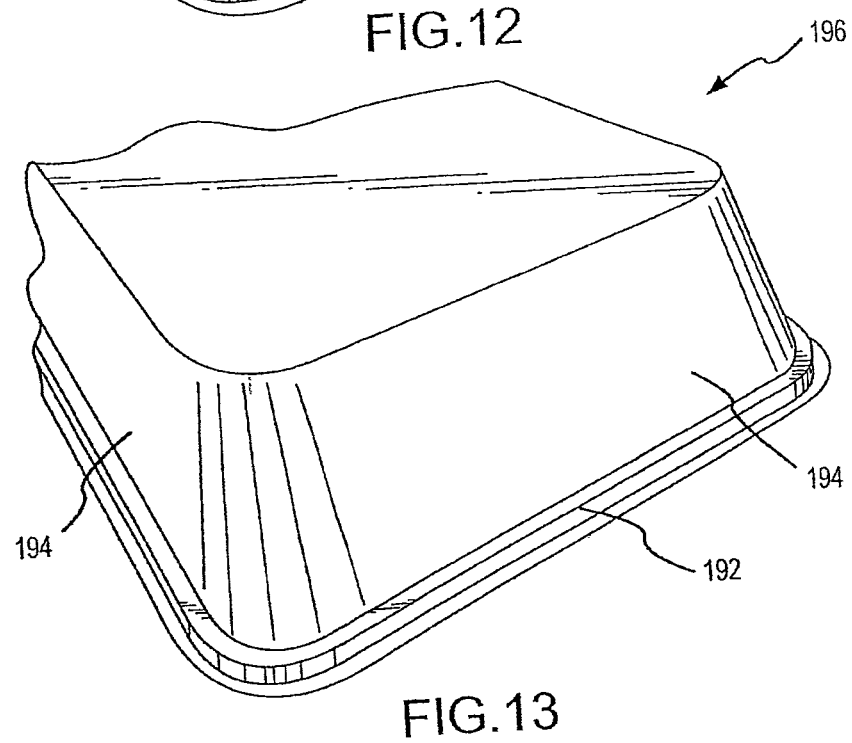
FIG. 13 is a perspective view of the bottom of a tray having an encapsulated rim, showing the injection-molded resin extending a second distance along the tray sidewalls.

As previously mentioned, the injection-molded material may extend partially along the tray sidewall or sidewalls. Different embodiments may vary the depth to which the injection-molded material extends. FIG. 12 depicts the material 192 extending along the sidewalls 194 of an inverted tray 196 to a relatively shallow depth, while FIG. 13 depicts the material 192 extending substantially farther along the tray sidewalls 194.

Referring next to FIGS. 164-173, additional embodiments 197 of the present invention are described. As discussed further below, these embodiments 197 provide additional advantages. For example, in the embodiments of FIGS. 164-173, the heat sealability of lid film is improved via a recessed hot tip injection point and thick channel projected feet 199 along the narrow edges of the tray. Further, since the trays 197 depicted in these figures are created using a single hot tip runner injection site 201, the cost and complexity of the injection mold tooling is reduced. The throughput of the injection molding process is also improved via the use of a single hot tip runner injection site 201. Finally, as discussed further below, resin flow control is also improved via modifications to the flow channel design, which limits undesirable flashing of resin onto the wrong side of the tray.

Single Point Injection and Recessed Hot Tip Injection Point

As may be seen from reviewing FIGS. 164,168, 169, and 173, and as shown to best advantage in FIGS. 168 and 173, the semi-circular resin extension 203 or gate area at the hot tip injection point has been recessed to facilitate flange 205 or rim encapsulation and the subsequent formation of a seal between the top surface of the flange and the lid film. Typically a remnant of resin is present at the gate area. If the semi-circular resin extension 203 is not recessed, it is possible that the tray may rock back-and-forth in the lidding machine, using the resin remnant as a pivot point. When the semi-circular resin extension 203 is recessed, any remnant from the injection process is less likely to detrimentally affect the creation of the complete (i.e., formed, filled, and sealed) tray. In the embodiments depicted in FIGS. 164-173, single-point injection has been used, and the height of the semi-circular resin extension has been reduced relative to the thick section of resin.

Another advantage of single-point injection has to do with polymer heat history. Polymer heat history variations can cause problems. For example, in the embodiments depicted in FIGS. 164-173, the resin being injected to form the partially-encapsulated rim or flange is nylon 66. With nylon 66, the heat history can change the properties of the polymer. Even when using one extruder and multiple injection points, there is likely to be potentially problematic heat history variations. Also, when using more than one injection point, the supply lines to each injection point are designed to be of similar length and configuration, which further complicates the machinery. Although trays according to the present invention may be formed in tools having more than one injection point, the trays depicted in FIGS. 164-173 have partially-encapsulated rims 205 formed in a tool having a single point of injection. A single point injection tool is less expensive to design, build, and operate. Further, having a single injection point makes the rim formation process easier to control.

Flow Channel Modifications to Improve Sealing-Thick Channel Projected Feet

In one embodiment of a machine used to seal a lid film onto a tray 197 having a partially-encapsulated rim or flange 205 (as shown, for example, in FIGS. 164-168), a lid sealing device is used. The lid sealing device may comprise, for example, one or more heated drum seal film rollers in succession that press a heat seal lid film onto the tray flange that is being supported from underneath. The tray 197 is fed through the machine in the direction of the long sides of the tray, at right angles to the axes of rotation of the drum rollers. The drum rollers roll over the tray flange 205 (typically, the tray moves under the drum rollers). In this configuration, all of a tray short edge passes under each drum roller at one time. Thus, the force applied by the drum roller is dissipated or distributed across a greater surface area when passing over a tray short edge than when passing over the tray long edges, thereby reducing the effective pressure applied since the force applied by the drum rollers remains relatively constant whether on the long edges or one of the short edges. This results in a higher concentration of force on the long edges of the tray 197 than on the short edges of the tray, which results in a better seal being formed along the tray long edges than is formed along the tray short edges. In other words, there is relatively less bonding on the tray short ends than on the tray long ends, which affects seal quality/integrity.

To form a heat seal it takes a certain amount of dwell time at a given temperature and a given pressure. If the temperature and pressure remain relatively constant (e.g., if the temperature and pressure are at desirable levels), seal improvement is obtained by increasing the dwell time. Thus, to improve the seal quality along the tray 197 short edges, the dwell time underneath the drum roller of the heat sealer must be increased. The "feet" 199 depicted in, for example, FIGS. 164 and 169 support the flange as it passes under the heat sealer and desirably increase the dwell time. Each pair of feet 199 on a tray short edge also act like pillars that support a "beam" or "bridge" between the feet with respect to the force being applied by the drum rollers to the short edge flange. The beam or bridge provides stability to the tray as the tray passes through the machinery and under the drum roller or rollers. Since the free edge of the flange 205 is thus supported by these feet 199, that nearly doubles the dwell time of each tray short side under the drum roller of the heat sealer without doubling the amount of resin, which would slow the manufacturing cycle time and cost more for plastic per tray 197, and without increasing the cycle time of the machinery. The feet 199 minimize deflection of the thin section of polymer (i.e., the section of polymer that extends to the edge of the tray flange).

The feet 199 are created by extending the "deep" or thick part of the resin channel in two locations per tray 197 short edge (i.e., at both longitudinal ends of the tray). The feet 199 and the rest of the thick part of the rim 207 rest on a steel receiver plate comprising part of the machinery that transports the tray during sealing. The steel receiver plate has a hole cut through it that complements the perimeter of the thickened portion of the tray rim 207, including the feet 199, thereby supporting the tray as the tray is fed through the machinery. The tray drops down into the steel receiver plate and is supported by only the thickened tray perimeter, which includes four feet (two on each tray short edge) in the embodiments shown in FIGS. 164-173. The drum roller is, or the drum rollers are, typically mounted at a fixed gap distance above the steel receiver plate. The feet 199 make it possible to extract additional benefit from the nip area between the drum roller and the tray. Further, the area across which the drum roller force is spread is reduced as the feet pass under the drum roller. That is, the effective roller pressure is greater over the feet than it is over the rest of the thickened portion along the longitudinal ends of the tray.

By adding the feet 199 to the tray 197 short edges, this effectively increases the width of the seal along the tray short sides without a proportional increase in the amount of plastic being used, which is advantageous for at least the reasons mentioned above. Thus, the benefits obtained are similar to the benefits one would get by doubling the width of the flow channel along the entire short edge of the tray 197, without the drawbacks of increasing cycle time and increasing resin use that would go along with doubling the flow channel along the entire short edge of the tray. The feet 199 are like the pillars of a bridge and support the section between them in a manner that results in better seal integrity and a greater area that gets bonded. In other words, a better seal is reached along the entire short edge of the tray, including the section between the feet and the corner sections between each foot and the long edge of the tray adjacent to each foot.

Flow Channel Modifications to Reduce Flashing

When "flashing" occurs, plastic resin gets over the tray flange 207 and onto the wrong side (i.e., the top side) of the flange. It is undesirable to have flashing since the lid film does not bond to the resin as well as it bonds to the material on the inside of the tray. For example, in one embodiment of the invention, polyester (PET) film is laminated to the paperboard to make the base tray 197. The resin being injected to form the partially-encapsulated rim or flange is nylon 66. The lid film bonds to PET, but does not bond well to the nylon 66. Thus, for a good heat seal, you cannot have nylon 66 on the portion of the flange 207 to which the lid film is being sealed.

When the resin flow in the thick section of the flow channel leads the resin flow in the thin section of the flow channel, this helps prevent undesirable flashing by pressing the tray flange 207 against the tool steel as the resin advances in a manner that keeps the flange tight against the tool steel. This relationship between the flow in the thick section of the flow channel (i.e., the "leading flow") and the resin flow in the thin section of the flow channel (i.e., the "trailing flow") is known herein as the "leading-trailing relationship."

Flashing can occur in the corner 209 areas, for example, where the leading-trailing relationship may be lost. The leading-trailing relationship may be lost in the corners in part due to the greater distance that the flow in the thin section of the flow channel must travel than the flow in the thick section of the flow channel as the resin flows around the corners. In other words, in the tray corners 209, the resin adjacent to the inner or attached edge of the flange 207 must travel a shorter distance than the distance traveled by the resin adjacent to the outer or free edge of the flange. As the resin in the thick channel rounds a corner, the resin starts to prematurely fill in the thin channel ahead of the main flow front in the thin channel, which reduces or eliminates the desired, flash-inhibiting leading-trailing relationship. As the main flow front in the thin section catches up with the resin flowing prematurely from the thick section into the thin section, flashing may occur since the tray flange is thus not being pressed against the tool steel in advance of the resin reaching the edge of the tray flange. In the corners, the resin flowing in the thick section is traveling in a larger area, requiring additional resin to maintain the desired leading-trailing relationship.

To address this undesirable flow behavior and return to the desirable leading-trailing flow front relationship, which helps to pin down the tray flange 205 in the corners 209 and keep the flange in contact with the tool steel, the trays 197 depicted in FIGS. 164-173 have a modified flow channel. In a first flow channel modification, rather than having the transition from the thick section to the thin section of the flange to be at 90°, the transition from the thick section to the thin section of the flange in the corners is radiused. In particular, the corners have been radiused at the point where the thick section of resin joins the thin section of resin to help maintain the desirable flow pattern having the leading-trailing relationship. The radiused areas allows more polymer to flow from the thick part of the flow channel into the thin part of the flow channel. As shown to best advantage in FIGS. 164 and 169, the radiused areas may include more than merely the rounded corners of the tray. For example, as shown in these figures, radiusing may begin some distance before the tray corners. The radiusing allows the thin section to fill in more rapidly as the flow rounds the corners, thereby allowing the flow front in the thin section to keep up with the flow front in the thick section.

FIGS. 164 and 169 provide details and some possible dimensions for the radiused corners 209 according to embodiments of the present invention. As shown in these figures, the dimensions at the end where the resin injection gate is located (i.e., the right-hand end as drawn in FIGS. 164 and 169) may be different from the dimensions at the other end of the tray.

An alternative way to alleviate the flashing problem in the tray corners 209 and along the tray edges (rather than or in addition to using a radiused juncture between the thick and thin sections of the flange) is to place a flow restriction in the thick channel and/or by placing a flow restriction in thin channel.

Formed Rim Having a Down-turned Portion or "Downturn"

FIGS. 14-18 depict various types of partially-encapsulated flanges. In these embodiments, the tray comprises a flange having a down-turned portion or "downturn" and various injection-molded rim features added to the paperboard at selected locations. The flange and downturn may extend at any angle from the sidewall and from each other. Similarly, the downturn may extend at any angle from the flange.

Figure 18:
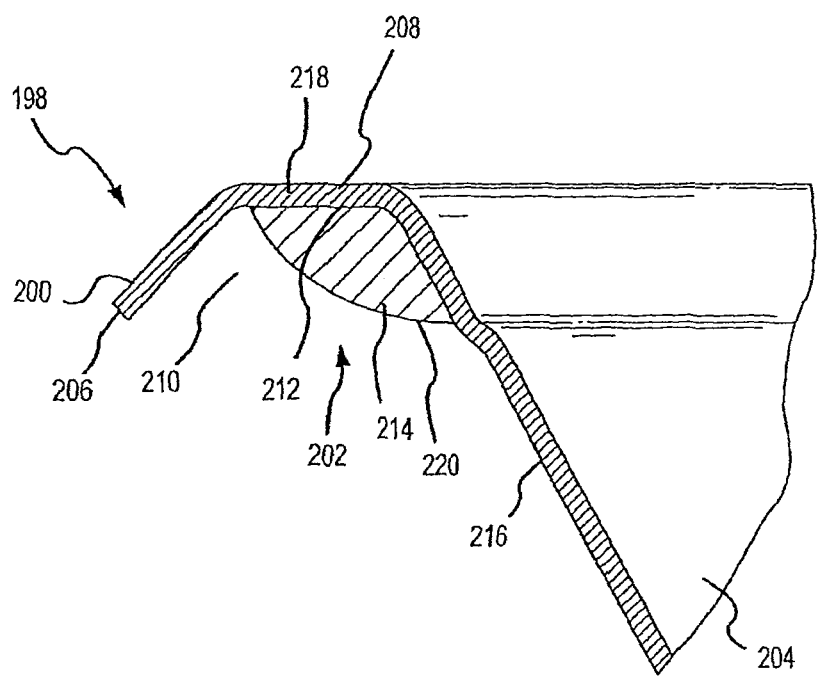
FIG. 18 is a fragmentary, cross-sectional view of another embodiment of a partially encapsulated tray flange.

FIG. 18, which is most similar to FIG. 11, is a cross-sectional view of an embodiment comprising a flange 198 having a downturn 200 and an injection-molded supported rim 202. In this embodiment of the present invention, the tray 204 includes a flange 198 shaped like an upside down, flattened "U", with the terminus 206 of the flange 198 projecting outwardly and downwardly from the plane defining the flange top surface 208. A portion of the downwardly-opening cavity 210 defined by the underside 212 of the flange 198 is filled or encapsulated with injection-molded material 214. More specifically, the inner angle of the cavity defined by the outer sidewall 216 of the tray 204 and the underside 212 of the flat flange top surface 218 is filled in. In the embodiment shown in FIG. 18, the injection-molded material 214 fills a roughly triangular cross-sectional shape defined by the (1) underside 212 of the flat flange top surface 218, (2) outer sidewall 216 of the tray 204 to a depth approximately equal to that of the outwardly, downwardly extending flange member 200, and (3) a line 220 extending between these two points. This line 220 may be either substantially straight or curved, as shown in FIG. 18. As with previously described embodiments, the embodiment shown in FIG. 18 has increased strength and rigidity when compared with nonencapsulated trays. It should be noted that the injection-molded material 214 partially encapsulating the flange 198 or tray 204 not only prevents the tray 204 from flexing outward when bearing a load, but also from flexing upward when a tray 204 containing a large food load is lifted.

Figure 16:
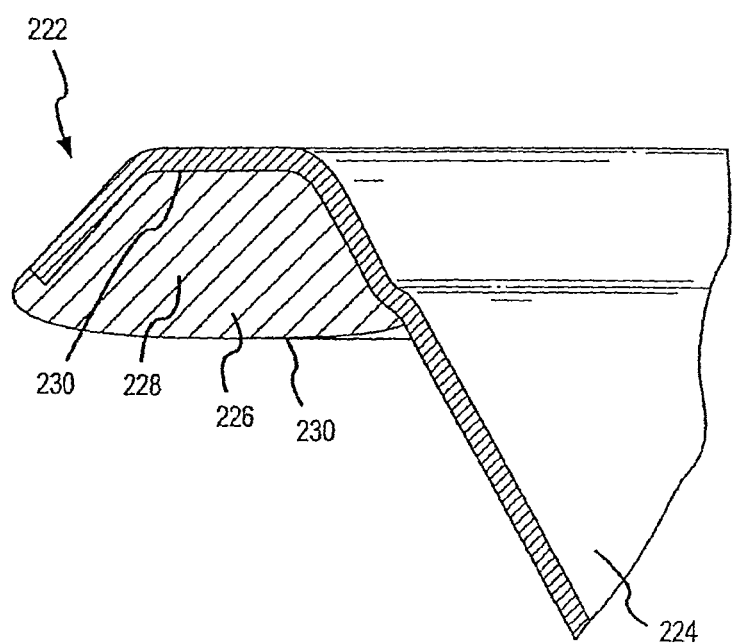
FIG. 16 is a fragmentary, cross-sectional view of another embodiment of a partially encapsulated tray flange.
Figure 17:
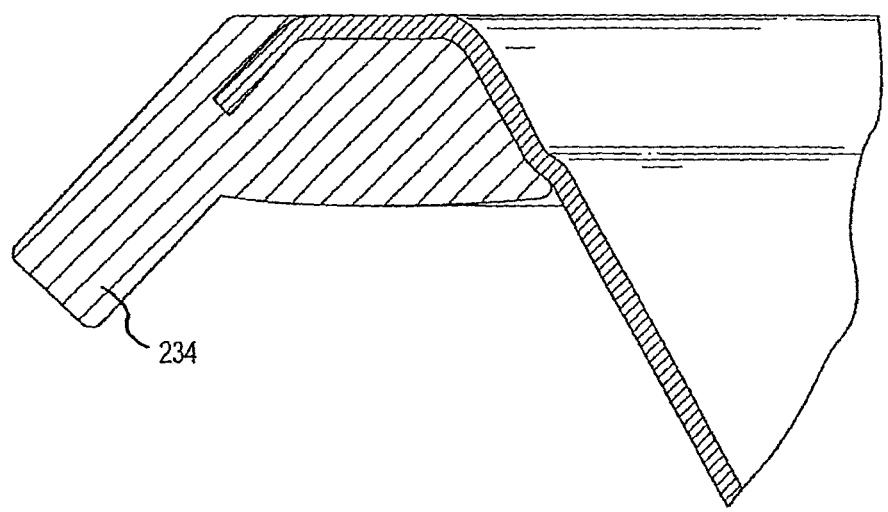
FIG. 17 is a fragmentary, cross-sectional view of the partially encapsulated tray flange similar to the embodiment of FIG. 16, but wherein the injection-molded material is extended to form a gripping surface.

FIG. 16 is a cross-sectional view of another embodiment of a partially-encapsulated flange 222. The tray 224 and flange 222 depicted in FIG. 16 are of a similar shape and construction to that shown in FIG. 18. However, the embodiment shown in FIG. 16 comprises a partially-encapsulated flange 222 having sufficient injection-molded material 226 to completely fill the downwardly-opening cavity 228 defined by the flange's under surface 230. In this embodiment, the injection-molded material 226 filling the cavity 228 may define a slightly curved lower surface 232, as shown, or may alternately define a flat lower surface. By injection molding sufficient material to completely fill the cavity (and, in some cases, extend downwardly below the cavity), additional stiffness and tensile strength is provided to the tray over that obtained from the geometry of the injection-molded material depicted in, for example, FIG. 18. This embodiment may also be provided with an integrally-formed, projecting handle or extended lip 234 as shown in FIG. 17. Handle features are discussed further below.

Figure 14:
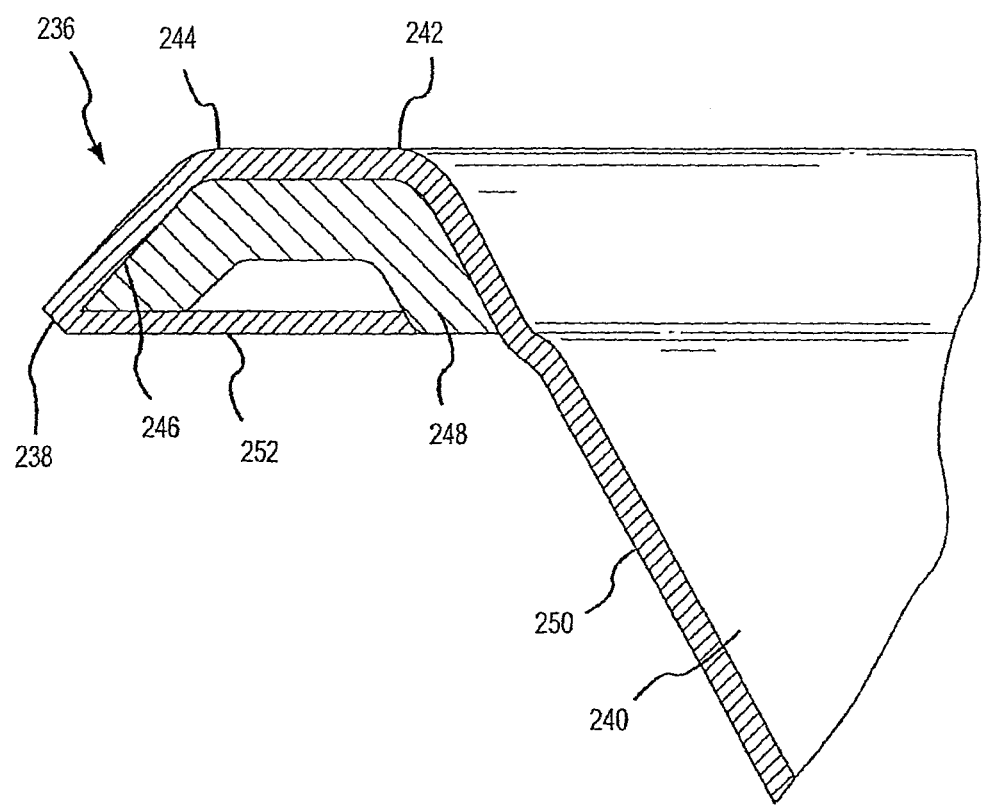
FIG. 14 is a fragmentary, cross-sectional view of another embodiment of a partially encapsulated tray flange.

FIG. 14 is a cross-sectional view of a further alternate embodiment of a partially-encapsulated injection-molded flange 236. This embodiment is most comparable to the embodiment of FIG. 16. In this embodiment, the edge 238 of the tray 240 again extends downwardly and outwardly from the plane containing the top surface 242 of the tray 240. In cross-section, the outer rim 244 of the tray 240 effectively forms an upside down "U" with a flattened bottom. By encapsulating the underside 246 of the flange 236 in a contoured shape following the shape of the flange 236, as shown in FIG. 14, stability and rigidity are added to the tray 240 using a material-saving geometry for the rim feature. In this embodiment, the shape of the injection-molded material 248 generally conforms to the shape of the flange 236. The flange 236 may also be folded towards the tray sidewall 250 at approximately the point at which the injection-molded material terminates in order to form a lower surface 252, as shown in FIG. 14. Alternatively, this flange fold may be omitted. This embodiment is well suited for trays or other devices that do not require a hermetic seal, such as pizza trays, serving plates, and so forth.

Figure 15:
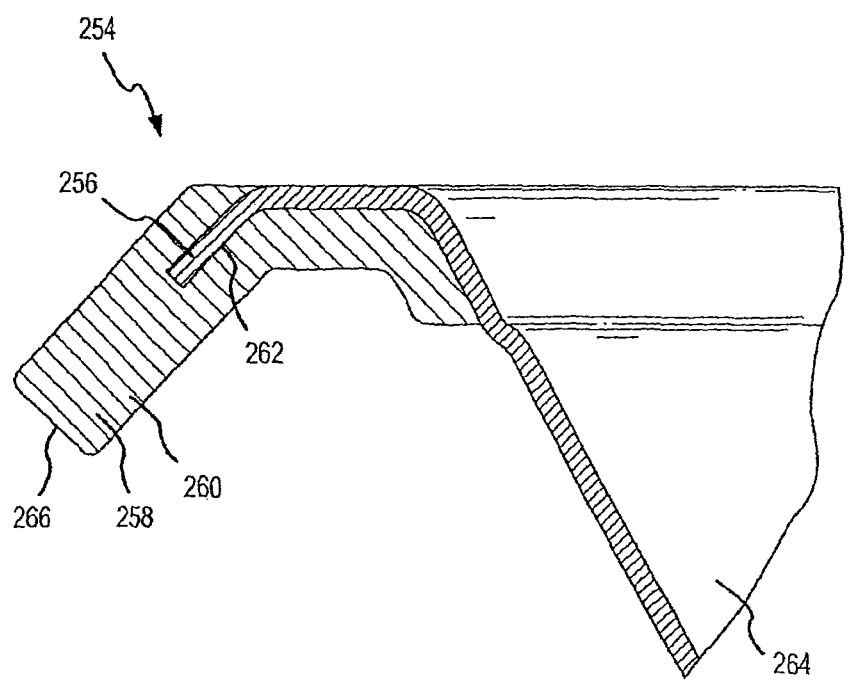
FIG. 15 is a fragmentary, cross-sectional view of a partially encapsulated tray flange similar to the embodiment of FIG. 14, but wherein the injection-molded material is extended to form a gripping surface.

As previously discussed, the injection-molded material encapsulating portions of the tray may be used to create a handle or other holding surface. In FIG. 15, which is similar to FIG. 17, but which also encompasses the conforming aspects of the injection-molded material depicted in FIG. 14, the down-turned portion 256 of the flange 254 is encapsulated and forms an integrally-formed handle feature 258. Additional handles are discussed further below. Here, the injection-molded material 260 extends beyond the underside 262 of the tray flange. Specifically, the material 260 extends outwardly in a direction paralleling the outer, down-turned portion 256 of the flange to form an extended surface 266. Further, the injection-molded material 260 encapsulates the outer portion of the flange 254. Generally, this embodiment extends the injection-molded material 260 across only a portion of the flange 254 in order to form a conveniently-sized handle 258. Alternate embodiments, however, may substantially reduce the width of the injection-molded extension (i.e., how far it extends outwardly), but continue the extension along the entire perimeter of the tray. In this manner, a lip or rim of sufficient width to create finger holds on the underside of the encapsulated flange may be formed.

The injection-molded stiffening features depicted in FIGS. 14-18 could be applied to containers having flanges lacking down-turned portions as may be seen, for example, by comparing FIG. 18 to FIG. 11.

Injection-Molded Sealing Surface

In certain situations, it may be desirable to merely add a ring of polymer material that provides a sealing surface and enhanced rigidity for the tray. Another benefit is that the polymer material is unaffected in a high-moisture environment, unlike paperboard. Therefore, the container rigidity and shape will be maintained.

In some instances, ease or cost of manufacturing considerations may require a tray having hermetic sealing capabilities, but not appreciably enhanced strength. For example, a relatively small tray bearing a light food load (such as a microwave dinner tray) may require an airtight seal although additional tray strength or rigidity is unnecessary. In such cases, adding only a small portion of injection-molded material to the upper or lower surface of a tray flange may substantially reduce the cost and the difficulty of manufacturing the tray.

Figure 19:
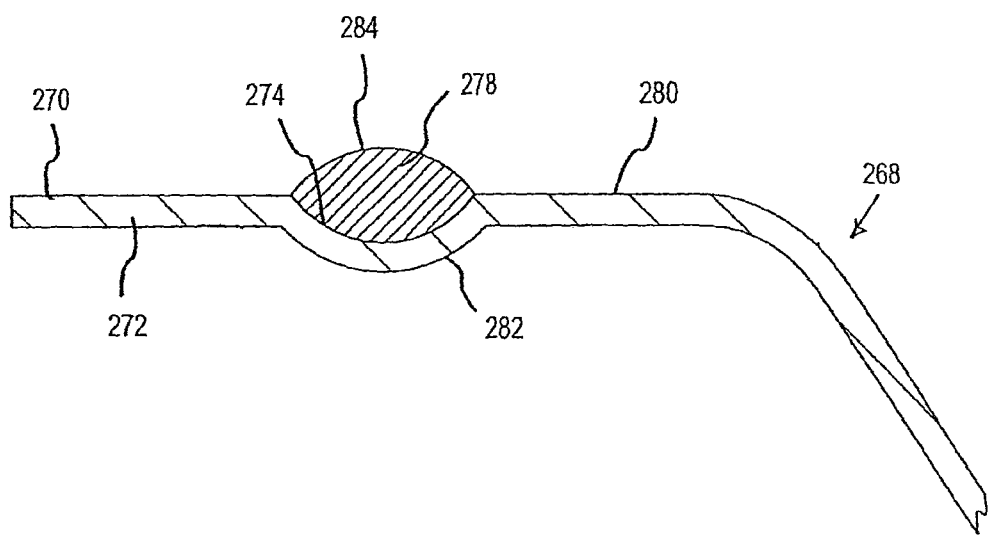
FIG. 19 is a fragmentary, cross-sectional view of a partially encapsulated tray flange, wherein the injection-molded material provides a surface for sealing a lid, film, or cover to the tray.
Figure 20:
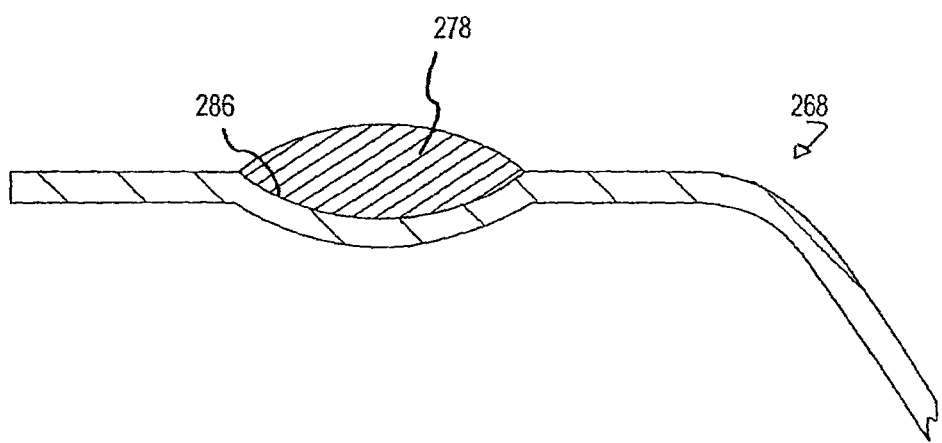
FIG. 20 is a fragmentary, cross-sectional view of another embodiment of a partially encapsulated tray flange, wherein the injection-molded material provides a surface for sealing a lid, film, or cover to the tray.
Figure 21:
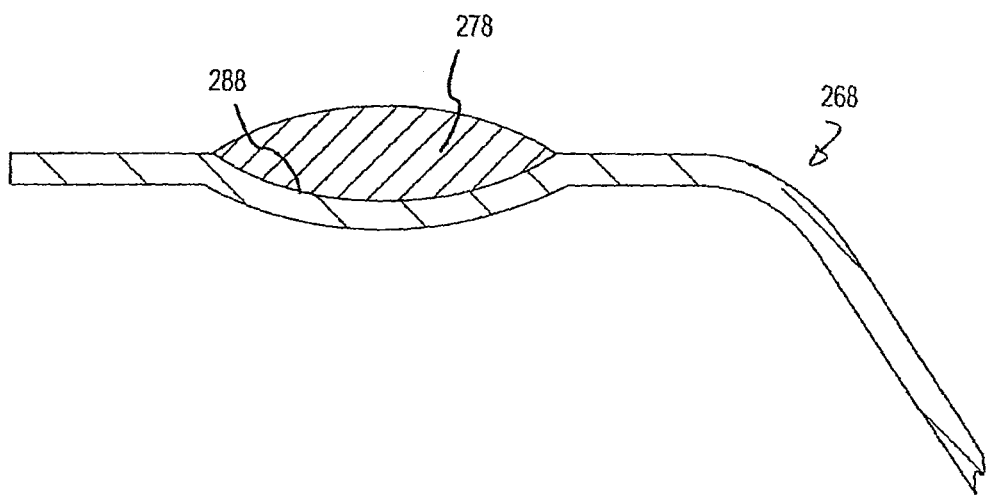
FIG. 21 is a fragmentary, cross-sectional view of yet another embodiment of a partially encapsulated tray flange, wherein the injection-molded material provides a surface for sealing a lid, film, or cover to the tray.

Such a tray 268 is shown generally in FIGS. 19, 20, and 21. Turning now to FIG. 19, it may be seen that the top 270 of a tray flange 272 may include a curved or arcuate depression or groove 274 running along the perimeter of the tray 268. By filling this groove 274 with injection-molded material 278, such as a plastic or other similar polymer, a substantially continuous bonding surface may be created on the upper surface 280 of the tray flange 272. It should be noted that the arcuate depression or groove 274, and thus the injection-molded material 278 filling same, could also be on the lower surface 282 of the tray flange 272, rather than on the upper surface 280 of the flange. A hermetic seal may be established by bonding a film or lid to the injection-molded material 278 filling the groove 274. By slightly raising the surface 284 of the injection-molded material with respect to the flange 272, the injection-molded material 278 is made more accessible to the lid or film and greater surface area is provided to establish a stronger seal.

The dimensions of the groove running along the perimeter of the flange 272 (and thus, by implication, the dimensions of the injection-molded material) may vary as necessary given the desired use of the tray 268. FIGS. 20 and 21 show progressively more elongated grooves 286, 288, filled with injection-molded material 278. Although increasing the surface area of the injection-molded material does not in this instance add appreciable tensile strength to the tray, it does provide greater opportunity to sealably mate the film or lid to the tray.

Tray with Web Corners

Figure 22:
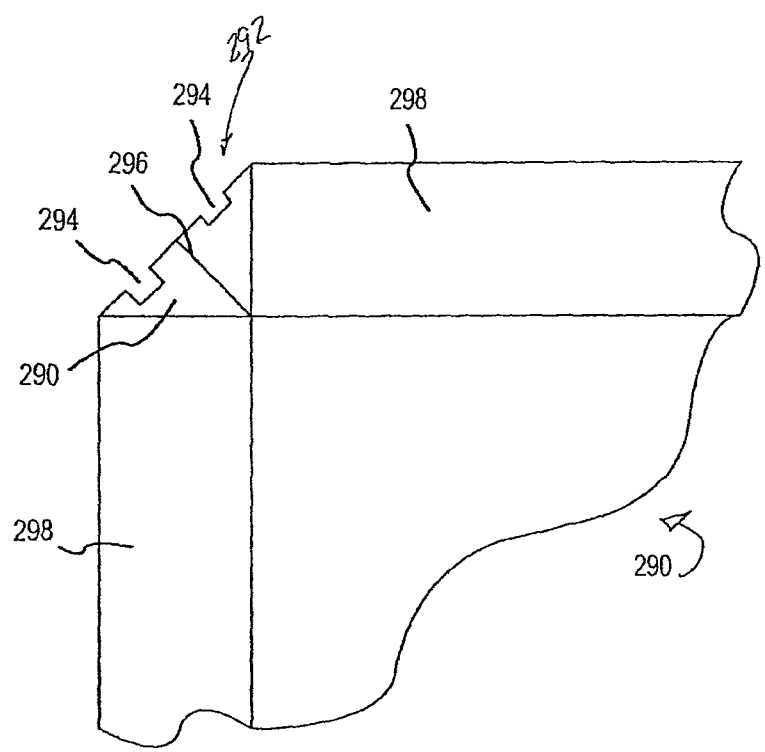
FIG. 22 is a fragmentary view of a corner of a notched web-corner tray blank.

Another commonly used tray blank in many industries is a web-cornered tray. Generally, the corners of a web-cornered tray blank are scored or folded in such a manner that when the tray is fully assembled with the sidewalls in an upright position, the web corner extends outwardly, folds along an exterior sidewall of the tray, and lies flat. Such trays are also referred to as "gusseted" trays. Alternately, the web corner or gusset may project into the center of the tray and fold back along the interior of one of the sidewalls, depending on the construction of the tray. An example of a fragmentary portion of a web-cornered tray blank 290 is shown in FIG. 22 in an unassembled state. A notched corner 292 is shown. Such blanks can more readily be printed and achieve high-quality graphic reproduction (e.g., using a four-color process) than a blank for a press-formed tray. Web-corner blanks can also be laminated or coated on both sides, which allows added functionality (e.g., barrier and high gloss).

It may be seen in FIG. 22 that the corner 292 of the web-cornered tray blank 290 (that is, the gusset) includes a pair of notches 294 in the depicted embodiment. One notch is placed on either side of the center fold line 296 in such a manner that the notches 294 align when the tray is assembled.

Gusseted trays are often used in situations where the tray must be printed with, for example, four-color process graphics or other high image quality designs, insofar as the gusseted corner does not distort a tray graphic. Gusseted trays, unlike press-formed paperboard trays, accept such graphics easily. They may also be laminated or coated on both sides with a barrier material (not shown) to minimize moisture or vapor passage, or may be provided with an attractive high gloss coating. Generally, such enhancements may not be used with press-formed trays. The web-corner tray blank 290 may have flanged panels or may be flangeless. The blank 290 depicted in FIG. 22 has flangeless side panels 298. As shown in cross-section in FIG. 23, an injection-molded polymer flange 300 may be added to the formed web-corner tray 302. The formed web-corner tray 302 is essentially the assembled tray blank 290 of FIG. 22.

Although general reference is made throughout this application to four-color, six-color, and other printing processes with respect to specific trays, blanks, and so forth, it should be understood that such references are by way of example and not limitation. Generally speaking, any printing process may be used with any tray described herein.

Figure 23:
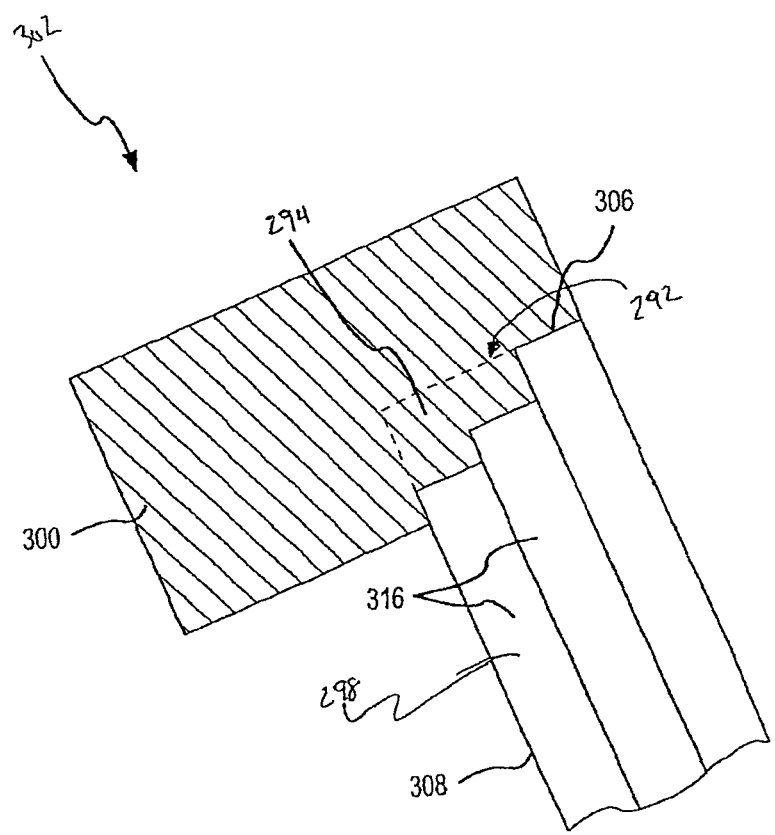
FIG. 23 is a fragmentary, cross-sectional view of a web-corner tray assembled from the blank of FIG. 22 and having an injection-molded, polymer flange, the cross-sectional view taken through the notch.

In the embodiment shown in FIG. 23, the assembled web-corner tray 302 has no integral paperboard flange. Rather, the flange 300 is formed by injection molding appropriate material directly along the upper edge 306 of the tray in such a manner that the injection-molded material not only encapsulates the otherwise raw, die-cut top tray edges, but also projects some distance beyond the outer surface 308 of the sidewall 298 substantially perpendicularly to the tray sidewall. Thus, the flange 300 is formed entirely of an injection-molded polymer or other suitable material. Although the flange is shown as substantially perpendicular to the tray sidewall, it may also be parallel to the tray bottom or at any other desired angle.

This, however, may present special problems at those portions of the tray 302 where the web corners 292 or gussets overlap the sidewalls 298. The discontinuity in thickness caused by the overlapping gussets may mean that proportionately less injection-molded material is placed around that portion of the sidewall, and thus that at these points the bond between the injection-molded material and tray body is relatively weak. The notch 294 in each side of the gussets provides additional surface area to bond with the injection-molded material, enhancing the bond strength, as described further below.

A cross-section of a gusseted corner 292 of an assembled web-cornered tray 302 having an injection-molded flange 300 is shown in FIG. 23. The cross-section is taken through the notch 294 at the outer edge of each gusset or web 316 when the tray 302 is assembled. Essentially, the notch 294 serves as a nesting place for additional injection-molded polymer. By filling the notch 294, the bonding of the injection-molded polymer to the tray blank 290 is enhanced due to the settling of some polymer in the groove created by the notch 294. Through this process, the web-cornered tray 302 is provided with both increased flexural strength and rigidity, and may be sealed hermetically with a lid or film.

Accordingly, in another embodiment of the present invention, web-cornered trays 302 may also be provided with an encapsulated rim or flange. Generally, the encapsulated flange is injection molded after the tray blank 290 is assembled into the web-cornered tray 302. Further, the gusseted tray blank 290 may be provided with a projecting flange, as previously discussed.

Press-Forming and Encapsulating a Web-Cornered Tray Blank

Figure 24:
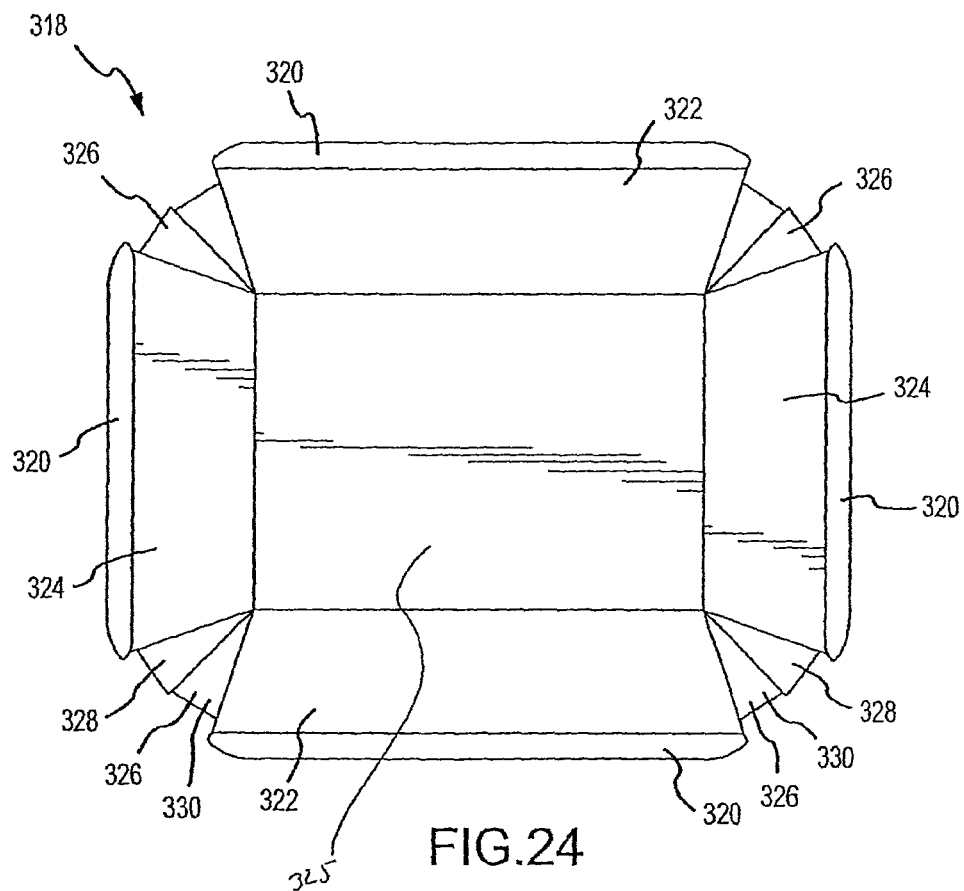
FIG. 24 is a top-down view of a web-corner tray blank, similar to the blank shown in FIG. 22 but lacking notches.

FIG. 24 displays an alternate embodiment of a web-cornered tray blank 318. This tray blank 318 includes flanges 320 extending from the trays long sidewalls 322 and short walls 324. The tray blank 318 may be manufactured, for example, from a clay coated, non-moisturized board. Materials of varying thicknesses may be used to manufacture the blank 318 shown in FIG. 24.

Figure 25:
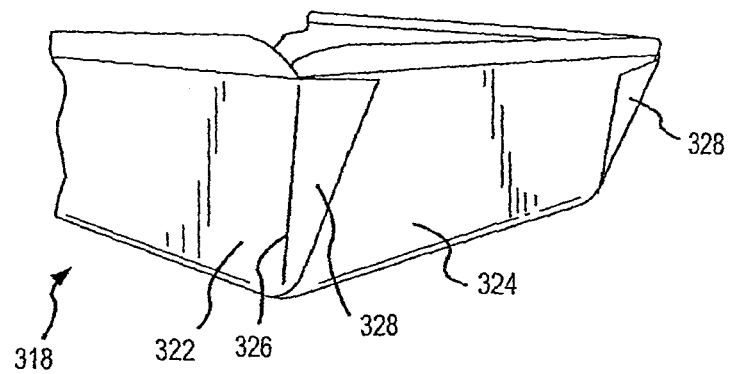
FIG. 25 is an isometric view of the web-corner tray blank of FIG. 24 in an assembled state.

Generally, when the flat blank 318 is inserted into an injection-molding apparatus (as described in more detail herein), the mold press-forms the blank 318 into a three-dimensional shape. Generally speaking, the web corners 326 fold along a sidewall 322,324, of the tray, such that one portion 328 of the web corner 326 is covered by the immediately adjacent portion 330. This folded position is best shown in FIG. 25, which displays a perspective view of the assembled blank 318 of FIG. 24. Although FIG. 25 displays the web corners 326 folded against the short sidewalls 324, alternate embodiments may fold the web corners adjacent against the long sidewalls, or may fold different web corners against different sidewalls 322.

Once the blank 318 is press-formed, injection-molded material is injected along the flange to form an encapsulated rim, as described elsewhere herein. The pressure exerted by the injection mold on the blank 318 during press-forming (and subsequent injection molding) generally compresses the flange 320 and tray. For example, the pressure may compress the folded web-corner 326 shown in FIG. 25 (having three overlapping layers of paperboard) to approximately the same thickness as the sidewall 324 or base 325 of the tray (made of a single layer of paperboard). This minimizes discontinuities between the tray surfaces and enhances tray 318 uniformity. Press-forming and injection molding are discussed further below, in the section entitled "Second Method and Apparatus for Encapsulation."

Additionally, the high pressure experienced by the tray 318 during the press-forming and injection-molding process may fuse the layers of the clay coating or paperboard fiber located along the web corners 326, causing a relatively vapor- and/or water-tight seal therebetween. Thus, the corners need not be held together with adhesive or through other sealing means, insofar as the fusing of adjacent material layers holds the corners in an assembled position.

Adjacent tray layers 328,324 may be fused in a variety of manners, depending on the composition of the tray blank 318. Where the blank is clay-coated or otherwise includes a film or polymer layer, the polymer chains making up the layer are typically bent or twisted at a molecular level. The pressure exerted by the injection-molding tool on a blank placed within the tool may cause such polymer chains to straighten from their normally bent arrangement. As the pressure is released, the polymer chains may attempt to return to their initial configuration. As the straightened or aligned polymer chains bend, they may abut and bond to one another. Such bonds may be covalent (i.e., chemical or molecular bonds) or noncovalent (i.e., hydrogen or ionic bonds). Alternately, the pressure on the tray may cause fusing or a purely mechanical "crosslinking"—an intermingling of polymer chains or paperboard fibers crushed together by high pressure. Such mechanical crosslinking may occur even where the tray 318 includes no polymer film or resin.

For a true hermetic seal, a vapor-proof barrier coating may be added to the blank 318 prior to press-forming. One example of such a coating is ethylene vinyl acetate, or EVA. Further, such barrier coatings, or other desired coatings, may be press-applied prior to press-forming of the tray.

Generally, by using a clay-coated board for the blank 318, the overall thickness of the blank may be reduced in comparison to, for example, standard paperboard blanks. Further, varying grades of clay-coated board may be used, such as CRB (coated recycled), SUS (solid unbleached sulfate), and Kraft grade paperboards. Additionally, a clay-coated blank may accept a six-color (or more) process printing, permitting more colors to be printed on the blank. Further, because the overlapping layers of the flange 320 may be compressed along their overlapping portions to a thickness approximately equivalent to the tray sidewall (i.e., a single layer of paperboard), when the flange is encapsulated it is more or less uniform in thickness.

Finally, where the tray blank 318 shown in FIG. 24 is clay coated, it need not be moisturized prior to die cutting.

Lid and Tray Having a Mating Feature

Figure 26:
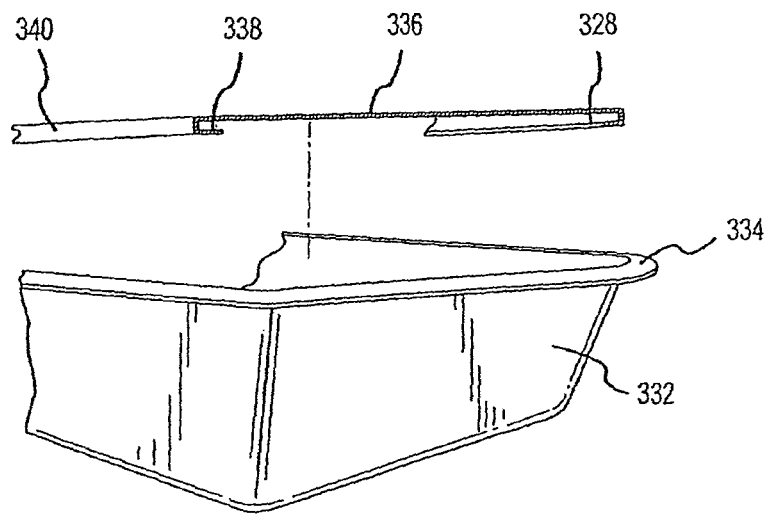
FIG. 26 is an isometric view of a tray having an encapsulated rim and a cross-sectional view of a folded lid designed to mate with the rim.
Figure 27:
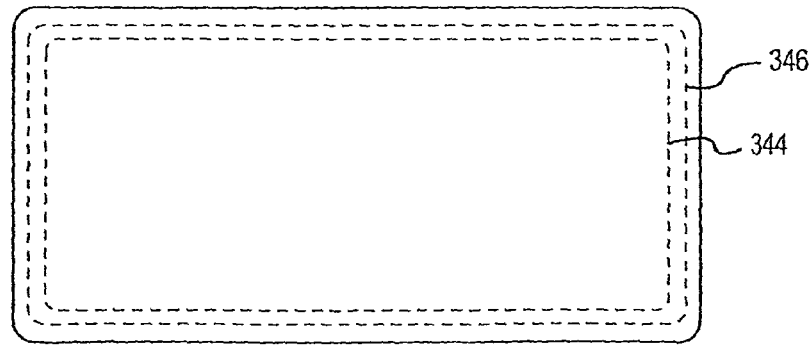
FIG. 27 is a top-down view of the lid of FIG. 26 in an unfolded state.
Figure 28:
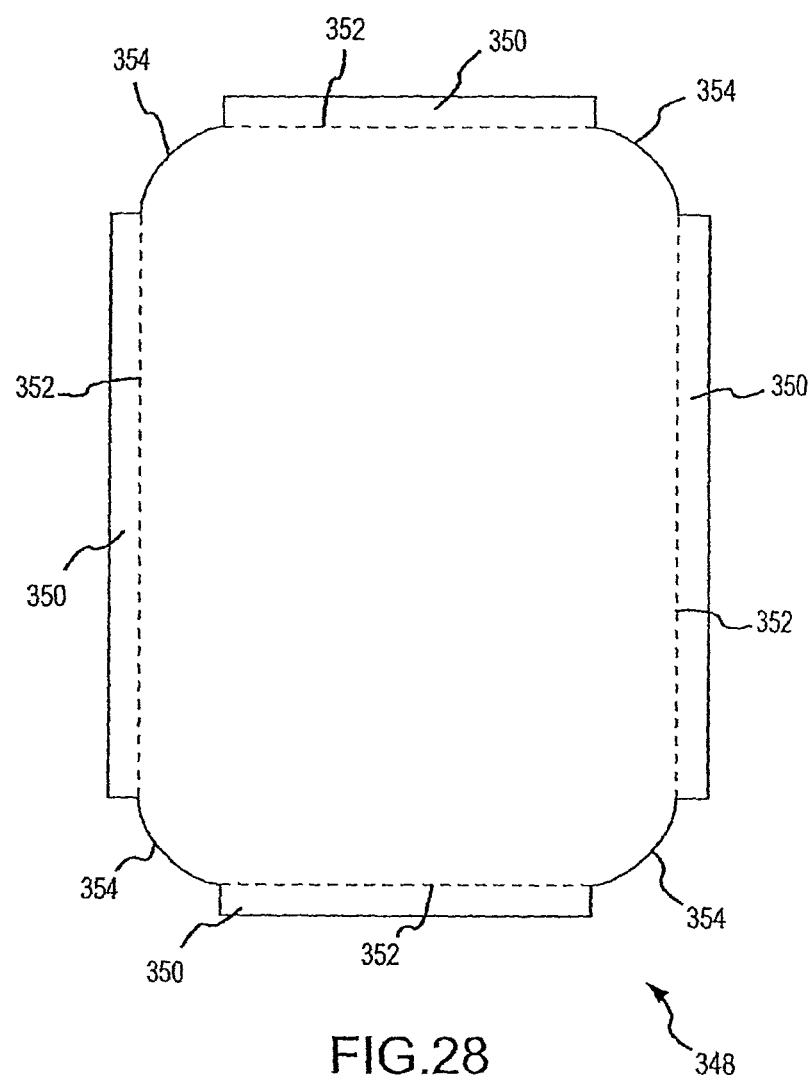
FIG. 28 is a top view of a lid similar to the lid depicted in FIG. 27, but having material removed from each corner and a single semicontinuous score line.

FIG. 26 illustrates an exploded isometric view of a tray 332 having an encapsulated rim 334 and a cross-sectional view of a lid 336 adapted to engage the encapsulated rim 334. To engage the rim 334, the lid 336 defines a channel 338 defined partially or completely along the length of the outer portion 340 of the lid 336. FIG. 27 illustrates one example of a scored lid blank 342 adapted to be formed to define a lid 336 having a channel 338, as shown in FIG. 26. Particularly, the lid 342 includes an inner score line 344 and an outer score line 346. The score lines may be continuous or intermittent. The score lines preferably do not completely penetrate the paperboard. FIG. 28 is an alternate embodiment of the lid shown in FIG. 27. In this embodiment, the dual score lines 344,346 of the lid blank 342 of FIG. 27, are replaced by a semicontinuing single score line 352. The semicontinuing score line extends generally across the base of one or more flanges 350 and is contiguous with one or more rounded corners 354. Generally, the exterior edges of the rounded corners are recessed from the exterior edge of the flanges, and aligned with the score line.

Figure 29:
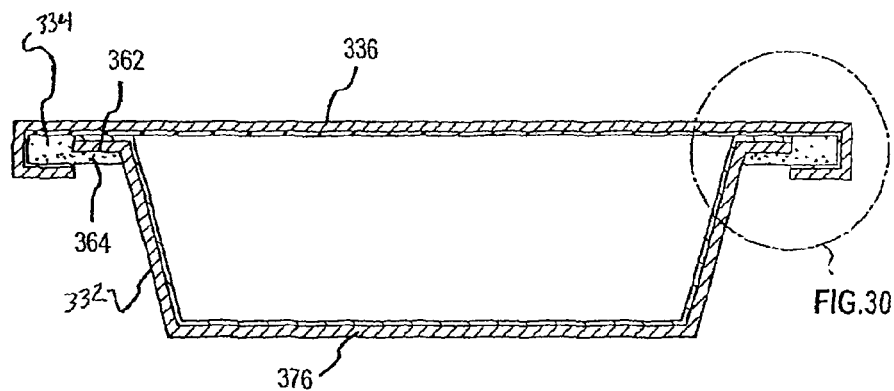
FIG. 29 is a cross-sectional side view of the tray and lid of FIG. 26 in a mated position.
Figure 30:
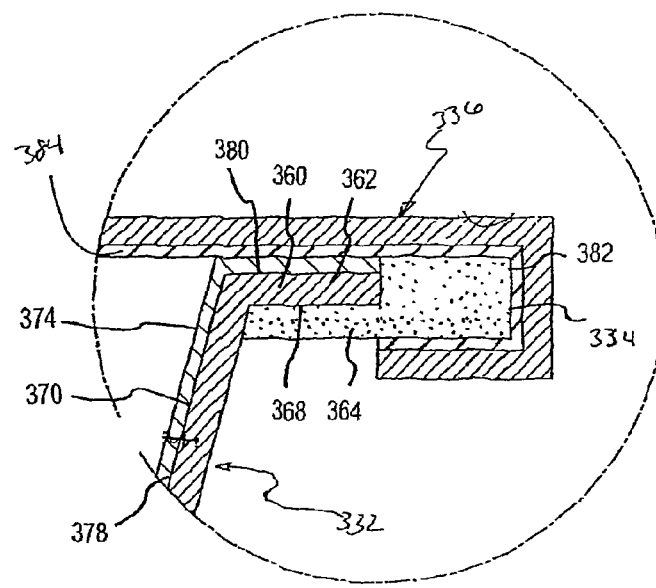
FIG. 30 is an expanded view of the corner of the tray shown in FIG. 29.

FIG. 29 is a representative section view of the lid 336 in engagement with the tray 332. FIG. 30 is a close-up view of the lid 336 engaged with the tray 332. As discussed herein, a tray 332 in conformance with aspects of the present invention includes an encapsulated rim 334. As such, the paperboard flange portion 362 of the tray 332 may be completely or partially encapsulated in a polymer 364 to at least partially form the encapsulated rim 334. The embodiment depicted in FIGS. 29 and 30 has a partially encapsulated paperboard flange 362. Particularly, the polymer covers the outer edge and, possibly, a portion of the lower surface 368 of the paperboard flange. The inner surface 370 of the paperboard is coated with a film 374 in which may extend along the interior of the tray's sidewalls 378. The film covers the bottom 376 of the tray, the inner sidewalls 378 of the tray, and the upper side 380 of the paperboard flange 362. The encapsulated rim 334 has an upper portion, which is formed partly of a resin (such as a polymer) and partly of the coating on the upper side of the paperboard flange. The encapsulated rim 334 further defines an outer rim edge 382, upper rim surface, and lower rim surface.

To form the lid 336 and channel 338 securing the lid 336 to the tray 332, the lid blank 342 is set on the tray so that the inner score line 344 (see FIG. 27) is aligned generally with the outside edge 382 of the encapsulated rim 334. Next, the lid blank is bent downwardly along the inner score line. The lid may be bent in a die form arrangement, manually, or by other means. The first bend causes the region between the inner 334 and outer 346 score lines of the lid to generally abut the outer rim edge 382 of the encapsulated rim 334. To finally form the channel 338, the lid blank 342 is bent inwardly along the outer score line so that the portion of the lid blank outward of the outer score line abuts the lower side of the encapsulated rim. After forming the channel, the non-formed lid 336 may experience some spring back such that the channel 338 does not firmly abut either the lower side of the encapsulated rim 334 or the outer side 382 of the rim. Nonetheless, the arrangement may provide a fairly tight connection of the lid 336 to the tray 332. Additionally, a polymer film 384 on the under-surface of the lid may be heat sealed to the encapsulated rim 334 or film on the tray, thus providing a tight, and possibly hermetic seal.

Figure 31:
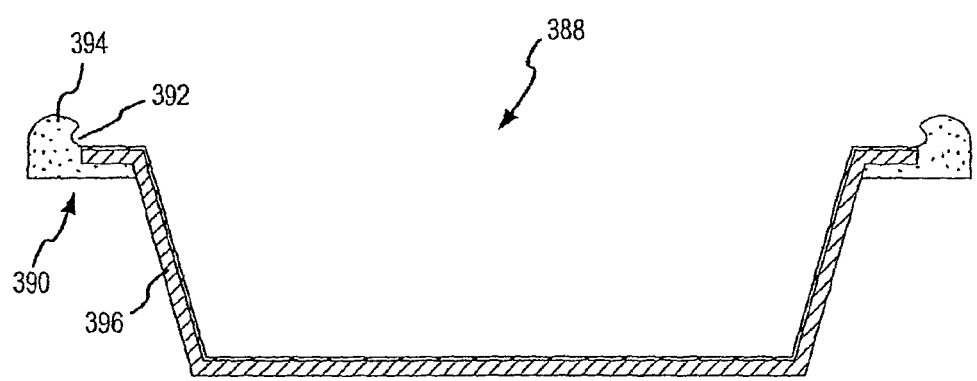
FIG. 31 is a cross-sectional view of a tray having an encapsulated rim including a recess cavity.

FIG. 31 shows yet another embodiment of a tray 388 having an encapsulated feature 390. In this embodiment, the tray includes a recess feature 392 formed of injection-molded material 394 and capable of accepting a lid (not shown). The recess, shown in cross-section in FIG. 31, generally extends around at least three sides 396 of the tray. One side may be left open to allow the lid to slide into the recess, or all four sides may be encapsulated with such a recess and the lid pressed into the recess.

Figure 32:
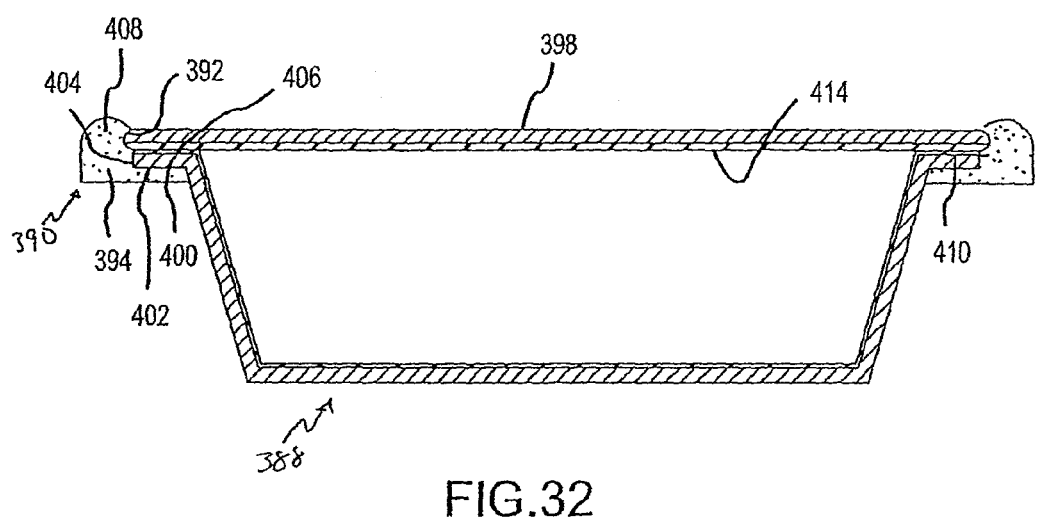
FIG. 32 is a cross-sectional view of the tray of FIG. 31, showing a lid resting in the recess cavity.

FIG. 31 is a representative section view of a tray 388 having an encapsulated rim 390 defining an inwardly opening lid engagement channel 392. FIG. 32 is a representative section view of the tray 388 illustrated in FIG. 31 with a lid 398 in engagement with the lid engagement channel 392. Referring to both FIG. 31 and FIG. 32, the polymer portion 394 of the encapsulated rim 390 partially encompasses the paperboard flange 400. Particularly, the polymer is formed along the lower side 402 and the outer side 404 of the flange. The polymer or resin also extends upwardly from the top portion 406 of the paperboard flange. This upwardly extending portion 408 defines the inwardly opening engagement channel 392.

The lid engagement channel 392 may be formed completely or partially around the inner edge of the encapsulated rim 390. As shown in FIGS. 31 and 32, the engagement channel defines a partially circular cross-section. However, the channel may define other shapes, such as a partially rectangular cross-section or a generally triangular cross-section. The upper edge of the channel 392 may be aligned generally longitudinally with the outside edge of the paperboard flange 400, may extend over the paperboard flange, or may be positioned somewhat outwardly from the outside edge of the paperboard flange.

Preferably, the lower edge of the channel 392 is laterally aligned generally with the outer edge 404 of the paperboard flange 400. As best shown in FIG. 32, when the lid 398 is engaged with the tray 388, the lower or inner side of the lid 414 abuts the top portion 406 of the encapsulated flange 390. Arranged as such, a seal (or at least a partial seal) is formed between the lid 398 and the tray 388 to help prevent leaks of material in the container, to help keep contents of the container warm, and to provide other benefits. The opening of the channel 392 is generally dimensioned in such a manner as to securely hold the lid in place.

Figure 103:
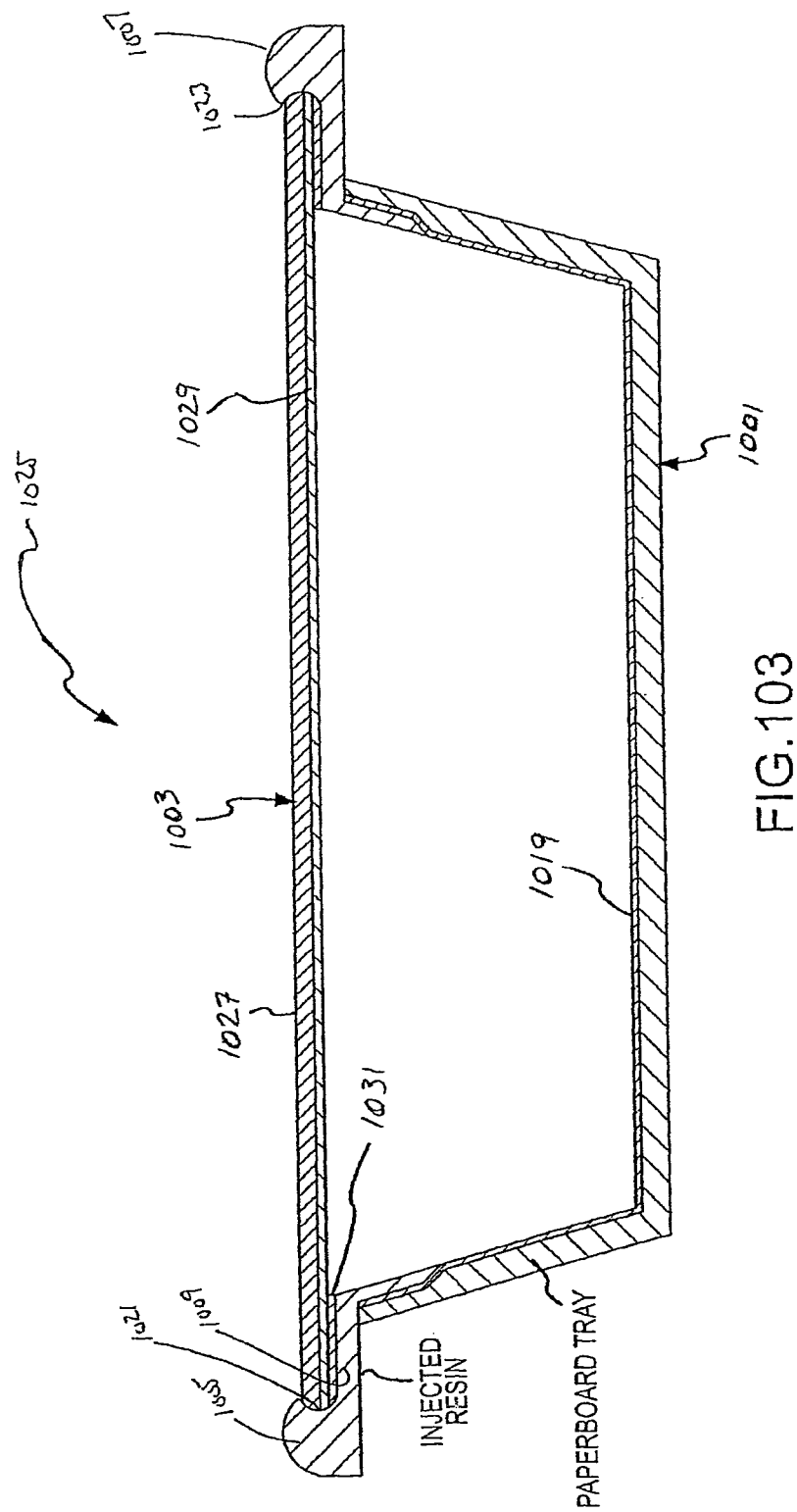
FIG. 103 is a cross-sectional view of a package comprising the tray of FIG. 102 and a frictionally and adhesively affixed lid.

FIGS. 102-105 are various views of a tray 1001 and lid 1003 forming a package 1025 according to an embodiment of the present invention. As shown in FIG. 102, the tray has an encapsulated rim 1005 comprising an arcuate head portion 1007, a flange portion 1009, and an anchor portion 1011, all of which are formed from injected resin. The sidewalls 1015 and bottom 1017 of the tray 1001 are lined with a film 1019 prior to injecting the resin to form the encapsulated rim. When the resin is injected to form the encapsulated rim, the upper end of the sidewalls may be displaced or compressed to accommodate the anchor portion of the encapsulated rim. The upper end of the anchor portion 1011 intersects a flange portion 1009 of the encapsulated rim 1005, and the flange portion terminates at its outward edge at a lid engagement channel 1021. The lid engagement channel has an arcuate shape, the upper portion of which is defined by an overhang 1023 comprising part of the arcuate head portion. As shown in FIG. 103, the package is completed by adding a lid to the tray of FIG. 102. In this embodiment, the lid 1003 is constructed from paperboard 1027 with a film 1029 attached to its underside. In FIG. 103, the lid 1011, including the film attached to its lower or inner surface, is frictionally and adhesively affixed to the tray 1001 to form the completed package 1025. In particular, small strips of pressure sensitive adhesive 1031 are applied along the edges of the lid as shown in, for example, FIG. 103. Thus, when the lid 1003 is pressed on the top of the tray 1001, the pressure sensitive adhesive 1031 acts to hold the lid on the flange portion 1009 of the encapsulated rim 1005. When the lid is forced downwardly onto the tray, the edges of the lid snap past the overhangs 1023 of the arcuate head portions 1007 and frictionally engage the lid engagement channels formed in the encapsulated rims. Thus, in this embodiment, the lid is both adhesively and frictionally held in position on top of the flange portions of the encapsulated rim. The tray 1001 may include a film 1019 or other lining along its inner surface.

Figure 104:
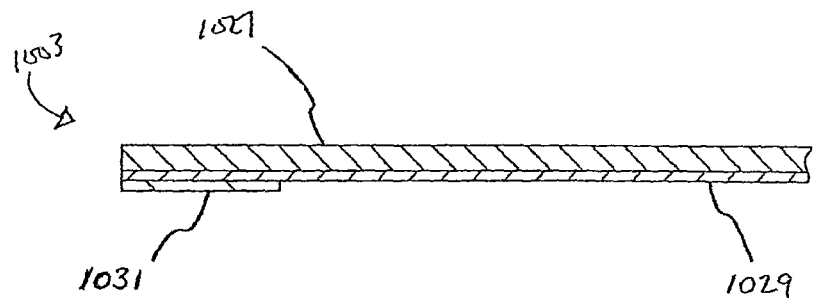
FIG. 104 is a fragmentary, cross-sectional view of one end of the lid depicted in FIG. 103.

FIG. 104 is a fragmentary, cross-sectional view of one end of the lid 1003 depicted in FIG. 103. In this figure it is possible to see the paperboard 1027, the film 1029 (which may be a seal layer), and the relatively shorter section of pressure sensitive adhesive 1031. If the tray includes an encapsulated rim around its entire perimeter, similar sections of pressure sensitive adhesive would be located around the other edges of the lid and would, once the lid was installed on a tray, secure the underside of the lid to the flange portion 1009 of the encapsulated rim of the tray.

Figure 105:
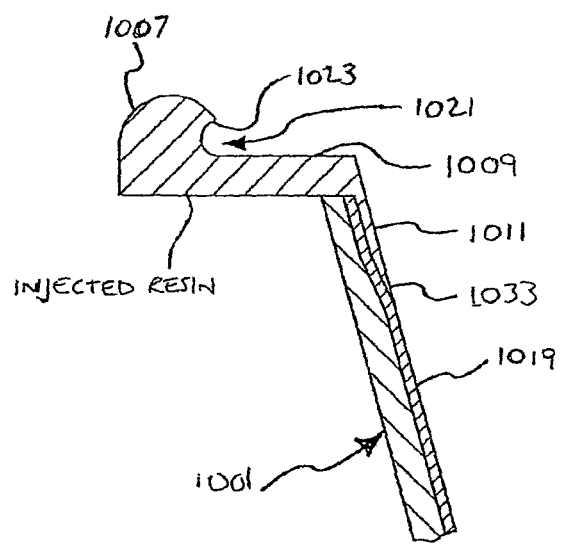
FIG. 105 is a fragmentary, cross-sectional view of a portion of the tray depicted in FIGS. 102 and 103.

FIG. 105 is a fragmentary, cross-sectional view of a portion of the tray 1001 depicted in FIGS. 102 and 103. As clearly shown in this figure, the encapsulated rim 1005 comprises the arcuate head portion 1007 that includes the overhang 1023, which helps to define the lid engagement channel 1021. The encapsulated rim also includes the flange portion 1009 that extends from a lower portion of the arcuate lid engagement channel to an upper end of the anchor portion 1011. In the embodiment depicted in FIG. 105, the lower, distal end 1033 of the anchor portion 1011 terminates in a relatively sharp point flush with the inner surface of the film 1019 attached to the sidewall of the paperboard tray.

Figure 106:
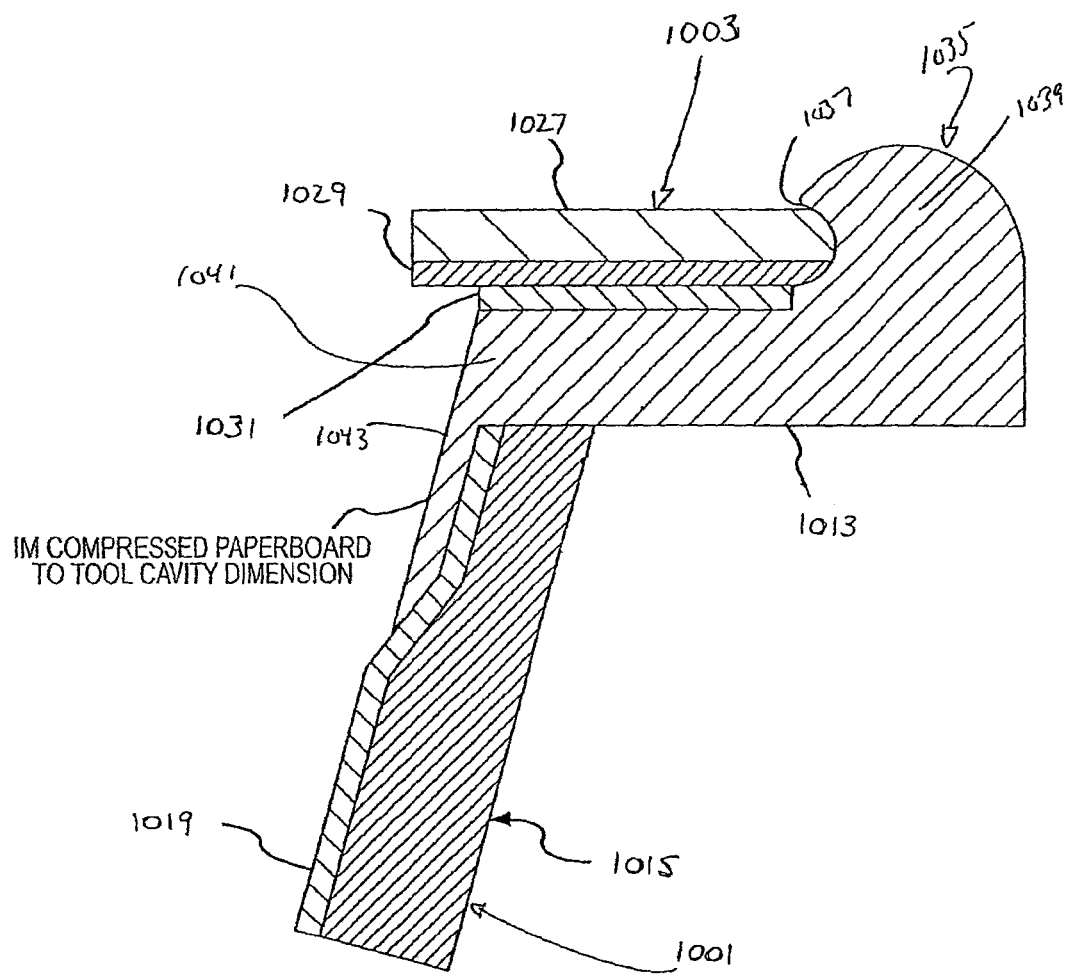
FIG. 106 is an enlarged, fragmentary, cross-sectional view depicting the lid of FIGS. 103 and 104 frictionally and adhesively bonded to a first alternative embodiment of the encapsulated rim depicted in FIGS. 102, 103, and 105.

FIG. 106 is an enlarged, fragmentary, cross-sectional view depicting the lid 1003 of FIGS. 103 and 104 frictionally and adhesively bonded to a first alternative embodiment of the encapsulated rim 1035 depicted in FIGS. 102,103, and 105. In this embodiment, the lid is again a paperboard 1027 having a film 1029, which may be a seal layer, on its lower or inner surface. As clearly visible in FIG. 106, the edge of the lid 1033, including the film 1029 adhered to the lower side of the lid, is frictionally engaged with the lid engagement channel 1037 formed in the arcuate head portion 1039 of the encapsulated rim. Again, a pressure sensitive adhesive 1031 has been applied to the lower side of the lid film and is shown adhering the lid to the flange portion 1041 of the encapsulated rim. Thus, in this embodiment, as in the embodiment depicted in FIGS. 102,103, and 105, the lid 1003 is frictionally and adhesively attached to an encapsulated rim 1035 of the tray 1001. In this embodiment, however, the anchor portion 1043 of the encapsulated rim is set back from the film 1019 affixed to the inside surface of the tray sidewall 1015. Thus, a slightly reduced amount of injected resin 1013 is required and the relatively pointed distal end of the anchor portion is somewhat shielded from whatever product is contained in the package.

Figure 107:
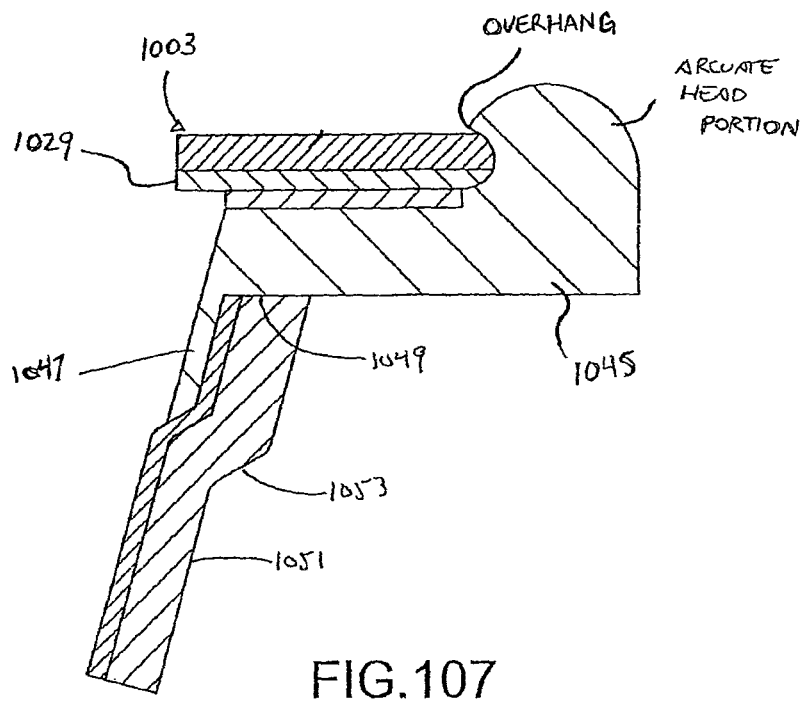
FIG. 107 is an enlarged, fragmentary, cross-sectional view depicting the lid of FIGS. 103 and 104 frictionally and adhesively bonded to a second alternative embodiment of the encapsulated rim depicted in FIGS. 102, 103, and 105.

FIG. 107 is similar to FIG. 106, but depicts an enlarged, fragmentary, cross-sectional view of the lid 1003 of FIGS. 103 and 104 frictionally and adhesively bonded to a second alternative embodiment of the encapsulated rim 1045 depicted in FIGS. 102,103, and 105. In this second alternative embodiment, the anchor portion 1047 of the encapsulated rim has its distal end again offset away from the film 1029 on the inner surface of the tray sidewall. Additionally, during formation of this particular embodiment, the resin was injected in a manner that does not compress the upper end 1049 of the sidewall of the tray. Thus, as shown in FIG. 107, the tray sidewall 1051 has relatively the same thickness at its upper end as it does along the remainder of the sidewall. Here, the offset or jog 1053 in the sidewall is more pronounced than what is shown in FIG. 106, which allows the tray sidewall to remain at a relatively constant thickness and allows the distal end of the anchor portion to terminate in a less tapered or pointed configuration.

Figure 108:
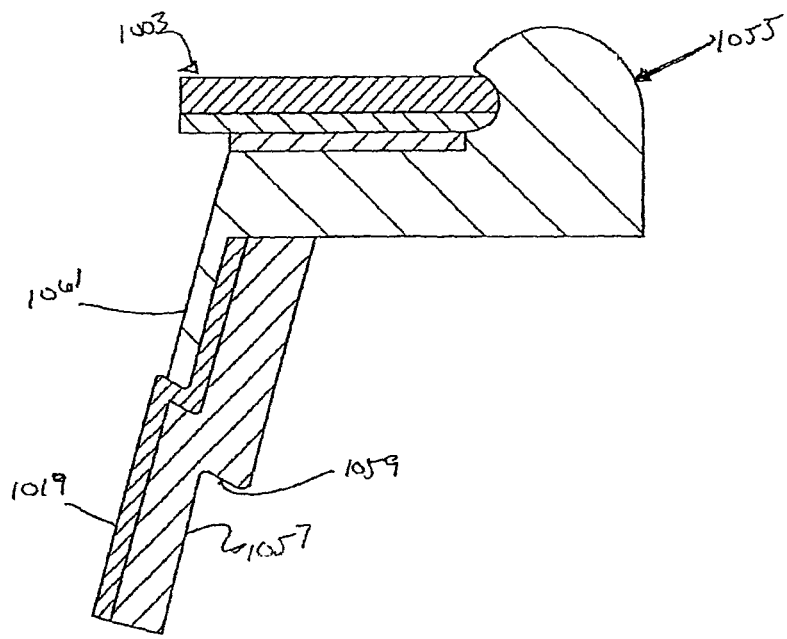
FIG. 108 is an enlarged, fragmentary, cross-sectional view depicting the lid of FIGS. 103 and 104 frictionally and adhesively bonded to a third alternative embodiment of the encapsulated rim depicted in FIGS. 102, 103, and 105.

FIG. 108 is an enlarged, fragmentary, cross-sectional view depicting the lid 1003 of FIGS. 103 and 104 frictionally and adhesively bonded to a third alternative embodiment of the encapsulated rim 1055 depicted in FIGS. 102,103, and 105. In this embodiment, like in the embodiment depicted in FIG. 107, the tray sidewall 1057 remains of relatively constant thickness. Here, the jog 1059 in the sidewall is even more pronounced than the jog depicted in FIG. 107. In fact, the sidewall slopes downwardly and to the right in FIG. 107 for a short section before it continues with its upwardly and rightwardly slope. With this "negative slope," it is possible to nearly square off the distal end of the anchor portion 1061 of the encapsulated rim. Again, the distal end of the anchor portion is offset away from the film 1019 on the inner surface of the tray sidewall.

Figure 109:
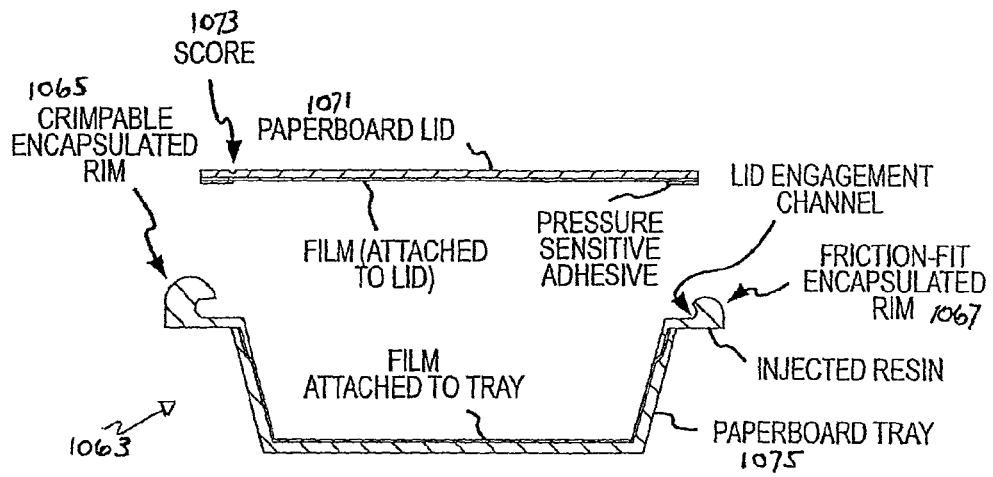
FIGS. 109-113 depict the assembly and operation of a package having asymmetrically-injected encapsulated rims, including a crimpable encapsulated rim and a friction-fit encapsulated rim.

FIGS. 109-113 depict the assembly and operation or use of a package 1063 having asymmetrically-injected rims, including a crimpable encapsulated rim 1065 and a friction-fit encapsulated rim 1067. As shown in FIG. 109, the crimpable encapsulated rim is depicted on the left side and the friction-fit encapsulated rim is depicted on the right side. The crimpable encapsulated rim is relatively larger than the friction-fit encapsulated rim in this embodiment 1063. The crimpable encapsulated rim is relatively larger to handle the stresses of crimping and to accept more of the lid for a more secure attachment of the lid to the tray. The injected resin used to form the crimpable encapsulated rim is designed to remain permanently deformed after crimping and, thus, may include various fillers to facilitate that desired result. Since the lid may be attached along one edge by crimping the crimpable encapsulated rim, the lid and tray may be shipped as a single component package to be filled and finally sealed by the package purchaser. Also as shown in FIG. 109, the lid 1071 may include a score line 1073 to make it easier to open and close the lid by pivoting it about the edge being held by the crimpable encapsulated rim.

Figure 110:
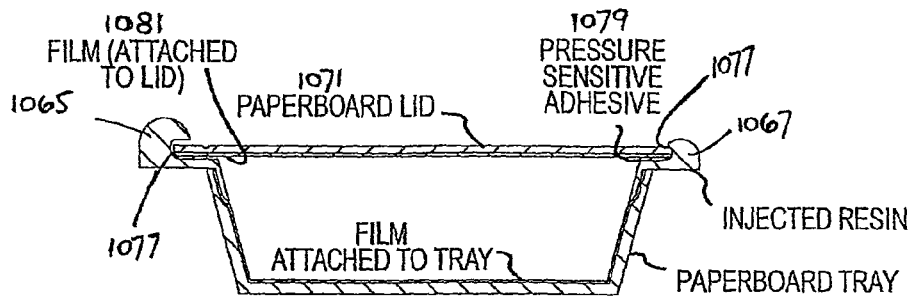

In FIG. 110, the lid 1071 has been positioned on the tray 1075. As shown in this figure, the lid fits relatively snugly in the lid engagement channels 1077 along the encapsulated rims 1065,1067. In the depicted embodiment, the score line 1077 in the upper surface of the lid is located at the edge of the pressure sensitive adhesive 1079 mounted to the film 1081 attached to the underside of the lid. Thus, when the adhesive has been activated and is holding the lid on the flange portion of the crimpable encapsulated rim, the lid hinge point is along the inboard edge of the pressure sensitive adhesive. Thus, FIG. 110 depicts the first step of assembling the paperboard lid to the tray by inserting the lid edges into the edge receiving channels of the encapsulated rims. At this point, the package 1063 may have been filled.

Figure 111:
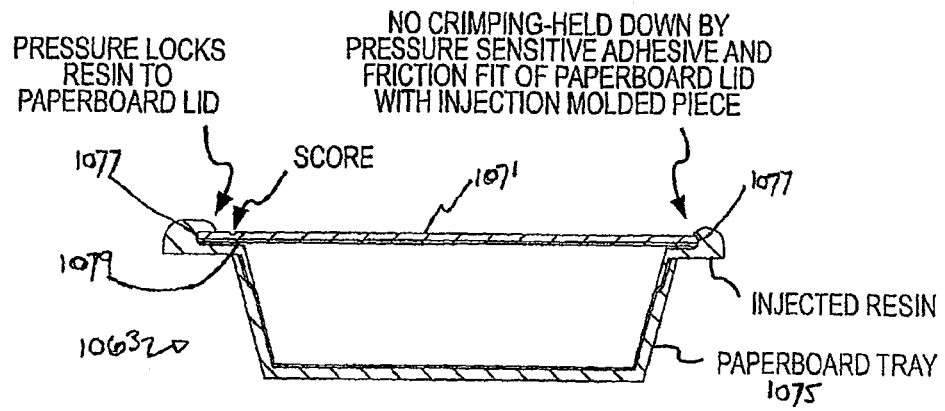

In FIG. 111, step two of the assembly of the lid 1071 to the tray 1075 has been completed. In this step, the crimpable encapsulated rim 1065 has in fact been crimped on the hinge side of the lid. If the package 1063 has been filled, pressure may then be applied to the remaining three sides of the lid to achieve a final seal, in which the edge of the paperboard lid being held by the crimpable encapsulated rim is securely held by the pressure sensitive adhesive 1079 and the crimping, and the remaining three edges of the lid are held by both the pressure sensitive adhesive and by frictional engagement of those three edges of the paperboard lid in the lid engagement channels 1077. Although it is possible to crimp more than one edge of the paperboard lid, in this depicted embodiment, only one edge of the lid is being held by a crimped encapsulated rim.

Figure 112:
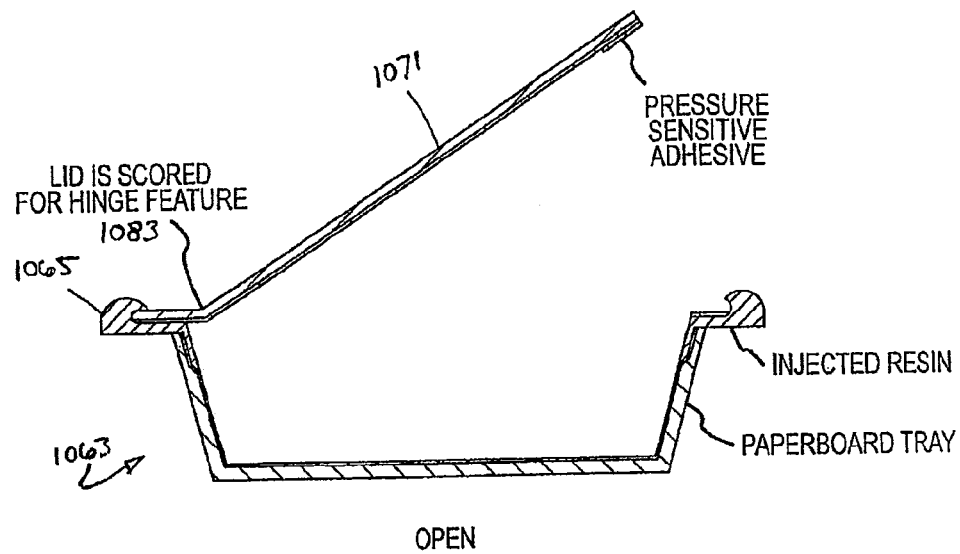
Figure 113:
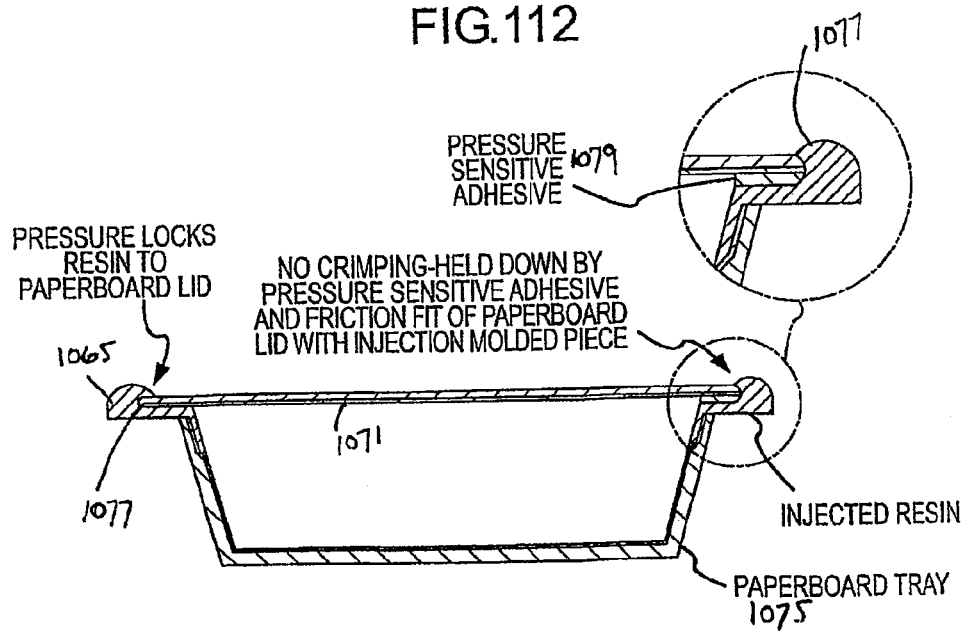

In FIG. 112, the crimpable encapsulated rim 1065 is depicted fully crimped onto one edge of the lid 1071, and that edge of the lid is scored to create a hinge feature 1083 allowing the lid to be pivoted open as shown in FIG. 112. If, for example, the container 1063 were to be shipped empty, it could be shipped in the configuration depicted in FIG. 112. Then, it could be opened, filled, and then closed as shown in FIG. 113. In FIG. 113, the tray 1075 has been filled, the crimpable encapsulated rim 1065 has been crimped along one edge of the lid 1071, and the pressure sensitive adhesive 1079 around the remaining three edges of the lid has been activated. Those remaining three edges of the lid are held down by both the pressure sensitive adhesive and by frictional engagement of the paperboard lid edges in the lid engagement channels 1077 of the friction-fit encapsulated rims.

Figures 114, 115:
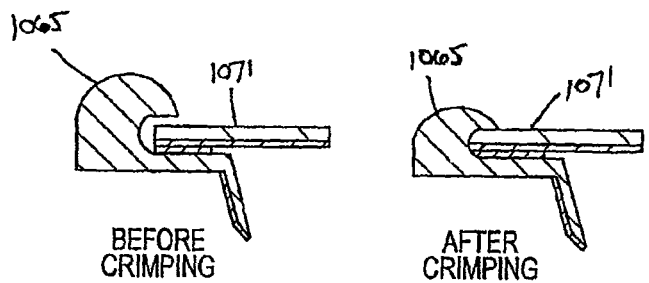
FIGS. 114 and 115 depict crimping of the crimpable encapsulated rim depicted in FIGS. 109-113.
Figures 116, 117:
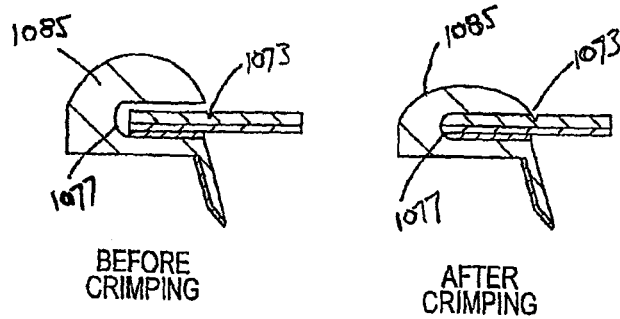
FIGS. 116 and 117 depict crimping of an alternative embodiment of a crimpable encapsulated rim.

FIGS. 114 and 115 are enlarged, fragmentary views of the crimpable encapsulated rim 1065. In FIG. 114, one end of the lid 1071 has been inserted under the overhang of the arcuate head portion of the encapsulated rim and is resting on the flange portion of the encapsulated rim. Crimping has not taken place. In FIG. 115, the crimpable encapsulated rim has been crimped onto the edge of the paperboard lid and is shown securely holding that edge of the lid. FIGS. 116 and 117 depict an alternative embodiment of the crimpable encapsulated rim 1085. In this embodiment, the lid engagement channel is deeper 1077 since the overhang portion of the arcuate head portion is longer than what is depicted in FIG. 114. As shown in FIGS. 116 and 117, the score line 1073 may be configured so that the overhang of the arcuate head portion comes to rest at the score line, possibly making it easier to open the lid along the hinge line.

Figure 118:
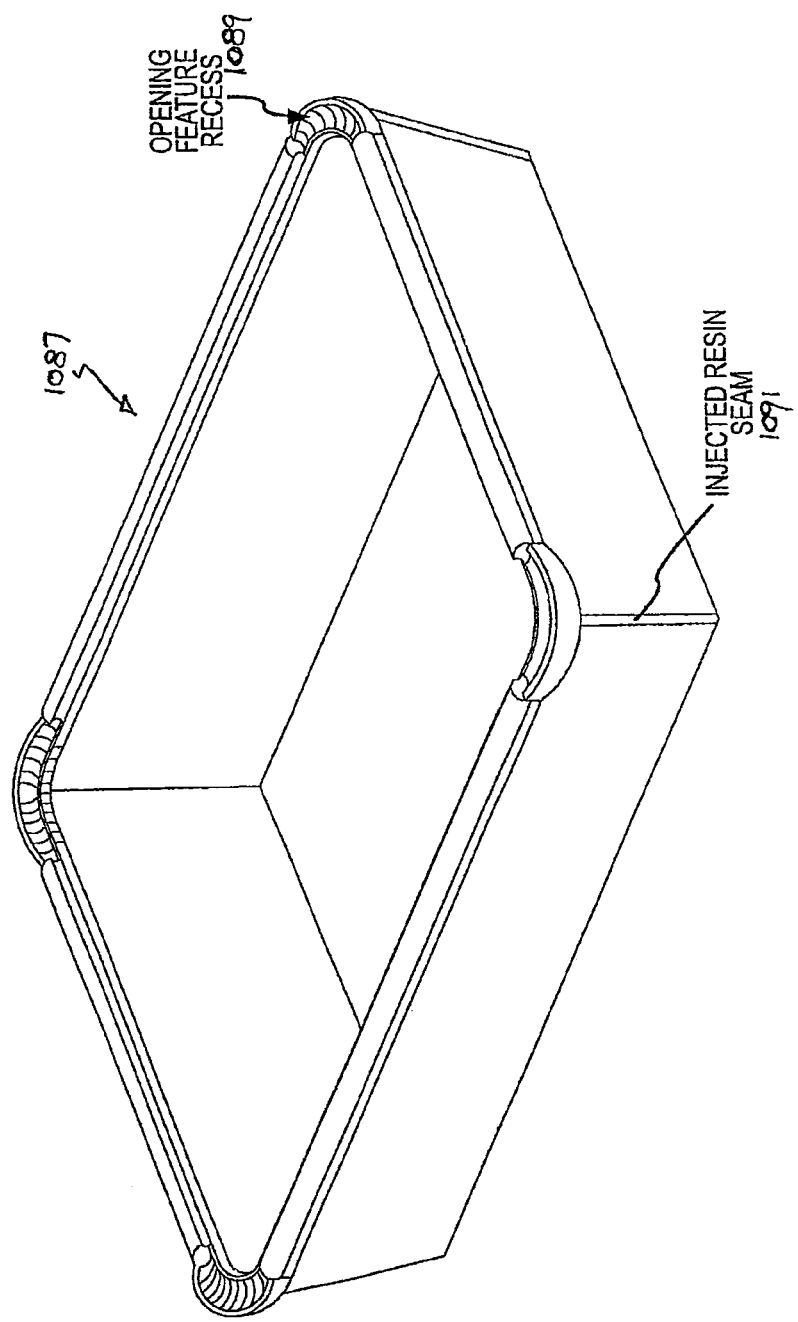
FIG. 118 is an isometric view looking downwardly into a tray having encapsulated rims like those discussed in connection with FIGS. 102-117, wherein a first opening feature recess is formed in the corners of the tray.

FIG. 118 is an isometric view looking downwardly into a tray having encapsulated rims like those discussed above in connection with FIGS. 102-117. In this embodiment of the tray 1087, a first opening feature recess 1089 has been formed in the corners of the tray for purposes discussed further below. The tray depicted in FIG. 118 may have been formed, for example, from a five-panel blank. Thus, an injected resin seam 1091 is also present at each corner.

The package 1093 depicted in FIG. 119 is formed from the tray 1087 depicted in FIG. 118 in combination with a lid 1095 with rounded corners 1097. In this embodiment of a package according to the present invention, the opening feature recesses 1099 in each corner allow a consumer to open the package. For example, as shown in FIG. 121, which is an enlarged, cross-sectional view through a corner of the package 1093, the opening feature recess 1099 allows access to the curved corner 1097 of the lid since a consumer can obtain a finger hold on the corner by taking advantage of the opening feature recess. As shown in FIG. 120, which is an enlarged, cross-sectional view through a different corner of the package, corner hinges 1201 may be present to make it even easier for a consumer to open the package. In particular, the lid may be scored, creating a hinge feature, on all four corners. This hinge feature, together with the opening feature recess, make it easier to lift a corner of the lid to initiate opening of the package.

FIG. 122 depicts a package 1203 that is similar to the package depicted in FIG. 119. In this embodiment, however, an edge score 1205 is present, creating a hinge feature for the entire lid. In this embodiment, if a consumer were to lift on the corner 1207 or most-leftward corner as depicted in FIG. 122, the lid could then be opened by pivoting it along the edge score. FIG. 123 depicts a cross-sectional view of a corner of the package of FIG. 122, showing the edge score.

Figure 124:
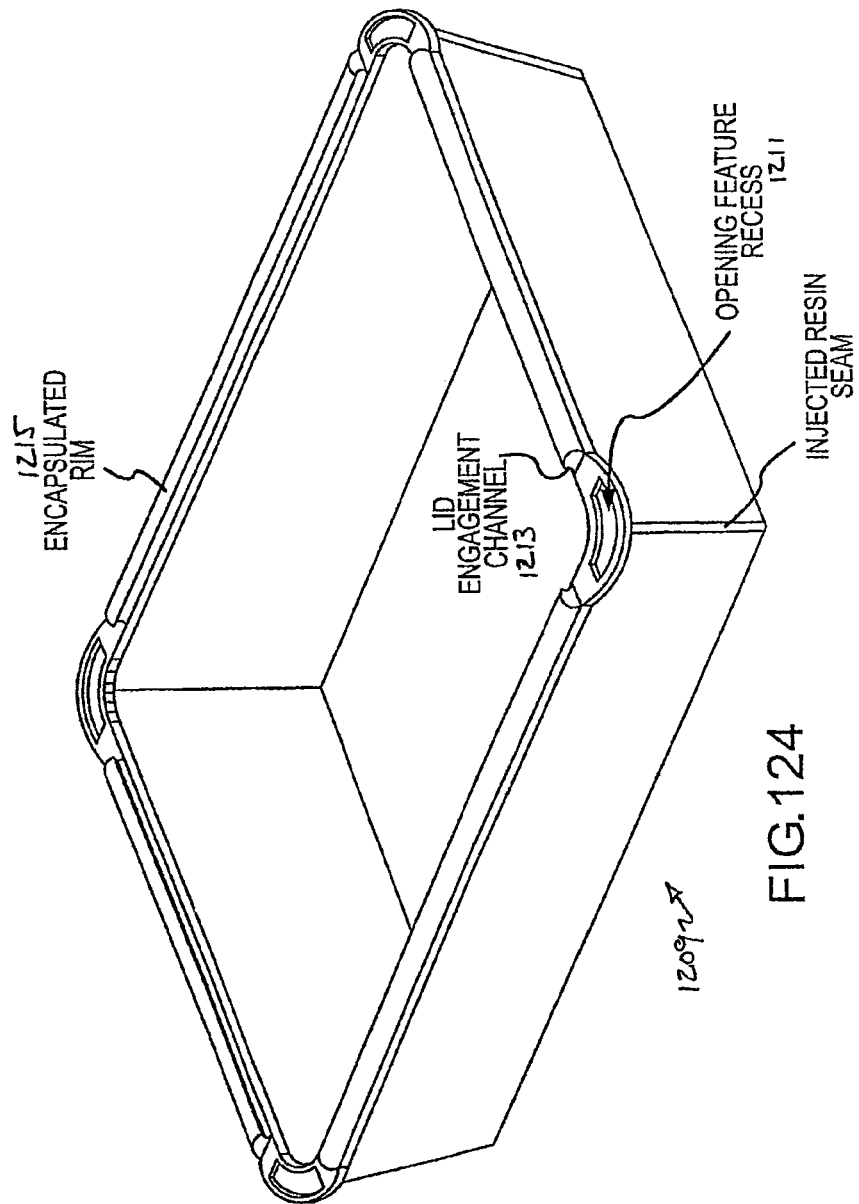
FIG. 124 is similar to FIG. 118, but depicts a tray having an alternative opening feature recess formed in the corners of the tray.

FIG. 124 is similar to FIG. 118, but depicts a tray having an alternative opening feature recess 1211 formed in the corners of the tray. This alternative opening feature recess again provides the consumer with access to one of the corners of the lid enabling the consumer to, for example, initiate opening of the package. The opening feature recess may be at least partially covered by a lid (not shown) nested in the lid engagement channel 1213 of the encapsulated rim 1215, and may facilitate removing the lid therefrom.

Figure 126:
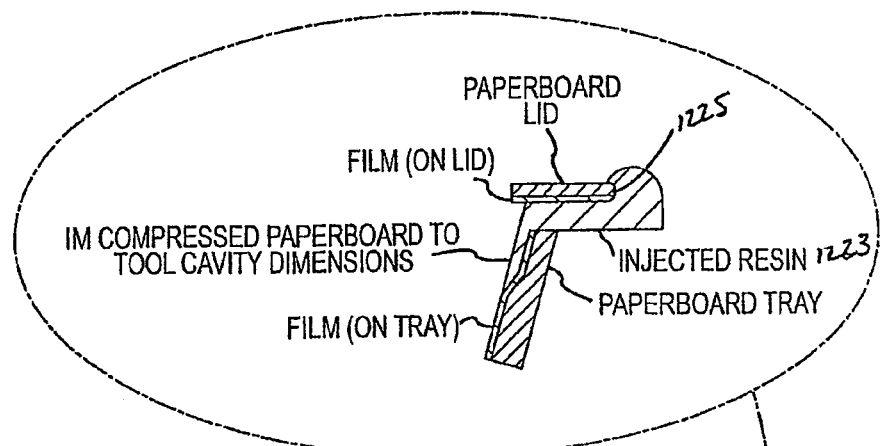
FIG. 126 is an enlarged, fragmentary, cross-sectional view through an indicated portion of the encapsulated rim.
Figure 125:
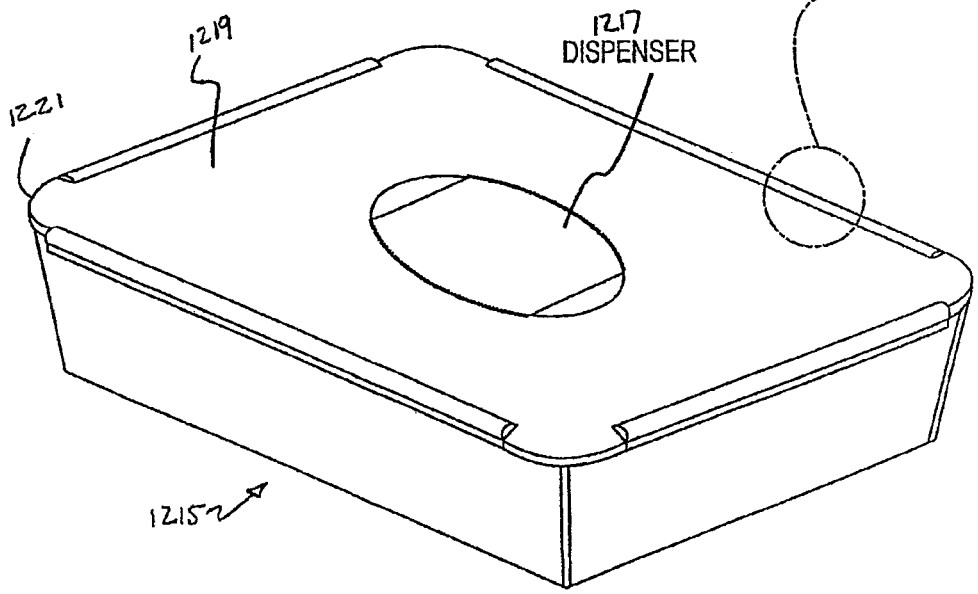
FIG. 125 is similar to FIG. 119, but depicts a dispensing feature through the center area of the lid.

FIG. 125 depicts yet another alternative embodiment 1215 according to the present invention. This figure is similar to FIG. 119, but depicts a dispensing feature 1217 through the center of the lid 1219. Since the package depicted in FIG. 125 includes this dispensing feature, it is unnecessary for a consumer, for example, to have access to the corners 1221 of the lid to initiate opening of the lid. Thus, the opening feature recesses depicted in FIGS. 118-124 are not present in the package depicted in FIG. 125. As shown to good advantage in FIG. 126, which is an enlarged, fragmentary, cross-sectional view through a portion of the encapsulated rim 1223, this embodiment also does not have pressure sensitive adhesive. The pressure sensitive adhesive may not be required in embodiments like the one depicted in FIGS. 125 and 126 since, with the dispensing feature, the lid is not being opened and reclosed. Thus, there is no need for the pressure sensitive adhesive. Also, if the tray need not be "sealable," the added security provided by the pressure sensitive adhesive is unnecessary. Although the encapsulated rims depicted in FIGS. 125 and 126 are friction-fit encapsulated rims, if desired crimpable encapsulated rims like those depicted in, for example, FIGS. 109-114 and 116 could be used. A machine could be used to insert the lid onto the tray with the lid engagement channels 1225 on the four straight sidewalls as shown in FIG. 125.

Figure 128:
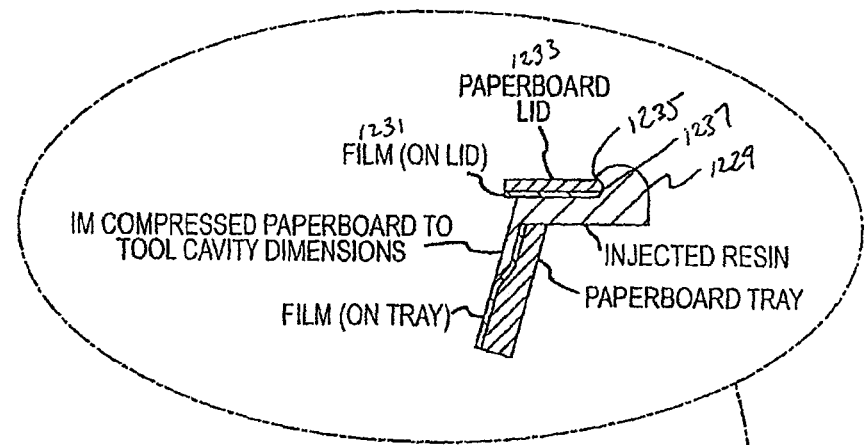
Figure 127:
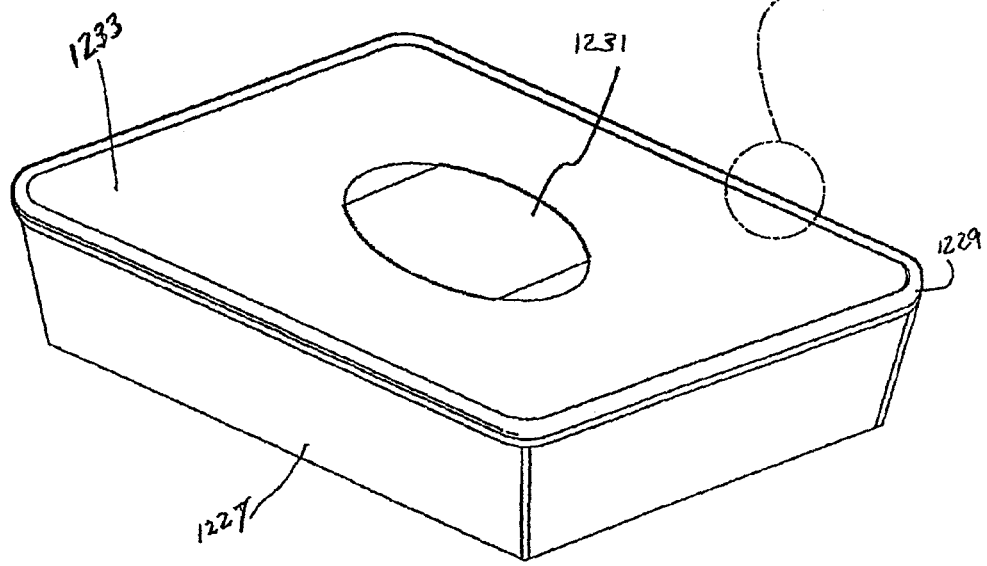

FIG. 127 is similar to FIG. 125, but depicts a package 1227 where the encapsulated rim 1229 extends around the entire perimeter of the lid 1233. Since the lid again includes a dispensing feature 1231, it is unnecessary to include pressure sensitive adhesive, which allows the lid to be opened and closed repeatedly. With the dispensing feature in the center of the package, the lid need not be opened (i.e., separated from the tray) at all. As mentioned in connection with FIGS. 125 and 126, even though a friction-fit encapsulated rim 1229 is depicted in FIGS. 127 and 128, a crimpable encapsulated rim could be used here. In this embodiment of a package according to the present invention, one could ultrasonically seal the lid film 1231 to the injected resin on the flange portion of the encapsulated rim, if desired.

In order to install the lid 1233 on the tray 1227 depicted in FIG. 127, a heat seal machine may be used. The machine would heat the lid as it pressed the lid toward the flange portion of the encapsulated rim 1229 extending around the entire perimeter of the tray. As the lid is pressed downwardly on the encapsulated rim, the overhang of the rim 1235 (See FIG. 128) would be deflected downwardly with a plate or a ring on the machine applicator head to allow the edge of the paperboard lid to pass by the overhang until it becomes frictionally engaged with the lid engagement channels 1237. Then, as the machine plate is moved away from the tray, the overhang may spring back to its original position, helping to retain the lid, which may now be heat sealed to the flange portion of the tray encapsulated rim. Alternatively, it is possible to merely press downwardly in the center region of the lid until the give in the paperboard lid allows its edges to snap into the lid engagement channel around the perimeter of the tray encapsulated rim. In yet a third alternative, a crimpable encapsulated rim could be used, wherein the crimpable encapsulated rim is open sufficiently to permit placement of the lid on the flange portion of the encapsulated rim. In other words, the overhang of the arcuate head portion could be rocked backward enough to allow insertion of the paperboard lid onto the flange portion of the encapsulated rim. Subsequently, the overhang could be crimped onto the lid to secure the lid in place on the tray.

Five-Panel Tray

Basic, Sloped-Wall Tray

Figure 46:
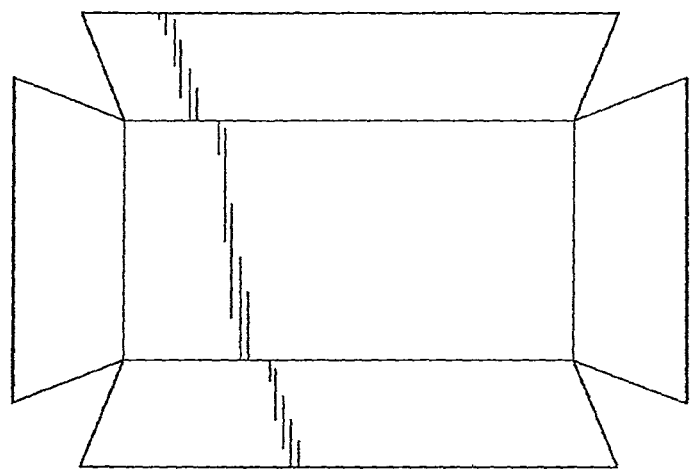
FIG. 46 is a top-down view of a five-panel tray blank.
Figure 47:
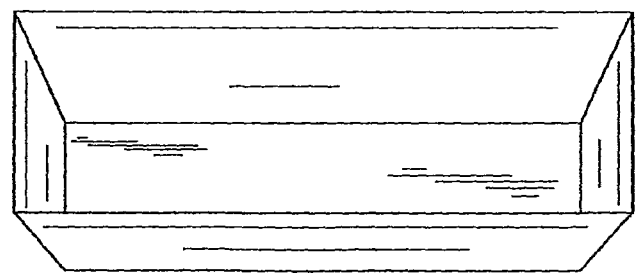
FIG. 47 is an isometric view of the tray blank of FIG. 46 in an assembled state.

A partially-encapsulated tray 416 may be formed from a five-panel blank that includes a bottom 418 and four sidewalls (420,422), as shown in FIGS. 33-36. Each major sidewall 420 and minor sidewall 422 is formed from a single panel, as is the tray bottom. The sidewalls are connected only along the bottom or base panel. Thus, when laid flat, the blank resembles a cross. FIG. 46 depicts a cross-shaped tray blank 424, while FIG. 47 depicts the tray blank of FIG. 46 in a folded (but not yet encapsulated or sealed) position corresponding to a tray 426 relatively narrower than the tray shown in FIG. 33.

When the tray 416 of FIG. 33 is formed, the sidewalls 420,422 are folded up until they are adjacent to each other, creating a seam or spine 430 between adjacent sidewalls. FIG.

34 is a side view of a tray assembled from a five-panel blank, and FIG. 35 is a front view of the same tray.

Initially, the tray blank is folded into the configuration shown in FIGS. 33-35, with the sidewalls 420,422 adjacent to one another, but not necessarily touching. FIG. 36 is an enlarged, fragmentary view of a corner 428 of the five-panel blank folded to make the basic shape of the tray 416. As can be seen, a small gap or seam 430 may exist between adjacent sidewalls (420,422) meeting at the tray corner. Further, the sidewall panels do not overlap one another, thus leaving little or no room for conventional adhesives or fasteners to hold the sidewalls fast to one another. Rather, the corners will be held together via injection-molded material. Although the embodiment shown in FIGS. 33-35 includes an integral flange 432, other embodiments may omit the flange, such as the embodiment shown in FIGS. 46 and 47.

Next, the folded blank is placed in an injection mold tool, similar to that shown in FIG. 74-76 or 93-96, both discussed later. The injection mold tool suited for use with this particular embodiment, however, pumps pressurized injection-molded material not only along the flange 432 (if any) of the tray 416, but also along the seam or spine 430 in each corner. The pressurized injection-molded material flows in such a manner as to fill in the gaps between adjacent sidewalls 420, 422 and to coat a portion of each adjacent sidewall. Thus, each corner seam of the finished five-panel tray is made of injection-molded material partially encapsulating the sidewalls adjacent to the corner. If necessary, a portion of the bottom panel of the tray may also be encapsulated in order to provide an airtight seal.

Injection-Molded Rim

Figure 37:
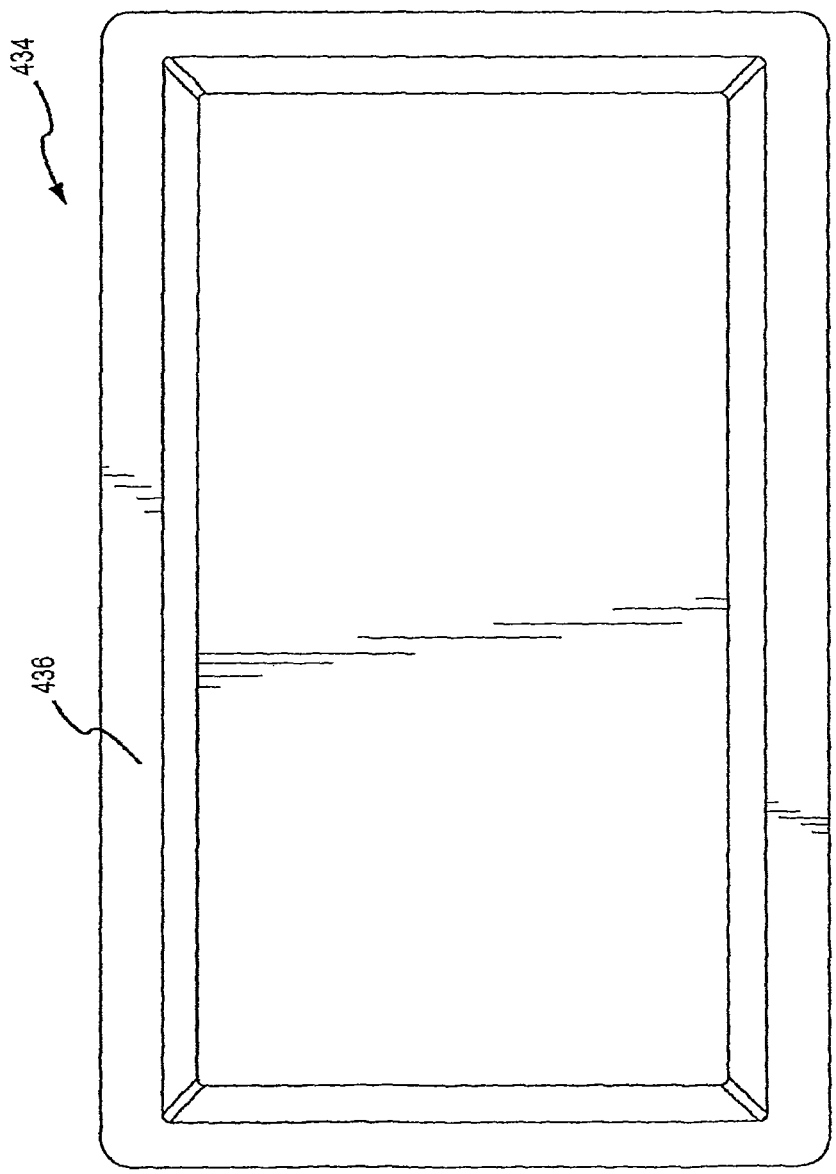
FIG. 37 is a top-down view of a five-panel tray similar to the tray of FIGS. 33-36, but also having an injection-molded rim.
Figure 38:
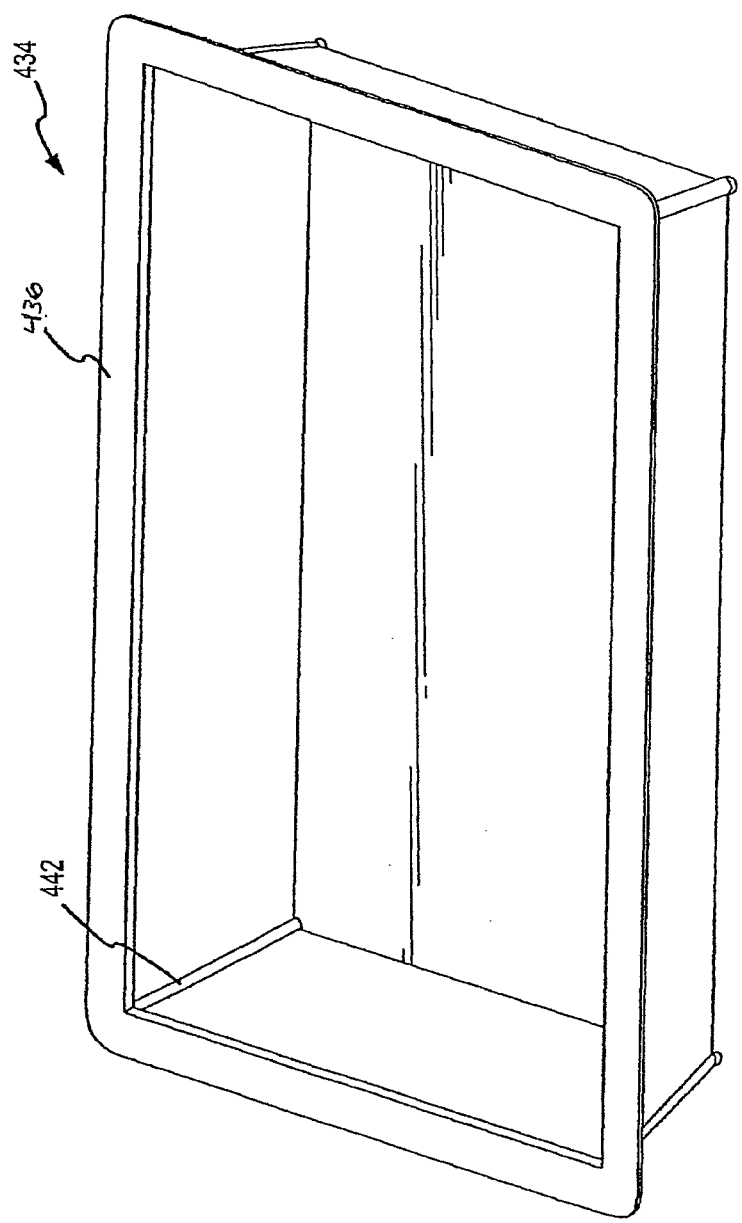
FIG. 38 is an isometric view of a five-panel tray similar to the tray of FIG. 37, but also having injection-molded corner beads.
Figure 39:
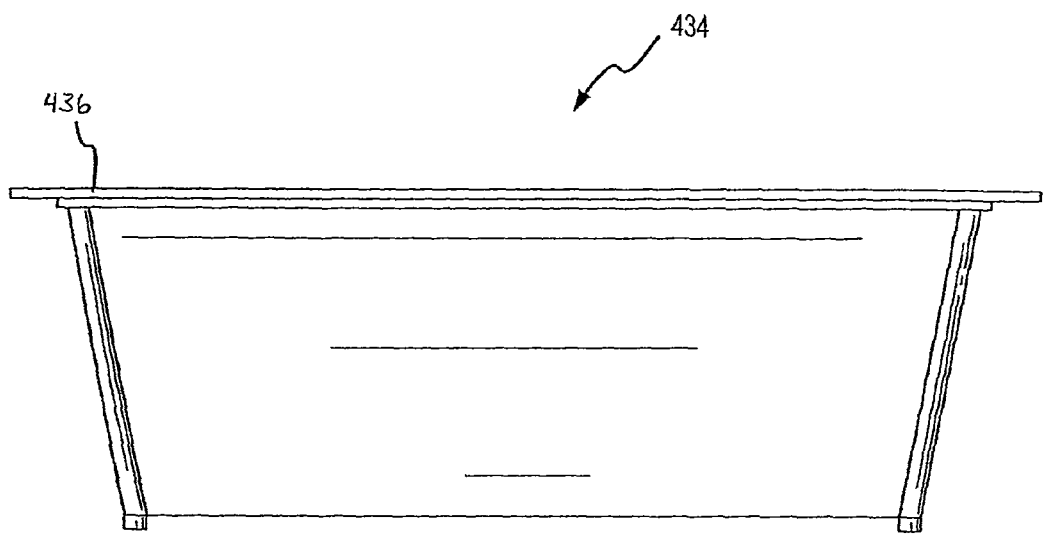
FIG. 39 is an end view of the five-panel tray of FIG. 38.

As previously discussed, there may be no separate flange portion along the upper edges of the walls, and any desired flange may be formed during the encapsulation process by the injected material itself FIGS. 37-42 show a five-panel tray 434 having encapsulated portions. FIG. 37 is a top-down view of a five-panel tray 434 having a flange 436 made from injection-molded material. Molding a plastic rim onto the unflanged upper perimeter of the tray increases tray stiffness and rigidity. FIG. 38 is an isometric view of a similar five-panel tray 434, clearly displaying the flange 436 made of injection-molded material and injection-molded corner seams 442. FIG. 39 is an end view of the tray 434 depicted in FIG. 38.

Injection-Molded Rim and Corner Beads

Figure 40:
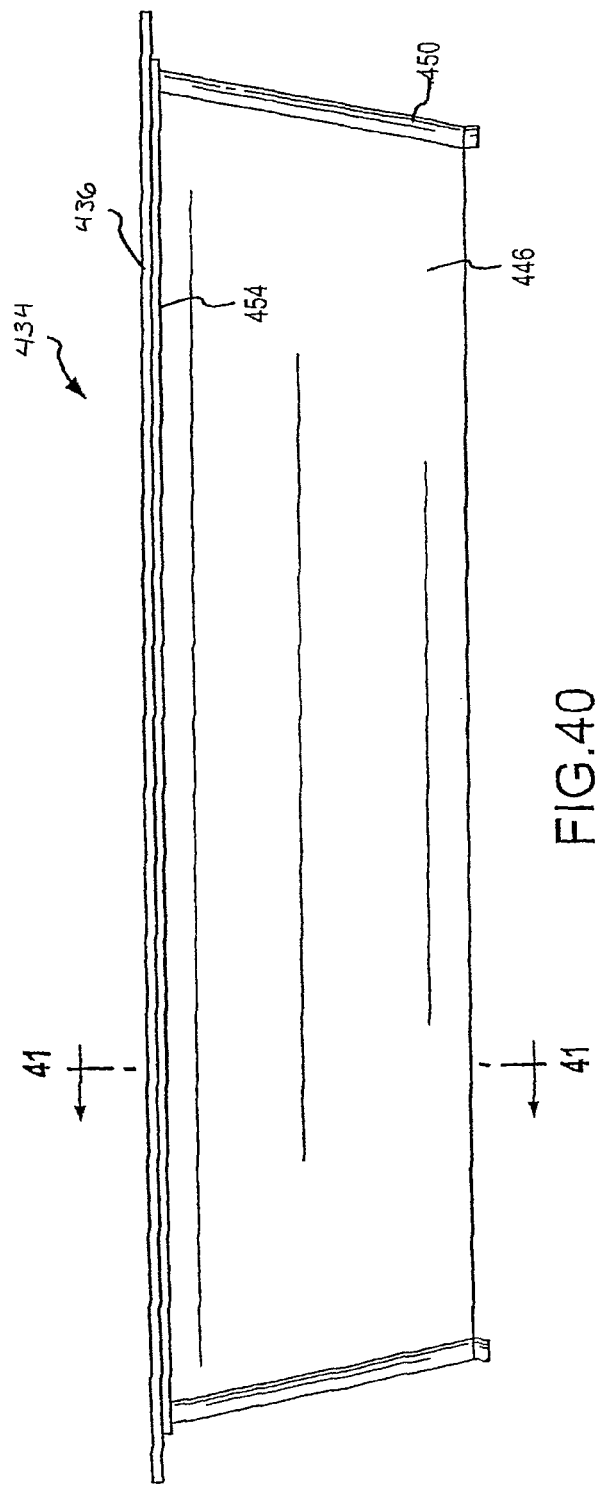
FIG. 40 is a side view of the five-panel tray of FIGS. 38 and 39.
Figure 41:
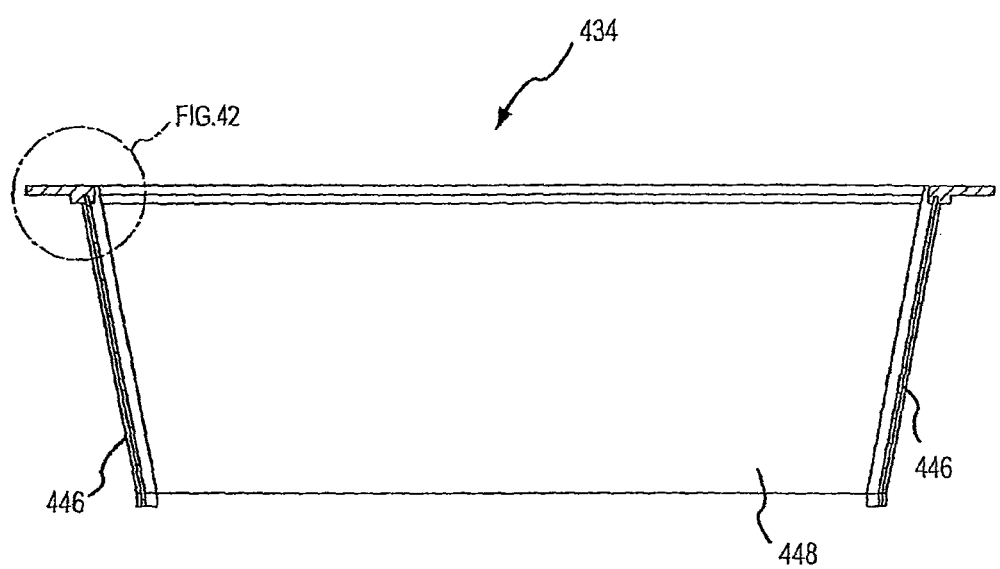
FIG. 41 is a cross-sectional view taken along line 41-41 of FIG. 40.
Figure 42:
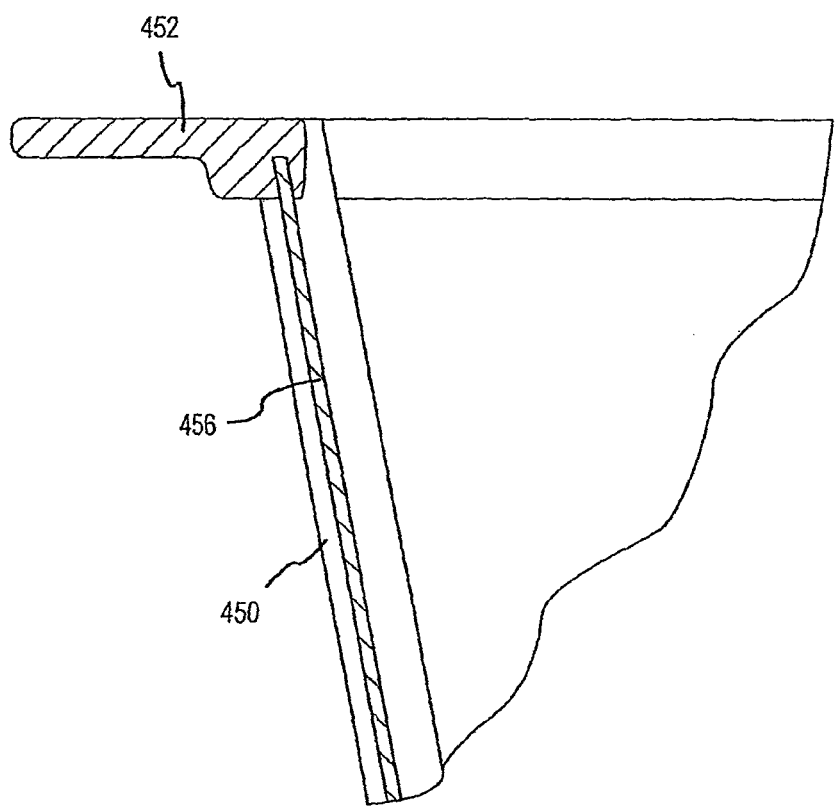
FIG. 42 is an enlarged, fragmentary view in partial cross-section of the circled portion of FIG. 41 of the flange and sidewall of the tray shown in FIGS. 38-41.

FIG. 40 is a side view of an assembled, encapsulated five-panel tray 436. As shown in FIG. 40, the sidewalls (446,448) are joined along the seam or spine 450 using injected materials at the same time that any rim or flange 452 is formed around the upper edge 454 of the walls. FIG. 41 is a cross-sectional view of the five-panel tray taken along line 41-41 of FIG. 40. Similarly, FIG. 42 is an enlarged, fragmentary, cross-sectional view through a side wall 446 of the circled portion of FIG. 41, depicting the injection-molded flange 452 and corner seam 450. FIG. 42 prominently displays not only the injection-molded flange (shown with fine diagonal shading), but also the inner and outer beads 456 of injection-molded material comprising the corner seam (shown with opposite diagonal shading).

Figure 43:
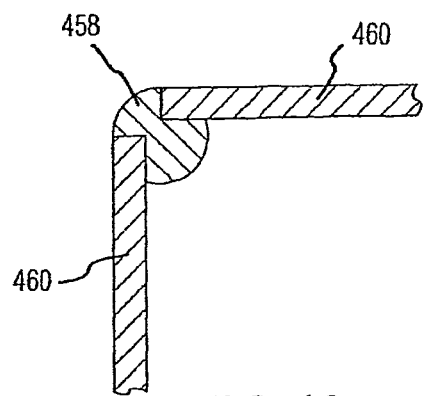
FIG. 43 is a fragmentary cross-sectional view of a corner of a tray made according to one embodiment of the present invention, wherein the injection-molded resin bead remains on the inside of the package and forms a smooth, curved surface with the exterior of the sidewalls.
Figure 44:
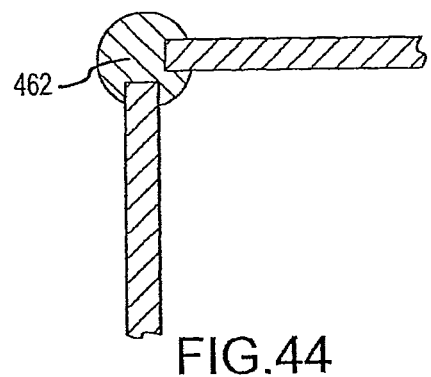
FIG. 44 depicts a fragmentary cross-sectional view of a tray corner having an alternative bead configuration to that depicted in FIG. 43, wherein the injection-molded resin extends past the exterior surface of the sidewalls.
Figure 45:
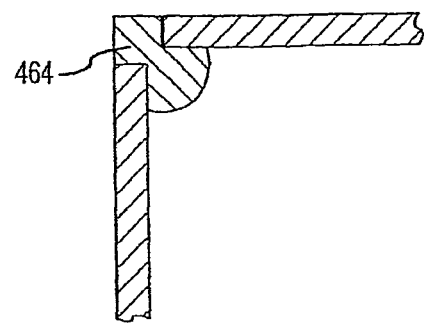
FIG. 45 depicts a fragmentary cross-sectional view of a tray corner having an alternative bead configurations to that depicted in FIGS. 43 and 44, wherein the injection-molded resin does not extend past the exterior surface of the sidewalls.

Controlling the position of the paperboard in the mold helps to ensure that a hermetically-sealable package is created. Injection-molded resin may bond poorly to paperboard because of the dissimilarities of base components (e.g., melt temperatures, etc.). When manufacturing a package it may be important that the paperboard edge does not get exposed to the package contents. Thus, it is important that the injection-molded resin bonds with the lamination film on the inside of the package. Failure to do this will expose the paperboard edge, which in turn can lead to wicking of the product or leakage through the resin and paperboard interface. One fragmentary, top-down cross-sectional view of an embodiment preventing this is shown in FIG. 43. Note the position of the injection-molded resin 458 and the paperboard insert 460. When manufacturing the composite package, the paperboard insert is placed in the injection mold tool so that the position of the resin bead 458 is on the inside of the package and not on the outside. The resin, when injected into the mold, forces the paperboard to the outside of the mold, allowing the resin to sufficiently bond to the inside laminated film. FIGS. 44 and 45 depict alternative bead configurations (462,464).

Additional Tray Blanks

In addition to the various tray blanks described herein, multiple other blanks may be press-formed and provided with one or more encapsulated features by an injection-molding apparatus, in accordance with an embodiment of the present invention. Generally, the injection-molding apparatus may both press-form the tray and injection-mold the encapsulated feature within the confines of a single machine or tool, rather than requiring one tool for press-forming and a second for injection-molding. One example of such an apparatus is given below.

Figure 48:
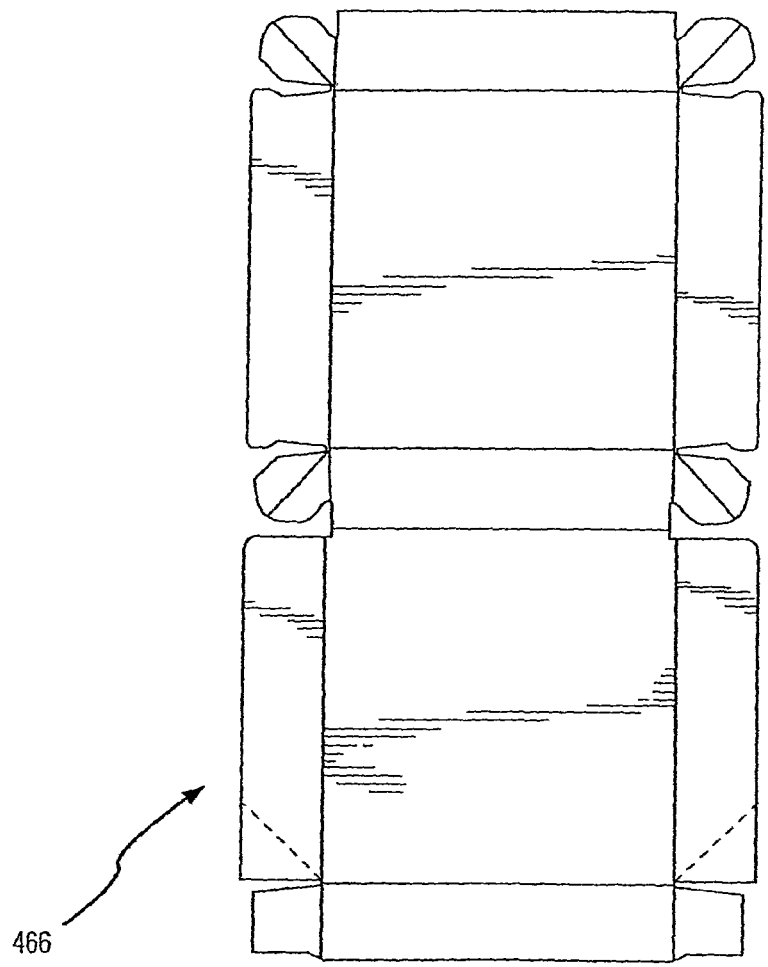
FIG. 48 is a top-down view of one tray blank suitable for use in an injection-molding apparatus.

FIG. 48 depicts an alternate tray blank 466 suitable for press-forming and injection-molding within a single apparatus.

Figure 49:
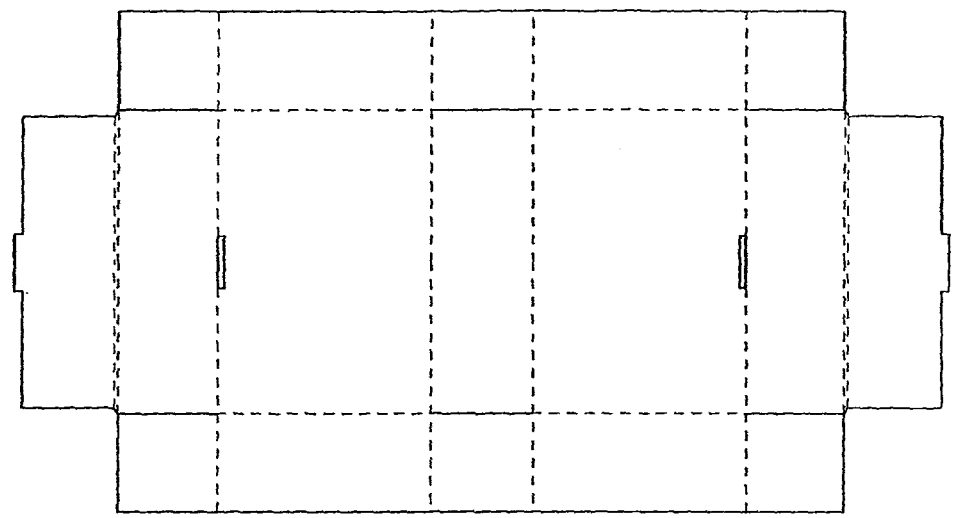
FIG. 49 is a top-down view of a second tray blank suitable for use in an injection-molding apparatus.
Figure 50:
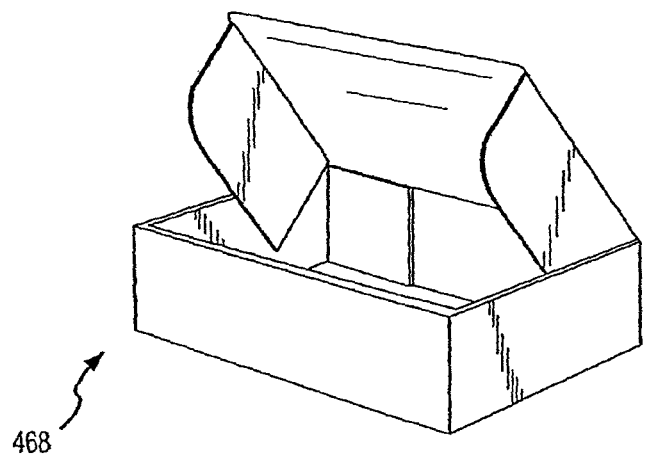
FIG. 50 is an isometric view of the tray blank of FIG. 49 in an assembled state.

FIG. 49 depicts a second alternate tray blank 468 that may be both press-formed and injection-molded within a single apparatus, while FIG. 50 depicts the tray blank in a folded state, albeit without any injection molded or encapsulated features. Exemplary injection-molded features that may be included on the formed, three-dimensional tray shown in FIG. 50 include flanges, rims, projections, handles, ribs, vanes, and any other feature described herein.

Figure 51:
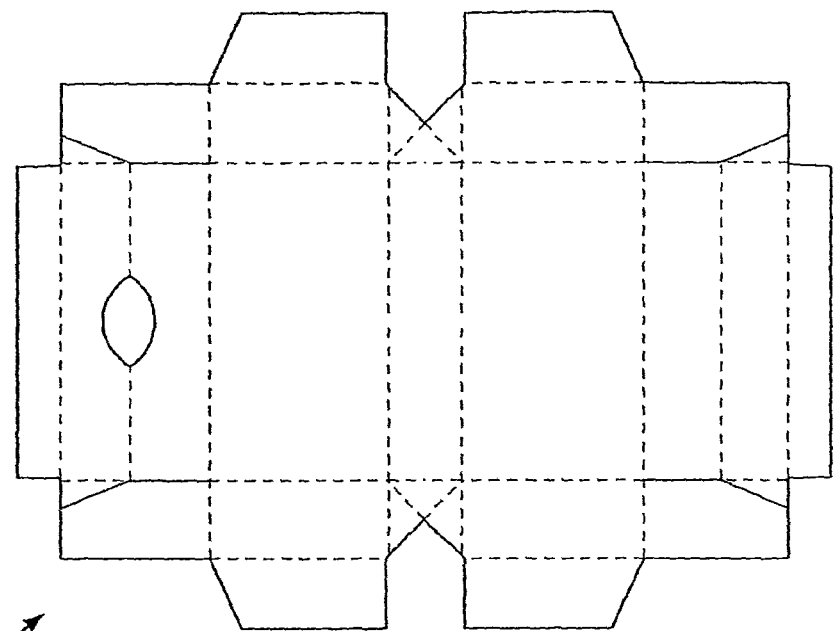
FIG. 51 is a top-down view of a third tray blank suitable for use in an injection-molding apparatus.
Figure 52:
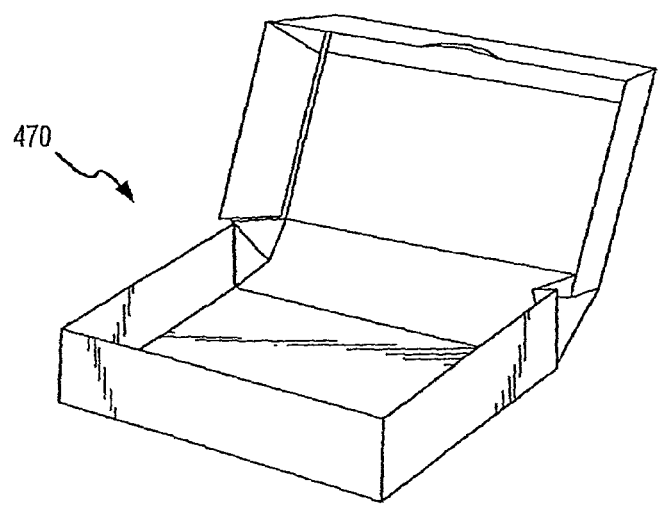
FIG. 52 is a perspective view of the tray blank of FIG. 51 in an assembled state.
Figure 53:
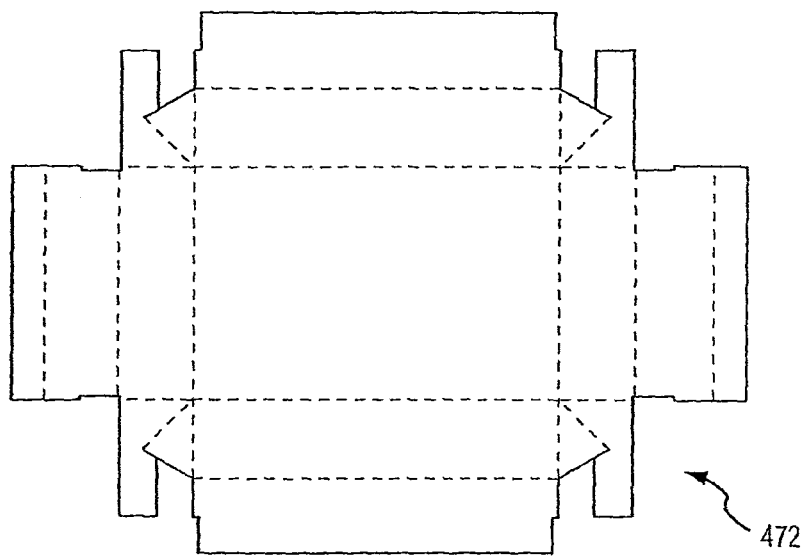
FIG. 53 is a top-down view of a fourth tray blank suitable for use in an injection-molding apparatus.
Figure 54:
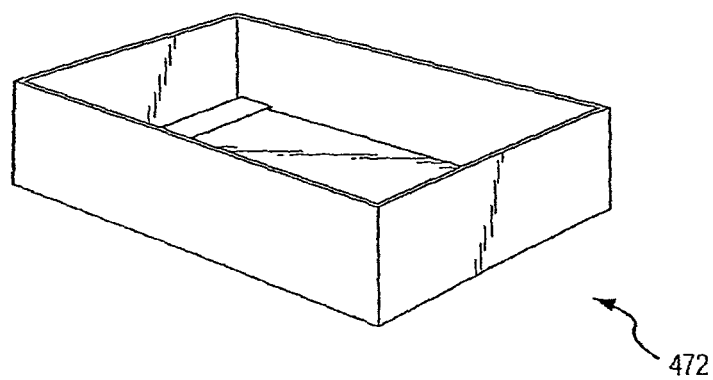
FIG. 54 is a perspective view of the tray blank of FIG. 53 in an assembled state.
Figure 55:
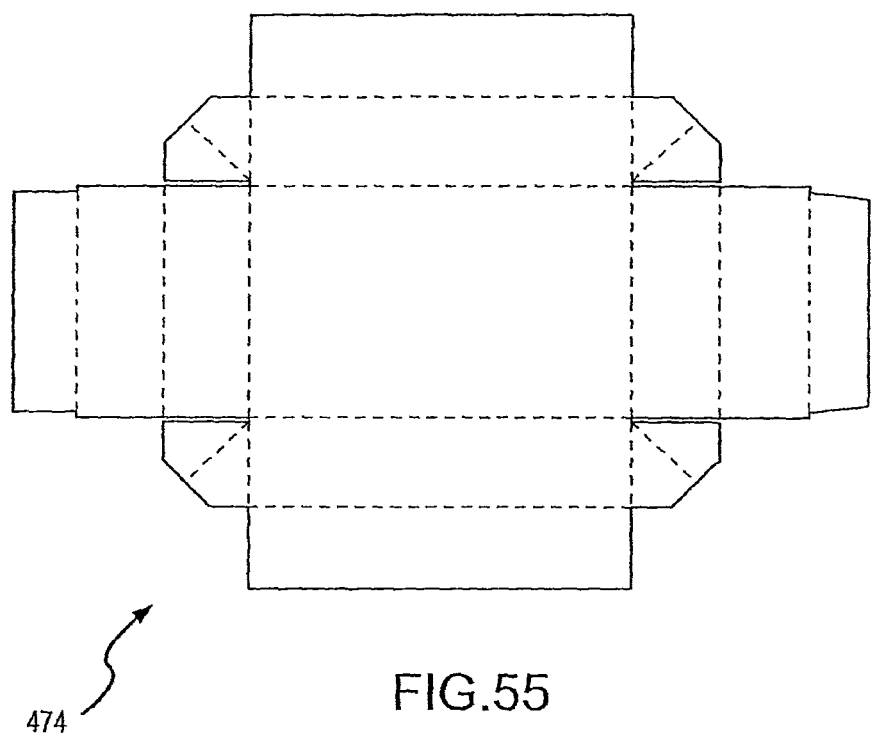
FIG. 55 is a top-down view of a fifth tray blank suitable for use in an injection-molding apparatus.
Figure 56:
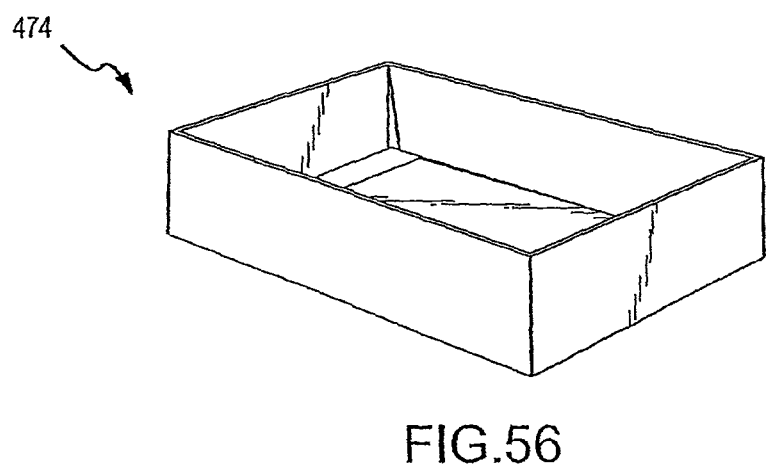
FIG. 56 is a perspective view of the tray blank of FIG. 55 in an assembled state.
Figure 57:
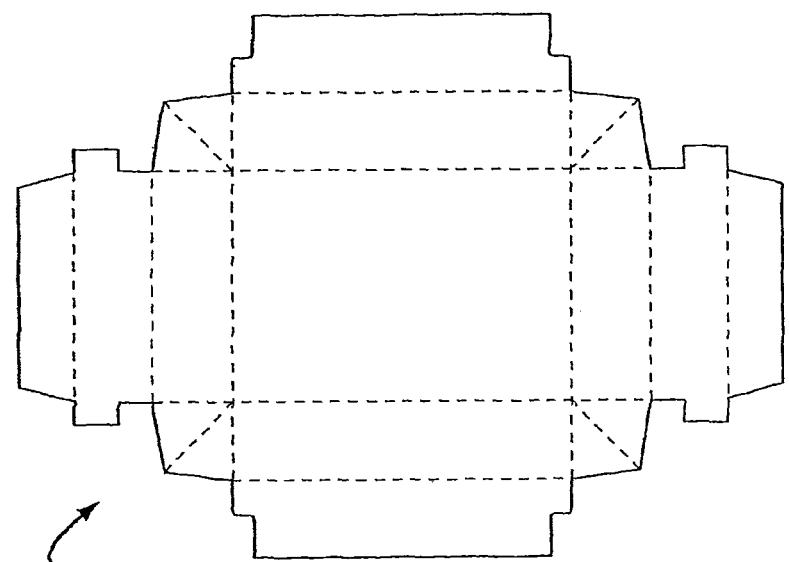
FIG. 57 is a top-down view of a sixth tray blank suitable for use in an injection-molding apparatus.
Figure 58:
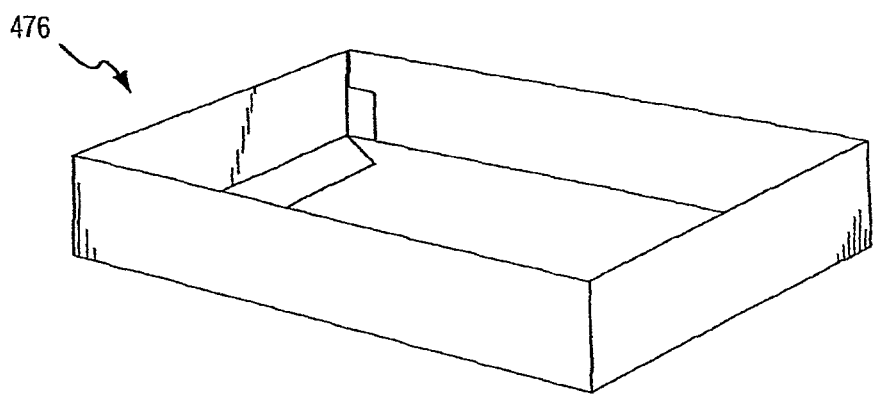
FIG. 58 is a perspective view of the tray blank of FIG. 57 in an assembled state.

Similarly, FIG. 51 depicts a third alternate tray blank 470 that may be both press-formed and injection-molded within a single apparatus, while FIG. 52 depicts the tray blank 470 in a folded state, albeit without any injection molded-features. FIG. 53 depicts a fourth alternate tray blank 472 that may be both press-formed and injection-molded within a single apparatus, while FIG. 54 depicts the tray blank 472 in a folded state, albeit without any injection molded-features. FIG. 55 depicts a fifth alternate tray blank 474 that may be both press-formed and injection-molded within a single apparatus, while FIG. 56 depicts the tray blank 474 in a folded state, albeit without any injection molded-features. FIG. 57 depicts a sixth alternate tray blank 476 that may be both press-formed and injection-molded within a single apparatus, while FIG. 58 depicts the tray blank 476 in a folded state, albeit without any injection molded-features. Exemplary injection-molded features that may be included on any of the formed, three-dimensional trays shown in FIGS. 50-58 include flanges, rims, projections, handles, ribs, vanes, and any other feature described herein.

Still further examples of tray blanks suitable for press-forming in an injection-molded tool such as the ones described herein, may be found in "The Packaging Designer's Book Of Patterns," by Roth and Wybenga.

Cylindrical Containers

Figure 59:
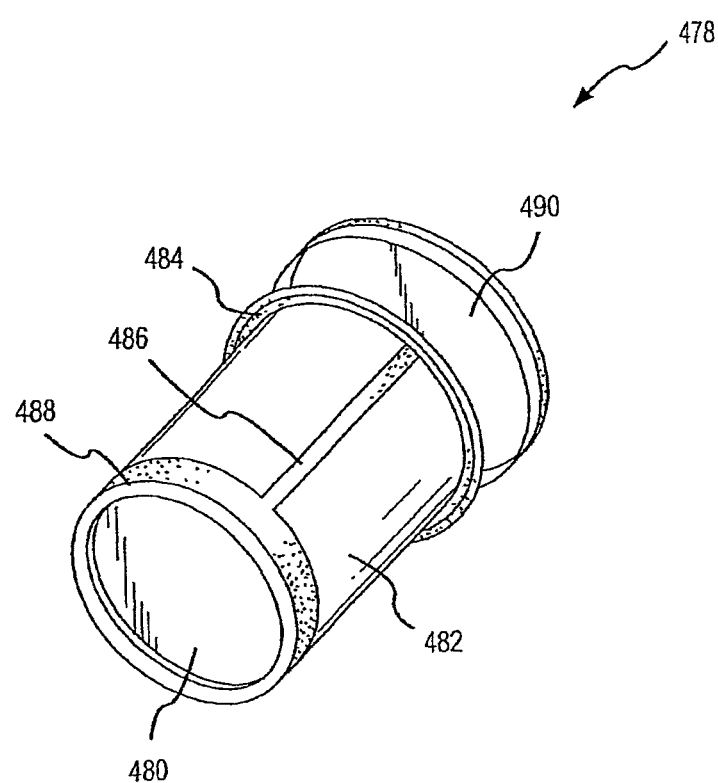
FIG. 59 is a view of an alternative embodiment of the present invention, which is a three-piece package consisting of a bottom panel member, a sidewall member, and a lid member, including an injection-molded seam and extending bottom lip.

FIG. 59 shows another embodiment of an injection-molded paperboard laminate composite container 478. This embodiment generally comprises a bottom blank 480 and at least one sidewall blank 482. The blanks are each die cut and then bonded together by injection molding plastic at their extremities. In particular, an injection-molded rim 484, at least one injection-molded sidewall bead 486, and an injection-molded bottom wall bead 488 may hold the blanks together. This container can be formed on a single cavity injection mold tool.

A cylindrical container as shown in FIG. 59 may be formed using the following process:

First, prepare the paperboard laminate using conventional means, for example, extrusion coating, extrusion laminating, or adhesive laminating. The laminate can be chosen from, for example, MICRO-RITE, MICRO-RITE susceptor, QWIK-WAVE susceptor, PET (polyethylene terephthalate), EVOH (ethylene vinyl alcohol) barrier co-extruded films, or others, depending on final composite package requirements (e.g., oxygen or moisture barrier, microwavability, conventional ovenability, or some combination of these attributes). EVOH is a barrier material that is used, for example, for nonirradiated beef. PET is thermoplastic polyester used in beverage bottles and food trays designed for microwave and conventional ovens.

Second, print the paperboard laminate. Printing may be by known means such as flexography, lithography, or rotogravure. Printing may be done on a film that is laminated to the paperboard, trapping the ink between the paperboard and the film.

Third, die cut one or more sidewall blanks and a bottom blank from the paperboard laminate. The sidewall can be straight or tapered for nesting stackability.

Fourth, place the sidewall blank or blanks and the bottom blank in an injection mold tool. If using one sidewall blank, wrap the sidewall blank around a mandrel until its ends are in close proximity and hold the blank in place with, for example, a vacuum. No side seam overlap is necessary and the ends of the blank forming the sidewall are placed in an abutting configuration. The bottom blank is placed in correct position relative to the sidewall blank near the bottom periphery of the sidewall blank, and held in place by, for example, a vacuum. The bottom blank may be folded at its periphery to form a skirt. The sidewall typically surrounds the bottom wall because of graphics concerns. There is also no folded overlap at the bottom edge of the sidewall where it meets the bottom, unlike what you may see in a standard paper cup.

Fifth, inject plastic polymer to bond the abutting ends of the sidewall blank to each other, forming a seam, and to bond the periphery of the bottom blank to the sidewall blank. The injected polymer also forms a rim attached to the top periphery of the sidewall blank. Other features could be injection molded as part of the composite package, such as stacking lugs or snap-fit lid configurations. Where multiple sidewall blanks are used, each sidewall blank may be bonded to an adjacent blank with polymers, as described. This process may also be used to construct rectangular trays (or trays having flat sidewalls) from a series of initially unjoined, flat blanks.

Since both the outer surface and the inner surface of the container can be made impervious to moisture and gas, the embodiment shown in FIG. 59 is retortable. Generally, retorting the tray involves putting the tray in a 250 degree Fahrenheit environment in a pressure chamber and heat sterilizing the product and food for extended shelf life.

The embodiment shown in FIG. 59 may optionally include a lid 490, in which case it is a three-piece package consisting of a bottom panel member 480, a sidewall member 482, and a lid member 490. The three members generally consist of die-cut blanks held together by injection-molded plastic at their extremities.

Figure 60:
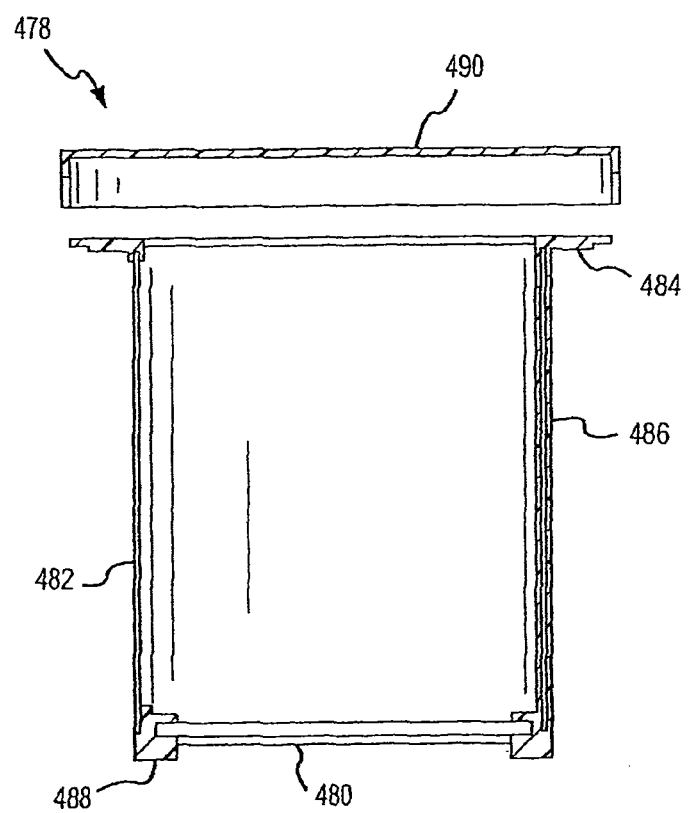
FIG. 60 is a cross-sectional view taken along the injection-molded seam of the embodiment shown in FIG. 59.

The embodiment of FIG. 59 may be formed with an injection-molded seam 486 and periphery. FIG. 59 clearly displays the injection-molded seam container 478 in accordance with the present embodiment, while FIG. 60 is a cross-sectional view taken along the injection-molded seam 486 of FIG. 59. In FIG. 60, diagonal shading indicates injection-molded material.

The injection-molded cylindrical container 478 shown in FIG. 59 is formed from a sidewall blank 482 and a bottom blank 480. Generally, the bottom blank is circular, while the sidewall blank is rectangular. The blanks are prepared via conventional means known to those skilled in the art. The blanks may be laminated with a variety of materials, such as the MICRO-RITE and QWIK-WAVE susceptors previously mentioned, PET, an EVOH barrier co-extruded film, and so forth. If desired, graphics may also be printed on either blank.

The sidewall 482 and bottom blanks 480 may then be placed in an injection mold tool, with the sidewall blank positioned perpendicularly to the bottom blank. The sidewall blank is wrapped around until its ends are in close proximity, thus forming a hollow cylinder. The space where the sidewall ends come near each other is referred to as the sidewall space. The bottom blank is generally positioned near the bottom portion of the curved sidewall blank. Further, the bottom blank may be folded at its periphery to form a skirt, if desired.

Figure 61:
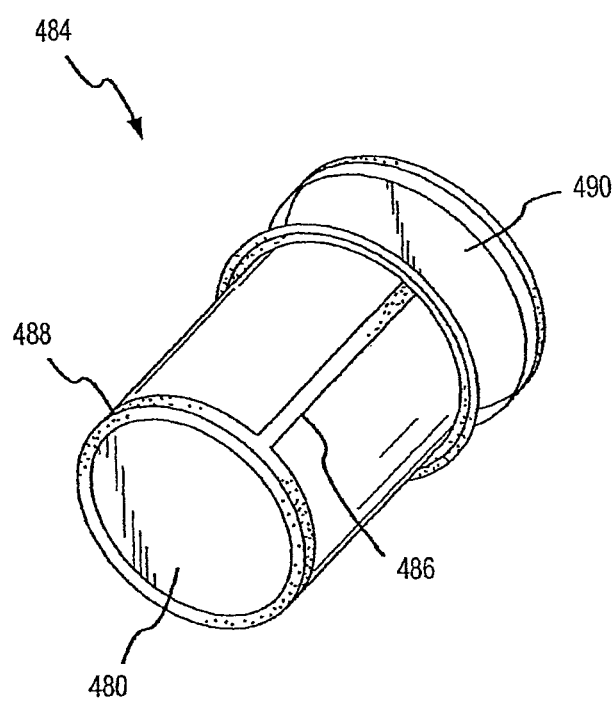
FIG. 61 is a view of an embodiment of the present invention similar to that shown in FIG. 59, but lacking the extending bottom lip.

Injection-molded material is then forced into the injection mold tool, coating a portion of the inside and outside of the sidewall blank along its edges in close proximity, filling the sidewall space, and forming a sidewall seam of injection-molded material. The injection-molded material is also forced into the space between the bottom portion of the sidewall blank and the bottom blank, coating a portion of each and bonding the two blanks to each other. If desired, the injection-molded material may extend slightly downwardly beyond the bottom surface of the bottom blank 480 (as shown in FIG. 60), or may be flush with the bottom surface of the bottom blank 480 (as shown in FIG. 61). The injection-molded material may also form a rim attached to the top periphery of the sidewall blank.

Figure 62:
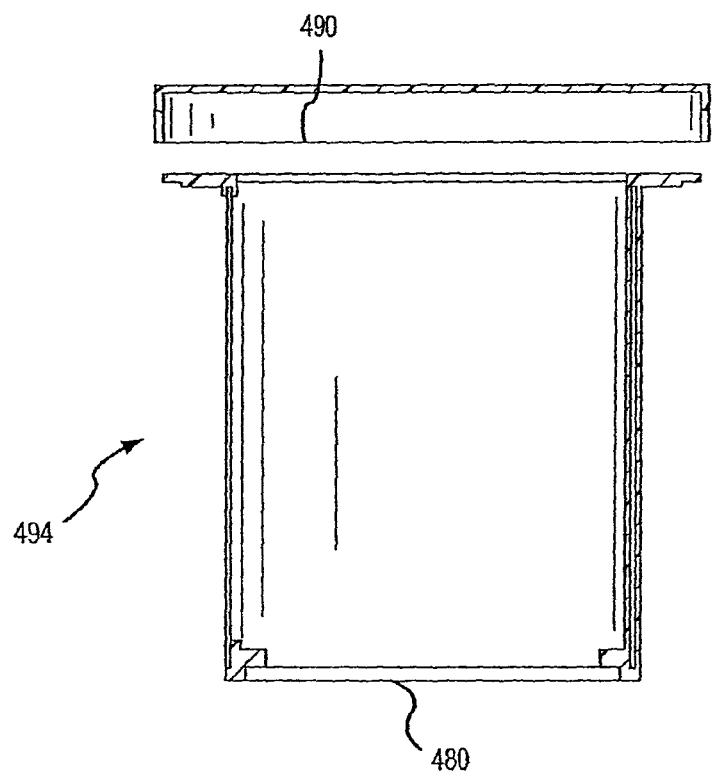
FIG. 62 is a cross-sectional view of the embodiment shown in FIG. 61, taken along the injection-molded seam.

FIGS. 61 and 62 depict a cylindrical microwave-retort package 494. The package could be round, as depicted, to roll in the retort to aid in heating. Alternatively, the package could be noncylindrical or nonround, such as a tray, and thermally processed in a still or rotating retort.

Figure 178:
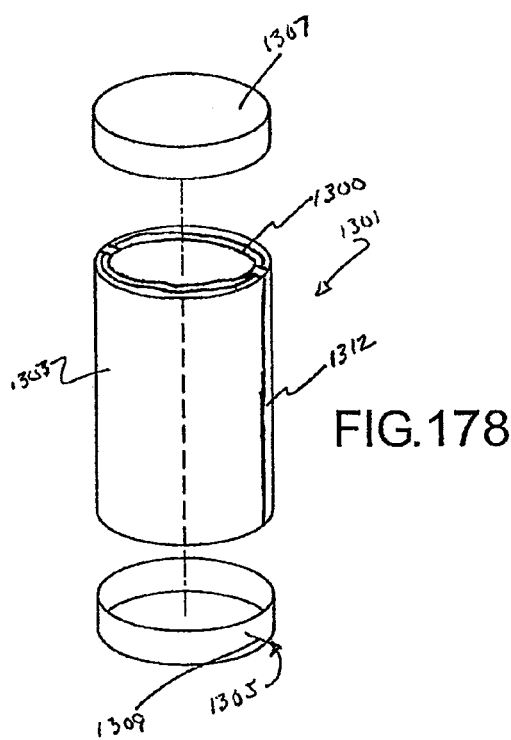

Another embodiment of the present invention takes the form of a cylindrical container having an injection-molded seam and periphery. FIG. 178 displays an exploded view of an injection-molded cylindrical container 1301 in accordance with the present embodiment.

The injection-molded cylindrical container 1301 shown in FIG. 178 is formed from at least one sidewall blank 1303, a bottom blank 1305, and an optional lid 1307 or top blank. Generally, the bottom blank is circular, while the sidewall blank is rectangular. The blanks are prepared via conventional means known to those skilled in the art. The blanks may be laminated with a variety of materials, such as the MICRO-RITE and QWIK-WAVE susceptors previously mentioned, PET, an EVOH barrier co-extruded film, and so forth If desired, graphics may also be printed on either blank. The sidewall blank (s) may be laminated with a film 1300 on the interior. The film laminate is exaggerated in FIG. 178 for clarity.

The sidewall 1303 and bottom 1305 blanks may then be placed in an injection mold tool, with the sidewall blank positioned perpendicularly to the bottom blank. The sidewall blank is wrapped around until its ends are in close proximity, thus forming a hollow cylinder. The space where the sidewall ends come near each other is referred to as the sidewall space. The bottom blank is generally positioned near the bottom portion of the curved sidewall blank. Further, the bottom blank may be folded at its periphery to form a skirt 1309, if desired.

Injection-molded material is then forced into the injection mold tool, coating a portion of the inside and outside of the sidewall blank 1303 along its edges in close proximity, filling the sidewall space, and forming a sidewall seam 1312 of injection-molded material. The injection-molded material is also forced into the space between the bottom portion of the sidewall blank and the bottom blank 1305, coating a portion of each and bonding the two blanks to each other. If desired, the injection-molded material may extend slightly downwardly beyond the bottom surface of the bottom blank (as shown in FIGS. 59 and 60), or may be flush with the bottom surface of the bottom blank (as shown in FIGS. 61 and 62). The injection-molded material may also form a rim (not shown) attached to the top periphery of the sidewall blank.

Figure 179:
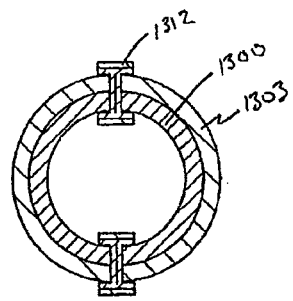
Figure 180:
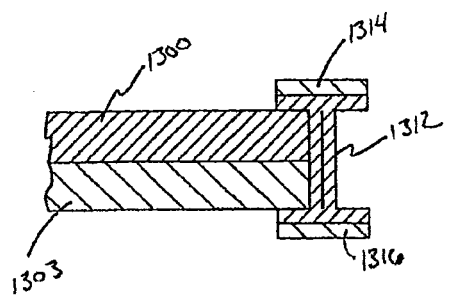
Figure 181:
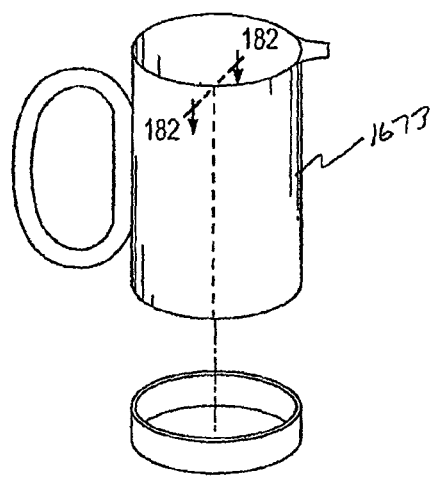

FIG. 179 is a cross-sectional view through the middle of the injection-molded cylindrical container 1301 shown in FIG. 178. FIG. 180 is an enlarged, cross-sectional view of the noted portion of FIG. 179, taken through a middle of the container and showing at least one sidewall (or connecting) seam 1312. In FIGS. 179 and 180, diagonal shading indicates injection-molded material. The overlap of injection-molded material along the exterior and interior of the seam 1312 is exaggerated for ease of viewing. FIG. 180 depicts the seam 1312, sidewall blank 1303, and laminated film 1300 in close-up. Generally, the injection-molded material forming the seam 1312 may bond more tightly with the film. Accordingly, an overlap of injection-molded material (such as resin or polymer) may form a crossbar member 1314 on the film side. A similar crossbar member 1316 may be formed on the exterior of the sidewall blank to minimize gas or liquid leakage around the seam and/or sidewall.

Figure 63:
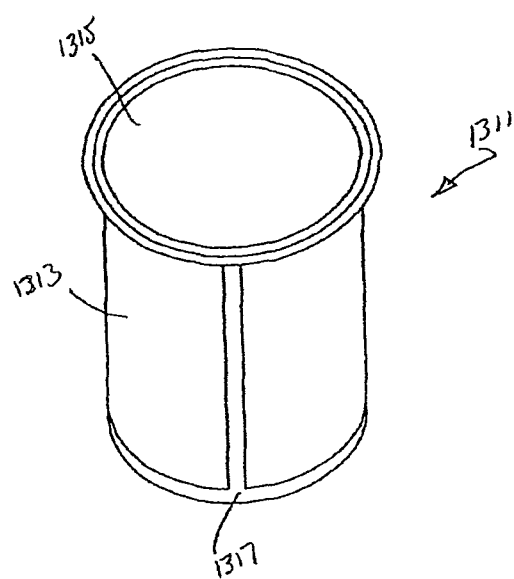
FIG. 63 depicts a retortable embodiment of the present invention, which is a three-piece package consisting of a bottom panel member, a sidewall member, and a top panel member.

FIG. 63 depicts a cylindrical microwave-retort package 1311 consisting of a bottom panel member (not shown), a sidewall member 1313, and a lid member 1315. The three members generally consist of die-cut blanks held together by injection-molded plastic 1317 at their extremities. The package could be round, as depicted, to roll in the retort to aid in heating. Alternatively, the package could be non-cylindrical or non-round, such as a tray, optionally manufactured with multiple sidewall members, and thermally processed in a still or rotating retort.

Encapsulated or Coated Interior

Figure 64:
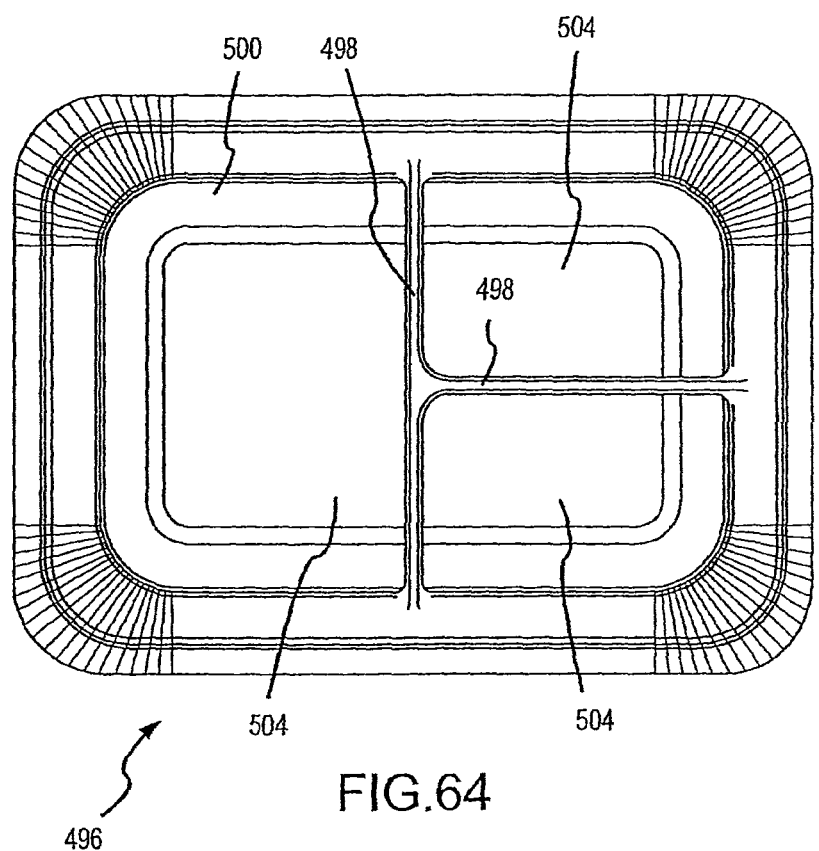
FIG. 64 is a top-down view of a tray having encapsulated interior ribs or dividers and a coated interior.

This embodiment of the present invention combines the consumer benefits of paperboard and plastic into one container. One exemplary embodiment 496 is shown in FIG. 64. In this embodiment, the container comprises multiple layers, including at least one layer of paperboard and another layer of an injection-molded polymer.

A lamination process may be used to put a polymer on the inside or outside of the tray. Either the paperboard or paperboard substitute may include a polymer film laminated or extruded on one or two sides of the substrate. Both layers may cover all or most of the surface area of the container, including any internal dividers or walls that may be present on the interior of the container, as shown, for example, in FIG. 64. The tray shown in FIG. 64 may be crafted by the following exemplary process:

i) start with a press-formed, MICRO-RITE container; and
    ii) injection mold a layer of black PET polymer on the inside surfaces.

The resulting container looks like popular CPET (crystallized polyethylene terephthalate) containers, but provides improved cooking benefits for consumers. CPET is a heat-tolerant plastic that can be molded into multi-compartment and single frozen food containers, and can be heated in the microwave or conventional oven. The resulting package is not moisture sensitive, allowing use of the trays in a steam table environment without the typical concern that the tray will soften and fall through the table aperture.

A dishwasher-safe, reusable microwave package may be made as another embodiment of the current invention. For example, a tray including a controlled, microwave-heating layer (such as MICRO-RITE, made by Graphic Packaging Corporation of Golden, Colo.) may be laminated on both the inside and outside. This lamination is generally performed before die cutting/press-forming the tray itself. Further, the laminated tray blank may be heat plasticized before the tray is formed. An injection-molded plastic rim, as described above, may then be added in order to protect the unlaminated tray edges. This protects the entirety of the tray from water and detergents, thus allowing the tray to be easily washed and reused.

FIG. 64 depicts a tray 496 having encapsulated interior dividers or walls 498 and a completely coated interior surface 500. In this embodiment, the interior surface is coated with a plastic such as crystallized polyester (C-PET), which resists high temperatures. The C-PET surface is especially useful in trays intended for microwave oven use, and may be coupled with a susceptor or controlled microwave heating/focusing layer located beneath, the C-PET. Further, many such trays include interior dividers or walls intended to keep foodstuffs separate from one another. The injection mold tool may be modified to provide both an interior lining and dividers.

Susceptor Tray Having Injection-Molded Feature

As previously discussed, trays incorporating one or more encapsulated features may also be provided with coatings or linings, depending on the nature of the tray's ultimate use. Trays may, for example, be provided with a metallic susceptor layer or pattern designed to focus radiant energy in specific portions of the tray. Such susceptor layers are often used in trays designed for microwave use. Exemplary susceptor trays include the MICRO-RITE and QWIK-WAVE product lines manufactured by Graphic Packaging Corporation of Golden, Colo.

Figure 65:
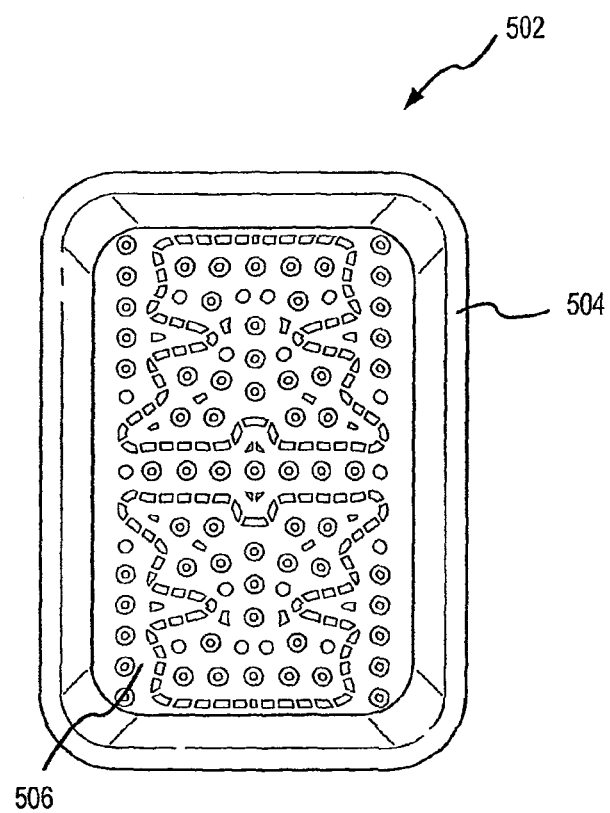
FIG. 65 is a top-down view of a tray having an encapsulated rim and susceptor layer.

FIG. 65 displays an embodiment of a tray 502 having both an encapsulated feature 504 and susceptor layer 506. In this embodiment, the encapsulated feature is an encapsulated rim. Although a specific susceptor pattern is shown, any susceptor pattern may be used with an embodiment of the present invention. Further, the susceptor pattern may be specifically shaped to take into account one or more encapsulated features of the tray. For example, a tray may be provided with dividers or ribs formed of a resin. In such a tray, the susceptor pattern may be arranged to avoid focusing microwave energy into the portions of the tray occupied by the dividers. In another embodiment, the tray may be provided with a raised shelf or ledge of resin across a portion of the tray base. The raised shelf may trap air between the shelf bottom and the tray base. In this embodiment, the susceptor pattern may be arranged to provide different heating properties for the portion of the tray base covered by the shelf.

Compartmented Trays

Multiple deep or steep food compartments that keep several food items separated are difficult to make by press-forming a paperboard container. Injection-molded dividers 498 can be added to the inside surface 500 of a single-compartment container to divide it into multiple compartments 504, as shown in FIG. 64. These dividers can join an injection-molded rim around the outer perimeter of the container, or the rim may be omitted.

In the present invention, each compartment 504 can include a microwave interactive material (e.g., susceptor laminated paperboard) that is unique to the specific type of food to be stored in that compartment of the container. Thus, a single paperboard container 496 could include a plurality of different microwave interactive materials; each designed to most-effectively heat the specific food item associated with it.

Finally, alternate embodiments may make use of interior dividers 498 without coating the entire interior surface 500 in a plastic. Rather, the interior dividers may be molded uniformly with an encapsulated rim (not shown). In this manner, many different types of trays may include dividers. For example, a tray with an interior susceptor layer, or a controlled microwave-heating layer, may also have an interior divider. Further, the tray may have different susceptors or susceptor thicknesses on each side of the divider, thus changing the microwave heating characteristics to optimally heat different types of food separated by the divider.

The number of films in the marketplace makes the potential number of compartmented trays nearly endless. Also, a hinged lid or another style of lid could be made of a lid film that matches the tray film (lids are discussed further below).

Handles

Figure 66:
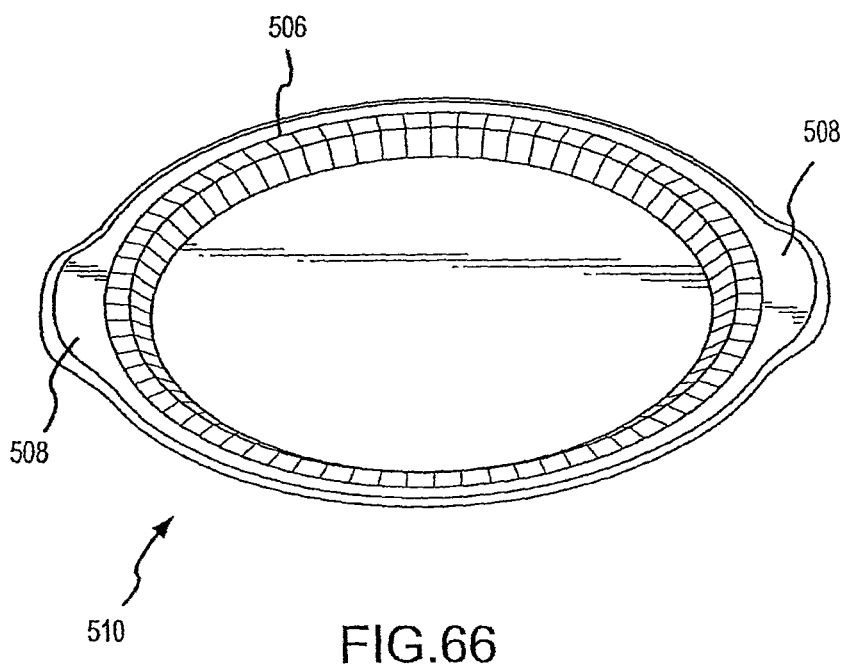
FIG. 66 is an isometric view of a circular tray having an encapsulated rim that includes handles.
Figure 67:
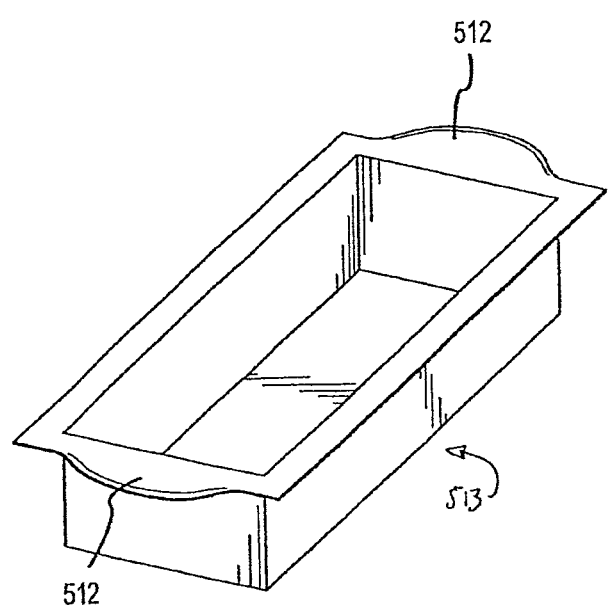
FIG. 67 is an isometric view of a rectangular tray having an encapsulated rim that includes handles.

The injection-molded material may be formed into a variety of features in order to accomplish multiple purposes. For example, an encapsulated rim 506 having opposing protuberances or handles 508 may be added to a circular tray 510, as shown in FIG. 66, to simplify carrying the tray. These handles may be formed as an integral portion of the encapsulated rim with minimal changes to the injection mold tool. Similar handles 512 (see, e.g., FIG. 67) could be provided for any tray 513 shape, or even for paper plates.

Fixed Handles

An injection-molded plastic rim 506 with handles 508 is depicted in, for example, FIG. 66. Such handles are useful with, for example, shallow round paperboard serving trays or containers, such as pizza pans, and other containers. In embodiments like the one depicted in FIG. 66, the rim 506 provides rigidity (improved bending stiffness) and a sealing surface, and the handles 508 provide consumer convenience. In an alternative form, a single fixed handle is formed, similar to a frying pan handle.

Foldable Handles

Figure 68:
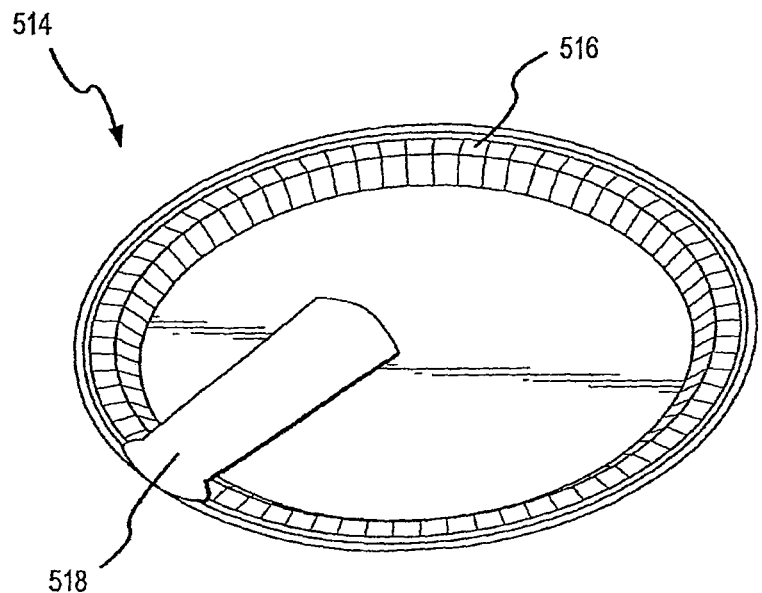
FIGS. 68 and 69 are isometric views of a circular tray having an encapsulated rim that includes a folding handle.
Figure 69:
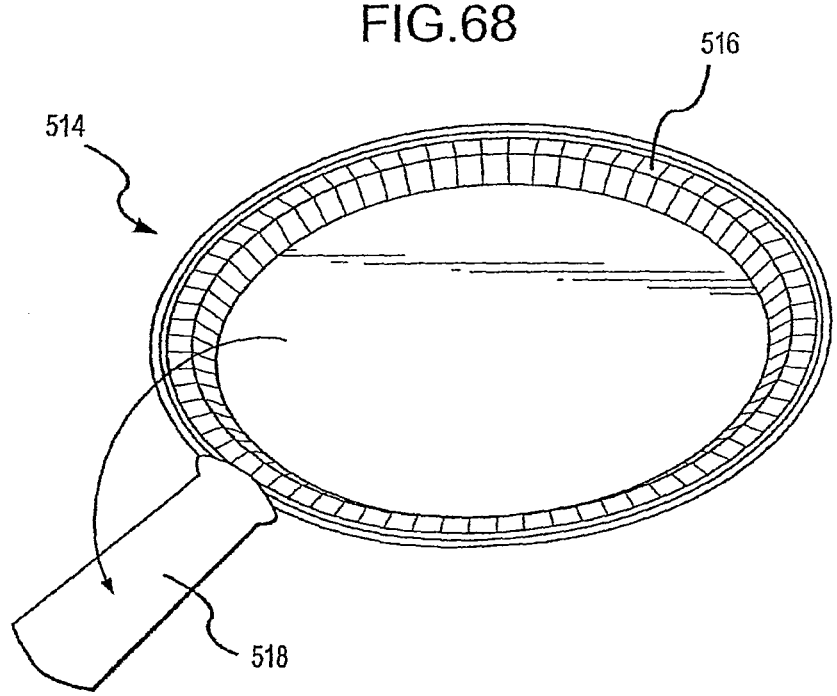

FIGS. 68 and 69 show a tray 514 having an encapsulated rim 516 including a folding or hinged handle 518. Foldable handles can be designed to, for example, pivot over the container while heating food in a microwave oven, and then pivoted downwardly and outwardly for serving the prepared food directly from the container.

The handle 518 may be folded atop the tray 514 (as shown in FIG. 68) in order to minimize both storage and cooking space, and folded out (as shown in FIG. 69) when carrying the tray. Such an encapsulated rim may be especially useful in a microwave tray, since not only is cooking space extremely limited, but also because the plastic handle will not react adversely with the microwave heating process. Again, changes to the injection mold tool permit the creation of a hinged handle integral to the encapsulated rim.

Trivet Feature

Figure 70:
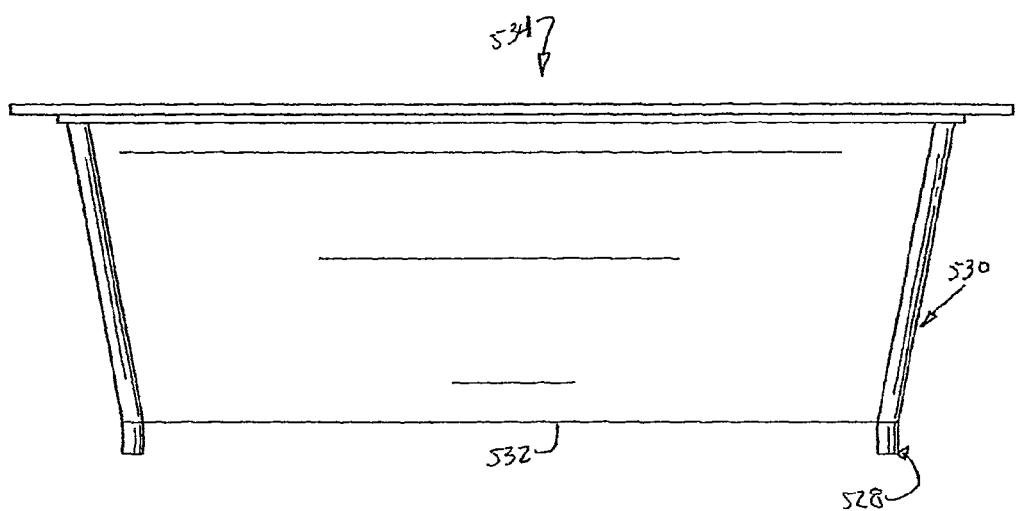
FIG. 70 is an end view of a container according to the present invention having a trivet feature.
Figure 71:
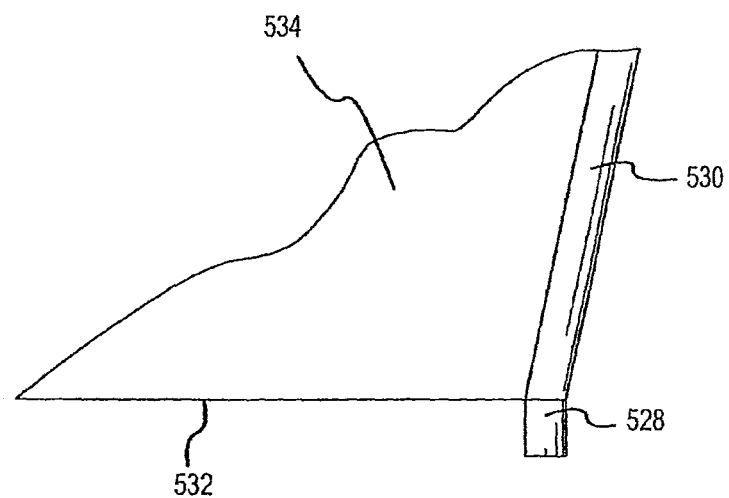
FIG. 71 is an expanded view of the bottom right corner of FIG. 70, more clearly showing an injection-molded trivet feature.

As shown in FIGS. 70 and 71, a trivet feature 528 could be formed by, for example, extending the injection-molded sidewall seam material 530 (e.g., in a five-panel tray discussed above) below the bottom surface 532 of the container 534 (like stilts) to hold the bottom surface of the container off a microwave bottom or to serve as a hot pad feature or trivet. This could be beneficial not only for preventing counter tops from burning, but also to aid in microwave cooking.

Stand-up Feature

Figure 72:
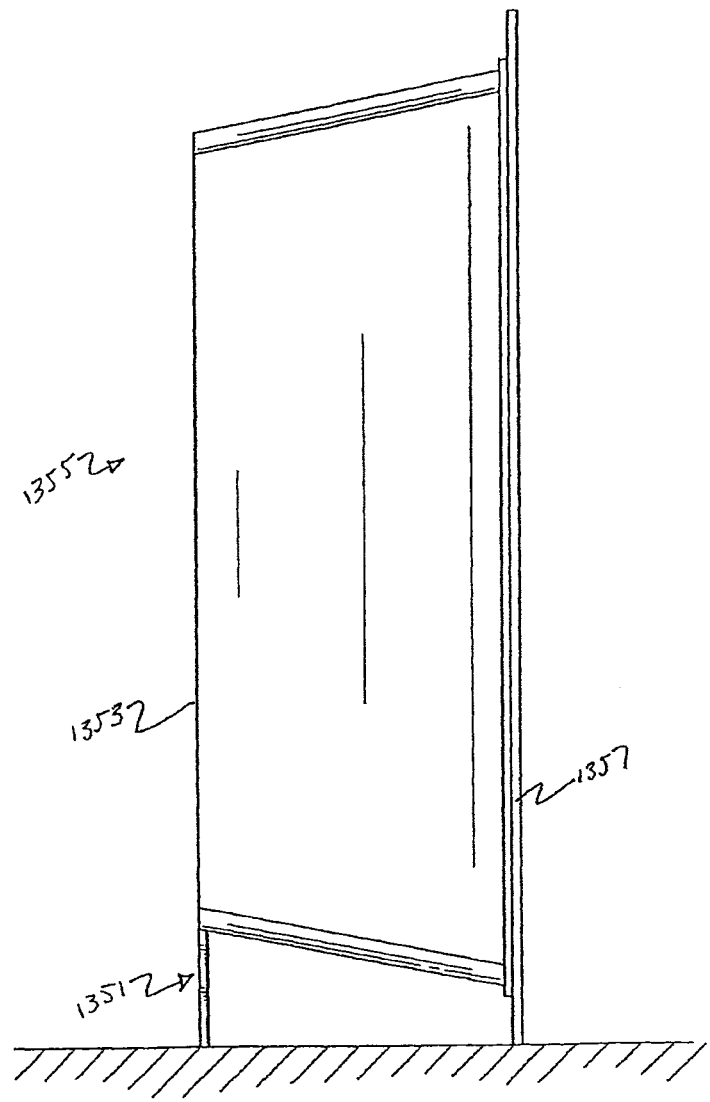
FIG. 72 depicts a stand-up feature that can be accomplished according to the present invention.

FIG. 72 depicts a stand-up feature 1351 that can be accomplished according to the present invention. The depicted stand-up feature is made by extending the injection-molded resin from the container base 1353 (and, optionally, the container's encapsulated rim 1357) to add the stand-up feature to the package 1355.

Lids

Various container types can be manufactured using the injection-molded, folded-style paperboard tray with a paperboard lid.

Hinged Lids

Figure 73:
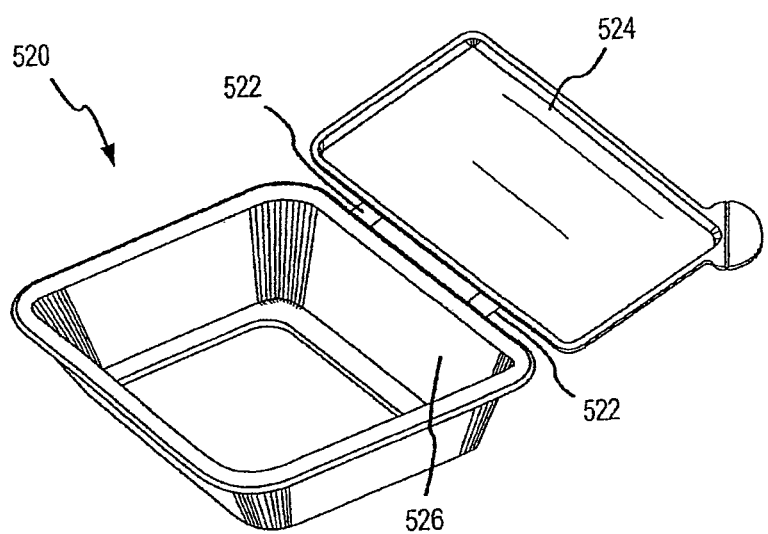
FIG. 73 is an isometric view of a tray having a hinged, snap-fit lid.

In hinged lid containers 520, a hinge 522 connects the primary lid 524 (as compared to lids covering dispensing features, which are discussed below) to a sidewall 526 in a hinge-like fashion to facilitate easy opening and closing of the tray or other container. One example is shown in FIG. 73.

Hinged lids include lids with living hinges (see, e.g., FIGS. 174 and 186). FIG. 174 depicts a tray 1359 and lid 1361 combination, wherein the lid is connected to the tray by a single long living hinge 1357. FIGS. 186 and 193 depict a tray 1359 and lid 1361 combination wherein the lid is connected to the tray by a pair of short living hinges 1363. The container and living hinge features depicted in FIGS. 174, 186, and 193, wherein all flat surfaces are paperboard and all curved or radiused surfaces are resin, can be made in one mold.

Snap-Fit Lids

In an alternative embodiment, the lid and sidewalls may be separate from each other and incorporate a cooperating snap fit open and re-close feature. Trays having an encapsulated rim may be fitted with a snap-fit lid. A lid 524 may both snap-fit and be hinged, as shown in FIG. 73. The encapsulated rim may have a male projection extending outwardly from the rim and shaped to accept a female or grooved lid. The lid may be a thermoformed plastic, or may be a reusable lid as described above.

Press-formed paperboard trays with a injection-molded plastic rim or flange also may be fitted with a snap-fit lid (not shown). The rim or flange may have a male projection cross section (i.e., a snap-fit feature), which will accept a snap-fit female cross section plastic lid. The lid may be, for example, thermoformed plastic or a reusable MICRO-RITE lid.

Peelable Lids

Peelable film structures that are known in the flexible packaging art may be adapted for use in combination with trays according to the present invention. For example, such films may be laminated to paperboard or other lid material.

Peelable lids may be constructed from polyester, which melts at approximately 500° F. and, thus, can be used as the lidding film for tray designed for use in conventional ovens. Peelable lids can also be made from polypropylene, which melts at temperature that is too low for use in conventional ovens, but which works well as the lidding film for tray designed for use in microwave ovens.

Lids

Various container types can be manufactured using the injection-molded, folded-style paperboard tray with a paperboard lid.

Hinged Lids

In hinged lid containers, a hinge connects the primary lid (as compared to lids covering dispensing features, which are discussed below) to a sidewall in a hinge-like fashion to facilitate easy opening and closing of the tray or other container.

Two-piece, mechanically-hinged lids (e.g., the ball and socket, piano-type hinge often used in other products) may be used in combination with the present invention. Such lids are similar to the dispensing feature 1365 lid depicted in FIG. 189.

FIG. 187 depicts an example of a two-piece package 1367. The lid 1369 has a living hinge 1371 that is mechanically adhered to a mounting surface 1373 comprising part of the formed tray 1375. In FIG. 187, the living hinge is about to be attached to the hinge mounting surface. Two separate injection molds are used: the first to make the lid, and the second to make the tray. In this configuration, all flat surfaces are paperboard, and all curved or radiused surfaces are resin.

FIG. 190 depicts a hinged tray 1377 that was made in one molding unit. Three paperboard pieces are placed into the mold and then resin is injected to form the tray. As previously noted, all flat surfaces are paperboard, and all curved or radiuses surfaces are resin. This container, as depicted, also includes a mechanical hinge providing access to a dispensing feature 1381.

Snap-fit Lids

Separate, snap-on or snap-fit lids (for example, one used with a large lasagna dish so it can be resealed if contents are not completely consumed in an initial sitting) may be made according to the present invention. FIG. 188 depicts a snap-fit lid 1383 with a living hinge dispensing feature 1385. It is another two-piece package made using two separate injection molds (like the one depicted in FIG. 187). One mold makes the tray 1387, and another mold makes the lid using paperboard and injection-molding resin. Again, in this configuration, all flat surfaces are paperboard, and all curved or radiuses surfaces are resin.

In an alternative embodiment, the lid 1383 and sidewalls of the tray 1387 may be separate from each other and incorporate a cooperating snap-fit open and re-close feature.

Trays having an encapsulated rim may be fitted with a snap-fit lid. The encapsulated rim may have a male projection extending outwardly from the rim and shaped to be accepted in a female or grooved lid. The lid may be a thermo formed plastic, or may be a reusable lid as described above.

Press-formed paperboard trays with an injection-molded plastic rim or flange also may be fitted with a snap-fit lid. The rim or flange may have a male projection cross section (i.e., a snap-fit feature), which will accept a snap-fit female cross section plastic lid. The lid may be, for example, thermo-formed plastic or a reusable MICRO-RITE lid.

Peelable Lids

Peelable film structures that are known in the flexible packaging art may be adapted for use in combination with trays according to the present invention. For example, such films may be laminated to paperboard or other lid material.

Peelable lids may be constructed from polyester, which melts at approximately 500° F. and, thus, can be used as the lidding film for tray designed for use in conventional ovens. Peelable lids can also be made from polypropylene, which melts at temperature that is too low for use in conventional ovens, but which works well as the lidding film for tray designed for use in microwave ovens.

Lids Having Dispensing Features

FIGS. 188, 189, and 190 depict various lids having dispensing features. These lids may be made according to the present invention, and are described elsewhere herein.

Gas Barrier Feature i.e., Leak Resistance or "Leak Proofness"

When a moisture and gas barrier layer is incorporated into a paperboard tray, a high-barrier paperboard tray package can be obtained when the lid film is hermetically sealed onto the plastic rim. Such trays are useful in, for example, modified atmosphere packaging (MAP) of refrigerated foods for extended shelf life. MAP is a packaging method in which a combination of gases such as oxygen, carbon dioxide, and nitrogen is introduced into the package at the time of closure to extend the shelf life of the product packaged (for example, lunch meat in a blister package).

Currently, nonbarrier packages that incorporate MICRO-RITE and other metallized microwave packaging are manufactured. These packages use conventional, nonbarrier orientated PET as the carrier sheet for both the foil and the metal. A barrier package that incorporates MICRO-RITE and other metallized microwave packaging can be created by combining the salable lid described above with one of the following techniques for improving the barrier aspects of the rest of the package:

i) use SARAN-coated (or acrylic or polyvinyl alcohol) PET in place of conventional PET;
ii) use a conventional microwave package but, in addition to the conventional PET, laminate a barrier sheet such as SARAN-coated (or acrylic or polyvinyl alcohol) PET or EVOH containing films;
iii) use a barrier adhesive to laminate conventional PET film to paperboard;
iv) extrusion laminate conventional PET films to paperboard using EVOH (or other barrier resins).

Method of Manufacturing a Tray Having Printed Graphics

Paperboard trays, whether press-formed, folded, gusseted, and the like, are generally formed from tray blanks. A tray blank suitable for creating a variety of paperboard trays may be manufactured as follows:

i) Initially, a polyester film is laminated to a foil, forming a film/foil combination. The polyester film itself may be metalized, if desired. Next, the film/foil combination is masked with a caustic-resistant agent in a desired pattern. Once masked, the film/foil combination is run through a caustic bath, which etches the unmasked portions of the combination. The mask may then be removed, if necessary. Once the desired pattern is etched, the film/foil combination is laminated to an uncoated, uncut paperboard sheet. After lamination, ink may be added to the board to form graphics.

ii) To be able to press-form a tray, the paperboard must have moisture in it. Thus, once the ink is placed on a paperboard sheet to be press-formed, a moisturizing process adds moisture to the paperboard. In one embodiment, the moisturizing process adds approximately 3 to 5% moisture to the board. This additional moisture helps expand and swell the paperboard fibers of the sheet so that a tray may be shaped without ripping.

iii) After the moisturizing process is completed, the paperboard sheet is die cut into individual tray blanks. Many different types of trays may be manufactured. The die-cutting step determines the final form of the tray blank. For example, a five-panel tray blank (discussed above) will be die cut differently from a tray blank for a press-formed tray.

iv) Following die cutting, the resulting tray blanks may be press-formed, folded, or otherwise shaped into a tray.

In order to have a high fidelity, six-to-eight color printing on the outside of a tray, it is necessary to have clay-coated paperboard. If there is no clay, the inks are absorbed into, and may bleed across, the paperboard. The resulting print resolution and quality are poor, possibly including smudged or blurred graphics. In one embodiment of the present invention, approximately eighteen pounds of clay are added per ream of paperboard in order to coat the paperboard. This amount of clay facilitates high fidelity printing of the tray surface. Further, the process just described permits graphics to be printed not only on the top of a tray, but also on a tray's sidewalls and bottom. If high-quality graphics are not desired, the aforementioned steps may be eliminated.

Using the five-panel tray 434 discussed above with respect to FIG. 41, for example, with a plastic injection-molded support rim 436 that permits a full hermetic seal, it is possible to manufacture a barrier tray with full color graphics on the tray sidewalls and lid. The five-panel tray 434, which eliminates any pleated corners, makes it possible to print the paperboard with full graphics on surfaces and then to use the injection mold tool itself to shape the tray and inject material that will seal the seams between the sidewalls.

Two-side printing on surfaces that ultimately become the outside or inside of tray sidewalls and/or a lid is also an option. The folded style tray can be enhanced by having graphics printed on both the inside and outside of the tray. The press-formed tray can have two-side printed lids. This printing is done using conventional printing processes known in the paperboard industry. The prior art thermoformed trays are not easily printed on either the inside or outside. Typically, pressure sensitive labels are utilized to add graphics to these prior art trays.

In-Line Press-Forming and Injection-Molding Process

It is possible to press-form a paperboard container into a three-dimensional tray having a flange, and then partially or fully encapsulate the flange with injection-molded plastic in a single tool. This improves container uniformity and reduces costs.

The injection mold tool may be a freestanding machine or may be combined with a machine designed to form the tray body. In the latter version, a single machine would form the tray and injection mold the encapsulated rim. When the injection mold tool is freestanding, trays may be conveyed to the injection mold tool by hand or via dedicated machinery, such as a conveyor belt.

These container-forming tools are similar to the tools commonly used to make pressed paperboard containers, such as bowls, trays, and plates, such as Gralex and/or Peerless presses. New features are, however, included in the tool to provide for a polymer to be injected into the rim area and any other desired areas of the container.

Alternatively, a two-step process can be used, wherein the formation of the container takes place in step one, and then the formed tray is transferred "on machine" to an adjacent location on the same machine where the polymer is injection molded.

Although the injection mold tool described above relates particularly to an embodiment having an encapsulated rim as a rim feature, alternate embodiments with different rim features may be created with some alterations to the apparatus already described.

It should be further noted that many methods of tray manufacture, including those discussed above and those well known to people skilled in the art, may be combined with the injection-molding process just described. Thus, a single production line may be set up in order to take a tray blank, form it into a three-dimensional tray, and injection mold the formed tray, all without requiring the blanks or folded trays to be transferred from one production line to another.

First Method of and Apparatus for Encapsulation

Figure 74:
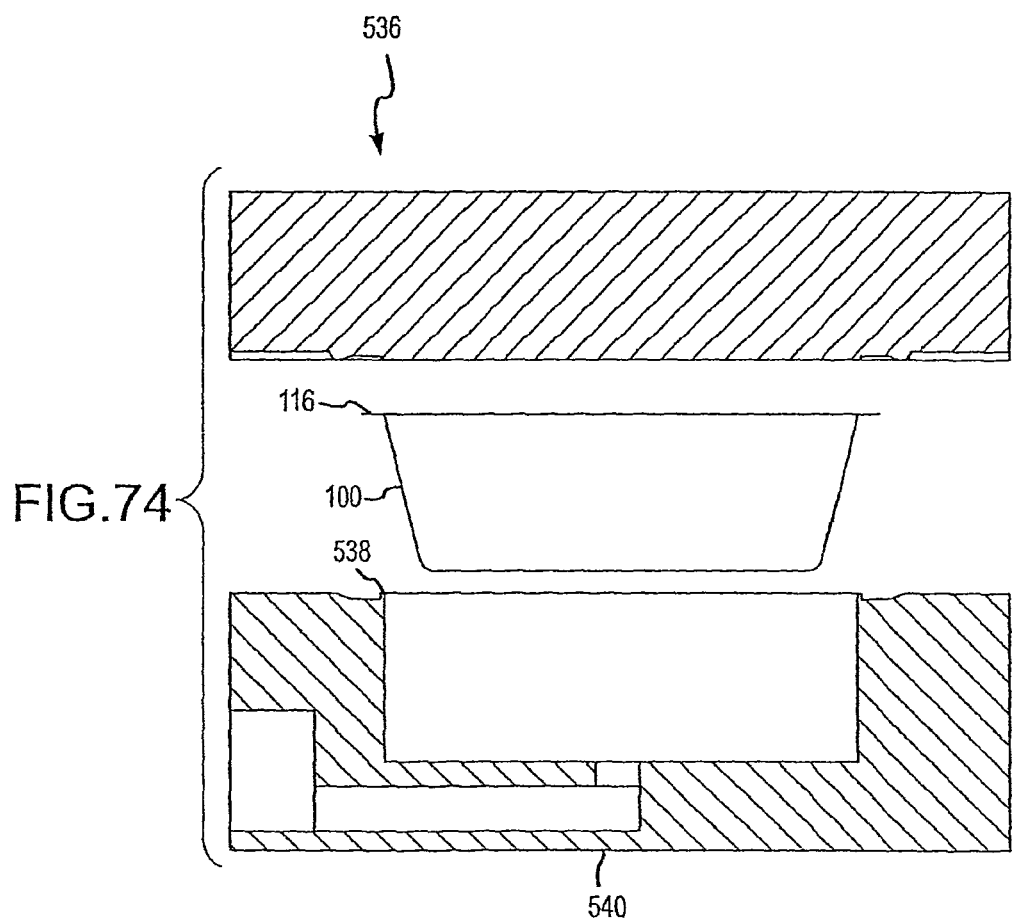
FIG. 74 is a cross-sectional, schematic view of an open injection mold tool according to a first embodiment with a tray positioned for insertion therein.

FIG. 74 displays an open injection mold tool 536 according to a first embodiment and suitable for manufacturing a tray 100 and encapsulated rim 124 (see, e.g. FIG. 76) according to one embodiment of the present invention. Generally, an assembled tray 100 is inserted in the middle of the injection mold tool 536, as shown in FIG. 74. The flange 116 rests on a barrier wall 538 (FIG. 77), thus supporting the tray 100 and suspending it above the bottom of the injection mold tool. The barrier wall 538 comprises a portion of the bottom member 540 of the closed injection mold tool 536.

As part of the manufacturing process, any pleats 122 spaced along the tray 100 or flange 116 may be pressed prior to being placed in the injection mold tool 536 in order to at least partially flatten them. This simplifies the process of creating an hermetic seal across the pleat surface, as described below.

Figure 75:
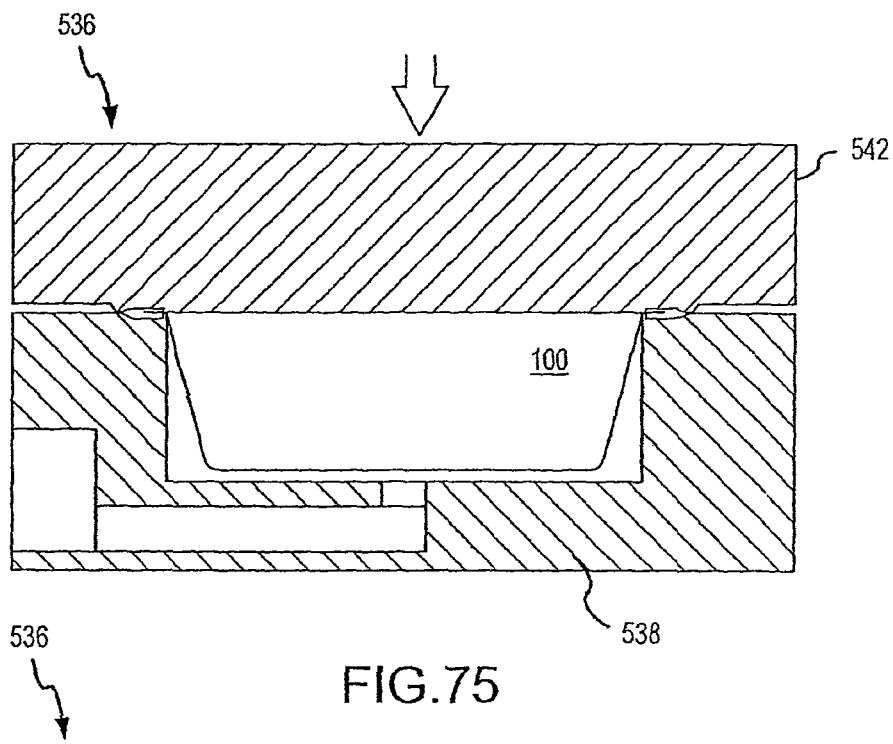
FIG. 75 is a cross-sectional view of the injection mold tool and tray of FIG. 74, when the injection mold tool is closed.

Once the tray 100 is properly positioned within the injection mold tool 536, the injection mold tool is closed, as shown in FIG. 75. A portion of the top member 542 of the closed injection mold tool tightly pins the flange 116 against the barrier wall 538 to help securely position the tray 100. The top of the closed injection mold tool 542, the flange, and the barrier wall create a generally airtight seal, absent any gapping or irregularities in the flange surface.

Further, the injection mold tool 100 may itself be used to press-form a tray 100 from a tray blank by appropriately shaping the top 542 and bottom 540 of the injection mold tool. For example, rather than having a flat mold top 542, as shown in FIGS. 74 and 75, the top of the injection mold tool may include a press-forming member projecting into the injection molding cavity. In one embodiment, the distance between the press-forming member and the base of the injection mold tool may be approximately equal to the width of a paperboard sheet. A tray blank may be placed in the injection mold tool, and, when the mold closes, the pressure exerted on the blank by the top and bottom of the injection mold tool may press-form the tray into its three-dimensional shape.

Figure 76:
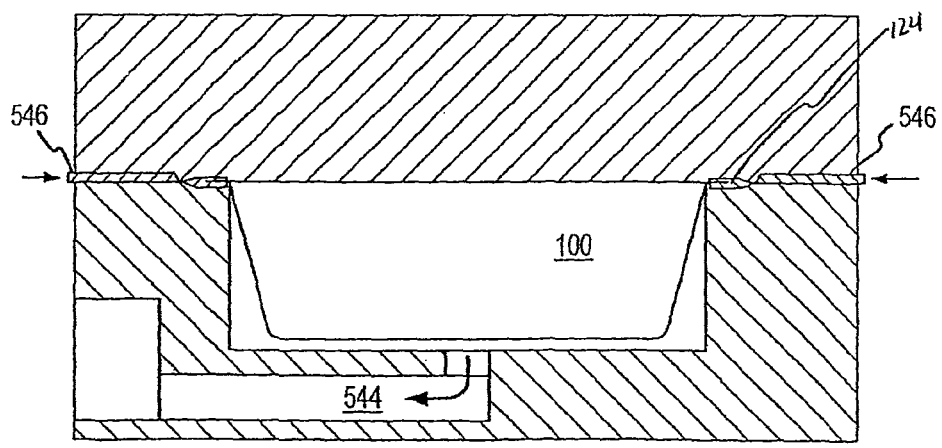
FIG. 76 is a cross-sectional view of the closed injection mold tool of FIG. 75, with pressurized runner lines injecting molten encapsulating material into the injection mold tool.

FIG. 76 depicts the injection mold tool 536 of FIGS. 74 and 75 during operation. Once the injection mold tool is closed, a vacuum line 544 draws most or all of the air out of the injection mold tool. Molten resin is then pressurized and piped through injection sites 546 into the injection mold tool 536. It should be noted that in this embodiment there are two injection sites, one at each end of the injection mold tool. FIGS. 74-82 display vertical cross-sections (at varying magnifications) of two different embodiments of the injection mold tool 536, and accordingly display only the portions that lay on the cross-section line. Alternate embodiments may use multiple injection sites, or a single injection site 546, feeding molten resin. Similarly, alternate embodiments may vary the pressure differential between the injection mold tool, and pressurized reservoir of molten resin.

Generally, the number and placement of injection sites 546 affects the injection and flow of the injection-molded material. Multiple injection sites permit lower pressurization and allow a more uniform distribution of injection-molded material throughout the mold 536. Further, the way in which the flange 116 or tray 100 is clamped in the injection mold tool affects the flexing of the flange during the injection-molding process. In order to minimize flexing, the flange or tray is typically clamped near the injection sites 546.

Figure 77:
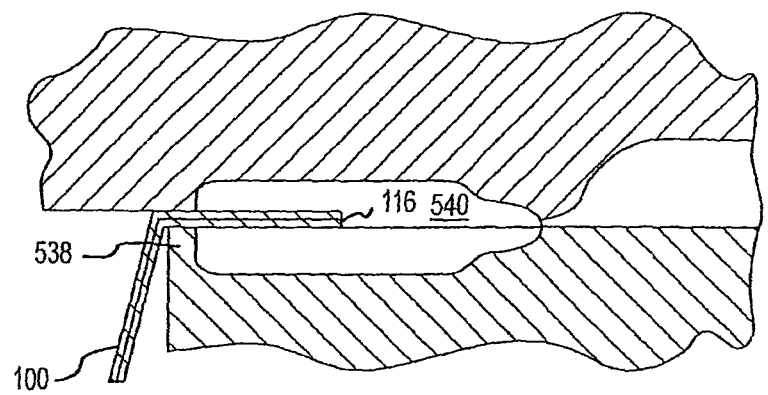
FIG. 77 is an enlarged, fragmentary cross-sectional view of the closed injection mold tool of FIG. 75.
Figure 79:
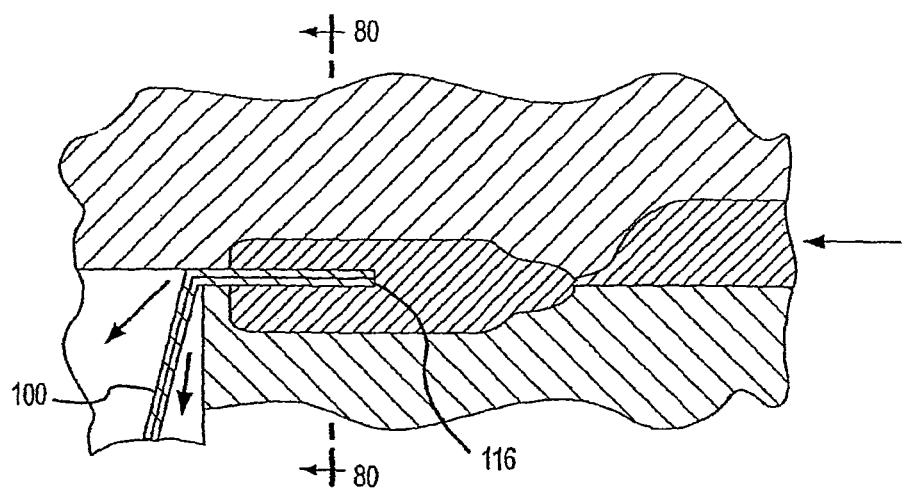
FIG. 79 is an enlarged, fragmentary cross-sectional view of the operational injection mold tool of FIG. 76.

The pressurized injection sites 546 force molten plastic into the injection mold tool 536 to coat the flange 116. As can be seen in FIGS. 77 and 79, the flange may be suspended substantially in the middle of the injection mold tool injection cavity 548, thereby permitting its top, outer side, and bottom to be coated with molten plastic. Further, because the flange 116 occupies the approximate center of the injection mold tool, the molten plastic may be dispersed above and below the flange. Accordingly, the flange may be enclosed approximately in the middle of the encapsulated rim, rather than having the majority of the encapsulated rim located above or below the flange. This ensures that (a) the rim 124 surrounds the flange in a stable manner, and (b) the flange is unlikely to break through a wall of the encapsulated rim weakened due to a minimal amount of plastic. Generally, however, the length of the flange is less than the distance from the flange surface to the top of the cavity 548, in order to prevent the flange 116 from being deflected out of the resin due to the pressure exerted on the flange by the resin. All portions of the flange 116 (i.e., corner flanges and sidewall flanges) are generally uniformly coated with molten plastic. Again, alternate embodiments may vary the thickness or other dimensions of the plastic coating.

Figure 80:
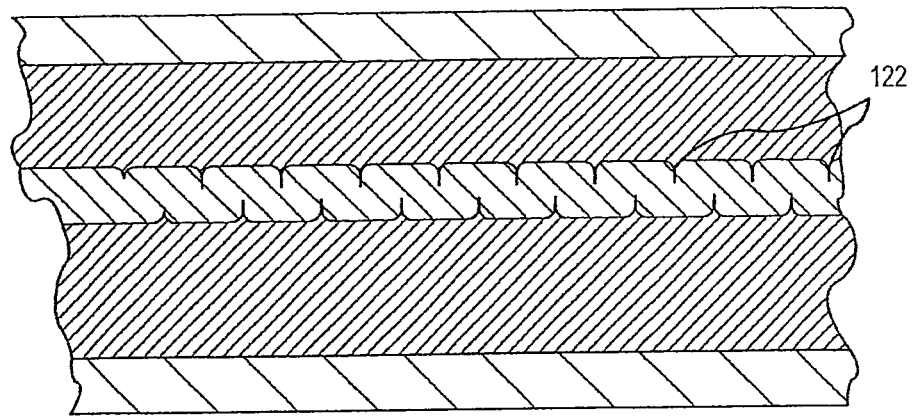
FIG. 80 is an enlarged, fragmentary cross-sectional view along line 80-80 of FIG. 79.
Figure 81:
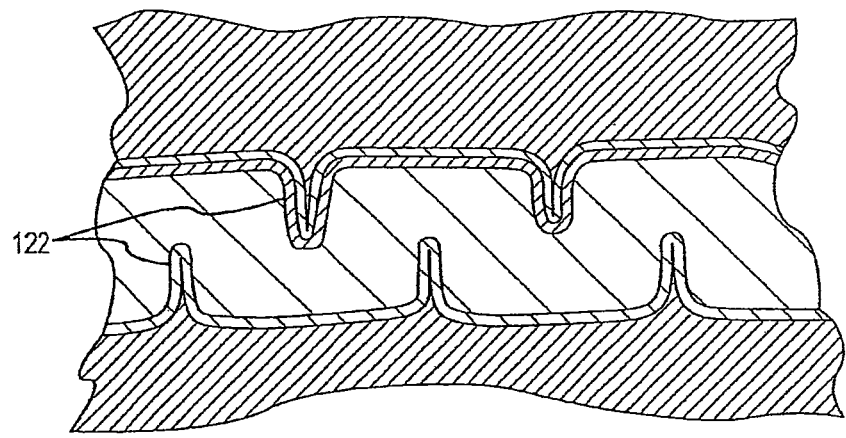
FIG. 81 is a further enlarged, fragmentary cross-sectional view along line 80-80 of FIG. 79.

FIGS. 80 and 81 are enlarged, cross-sectional views along line B-B of FIG. 79 and show folds, creases, and other irregularities 122 inherent in a press-formed tray 100 that make it difficult to achieve a hermetic seal. During injection, a crimped or pleated corner flange 116 is suspended in the injection mold tool 536. As molten plastic is pushed into an airflow path, it cools on the surface of the irregularities 122. Once a sufficient amount of plastic is pushed into and cools in the irregularity, a seal is formed between the injection mold tool 536. Typically, a seal forms only when the irregularities 122 are substantially filled with cooling plastic. This ensures that each irregularity is generally completely coated with molten plastic, thus eliminating any potential breaks in the encapsulated rim's 124 hermetic seal and ensuring that the rim is of a relatively uniform thickness and strength across the entire flange. FIG. 81 depicts molten plastic being forced into the flange irregularities 122 by the pressure generated during injection molding.

Figure 82:
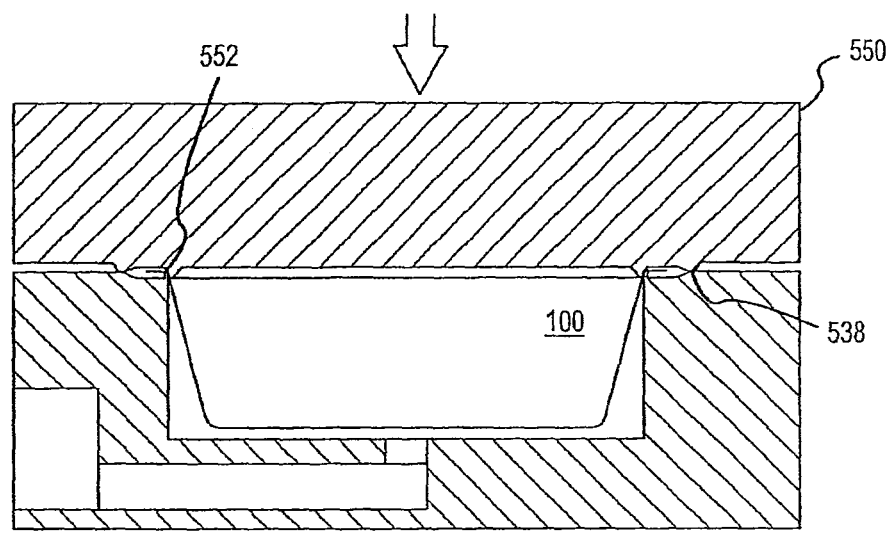
FIG. 82 is a cross-sectional view of a closed injection mold tool according to a second alternate embodiment and containing a tray.

FIG. 82 is a cross-sectional view of an alternate injection mold tool 550. The injection mold tool includes an inner lip 552, which presses the tray sidewalls outwardly. By exerting outward pressure on the tray sidewalls, the inner lip 552 ensures that the flange 116 is completely inserted into the injection mold tool 550. The lateral pressure also effectively locks the tray sidewalls 114 against the barrier wall 538, thus immobilizing the tray 100 once the injection mold tool 550 is closed. This minimizes the flange's movement while being coated with molten plastic, for example, movement that might otherwise result from the pressure of the molten plastic against the flange 116.

The encapsulated rim 124 is produced by placing a pressed or folded paperboard tray 100 into an injection molding cavity 548 and them injecting molten plastic onto the perimeter of the tray so that the perimeter of the tray is enveloped by the molten plastic. The vacuum in the mold merely holds the paperboard tray 100 in position while the mold is open, closed, being opened, being closed, and while the injectant is being injected. The vacuum is not used to move the polymer through the mold.

Figure 78:
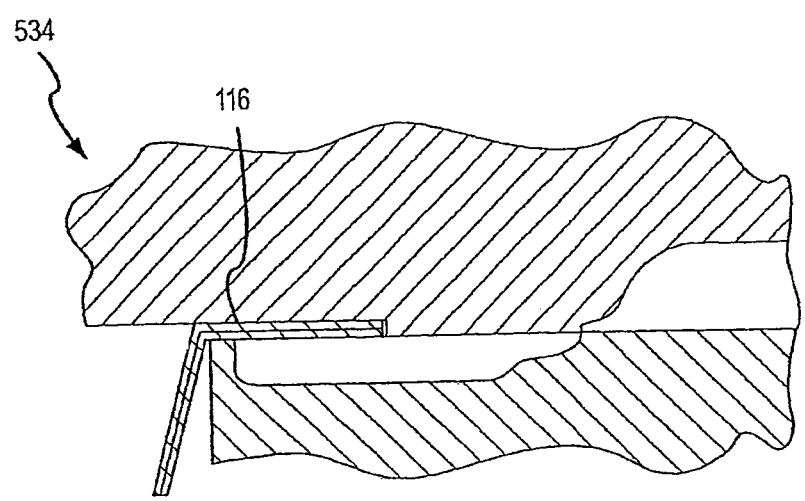
FIG. 78 is an enlarged, fragmentary cross-sectional view of a first alternate embodiment of a closed injection mold tool.

Complete encapsulation of the flange 116 may be performed using a single-step or a multi-step injection process. The single step process uses a mold like that depicted in FIGS. 74-82. In the multi-step process, the flange 116 initially may be positioned within the injection mold tool as shown in FIG. 78, with the top of the flange placed flush against the top of the injection mold tool 554. In the first step according to this embodiment, the injection-molded material coats only the outer edge and bottom of the flange 116, resulting in a partially encapsulated flange (the partially-encapsulated flange resulting from the mold configuration shown in FIG. 78 would look similar to the partially-encapsulated flange 158 depicted in FIGS. 8 and 9 except that, in these latter two figures, a portion of the tray sidewall 152 is also coated, and the injection-molded material is flush with the upper surface of the flange). After the first step, the encapsulating material is substantially flush with the bottom surface of the paperboard flange 116. Then, once the polymer at least partially solidifies, a second step is used to complete the encapsulation of the flange.

It is also possible to use an articulated injection-molded tool to fully encapsulate the flange. The articulated injection tool could take care of multiple injections in sequence. For example, a multi-step process may include:
  i) pressing the blank into the three-dimensional tray having a flange; and
  ii) moving the formed tray 100 to another tool for the partial or full encapsulation of its flange 116.

Second Method and Apparatus for Encapsulation

Additional aspects of the present invention involve a tool capable of press forming a paperboard item, such as a container or tray, from a flat blank of paperboard and injection molding a polymer to form a partially or completely encapsulated rim of the tray or container. An "in-mold" forming tool eliminates the preforming step required for conventional injection molding tools resulting in a substantial cost savings.

Generally, an injection-molding (or "in-mold") tool conforming to the present invention typically requires lower forming tool temperatures than conventional forming processes because the forming pressure and dwell time are substantially greater than they are for the traditional forming process for pressed paperboard containers. For example, one in-mold tool in accordance with the present invention may apply a forming pressure of between 1425 lb/in2-2850 lb/in2 on a paperboard blank. A traditional forming tool only applies about 240 lb/in2 on a blank during formation. Moreover, the dwell time of an embodiment of the present invention may be six seconds, which is about three times greater than the dwell time of conventional press forming processes. As such, laminates and coatings may be applied to both sides of the paperboard blank with only a minimal tendency for these coatings to stick to the tool. Thus, a strong container with a polymer film on the inside and a graphic lamination on the outside is possible.

In addition, the requirement for high moisture levels in the paperboard blank is greatly reduced since the shape of the container is held together by, and additional strength imparted to the container through, the injection of a polymer onto the rim or flange of the container at approximately 500 degrees Fahrenheit with a pressure of approximately 2000 lb/in2, for example. As such, the "in-mold" forming process and tool of the present invention provides a container or other item that is not dependent on moisture to achieve fiber bonding within the cellulose structure of the paperboard. Some moisture, however, may be added to the paperboard to plasticize the cellulose structure so that uniform pleats or required edge compression folds can be made. For containers, which require two sides of the paperboard to be coated, laminated, extruded, or sealed in any way, the low temperature of this forming process will not create blisters in the container.

A paperboard item of the present invention is fabricated at substantially greater pressures, longer dwells, and lower temperatures than in conventional paperboard forming processes and may also incorporate graphics and food packaging features not equally achievable by the traditional pressed paperboard forming process.

Additionally, a container formed in accordance with the present invention may be sized as required in the injection molding process. Although the exact shape of the tools may include corrections for polymer shrinkage, the finished containers can be produced with very small size variation. The significantly higher pressure and dwell levels of this new pressed paperboard forming process also result in a substantially higher level of cellulose fiber bonding within all of the pleats, folds, and/or bends throughout the entire shape of the paperboard structure. All of these combined container benefits provide new market opportunities for a broad range of applications.

Figure 83:
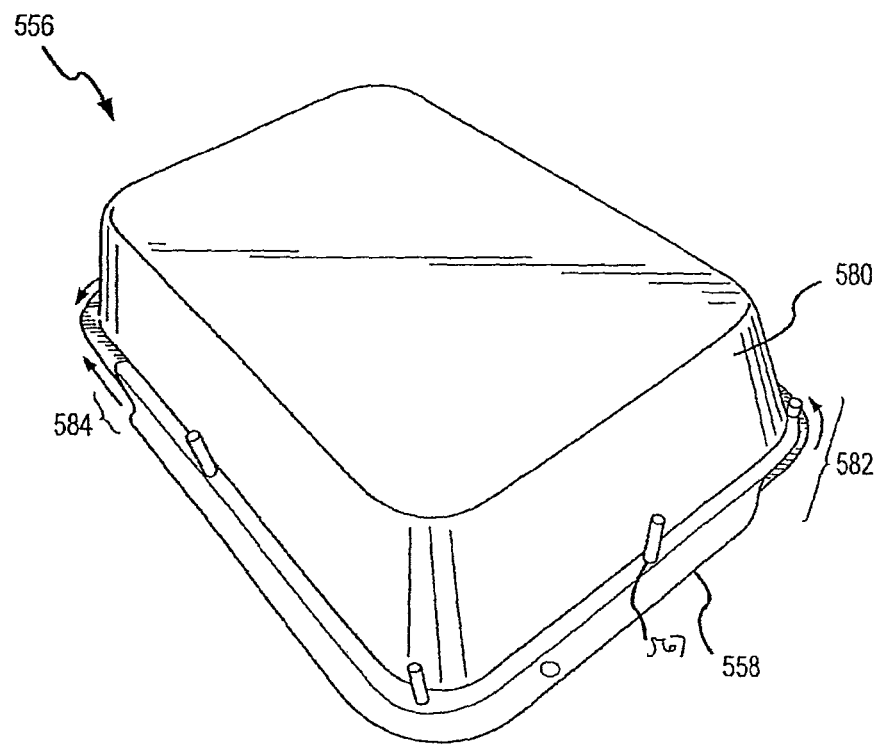
FIG. 83 is an isometric view of the bottom surface of a tray having a partially-encapsulated rim.
Figure 84:
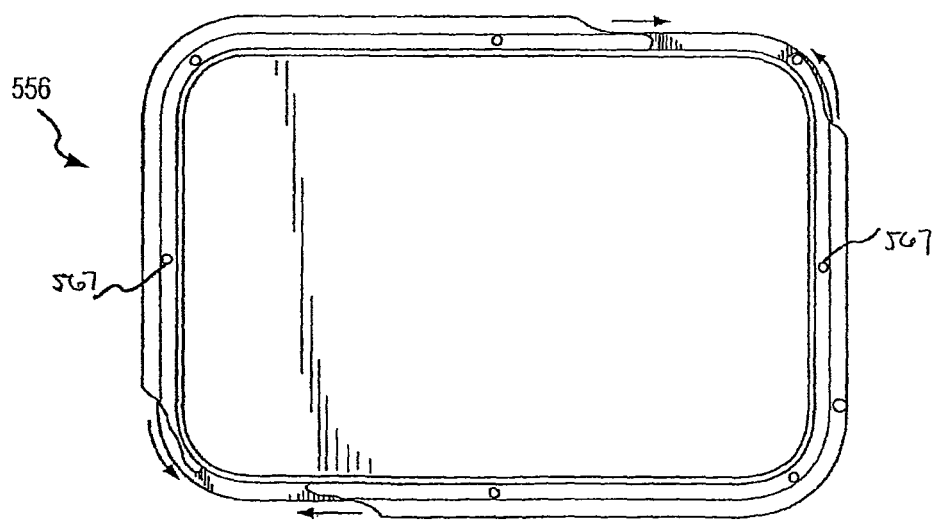
FIG. 84 is a bottom-up view of the tray of FIG. 83.
Figure 85:
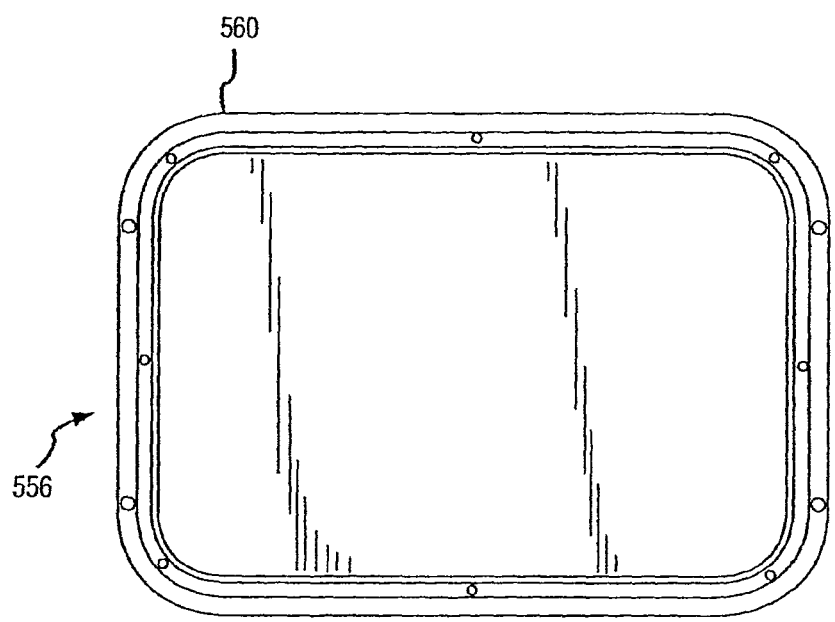
FIG. 85 is a bottom-up view of a tray having a fully-encapsulated rim.

FIG. 83 displays a bottom perspective view of a tray 556 having a partially-formed encapsulated flange 558. Such partially-formed encapsulation generally corresponds to a partially injected state during the injection-molding process occurring in the injection-molding apparatus described below. That is, the tray shown in FIG. 83 generally represents the state of a tray after the injection-molding has begun, but before it is complete. FIG. 84 is a bottom-up view of the tray 556 of FIG. 83, while FIG. 85 is a top-down view showing the tray of FIG. 83 with a completely encapsulated rim 560.

As shown generally in FIGS. 93-96, and as will be described in further detail below, one embodiment of the injection-molding tool 562 injects resin along the underside of the tray 556 flange. When blank is clamped in the tool and press-formed into a three-dimensional shape, the top of the flange is generally pressed snugly against a shut-off wall 564 of the tool (see, for example, FIG. 95). The shut-off wall prevents resin from flowing over the top of the flange and beyond the wall, thus assisting in dictating the outer geometry of the injection-molded rim. It should be noted that, throughout this document, the terms "injection-molding apparatus" and "injection-molding tool" are used interchangeably.

The cavity 566 into which resin is injected (the "injection cavity") generally runs around the outer edges of the tray when the blank is clamped in the tool 562, extending outwardly from the sidewalls a distance beyond the edge of the flange. The exact geometry of the injection cavity 566 varies depending on the injection-molded feature desired. A side shut-off wall prevents resin flow beyond the injection cavity.

Generally, liquid resin is injected at high pressure and temperature into the injection cavity through one or more pressurized gates. FIG. 86, for example, depicts a view of a section of the injection cavity 566 displaying a gate 568 location. The view of FIG. 86 is shown looking towards a cavity portion of an injection-molded tool. Such a tool is described in greater detail with respect to FIGS. 93-96, below. In this view, the sidewall of a tray would run along the top edge of the injection cavity. As shown in FIG. 86, the injection cavity 566 is typically divided into at least two sections, namely an advanced-flow section 570 and delayed-flow section 572. The delayed flow section may be further subdivided into a flange region 574 and a resin-only region 576. The advanced-flow section is labeled "A", the flange region of the delayed-flow section is labeled "B", and the resin region of the delayed-flow section is labeled "C". The subdivision between the flange and resin-only regions is represented by a dashed line. In this embodiment, the gate 568 is located in the advanced-flow portion 570 of the injection cavity.

Figure 87:
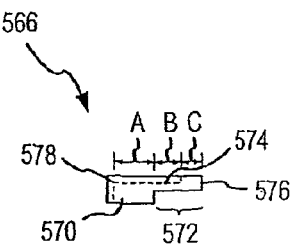
FIG. 87 is a cross-sectional view of the injection cavity of FIG. 86, taken along line 87-87 of FIG. 86.

FIG. 87 is a cross-sectional view taken along line 87-87 of FIG. 86, showing the cross-sectional geometry of the injection cavity 566. As can be seen, the cross-sectional area (and thus the overall volume) of the advanced-flow channel section 570 is greater than the cross-sectional area of the delayed-flow channel section 572. In the present embodiment, the ratio of the cross-sectional area (or "volumetric area") of the advanced-flow section to the delayed-flow section is approximately 3 to 2.

FIG. 87 also shows the placement of a portion of a tray 578 within the injection cavity 566 in phantom. Generally, the outer edge of the tray flange corresponds to the division between the flange 574 and resin-only 576 region of the delayed-flow section 572. The tray sidewall runs along the edge of the advanced-flow section 570 opposite the delayed-flow channel area 572.

As resin is injected through the gate 568, it generally spreads to fill the entirety of the injection cavity 566. However, because the volumetric area of the advanced-flow section 570 is greater than the volumetric area of the delayed-flow section 572, resin generally flows faster in the advanced-flow section. This is shown to better advantage in FIGS. 83 and 84. In FIG. 83, the projecting stubs 567 may generally correspond to gate 568 positions, and may also indicate where resin projects downward from the flange 558 due to excess resin remaining in the gates during cooling. As resin is injected, it flows in the direction indicated by the arrows. In the tray 556 shown in FIGS. 83 and 84, the stubs 567 representing gate 568 locations along the short sidewalls 580 of the tray are the primary injection points for resin (also referred to as "primary gates"). As previously mentioned, the advanced-flow section 570 is generally positioned next to the tray sidewall 580 in this embodiment. Alternate embodiments may change the positioning of the advanced-flow section in order to change the configuration of an encapsulated feature.

Typically, the gate 568 is sized to have an injection area equal to or exceeding 50% of the cross-sectional area of the advanced-flow section 570. This enhances the flow differential between the advanced-flow section 570 and the delayed-flow section 572.

Still with respect to FIG. 83, resin flows more quickly in the advanced-flow section 570 than in the delayed-flow section 572. Thus, until the entirety of the injection cavity is filled, the "flow front" of the molten resin (as measured from the primary gates) generally resembles an S-curve, with the resin in the advanced-flow section occupying the top portion of the S-curve and resin in the delayed-flow section occupying the bottom portion of the S-curve. When the encapsulation process is stopped before the entire flange is encapsulated, as in FIG. 83, the S-curve may be clearly seen as a first flow front 582.

As the resin flow extends from a primary gate, the difference in flow fronts may gradually diminish. Compare, for example, the first flow front 582 and the second flow front 584 shown in FIG. 83. The first flow front is immediately adjacent to a stub 567 corresponding to a gate 568. Accordingly, the difference between the advanced-flow section and the delayed-flow section is clearly seen, and the S-curve shape of the flow front is elongated. As the resin travels further from the primary gates 568, however, the delayed resin flow may begin to catch up to the increased resin flow. This forms a more gentle S-curve shape, illustrated by the second flow front 584. The point from the top of an S-curve to the inflection point along the body of the S-curve is generally referred to as the "advance flow front." The portion of an S-curve from the inflection point to the bottom of the curve may be referred to as the "delay flow front."

Figure 92:
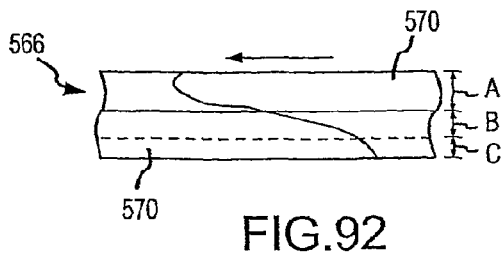
FIG. 92 is a view of the injection cavity of FIG. 86, showing resin flowing through the cavity.

FIG. 92 displays a bottom-up view of the injection cavity 566 of FIG. 86 during operation. In this view, the "top" surface of the injection cavity again corresponds to the placement of a tray sidewall, and the tray flange generally extends to the edge of the flange portion of the delayed-flow section 572. The flow front of the resin may be seen, forming the previously-discussed S-curve shape. Resin generally flows in the direction indicated by the arrow. The flow front extends farthest in the advanced-flow section 570. The gate 568 may be located at any point in the advanced-flow section behind the flow front.

Figure 88:
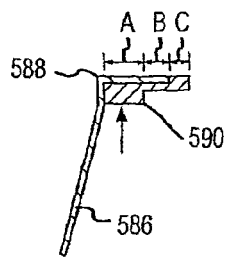
FIG. 88 is a cross-sectional view of a tray having an encapsulated rim formed in the injection cavity of FIG. 86.

FIG. 88 shows a cross-sectional view of a tray having an encapsulated rim formed by injection-molding in the injection cavity of FIGS. 86 and 87. The vertical arrow indicates the horizontal position of the gate when the tray is placed in the injection-molding apparatus. Here, the region marked "A" corresponds to the advanced-flow section 570, the region labeled "B" corresponds to the flange section 574 of the delayed-flow section 572, and the region labeled "C" corresponds to the resin-only section 576 of the delayed-flow section. As can be seen, the "A" region generally has a greater thickness of resin 590 coating the tray flange 588, matching the greater cross-sectional area of the advanced-flow section of the injection cavity 566.

Figures 89, 90, 91:
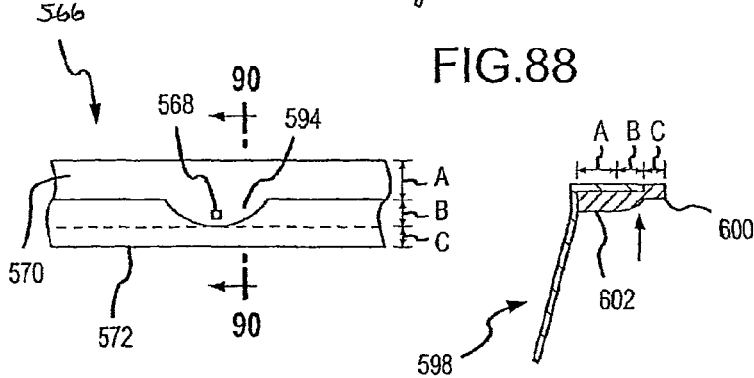
FIG. 89 is a view of a second embodiment of an injection cavity, looking towards a cavity half of an injection-molded tool.
FIG. 90 is a cross-sectional view of the injection cavity of FIG. 89, taken along line 90-90 of FIG. 89.
FIG. 91 is a cross-sectional view of a tray having an encapsulated rim formed in the injection cavity of FIG. 90.

FIG. 89 displays a view of another embodiment of an injection cavity 566. In this embodiment, the advanced-flow section 570 is expanded into a portion of the delayed-flow section 572 by creating a semi-ovoid protrusion 594 extending the advanced-flow section away from the wall of the injection cavity 590. The gate 568 is located within this protrusion, in a portion of the injection cavity that would otherwise comprise part of the delayed-flow section in, for example, the embodiment of FIG. 86. By moving the gate to the semi-ovoid protrusion, greater clearance between the gate and tray sidewall may be achieved, permitting the use of gates larger in cross-section and thus allowing more rapid resin injection into the injection cavity.

FIG. 90 displays a cross-sectional view taken along line 90-90 of FIG. 89. The cross-section is taken partially through the semi-ovoid protrusion 594. As can be seen in FIG. 90, the protrusion 594 has a curved wall 596 in cross-section, sloping from the depth of the delayed-flow section 572 to the depth of the advanced-flow section 570. In alternate embodiments, the protrusion's wall may be linearly sloped, stepped, or vertical. Similarly, the protrusion 594 may be square, triangular, circular, and so on when viewed in top-down fashion.

Generally, outside the semi-ovoid protrusion 594, resin flow through the injection chamber 590 of FIG. 89 is identical to flow through the injection chamber 566 of FIG. 86. When resin is initially pumped through the gate 568, it moves down the sloped or curved wall 596 of the protrusion and into the advanced-flow section 570. The volume of the protrusion is sized to encourage initial resin flow into the advanced-flow section and away from the decreased-flow section 572. Once the protrusion 594 fills, the resin flow path is as previously described with respect to FIGS. 86, 87, and 92.

FIG. 91 is a cross-sectional view of a tray 598 having an encapsulated rim 600 formed in the injection chamber 590 shown in FIG. 89. The present cross-sectional view is taken substantially through the middle of the portion of the tray 598 corresponding to the semi-ovoid protrusion 594. The resin gathering in the protrusion creates a similarly-shaped resin protrusion 602 on the surface of the encapsulated tray rim 600. As the rim extends from the resin protrusion, it assumes a cross-section similar to the tray shown in FIG. 88. The arrow indicates the location of the gate 568 inside the cavity 590.

Generally, a ratio of the length of the advance flow front to the thickness of the advance flow front may be calculated for the injected molten resin, yielding an advance length/thickness ("A L/T") ratio. Similarly, a ratio of the length of the delayed flow front to the thickness of the delayed flow front may be calculated to yield a delayed length/thickness ("D L/T") ratio. If an L/T ratio is greater than 200, a high flow resin may be used to completely fill the corresponding flow section of the injection cavity. For example, when the A L/T ratio is 300, a high flow resin may be used to ensure the advance flow section is completely filled with resin. Generally, a "high flow" resin is defined as a thermoplastic or other material having a meltflow value above 20 grams/10 minutes. The higher a resin's meltflow value, the more easily the resin flows when in a molten state. Various high flow resin types exist for each of the resins shown in the resin table in the section entitled "Tool Deformation," below.

Figure 93:
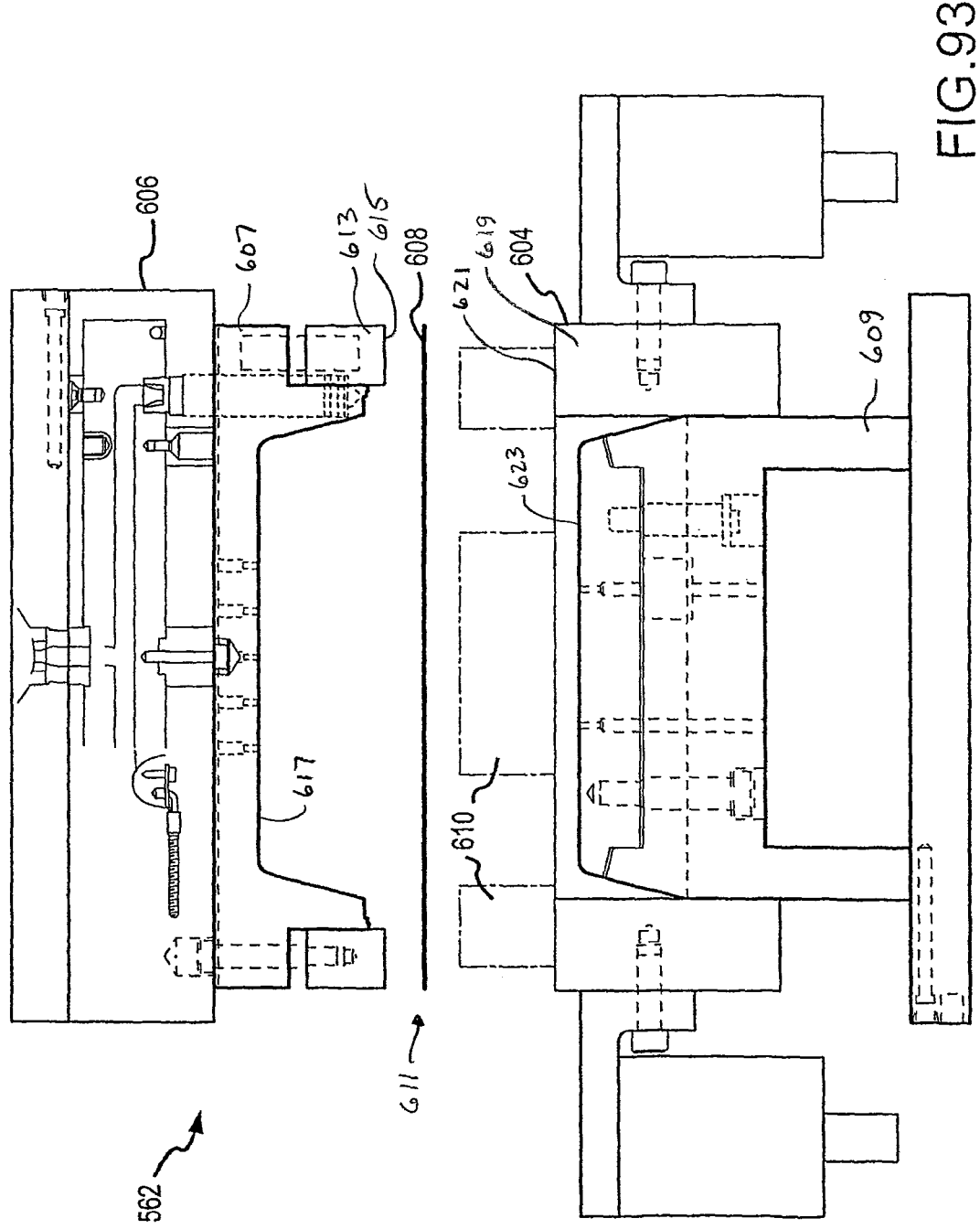
FIG. 93 is a first cross-sectional view of a third embodiment of an injection-molding tool.

FIG. 93 displays a cross-sectional view of an injection-molding apparatus 562, taken along the long axis of the apparatus. Generally, the apparatus consists of a male side 604 (also referred to as a "punch" or "core") and female side 606 (or "cavity"). The core 604 may move toward, and mate with, the stationary cavity 606. Typically, the injection-molding tool 562 is mounted in a horizontal press position, with the core and cavity essentially side-by-side. Alternate embodiments may vertically mount the tool.

Generally, the tool 562 may both press-form a tray blank 608 into a three-dimensional tray and injection mold one or more features onto the tray. The exact encapsulated feature or features formed by the tool depend on the configuration of the injection cavity 566.

Figure 94:
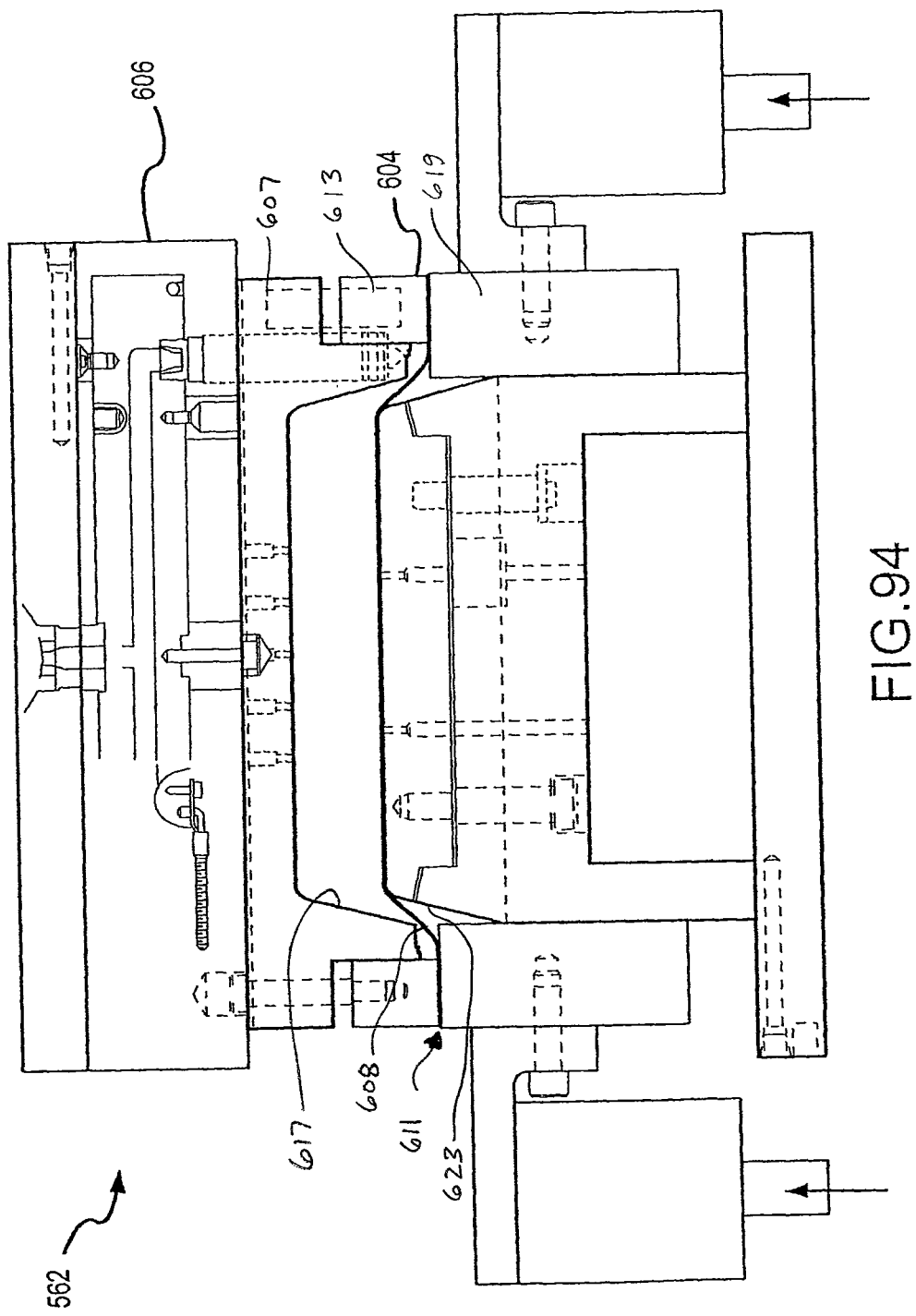
FIG. 94 is a second cross-sectional view of the injection-molding tool of FIG. 93, showing the tool in a partially closed position.
Figure 95:
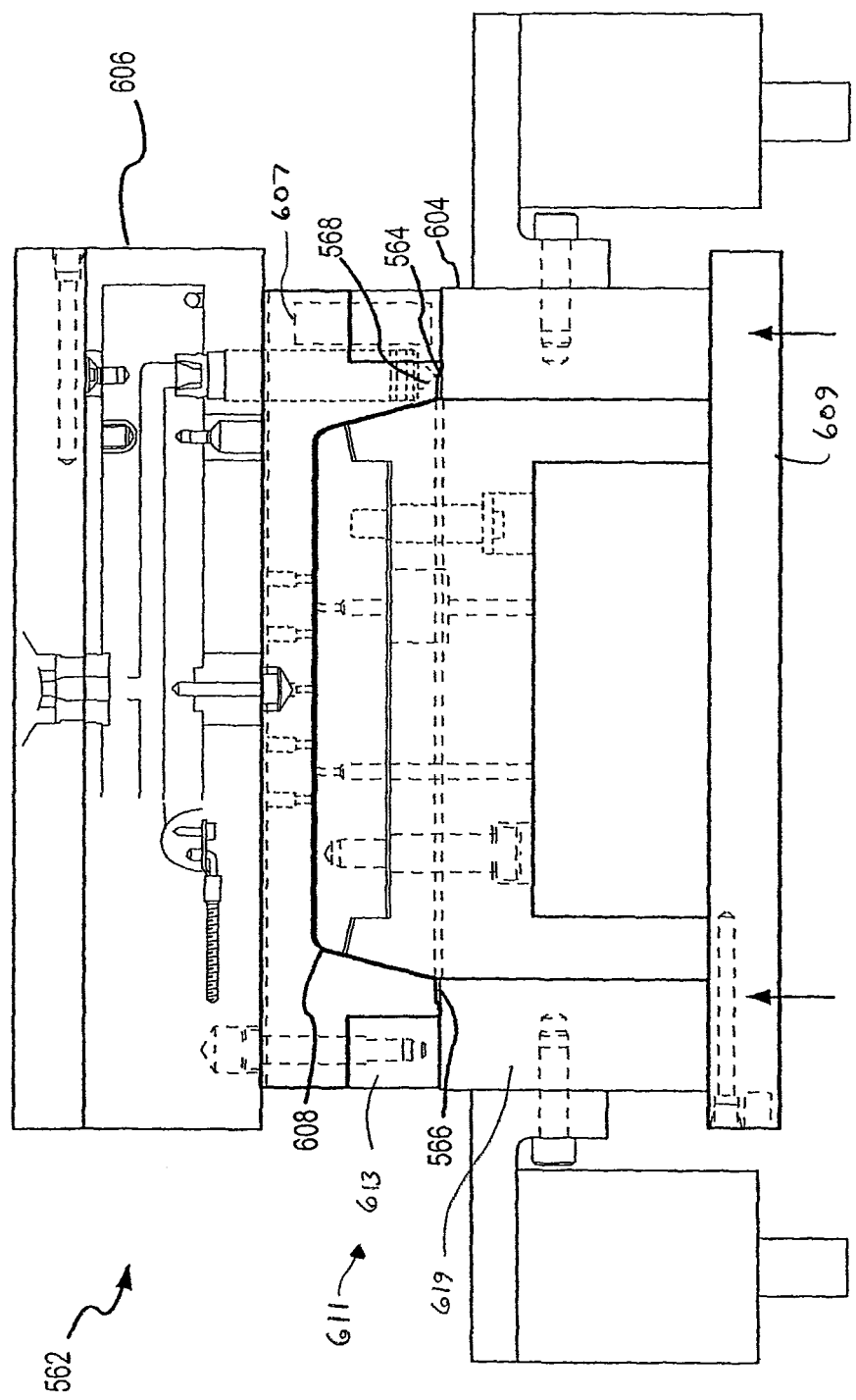
FIG. 95 is a third cross-sectional view of the injection-molding tool of FIG. 93, showing the tool in a fully closed position.
Figure 96:
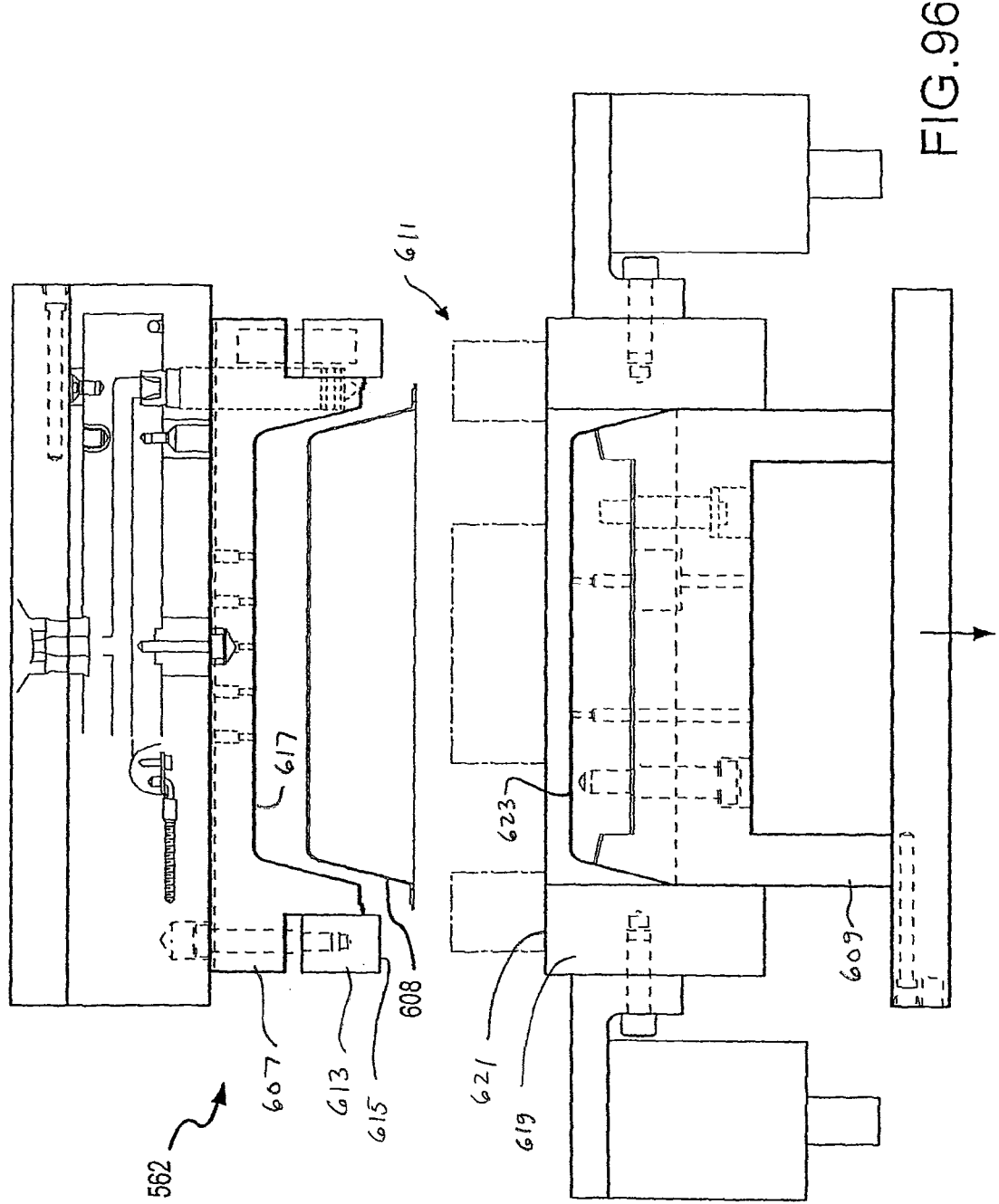
FIG. 96 is a fourth cross-sectional view of the injection-molding tool of FIG. 93, showing the tool in a fully open position, and also showing a cross-section of a tray press-formed by the operation of the tool.

As shown in FIGS. 93-96 the tool comprises a clamping feature 611 operatively connected to at least one of the cavity 606 and the core 604. The clamping feature 611 clamps a peripheral portion of the blank 608 or other construct as the core 604 moves into the cavity 606 to form the blank 608 or other construct into the container (FIG. 96).

In the illustrated embodiment, the cavity 606 comprises a cavity base 607 and the core 604 comprises a core base 609. The clamping feature 611 comprises a clamping ring 613 that is operatively connected to the cavity base 607 and is moveable relative to the cavity base. The clamping ring 613 comprises a clamping surface 615 that is located adjacent to and spaced outward from the surface 617 of the cavity 606 that is for forming the blank or construct 608 into a three-dimensional container. In one embodiment, the clamping feature 611 comprises a draw ring 619 operatively associated with the core 604. The draw ring 619 has a contact surface 621 that is located adjacent to and spaced outward from the surface 623 of the core 604 that is for forming the blank or construct 608 into a three-dimensional container. The clamping ring 613 and draw ring 619 are positioned to clamp or hold a peripheral portion of the construct or blank 608 between the surfaces 615, 621 when the core 604 moves into the cavity 606 and forms the construct or blank 608 into a three-dimensional container.

Initially, the tool 562 (both core 604 and cavity 606 sides) is heated below the melting point of the resin that will be injected along the blank 608 surface to form one or more encapsulated features. By heating the tool, premature cooling of molten resin due to contact with cool tool surfaces is minimized. Generally, the temperature to which the tool 562 is heated varies with, among other things, the resin used, the thickness of the tray blank 608, the thickness of the encapsulated feature to be formed, and the distance between injection gates 568. This, in turn, minimizes bunching of the resin or irregularities in the surface of the injection-molded feature. The tool 562 may be heated to any temperature within a temperature range varying for each type of resin employed to create an injection-molded feature. Generally speaking, when the tool 562 is heated to the lower end of a temperature range, the resin flows more sluggishly, but the cycle time required to create a tray having an injection-molded feature is minimized. Conversely, when the tool is heated to the upper end of a temperature range, the resin flow through the injection cavity is quicker, but the overall cycle time is lengthened.

After heating (or, in some embodiments, prior to heating), a tray blank 608 (such as those shown in FIGS. 3, 22, 24, 48, 49, 51, 53, 55, and 57) is inserted between the core 604 and cavity 606. The blank is flat at this point. Generally, the blank 608 is oriented with its bottom side (the exterior of the tray formed by the blank) facing the cavity 606, and its topside facing the core 604. One or more blank guides 610 position the tray blank for receipt within the cavity. The blank guides 610 may be perpendicular, parallel, or at an angle to the longitudinal axis of the tray blank 608. Typically, the guides are positioned along the exterior of the cavity 606 or core 604 in positions permitting the blank 608 to rest against one or more guides as the tool is closed. Upon moving of the cavity 606 and/or core 604 from the position of FIG. 93 to the position of FIG. 94, the blank 608 will be supported on the contact surface 621 of the draw ring 619 and the clamping ring 613 will be brought into contact with the blank so that the clamping surface 615 cooperates with the contact surface 621 of the draw ring to initially grip the peripheral portion of the blank.

FIG. 94 displays the injection-molding apparatus 562 in a partially closed position. In this position, the core 604 extends partially into the cavity 606 so that the surface 623 of the core contacts a central portion of the blank 608 or construct and the clamping feature 611 clamps a peripheral portion of the blank 608. As the core enters the cavity, it deforms the tray blank 608, beginning the press-forming process that shapes the blank into a three-dimensional tray and the clamping feature 611 continues to clamp the peripheral portion of the blank 608. The tray may deform in a variety of ways, dictated at least partially by both the score pattern on the tray blank and the configuration of the cavity 606 and punch 604.

Next, the injection-molding apparatus 562 completely closes, as shown in FIG. 95. When completely closed, the core 604 extends fully into the cavity 606. Generally, the core is shaped to substantially completely fill the cavity, with the walls of the core sloped, angled, and/or shaped congruently with the cavity walls. When fully closed, the tray blank 608 is held rigidly in place by pressure exerted by both cavity 606 and core 604. Further, one or more vacuum ports 610 may induce a negative pressure on the base of the blank 608 when it contacts the cavity interior wall, assisting in holding the blank in place during the injection-molding process. When the tool 562 is fully closed, the blank 608 is press-formed into the three-dimensional shape of the eventual tray, lacking only one or more injection-molded features.

As may also be seen in FIG. 95, one or more shut-off walls 564 may mate with corresponding surfaces on the opposing portion of the injection-molding apparatus. The shut-off walls 564 minimize resin flow beyond the wall during the injection-molding process (i.e., flash), as previously discussed. Essentially, the shut-off walls aid in creating the geometry of the injection-molded feature. Additionally, spacing between the mating surfaces of the core 604 and cavity 606 may define the injection cavity 566 into which resin is introduced.

Once the injection-molding tool 562 is completely closed, resin may be injected through one or more gates 568 into the injection cavity. Although only a single gate is shown in FIG. 95, two or more gates may be used. If multiple gates are used to inject resin, they are generally equidistantly spaced along the perimeter of the injection cavity 566 and/or press-formed tray, when the tray is clamped inside the tool. This aids in evenly distributing resin across the flange and/or other encapsulated portion of the tray.

In the present embodiment, the resin injected to form an encapsulated feature is typically nylon 6/6, although other polymers may be used. Several suitable polymers, for example, are given in the section immediately below entitled "Tool Deformation." Further, various additives may be mixed with the resin to enhance certain resin features or create new functionality. For example, fiberglass particles may be added to the resin to increase the resin's resistance to heat and raise the heat deformation temperature (HDT) of the resin. Similarly, nucleating or release agents may be added to the resin.

When the tray is secured between the punch 604 and cavity 606 and the injection-molding tool is fully closed, the pressure exerted on the top of the flange by the injection-molding tool and subsequent resin flow along the flange bottom compresses the top of the flange, minimizing pleats and irregularities in the flange surface. Generally speaking, this resin flow takes places at a high temperature of approximately 550 degrees Fahrenheit and approximately 2000 lbs/sq. in. Further, the pressure exerted by the tool 562 and resin injection process forces the flange against the shut-off wall, ensuring that no resin flows along the side and over the top of the flange. This aids in creating more precise geometries for injection-molded features.

For reference, the ram pressure used to close the injection-molding apparatus is approximately 170 tons/square inch. This pressure is spread across the surface area of the core. Accordingly, although the blank does not experience a pressure of 170 tons/square inch, the pressure is nonetheless substantial. The surface area of the core 604 varies, depending on the configuration of the tray blank 608 being press-formed and injection molded, as well as the configuration of the core and cavity 606. In one embodiment of the tool 562, the core face is approximately six inches wide, eight and five-eighths inches long, and one and three-quarters inches deep. Accordingly, the face area is approximately 50 square inches.

Once the injection molding process is complete and the resin hardens, the injection-molding apparatus 562 opens, as shown in FIG. 96. Effectively, the apparatus returns to the start or ready state initially displayed in FIG. 93. Now, however, the tray blank 608 has been formed and provided with one or more encapsulated features.

Center-Point, Resin-Injection Process

Figure 131:
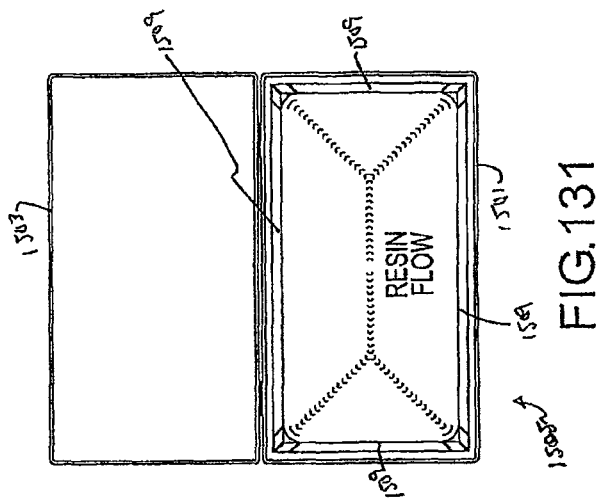
Figure 130:
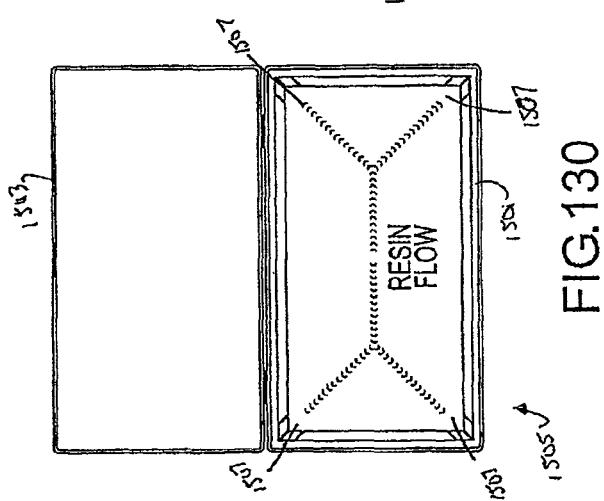
Figure 129:
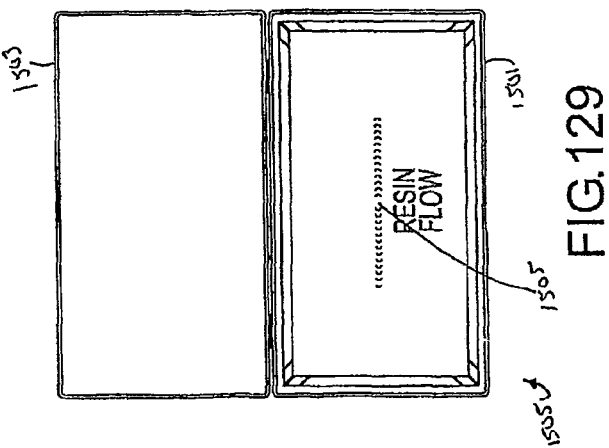

FIGS. 129-131 are top down views looking at a tray 1501 and lid 1503 combination (i.e., a "lidded tray" 1505). Moving from FIG. 129 to FIG. 131, these figures depict, in general, flow front progression during a center-point, resin-injection process. During this process, resin is injected in the center area 1505 of the tray and moves outwardly in two directions from that center point. In one embodiment, as shown in FIG. 130, the resin moving in each direction splits again and branches toward each corner 1507 of the tray. In FIG. 131, resin is accumulating in the corners and beginning to travel up the tray sidewalls 1509. One of the benefits of using this type of process is that the moving resin presses the tray against the mold or tool as the resin heads toward the edges of the tray. Since the tray is pressed against the mold in advance of the resin reaching the tray edge, "flashing" is reduced or eliminated. "Flashing" occurs when the resin escapes around a side or to some other portion of the tray to which it was not intended to reach. In other words, if a tray edge is not held firmly against a mold, the resin may escape to the "wrong side" of the tray.

Figure 132:
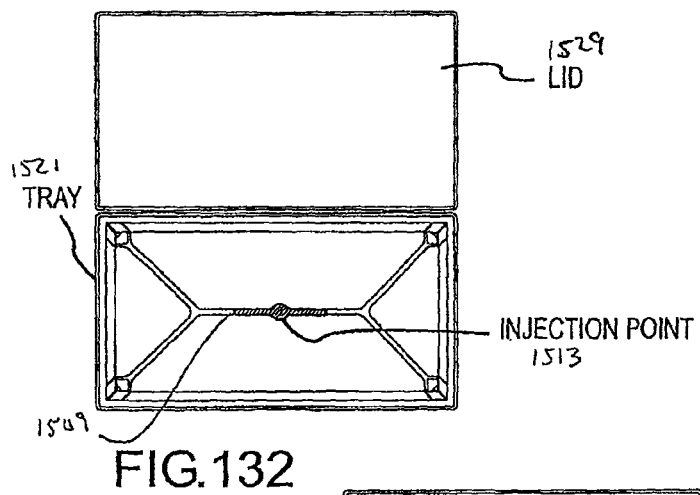
Figure 133:
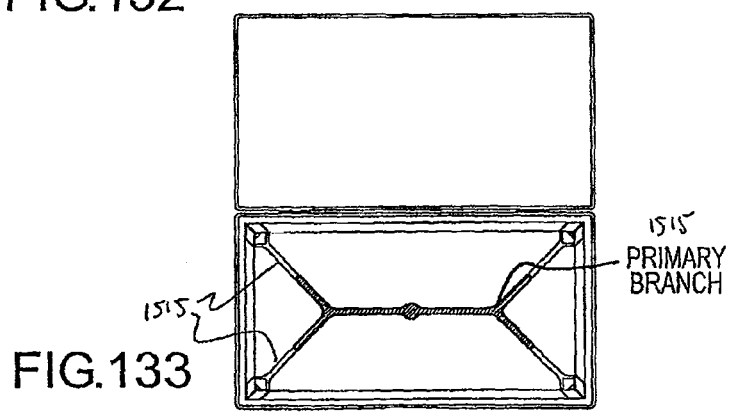
Figure 134:
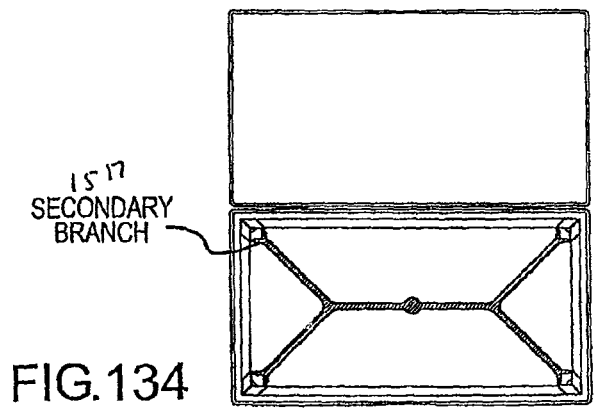
Figure 135:
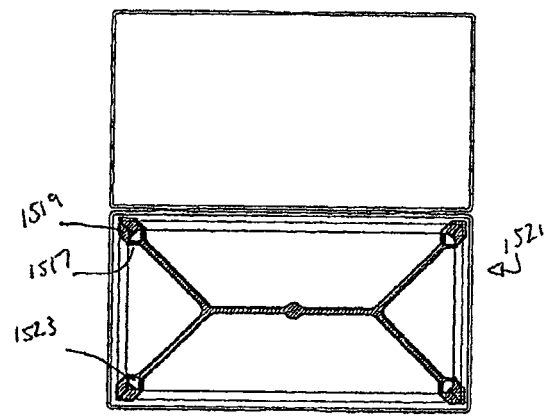

FIGS. 132-139 are similar to FIGS. 129-131, but depict in greater detail how the resin flow front 1511 may progress during a center-point 1513, resin-injection process designed to minimize flashing while encapsulating portions of a lidded tray 1521. In FIG. 132, the center-point, resin-injection process has just begun, and resin has begun to travel in opposite directions away from the injection point 1513. In FIG. 133, the resin has reached two primary branches 1515. At each primary branch, the resin flow divides, with approximately half of the resin heading toward one corner of the tray, while the other half of the resin flows toward a different corner of the tray. In FIG. 134, the resin flowing down each primary branch has reached a secondary branch 1517, where the flow is again split in this embodiment of a center-point, resin-injection process. At each secondary branch, the flow is again approximately split in half. As shown in FIG. 135, the resin, after being split at the secondary branch, is reunited before traveling up the sidewalls 1519 of the tray. The four white sections 1523 in the middle of the flow paths depicted in FIG. 135 represent areas that do not receive resin. For example, tool steel may be present at those locations, and the resin must flow around the tool steel before becoming reunited at the back side of the tool steel and then traveling up the sidewalls of the tray.

Figure 136:
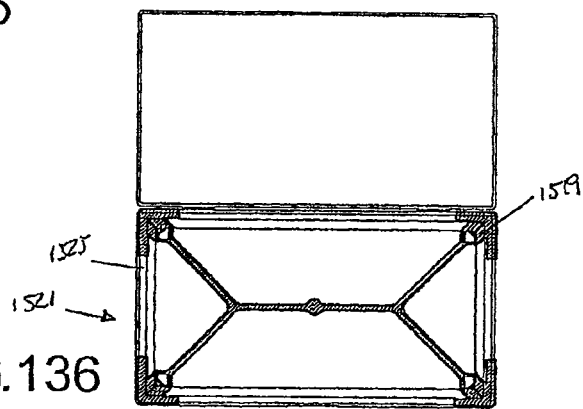
Figure 137:
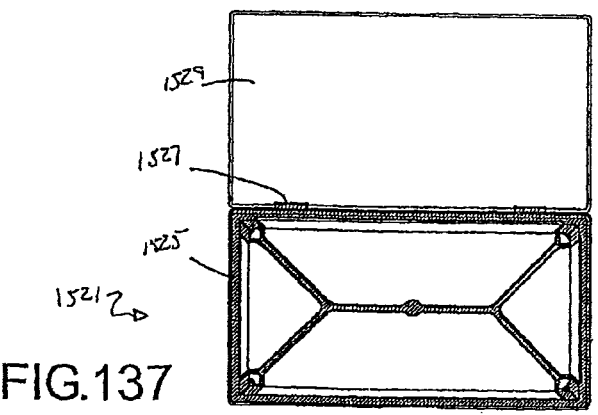
Figure 138:
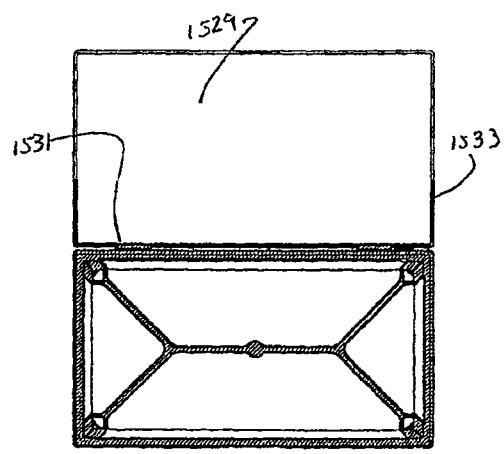
Figure 139:
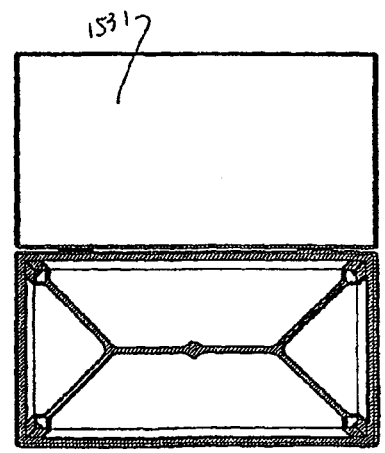
Figure 140:
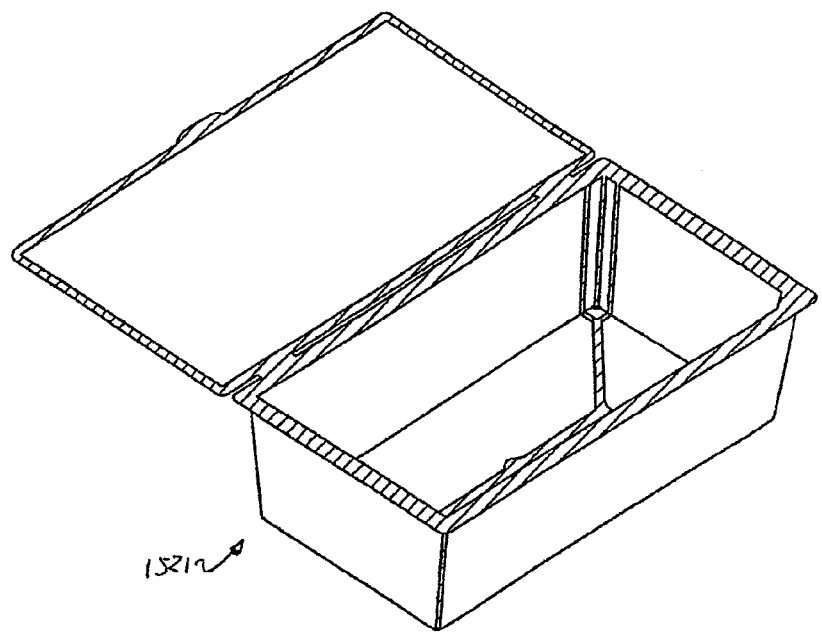

In FIG. 136, the resin has traveled up the tray sidewalls 1519 and has begun to travel around the perimeter 1525 of the tray 1521 to encapsulate the upper edges 1535 of the tray sidewalls. In FIG. 137, the entire upper perimeter of the tray has been encapsulated, and the flow is beginning to travel through the hinge regions 1527 toward the lid 1529. In FIG. 138, the resin continues to flow through the hinges, has encapsulated one long edge 1531 of the lid, and has begun to travel down the two shorter edges 1533 of the lid. In FIG. 139, the entire perimeter of the lid has been encapsulated. Finally, FIG. 140 is an isometric view of the resulting lidded tray 1521 at the end of the process depicted in FIGS. 132-139.

Figure 142:
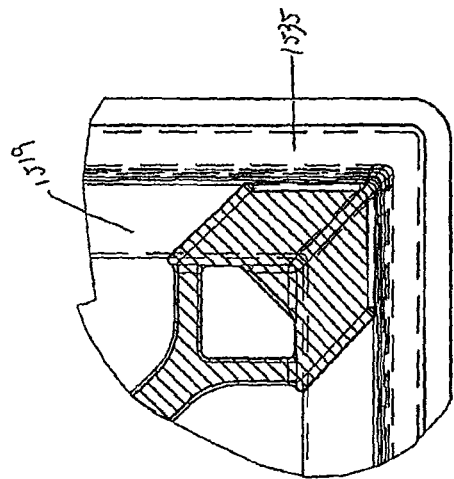
Figure 145:
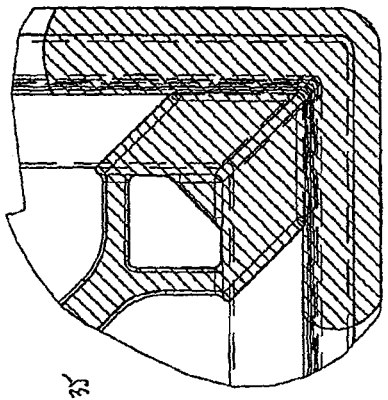
Figure 141:
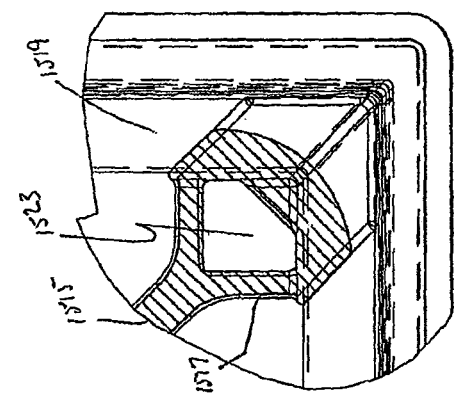
Figure 144:
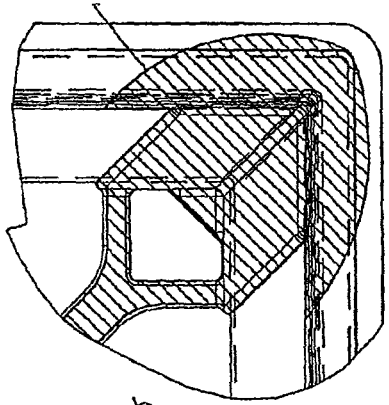
Figure 143:
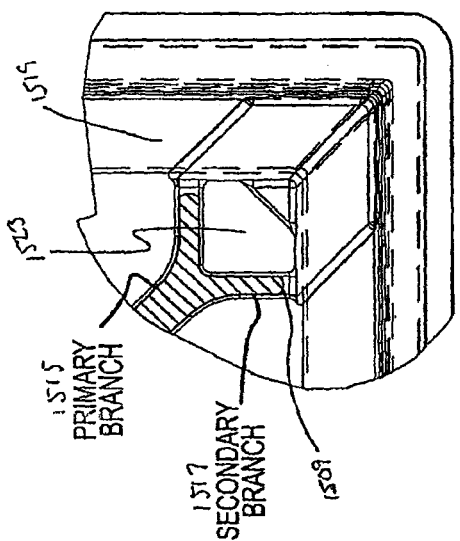
Figure 146:
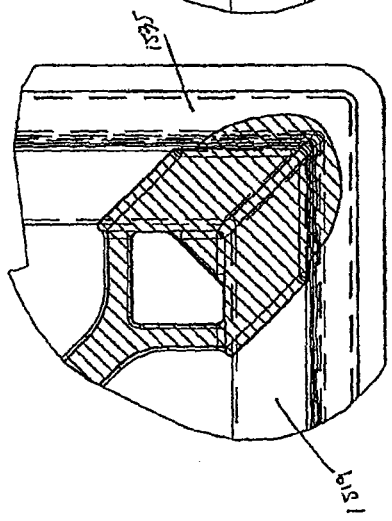

FIGS. 141-146 are enlarged, fragmentary views showing corner flow details of the flow stages also depicted in FIGS. 134-136. Again, the resin flow front 1509 progression depicted in FIGS. 141-146 is designed to prevent "flashing" of the flow front by pressing the paperboard against the tool before the resin gets to an edge of the tray 1521. As previously described and as shown in FIGS. 141 and 142, the resin must flow around tool steel 1523 before it can reunite and begin flowing up the tray sidewalls 1519 as shown in FIG. 142. In FIG. 143, the resin has reached the upper edge 1535 of the sidewalls. In FIG. 144, the resin has begun to encapsulate the upper edge of the tray sidewalls. In FIGS. 145 and 146, the progression continues and the resin flows around and encapsulates the upper edge of the tray sidewalls.

Figure 147:
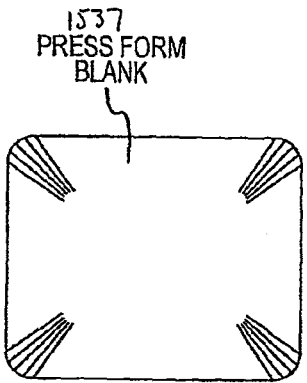
Figure 148:
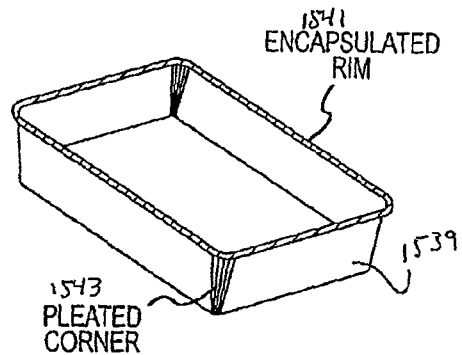

FIG. 147 is a plan view of a blank 1537 for a press-formed tray. In FIG. 148, the blank of FIG. 147 has been formed into a tray 1539 having an encapsulated rim 1541 and pleated corners 1543.

Figure 149:
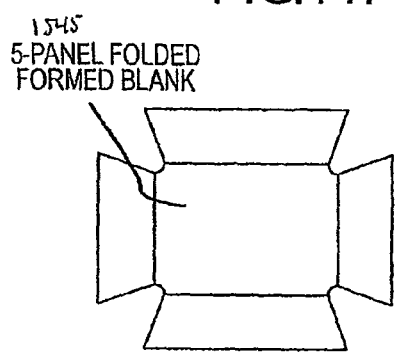
Figure 150:
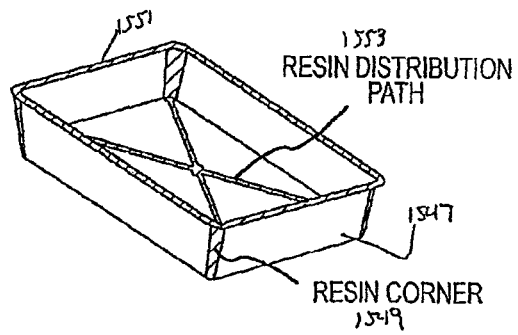

FIG. 149 is a five-panel, folded formed blank that may be used to form a tray according to the present invention. In FIG. 150, the blank of FIG. 149 has been formed into a tray 1547, and resin has been injected using a center-point, resin-injection process similar to what is depicted in FIGS. 132-139. In FIG. 150, however, the injected resin is immediately sent to each corner 1549 of the tray. After the resin forms the corners, it flows around the upper edge of the tray thereby creating an encapsulated rim 1551. The resin thus follows more of an "X" pattern 1553 than what is shown in, for example, FIGS. 132-139.

Figure 151:
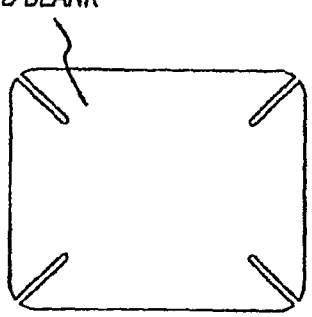
Figure 152:
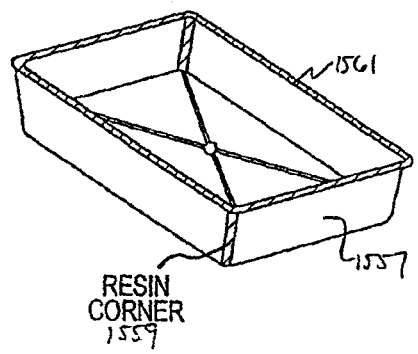

FIG. 151 is a plan view of a press-formed folded blank 1555 that may be used to make a tray according to the present invention. FIG. 152 is an isometric view of a tray 1557 formed from the blank depicted in FIG. 151 and having injected-resin features. In particular, the tray depicted in FIG. 152 has resin corners 1559 and a resin encapsulated rim 1561. Again, the center-point, resin-injection process has been used to form the tray of FIG. 152.

FIG. 153 depicts an eight-panel, rounded corner blank 1563 that may be used to form a tray according to the present invention. As shown in this figure, the blank includes a bottom panel 1565, two side panels 1567, two end panels 1569, and four corner panels 1571. FIG. 154 is an isometric view of a tray 1573 formed from the blank depicted in FIG. 153. As shown in FIG. 154, the corner panels become pleated corners 1575, each of which is straddled by a pair of resin, corner-panel seams 1577. The tray depicted in FIG. 154 is formed using a center-point, resin-injection process that is similar to the processes described above. In the process used to form the tray of FIG. 153, the resin is again immediately divided into four resin distribution channels 1579 (i.e., the "X" pattern), each of which is directed toward one of the four tray corners. Each of these four initial resin distribution channels branches adjacent to a corner at a secondary branch 1581 before traveling up the tray side walls to form the resin, corner-panel seams.

FIG. 155 depicts a web-corner blank 1583. As shown in this figure, the web-corner blank includes a bottom panel 1585, two side panels 1587, two end panels 1589 and four webbed corners 1591. From the blank depicted in FIG. 155, the tray 1593 depicted in FIG. 156 maybe formed. As shown in FIG. 156, a center-point, resin-injected process is used to form four resin corner beads 1595 and to create the encapsulated rim 1597.

FIG. 157 depicts an eight-panel, straight-corner blank 1599. This blank includes a bottom panel 1601, two side panels 1603, two end panels 1605, and four corner panels 1607. FIG. 158 depicts a tray 1609 according to one embodiment of the present invention that has been constructed from the blank depicted in FIG. 157. A center-point, resin-injection process has been used to form the tray depicted in FIG. 158. In particular, the center-point, resin-injection process used to form the tray of FIG. 154 could also be used to form the tray of FIG. 158.

The trays 1539, 1549, 1557, 1573, 1593, 1609 depicted in FIGS. 148, 150, 152, 154, 156, and 158 could be manufactured using in-mold, forming processes. In particular, the blanks depicted in FIGS. 147,149, 151,153, 155, and 157 could be both shaped (or formed) and encapsulated in one tool.

FIG. 159 is a cross-sectional view of a tray 1611 according to another embodiment of the present invention and having an encapsulated rim 1613 with a flange portion 1615 and an anchor portion 1617. In this embodiment, a resin bead 1619 has been created between adjacent tray sidewalls 1621. Although the encapsulated rim depicted in FIG. 159 does not include a lid engagement channel (see, e.g., FIGS. 102 and 103) it does include an anchor portion similar to what is described above. Encapsulated rims having other cross-sectional shapes can also be formed having similar anchor portions.

Minimizing Tray Deformation Resulting from Resin Shrinkage

Currently, the design of the tray may have the paperboard's edges encapsulated by the injection-molded resin in the injection mold tool 554 as shown in, for example, FIG. 79. When most, if not all, injection-molded resins cool, there is some shrinkage of the resin. The paperboard will not shrink at the same rate that the injection-molded resin shrinks. This situation may be remedied by sizing the paperboard blank to compensate for resin shrinkage.

The present invention addresses this problem by changing the make-up of the paperboard 610 as shown in FIG. 97. This embodiment shows the use of an extrusion laminated, or a polymer coated, paperboard, and directs the injection-molded resin 612 to the laminated or coated paperboard. The polymer 614 is a thermoplastic material that will melt and reset itself into another position. When the injection-molded resin is heated and attached to the polymer surface, the polymer will also melt. As both the injection-molded resin 612 and paperboard's polymer 614 cool together they will set into the relatively the same positions. The shrink rate of the polymers used for this product and the resins for injection molding are very comparable. The polymer 614 that is on the surface of the paperboard 610 repositions itself on the paperboard to prevent a warped or "wavy" appearance. This method works with any thermoplastic resin that bonds to the laminating film 614 or coats the paperboard 610. As shown in FIG. 97, according to this embodiment, the paperboard is not encapsulated. Some adhesive laminated polymer films employing acrylic or PET adhesive chemistry may not work in this instance, because they are not of a sufficiently thermoplastic nature.

Figure 98:
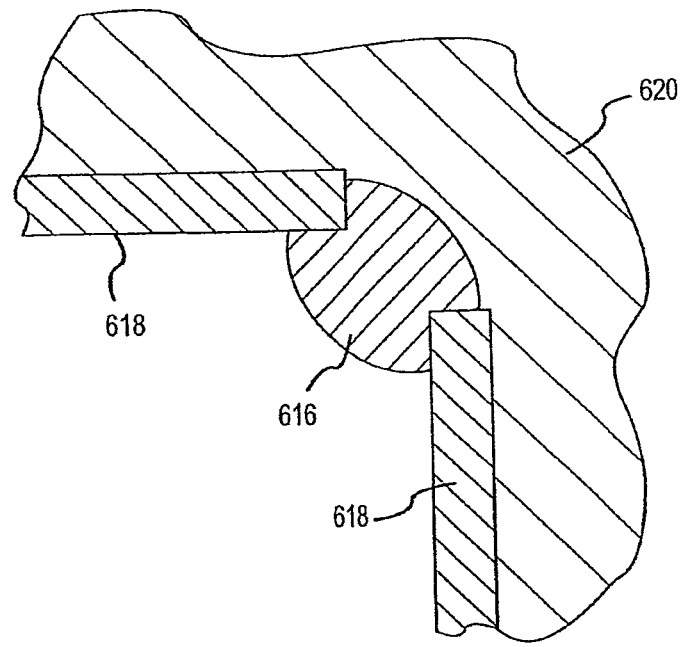
FIG. 98 depicts an embodiment of the present invention similar to the embodiment depicted in FIG. 43, but wherein the mold cavity has been modified to ensure that the injection-molded resin remains inward of the outer surface of the panels comprising the tray.

As shown to good advantage in FIGS. 38, 42, and 44, when injection-molded resin is used to join adjacent sidewalls in, for example, a five-panel tray 434, the injection-molded resin 456 may extend past the exterior surface of the sidewalls. It may be desirable for certain applications to prevent this from occurring, thereby improving the appearance of the tray by placing or bonding the injection-molded resin 456 only on the interior surface of the tray 434. As shown in FIG. 45, for example, the injection-molded resin 464 has been prevented from taking the configuration depicted in FIG. 44, and it remains flush with the outside surfaces of the panels comprising the tray. In FIG. 43, the mold has been modified so that the polymer 458 takes a curved configuration as it joins the outer surface of the panels comprising the sidewalls of the tray. Finally, in the embodiment depicted in FIG. 98, the mold cavity 620 has been modified to ensure that the injection-molded resin remains inward of the outer surface of the panels 618 comprising the tray and, as shown in this figure, follows an arcuate contour between adjacent tray panels. Further, as shown in FIG. 98, the recessed area in the mold cavity 620 helps to ensure that the injection-molded resin 616 stays to the inside of a paperboard tray. This also permits the sidewalls of the tray to slide into the mold until they seat properly in the recesses of the mold cavity 620.

In the embodiment depicted in FIG. 98, the paperboard 618 is not fully encapsulated. It may be desirable to avoid encapsulating the paperboard when injection molding, for example, sealing and locking mechanisms.

Additionally, the injection-molded resin may be impregnated with glass or fiberglass fibers to assist in minimizing deformation due to resin shrinkage. With glass-reinforced polymers, glass fibers are chopped to a small size and mixed directly with the polymer in a compounding step. When glass fibers of a particular configuration (length and diameter combination) are added to the polymer in a particular ratio, the glass-reinforced polymer actually requires less pressure to flow through the tool. The glass fibers change melt elasticity causing the combined material to be less "stretchy." When the material is less "stretchy," it takes less energy (pressure) to move the material through the mold. However, even though less pressure may be required to inject resin into the injection cavity, the resin flow is generally slower along the cavity due to the embedded glass fibers.

On the other hand, if the wrong glass fiber length and diameter combination is selected or if too much glass fiber is added to the polymer, the performance in the tool degrades. (When long fibers are used, that affects the flow of the polymer since the long fibers cannot pass through the narrow channels in the mold, which increases the cycle time for the production.

Tool Deformation

Figure 99:
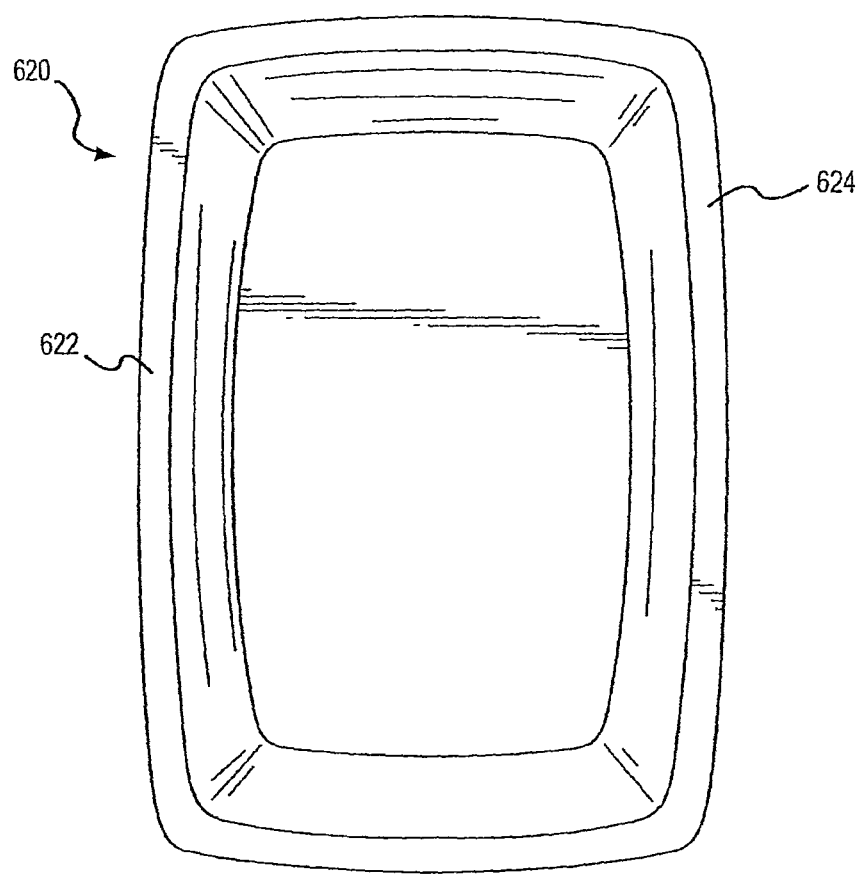
FIG. 99 is a top-down view of a tray having outwardly deflected precurved sidewalls and an outwardly deflected precurved rim.

Another aspect of the present invention involves the formation of a tray 620 that is distorted or "overmolded" to compensate for the shrink factor of the resin used for the encapsulated rim. Such a tray is shown in FIG. 99. Generally, the resin used for injection molding will experience some degree of shrinking as the formed resin cools. The degree of shrinkage for a particular resin is referred to as the "shrink factor." For example, a high flow nylon 6/6 resin has an average shrink factor of 0.014 inch/inch (in/in) in the direction of flow for a 0.10 inch thick formation under typical forming conditions.

Various embodiments of the present invention discussed herein may employ any number of resins in the formation of an encapsulated rim, whether precurved or not, such as amorphous polymer and crystalline polymer type resins. The following table illustrates some resins that may be employed in embodiments of the present invention. The table also illustrates the shrink factor of the resins, the melting temperature of the resins, and the heat distortion temperature ("HDT") of the resins.

TABLE 1

| Resins | | | |
|---|---|---|---|
| Resin | Shrink Factor | Melting Temperature (F.) | HDT (F.) |
| Acylonitrile Butadiene styrene ("ABS") | 0.003-0.009 | 425-500 | 180-195 |
| Acetal | 0.015-0.023 | 400-440 | 200-300 |
| Acrylic | 0.002-0.008 | 425-440 | 180-200 |
| Nylon 6 | 0.01-0.025 | 450-550 | 250-300 |
| Nylon 6/6 | 0.01-0.022 | 520-560 | 430-460 |

TABLE 1-continued

Resins

| Resin | Shrink Factor | Melting Temperature (F.) | HDT (F.) |
|---|---|---|---|
| Polycarbonate | 0.005-0.008 | 530-610 | 250-280 |
| Polypropylene | 0.009-0.029 | 375-525 | 220-250 |
| Polyester PBT | 0.017-0.023 | 480-500 | 250-300 |
| Polyester PET | 0.017-0.023 | 540-570 | 400-460 |
| Liquid Crystal Polymer | 0.003-0.005 | 640-680 | 530-580 |

Other suitable resins include polystyrene, polyvinyl chloride, styrene acrylonitrile, and polyethylene.

As discussed above, various embodiments of the present invention involve an encapsulated rim or flange. In accordance with one embodiment of the present invention, a tool is configured so that an encapsulated rim or flange type tray 620 formed will have distorted or curved sidewalls 622 and a distorted or curved encapsulated rim 624. FIG. 99 is a top view of a tray having outwardly deflected precurved sidewalls and an outwardly deflected precurved rim. In this example, the tray includes an encapsulated rim employing a nylon 6/6 resin. Without precurving the sidewalls, a formed tray (after adding injection-molded features) may exhibit somewhat inwardly curved sidewalls. To compensate for the inwardly curved sidewalls and the shrink factor of the nylon 6/6 resin, in one particular implementation, the sidewall and rim along the width of the tray has an outward deflection of about 0.018 inches, and the sidewall and rim along the length of the tray has an outward deflection of 0.03 inches. Besides the shrink factor of the resin used in the encapsulated rim and the inward deflection tendency of the sidewalls, the amount of deflection of the sidewalls of the tray also relates to the length of the sidewalls, the temperature of the mold and the dwell time during formation, and other factors.

In one embodiment, the tray 620 is not precurved, but instead is biased into having curved sidewalls substantially like those shown in FIG. 99 by bowing or curving the mating surfaces of the core 604 and cavity 606 of the injection-molding tool 562 (either the tool shown in FIGS. 93-96 or in FIG. 76). When the tray 620 is press-formed in the injection-molding tool 562, the curved tool surfaces impart the curvature of the mating surfaces to the tray sidewalls 622. Such a method of biasing the tray sidewalls 622 is especially useful where the tray 620 is both press-formed and provided with one or more injection-molded features 624 in a single machine 562.

The paperboard material used to form the tray 620, and particularly the sidewalls 622 of the tray, does not shrink when removed from an in-mold press forming tool 562. However, the polymer of the encapsulated rim 624 will experience some degree of shrinkage depending on the shrink factor of the resin used. As the encapsulated rim 624 cools and shrinks, it will deflect inwardly. The encapsulated rim at least partially encompasses the paperboard flange, and the paperboard flange is integral with outwardly precurved paperboard sidewalls 622. Thus, as the encapsulated rim 624 deflects inwardly, it causes the inward deflection of the outwardly precurved sidewalls 622. When the polymer forming the encapsulated rim has cooled and is no longer shrinking, the sidewalls 622 and rim 624 of the container 620 will be substantially straight. Accordingly, the precurvature or bias imparted to the tray sidewalls 622 offsets the warping or deflection otherwise caused by the cooling, shrinking resin.

Blank Stabilization Using One or More Articulated Sections

FIG. 160 is a schematic, cross-sectional view of a typical prior art forming tool 1623 having a core 1625 (or punch) and a cavity 1627 (or die). A gap is defined between the core and the cavity. A tray would be inserted in the gap before the core is moved toward the cavity to hold the blank during an injection-molding process. Using the forming tool depicted in FIG. 160, it is possible that the tray may shift leftwardly or rightwardly in FIG. 160 leading to potential problems. For example, if the tray were to shift leftwardly in FIG. 160, the left flange of the tray may end up longer than the right flange of the tray, and the tray height may be affected. The invention described in this section provides improved positioning of a paperboard blank or formed tray onto the core of an injection mold, which has a tight shutoff (clearance) in the upper area of the mold. It is desirable to provide an articulated section or sections in the bottom of the cavity to push the bottom area of a blank or preformed tray onto the core of an injection-molding tool, which requires a tight upper sidewall clearance.

FIG. 161 is a schematic, cross-sectional view of a forming tool 1631 incorporating single stage cavity articulation. The articulated section 1633 grabs the bottom and lower sidewall of the tray 1635 as the core approaches the cavity, before the tray becomes fully seated in the closed tool. This creates a more positive way to position the tray in the tool. For example, since press-formed trays have variable thicknesses in the pleats (e.g., plus or minus 30%), the tray may get shifted leftwardly or rightwardly as the core pushes toward the cavity, depending upon how the pleat thicknesses are distributed around the lower portion of the tray. In the embodiment of FIG. 161, the articulated section grabs the bottom and lower sidewall of the tray as the core approaches the cavity. Thus, the articulated section depicted in FIG. 161 allows more positive positioning of the tray in the tool, which allows, for example, for more precise control of the tray depth. Without being able to thus control the point in the closing cycle when the tray is pinched, the tray may get pushed around, which can cause asymmetrical flanges and lead to inconsistent tray heights. If a tray flange shifts too far either leftwardly or rightwardly (as shown in FIG. 161), it may be impossible to cover the end of the flange with injected-resin material, resulting in paperboard at the edge of the flange. In FIG. 161, the articulated section pushes the blank on other core as the core approaches the cavity. The articulated section subsequently descends to the bottom of the cavity, possibly under the influence of a hydraulic-loaded or spring-loaded system.

FIG. 162 is a schematic, cross-sectional view of a forming tool 1637 incorporating a multi-stage cavity articulation. In this embodiment, as the core 1639 approaches the cavity 1641, dual articulation occurs. A first articulated section 1643 grabs only the bottom, flat area of the tray 1645 as the core drives the tray toward the cavity. This helps stabilize the tray's position in the tool. As the core continues to travel toward the cavity, the first articulated section travels downwardly, moving relative to a second articulated section 1647. Upon sufficiently pressing the core toward the cavity, the second articulated section eventually begins to grab the lower portions of the sidewalls of the tray. Thus, the tray is initially stabilized by the first articulated section and then is further stabilized by the second articulated section. This multi-stage cavity articulation results in more accurate tray positioning within the tool.

FIG. 163 is a schematic, cross-sectional view of another embodiment or forming tool 1649 according to the present invention. This forming tool uses single-stage cavity articulation at the bottom of the tray 1651 only. Thus, the articulated section 1657 depicted in FIG. 163 grabs the tray bottom as the core 1653 is driven toward the cavity 1655, thereby stabilizing the tray in the tool. In this embodiment, the articulated section in the female cavity is larger (wider) than the bottom of the tray. When the mold is fully closed, the side corners 1659 are not compressed, which allow the tray to slightly bulge out at full closure.

By properly controlling the clearance, the shape of the articulated section or sections, the downward force driving the core toward the cavity, and the speed at which the core is driven toward the cavity, among other parameters, it is possible to accurately control the tray formation and subsequent encapsulation.

Manufacture of a Reusable, Dishwasher Safe Package Having a Paperboard Base and Susceptor Layer The following steps may be performed to manufacture a reusable, dishwasher safe package with a paperboard base and susceptor layer:
  i) Laminate film (or extrusion coat paperboard) on one side. The paperboard or film may be printed.
  ii) Manufacture a susceptor film/foil structure (such as the previously-mentioned MICRO-RITE structure) in the commercially known process.
  iii) Laminate the susceptor film/foil structure to the second side of the paperboard from step (1).
  iv) Die cut a package blank from the step (3) material.
  v) Optionally heat plasticize the step (4) blank.
  vi) Fold or press-form the step (5) blank into a three-dimensional package shape.
  vii) Injection-molded plastic that encapsulates the unprotected edges of the step (6) package.

The resulting package is protected on both sides and along all edges by a plastic film, coating, or injection-molded resin. The plastic renders the paperboard moisture resistant and thus dishwasher safe. Further, the susceptor layer imparts desired focusing capabilities for microwave use.

Cored Encapsulated Flanges

In many cases, preventing resin from flowing to specific areas of an encapsulated rim 630 or other feature may reduce the overall weight of the finished tray, as well as aid in limiting flex and movement of the encapsulated rim. This process is referred to as "coring" the rim. Coring may be accomplished by adding one or more raised spaces to portions of the shut-off walls 564 of the tool 562. Generally, the raised spaces correspond to points 632 along the encapsulated rim where no resin is desired. The raised portion of the injection-molding tool 562 wall prevents resin flow to the portion of the tray 626,628 overlaid by the raised portion.

FIGS. 100 and 101 depict two examples of trays 626,628 having cored encapsulated rims 630.

Co-Extrusion

FIG. 174 depicts a folded-style, injection-molded polymer paperboard composite package 1359 manufactured using a co-extrusion injection-molded process for improved gas barrier properties.

In the co-extrusion injection molding process, multiple polymer resins are separately melted and then extruded into a manifold where they are combined for co-extrusion in laminar flow fashion. The co-extrusion of laminar flow is directed from the manifold to the injection mold cavity where the co-extrusion is bonded to the paperboard forming the finished composite container.

The co-extrusion laminar flow ensures that the barrier polymer layer forms a continuous gas barrier at the joints and in the flange area of the composite container, if it is shaped into a tray configuration.

The individual polymer resins are selected for the properties they contribute to the co-extruded polymer product. Thus, at least one of the polymers is selected for its gas barrier properties, for example, low permeability to oxygen and carbon dioxide. Nylon 6, Nylon 6,6, Polyvinylidene chloride, and ethylene vinyl alcohol are examples of high oxygen barrier polymers. Other polymers are selected for co-extrusion which have other properties, such as increased adhesion to the gas barrier polymer, increased adhesion to the paperboard, low temperature durability, high temperature resistance, or low cost. Examples are polyolefins, such as polyethylene or polypropylene. There are many known examples of polymer co-extrusion combinations in the flexible film industry.

Rounded Corners

Referring again to FIG. 174, aesthetic quality of the composite injection-molded paperboard container 1359 can be improved by providing smooth rounded injection-molded polymer corners 1661. This is accomplished by adjusting the paperboard tray blank by reducing the length of the upright wall panels 1663 to less than the length of the adjacent bottom panel 1665. In addition the corners of the bottom be can be radiused.

When the five-panel tray blank, previously discussed, is held in a three-dimensional folded state inside the injection mold tool, injection-molded polymer is formed into a tapering curve to fill in the corner 1661 of the composite tray. A container thus formed will have a smooth tapered corner as shown in FIG. 174, which is aesthetically pleasing. A non-tapered version is also possible. FIG. 175 is an enlarged, fragmentary cross-sectional view of a portion of FIG. 174.

Supporting Ribs

Another type of injection-molded stiffening feature is supporting ribs 1667 like those depicted in FIG. 176. In particular, the structural integrity of packages 1669 like that shown in FIG. 174 can be enhanced without compromising the aesthetics of the package by placing injection-molded supporting ribs on the inside of the package as shown in FIG. 176. As shown in FIG. 177, the supporting ribs need not be visible from outside the package. The injection-molded ribs will bond to the polymer film 1671 that has been laminated to the paperboard in the tray interior. The combination of the injection-molded supporting ribs and inside laminated film gives enough package strength to preclude the use of a higher basis weight board. The use of a lower board weight allows for a lower price package.

Figure 182:
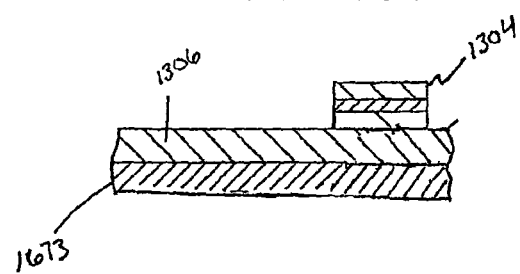

FIGS. 178-182 depict examples of cylindrical containers 1301,1673 that can be made with the same technology. The cylindrical container of FIG. 178 may include a connecting rib FIG. 182 is a cross-sectional view of the cylindrical container 1673 of FIG. 181, taken along line 182-182, and showing another supporting rib 1304 bonded to a film 1306 affixed to the interior of the paperboard container 1673.

Compartmented Trays

Multiple deep or steep food compartments that keep several food items separated are difficult to make by press-forming a paperboard container. Injection-molded dividers can be added to the inside surface of a single-compartment container to divide it into multiple compartments. These dividers can join an injection-molded rim around the outer perimeter of the container.

By combining injection molding with paperboard lamination, it is possible to create packages that have different characteristics in different compartments of the same tray. FIGS. 184 and 185 depict an example of a compartmented tray 1675 according to the present invention. In the depicted tray, it is unnecessary to use internal secondary packages 1677 like those shown in the prior art compartmented tray 1679 depicted in FIG. 183. FIG. 183 is an open package revealing compartments including a first compartment 1681 with curved sidewalls surrounding a cylindrical, secondary container (e.g., a dip tub) within the first compartment, and a second compartment 1683 having a soft-sided secondary package (e.g., a chip bag) in it. In this prior art package, where different compartments do not have different characteristics, it is necessary to use internal secondary packages, in this case the chip bag and the dip tub.

In the present invention 1675, each compartment 1685 can include a microwave interactive material (e.g., susceptor laminated paperboard) that is unique to the specific type of food to be stored in that compartment of the container. Thus, a single paperboard container could include a plurality of different microwave interactive materials, each designed to most-effectively heat the specific food item associated with it.

Finally, alternate embodiments may make use of interior dividers 1687 without coating the entire interior surface in a plastic. Rather, the interior dividers may be molded uniformly with an encapsulated rim 1689. In this manner, many different types of trays may include dividers. For example, a tray with an interior susceptor layer, or a controlled microwave-heating layer, may also have an interior divider. Further, the tray may have different susceptors or susceptor thicknesses on each side of the divider, thus changing the microwave heating characteristics to optimally heat different types of food separated by the divider.

The number of films in the marketplace makes the potential number of compartmented trays nearly endless. Also a hinged lid or another lid (lids are discussed further elsewhere herein) could be made of a lid film that matches the tray film.

Windows

FIG. 187 depicts a sample container 1375 with a pair of windows 1691 in the tray lid. Such windows could also be formed in the tray sidewall 1693. All of the configuration depicted in FIGS. 186-190 could be modified further by adding a window feature into the lid or sidewall.

Incorporation of Eating/Serving Utensils

Another feature which may be incorporated to enhance products made according to the present invention is depicted in FIGS. 191 and 192. FIG. 191 is a plan view looking at the inside surface of a lid 1695 that incorporates a two-piece, break-out serving utensil 1697. As depicted in FIG. 191, the handle portion 1701 of the break-out spoon 1697 and the serving portion 1699 of the break-out spoon can be directly incorporated into the container lid. As shown in FIG. 192, which is a plan view of the outer surface of the lid depicted in FIG. 191, a sealing film 1703 is fixed over the break-out serving utensil to allow the container on which the lid is placed for sale to a consumer to be hermetically sealed. According to the lid embodiment depicted in FIGS. 191 and 192, injection-molded resin is used to create the primary lid surfaces as well as the break-out serving utensil.

Easy-Opening Features

FIG. 193 depicts an easy-opening feature comprising an extended tab 1705 on both the lid and tray. The lid's tab 1705 when molded will have a lower caliper area 1707 as shown. When the consumer lifts on the tab to open the container, the tab will bend in this area and help impart a higher opening force on the sealed area between the lid and tray, helping to release the lid from the tray.

FIG. 194 is a cross-sectional view of the tab 1705 of FIG. 193, showing the score line 1709 defining the lower caliper area 1707.

FIG. 195 depicts a tray 1709 and lid 1711 sealing and locking mechanism 1713, including an easy-open, raised sealing ridge 1715n on the tray flange 1717. When the lid and tray are pressed together to create the seal, the raised ridge acts as a seal area limiter to help control the amount of surface area that actually gets sealed. The amount of surface area that actually gets sealed and the amount of opening force necessary to break that seal are directly related. The easy-open, raised sealing ridge on the tray flange results in a package that is easy to open, but yet retains enough surface area on the flange to maintain a locking mechanism and hermetic seal.

As shown in FIG. 196, injection-molded/paperboard composite trays 1719 may look warped or distorted or have "wavy" sidewalls 1721 when finished or formed. This unappealing look can most likely be explained by the differences in the inherent nature of injection-molded resin and the paperboard. Currently, the design of the tray preferably has the paperboard's edges 1723 encapsulated by the injection-molded resin in the injection mold tool as shown in, for example, FIG. 79. When most (if not all) injection-molded resins cool there is some shrinkage of the resin. The paperboard will not shrink at the same rate that the injection-molded resin shrinks. Therefore, the "wavy" or distorted appearance seen in FIG. 196 results. The prior art attempts to remedy this situation by sizing the paperboard blank to compensate for resin shrinkage.

The present invention addresses this problem by changing the make-up of the paperboard as shown in FIGS. 97 and 198, which show the use of an extrusion laminated, or a polymer coated, paperboard 1725 and directing the injection-molded resin 1727 to the laminated or coated paperboard. As shown in FIG. 197, the resulting composite tray is without distortion or a "wavy" appearance. The polymer is a thermoplastic material that will melt and reset itself into another position. When the injection-molded resin is heated and attached to the polymer surface, the polymer will also melt. As both the injection-molded resin and paperboard's polymer cool together they will set into the relatively the same positions. The shrink rate of the polymers used for this product and the resins for injection molding are very comparable. The polymer that is on the surface of the paperboard repositions itself on the paperboard to prevent the warped or "wavy" appearance. This/method works with any thermoplastic material that bonds on the laminating film or coats the paperboard. As shown in FIGS. 97 and 198, according to this embodiment, the paperboard is not encapsulated. Most adhesive laminated polymers employing acrylic or PET chemistry will not work in this instance because they are not of a thermoplastic nature.

As shown to good advantage in FIGS. 38, 42, and 44, when injection-molded resin is used to join adjacent sidewalls in, for example, a five-panel tray, the injection-molded resin may extend past the exterior surface of the sidewalls. It may be desirable for certain applications to prevent this from occurring, thereby improving the appearance of the tray by placing or bonding the injection-molded resin only on the interior surface of the tray. As shown in FIG. 45, for example, the injection-molded resin has been prevented from taking the configuration depicted in FIG. 44, and it remains flush with the outside surfaces of the panels comprising the tray. In FIG. 43, the mold has been modified so that the polymer takes a curved configuration as it joins the outer surface of the panels comprising the sidewalls of the tray. Finally, in the embodiment depicted in FIG. 98, the mold cavity has been modified to ensure that the injection-molded resin remains inward of the outer surface of the panels comprising the tray and, as shown in this figure, follows an arcuate contour between adjacent tray panels. Further, as shown in FIG. 98, the recessed area in the mold cavity helps to ensure that the injection-molded resin stays to the inside of a paperboard tray.

In the embodiment depicted in FIG. 98, the paperboard 1731 is not fully encapsulated. It may be desirable to avoid encapsulating the paperboard when injection molding sealing and locking mechanisms. For example, in the sealing and locking mechanism depicted in FIG. 195, the paperboard has been encapsulated. Similarly, as shown in FIG. 201, the paperboard 1733 comprising the lid 1735 has been encapsulated. In the embodiment 1737 depicted in FIG. 202, on the other hand, the injection-molded feature 1739 on the lid 1741 does not encapsulate the paperboard 1743 comprising the lid. Rather, the injection-molded feature has been moved to the lower surface 1745 of the lid and has been moved inward of the outer end of the lid to provide a mold clamp off area. Similarly, on the flange 1747 of the tray depicted in FIG. 202, the injection-molded feature 1749 sits on the upper surface of the flange, away from the outer edge of the tray, to again provide a mold clamp off area. The flange and clamp-off features are needed to ensure that the position of the injection-molded resin is proper in relation to the paperboard. FIG. 203 depicts an alternative embodiment 1751 wherein an injection-molded piece 1753 is again attached to the lower surface of the lid 1755, and a complimentary injection-molded piece 1757 is attached to the flange portion 1759 of the tray. When the lid is pressed downward in FIG. 203, the bottom portion of the injection-molded piece attached to the under surface of the lid extends below the flange of the tray, and a protruderance on the inward surface of the injection-molded piece attached to the under surface of the lid locks into a complimentary indented region on the outer facing surface of the injection-molded piece attached to the upper surface of the tray flange. A seal is thus affected between the lower surface of the lid and the upper surface of the injection-molded piece attached to the tray flange.

FIGS. 204-235 depict a folded, paperboard tray 1761 that has a flange 1763 extending outwardly from the sidewall 1765. The addition of this outwardly-folded flange enhances the ability to injection mold an encapsulated rim 1769 onto the tray. The injection mold tool clamps onto both sides of the outwardly-folded paperboard flange, which permits more efficient control of the flow of molten polymer. FIGS. 209-213 depict an alternate embodiment 1767 of the tray 1761 shown in FIGS. 204-208. FIGS. 214-216 depict trays 1761, similar to those shown in FIGS. 204-208, nested within one another. The encapsulated rim 1769 may enhance denesting operations.

In the embodiments depicted in FIGS. 202,203, and 204-235, the folded tray may be composed of any type of paperboard (e.g., SBS, SUS, Kraft, CRB), printed or plain, that is adhesively laminated or extrusion coated with a polyolefin material or any other material such as paper, another paperboard, CPET, or the like.

Venting Feature

According to yet another embodiment of the present invention, a venting feature 1771 like that depicted in FIGS. 199 (in top view) and 200 (in partial cross-section) may be incorporated into the package 1773. In this embodiment, a recessed area or micro channel is formed in the flange 1775 to allow for pressure equalization of the package. This recessed area may be clearly seen in FIG. 199, which is a plan view looking downwardly on a tray incorporating this venting feature. As depicted in FIG. 200, which is a fragmentary, cross-sectional view of the portion of the flange that incorporates the venting feature, the mold included a protruding portion that prevented resin from being deposited during the injection-molded process at this location on the flange. Thus, once a lid film is attached to the completed tray, an opening from the inside of the tray to the outside of the tray remains present. This venting feature makes it possible for the pressure in the package to equalize with the atmospheric pressure when the package is being transported over a mountain pass, for example. The venting feature includes one or more micro channels in the flange, each configured to permit gas pressure equalization and to prevent liquid leaks from the package.

FIGS. 217-221 depict a lid 1777 having a pull tab 1779 formed by injection-molded resin. The pull tab may facilitate removing the lid from a tray 1781 (shown in FIG. 22), where the lid encloses an encapsulated feature 1783 such as a protrusion defined in the lid (FIG. 219), or nests within a channel on the tray. FIG. 219, for example, is a detailed view of the end of the pull tab. FIG. 220 is an end view of the lid showing the pull tab, while FIG. 221 is a side view of the lid.

Figure 222:
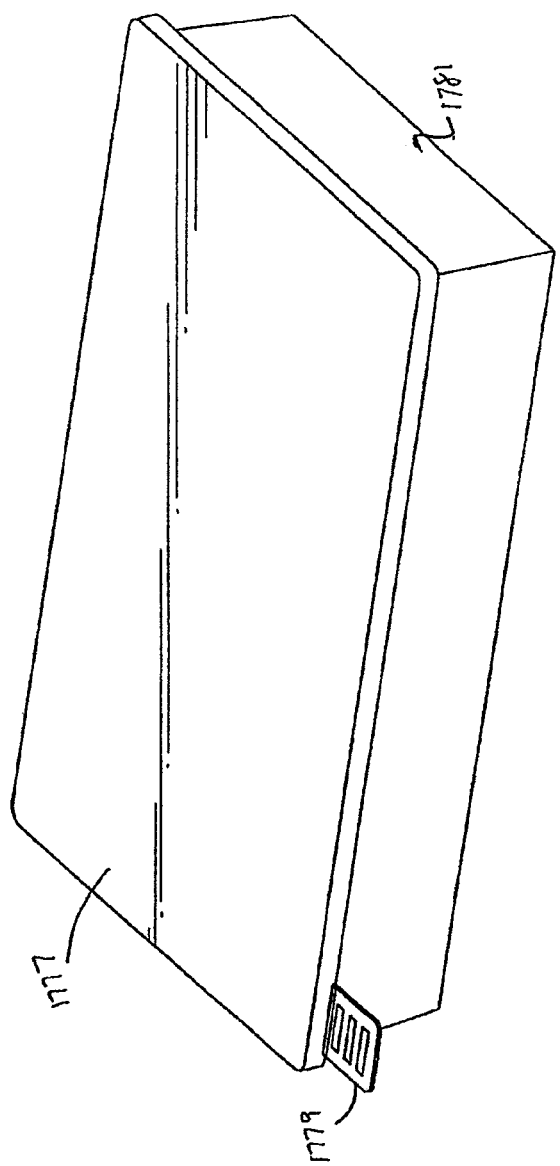
Figure 229:
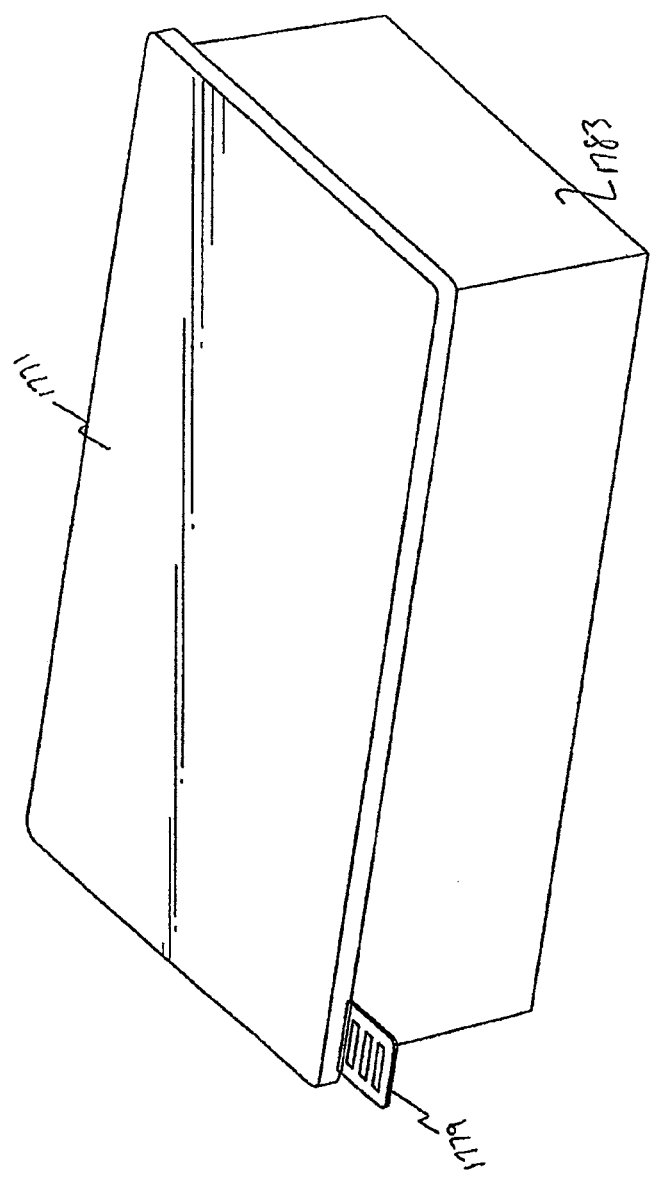

FIGS. 222-228 depict the aforementioned lid 1777 and pull tab 1779 affixed to a tray 1781. For example, FIG. 222 is an isometric view showing the pull tab projecting outwardly from the lid and extending beyond a sidewall of the tray. FIG. 225 is a detail view of the lid enclosing the encapsulated flange of the tray, and a male protrusion nesting within a receiving channel within the flange.

FIGS. 229-235 depict the aforementioned lid 1777 and pull tab 1779 affixed to a second tray 1783 of differing depth.

General Remarks

The trays used in the above embodiments may be formed by a variety of methods, including folding, press-forming, and injection molding.

The present invention can be used to make a broad range of containers, including deep, rectangular containers for frozen foods; shallow round trays (e.g., pizza trays); disposable paper plates; and cylindrical containers or cups.

In all of the above applications and embodiments, the plastic used is selected with the end use service temperature of the tray in mind. For example, trays intended for food preparation in a conventional oven could use a PET polyester rim, and trays intended for use at room temperature could use a high-density polyethylene rim.

Further, for a tray to be heated in a conventional or microwave oven, the tray material and the encapsulated rim must be heat resistant to a high temperature. Generally, both the tray and encapsulated rim, when accompanied by a food load, may withstand temperatures up to about 425° F. for approximately thirty minutes without charring, warping, or losing structural integrity. Where a tray is intended for use in a microwave oven, a metallic susceptor layer may be added to the interior of the tray to focus microwave radiation on certain portions of the contents, thus speeding up the cooking process. Also, interactive foil circuits (e.g., aluminum circuits) may comprise part of the tray to control microwave power distribution in foods. Examples of metallic susceptor layers include the QWIK-WAVE and MICRO-RITE products available from Graphic Packaging Corporation of Golden, Colo. Alternate embodiments may have different heat tolerances, depending on the final application intended for the embodiment.

Generally, the encapsulated rim features discussed above are made of a polyolefin, such as polyethylene or polypropylene; nylon; polyester; polycarbonate; or other engineering grade resin. In some embodiments described above, the injected material also may be nylon. Nylon is used due to its relatively inexpensive manufacturing costs (e.g., nylon is cheaper than polyester) and its ability to survive in high temperatures, such as those found in a conventional oven. In other embodiments herein described, a polyvinyl dichloride such as SARAN may be used. In yet other embodiments, other barrier materials, such as EVOH, may be employed, or a mixture of barrier materials may be used. By creating a flange, tray lining, or partial tray encapsulation as well as a fitted lid or film containing SARAN or another polyvinyl dichloride, a package having good hermetic sealing capabilities may be achieved through the intermolecular mixing of the encapsulating and lidding materials. In yet other embodiments that will be subjected to high heat, polyester may be used. In still other embodiments, such as those intended for microwave use, polypropylene is used as the encapsulating or injection-molded material.

Further, high-stiffness resins, including glass-reinforced (or glass-fiber stiffened) polymers, may be used as the injectant, providing at least the following several benefits:

(1) reinforcement-glass-reinforced polymers are stiff for their weight and volume;
(2) stronger part with less part weight;
(3) the injectant flows better in the tool, better distributing itself in a shorter cycle time;
(4) glass-reinforced polymers reduce part shrinkage and warpage on cooling (NB: the prior art, which recognized the problem of warpage on cooling, used predistortion of the mold and other techniques to accommodate or account for shrinkage and warping. Thus, they recognize the problem but address it differently);
(5) they are approved for food contact;
(6) they are GRAS (generally recognized as safe);
(7) they are ovenable (conventional or microwave); and
(8) they can be combined with polypropylene, nylon, polyethylene, and other polymers.

Alternate materials may be used to either construct the tray or flange, or to create the encapsulated rim, without departing from the spirit or scope of the present invention. For example, a metallic susceptor may be used to construct a microwave tray, while a temperature-resistant material might be used to form an ovenable tray. Similarly, different types of plastic, such as nylons or polyesters, may be used to create the encapsulated rim. The encapsulated rim may be of any color desired, or may be clear or translucent.

CONCLUSION

As can be seen, the present invention provides many advantages over the prior art. Additional embodiments and advantages will occur to those skilled in the art upon reading this disclosure. Further, the present invention may be modified in many different ways without departing from the spirit or scope of the invention as set forth in this disclosure. For example, different tray shapes may be used, or different materials employed, to create the tray body or the rim feature. As an additional example, the encapsulated rim may be provided with a step or groove located on the top or bottom surfaces or the outer edge in order to provide a secure seal with a similarly-shaped lid. Accordingly, the scope of the invention is properly defined by the claims set forth below.

What is claimed is:

1. A tool for forming a container from a construct, the tool comprising:
    a cavity for receiving a construct and the cavity having at least one sidewall for forming at least one sidewall of the container;
    a core operatively associated with the cavity and being operable to move into the cavity to at least partially form the construct into a three-dimensional article having at least one sidewall and a flange extending from the at least one sidewall and extending around the perimeter of the three-dimensional article;
    an injection cavity for receiving injection-molding material and directing injection-molding material around at least a portion of the perimeter of the three-dimensional article, the injection cavity comprising an advanced-flow section and a delayed-flow section, the advanced-flow section having a greater cross-sectional area than the delayed-flow section, and the advanced-flow section being located adjacent the at least one sidewall of the cavity, the injection cavity comprising a flange section extending across at least a portion of the advanced-flow section being operable to receive the flange of the three-dimensional article, the injection cavity extending around the perimeter of the cavity with the flange section and the advanced-flow section extending around the perimeter of the three-dimensional article;
    a clamping feature operatively connected to at least one of the cavity and the core, the clamping feature being for clamping a peripheral portion of the construct as the core moves into the cavity to form the construct into the container; and
    the clamping feature comprises a clamping ring and a draw ring for contact with the peripheral portion of the construct as the core is moved into the cavity, the clamping ring is operatively associated with one of the cavity and the core and is moveable relative to the one of the cavity and the core, the draw ring is operatively associated with the other of the cavity and the core and is movable relative to the other of the cavity and the core, the clamping ring has a clamping surface and the draw ring has a contact surface that is opposite the clamping surface, the clamping surface and the draw ring surface being positionable to hold the peripheral portion of the construct there between when the core moves into the cavity to form the container.

2. The tool of claim 1 wherein the cavity comprises a cavity base and the core comprises a core base, the clamping ring being operatively associated with one of the cavity base and the core base.

3. The tool of claim 2 wherein the clamping ring is operatively attached to the cavity base.

4. The tool of claim 3 wherein the draw ring is operatively associated with the core base.

5. The tool of claim 1 wherein the core comprises at least one articulated section movably received in the cavity, the articulated section being for initially gripping a central portion of the construct to hold the construct as the core is further moved into the cavity for forming the construct into the container.

6. The tool of claim 1 in combination with the construct, wherein the construct is a blank for being formed into a container.

7. The tool of claim 1 in combination with the construct, wherein the construct is a tray for being formed into a container.

8. The tool of claim 4 wherein the clamping ring is movable relative to the cavity base.

9. The tool of claim 8 wherein the draw ring is movable relative to the core base.

10. The tool of claim 1 wherein the contact surface and the clamping surface are adjacent the injection cavity.

11. The tool of claim 1 wherein the contact surface and the clamping surface are substantially parallel to at least a portion of the cavity surface.

12. The tool of claim 11 wherein the at least a portion of the cavity surface comprises an innermost portion that is for forming a bottom surface of the container formed from the construct.

13. The tool of claim 1, wherein said delayed-flow section comprises a resin section, said resin section extending laterally from said flange section.

14. The tool of claim 1, wherein the cavity comprises a shoulder at the top edge of the at least one sidewall of the cavity and extending around the perimeter of the cavity, the shoulder forms the lowermost portion of the advanced-flow section of the injection-molded cavity.

15. The tool of claim 1, wherein the at least one sidewall of the cavity comprises at least three sidewalls and the cavity comprises at least two corners, each corner being located between respective adjacent sidewalls of the at least three sidewalls, the shoulder being at the top edge of the at least three sidewalls and the at least two corners and extending around the perimeter of the cavity.

* * * * *